(12) United States Patent
Smith

(10) Patent No.: US 10,656,755 B1
(45) Date of Patent: *May 19, 2020

(54) GESTURE-EQUIPPED TOUCH SCREEN SYSTEM, METHOD, AND COMPUTER PROGRAM PRODUCT

(71) Applicant: P4TENTS1, LLC, Wilmington, DE (US)

(72) Inventor: Michael S Smith, Palo Alto, CA (US)

(73) Assignee: P4TENTS1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,022

(22) Filed: Aug. 30, 2019

Related U.S. Application Data

(63) Continuation of application No. 16/377,142, filed on Apr. 5, 2019, which is a continuation of application
(Continued)

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/016* (2013.01); *G06F 3/044* (2013.01); *G06F 3/045* (2013.01);
(Continued)

(58) Field of Classification Search
CPC ............. G06F 3/04847; G06F 3/04817; G06F 3/0482; G06F 3/04883
See application file for complete search history.

(56) References Cited

U.S. PATENT DOCUMENTS

| 3,358,493 A | 12/1967 | Erich |
| 3,524,169 A | 8/1970 | K et al. |

(Continued)

FOREIGN PATENT DOCUMENTS

| JP | 2008033739 A | 2/2008 |
| JP | 2011034216 A | 2/2011 |

(Continued)

OTHER PUBLICATIONS

US 7,965,578 B2, 06/2011, Bhakta et al. (withdrawn)
(Continued)

*Primary Examiner* — Antonio Xavier
(74) *Attorney, Agent, or Firm* — Patrick E. Caldwell, Esq.; The Caldwell Firm, LLC

(57) ABSTRACT

In one embodiment, an apparatus is provided, comprising: displaying a first user interface on a display, the first user interface including an object; while displaying the first user interface on the display, detecting a first input by a first contact on a touch-sensitive surface at a location in the first user interface that corresponds to the object of the first user interface; in response to detecting the first input by the first contact, in accordance with a determination that the first contact has a contact duration that is less than a duration threshold, displaying the object; and in response to detecting the first input by the first contact, in accordance with a determination that the first contact has a contact duration that is greater than the duration threshold, dynamically changing the appearance of the object, wherein the dynamic change in the appearance of the object is based at least in part on the duration of the first contact and wherein the dynamic change in the appearance of the object includes displaying, in sequence, at least some of a plurality of images based at least in part on the duration of the first contact.

43 Claims, 24 Drawing Sheets

Related U.S. Application Data

No. 16/153,763, filed on Oct. 6, 2018, now Pat. No. 10,275,086, which is a continuation of application No. 15/072,354, filed on Mar. 16, 2016, now Pat. No. 10,133,397, which is a continuation of application No. 13/567,004, filed on Aug. 3, 2012, now Pat. No. 9,417,754.

(60) Provisional application No. 61/581,918, filed on Dec. 30, 2011, provisional application No. 61/569,213, filed on Dec. 9, 2011, provisional application No. 61/566,577, filed on Dec. 2, 2011, provisional application No. 61/515,835, filed on Aug. 5, 2011.

(51) Int. Cl.
   *G06F 3/044* (2006.01)
   *G06F 3/01* (2006.01)
   *G06F 3/045* (2006.01)

(52) U.S. Cl.
   CPC .......... *G06F 3/0412* (2013.01); *G06F 3/0414* (2013.01); *G06F 3/04883* (2013.01); *G06F 2203/04104* (2013.01)

(56) References Cited

U.S. PATENT DOCUMENTS

| | | |
|---|---|---|
| 3,633,322 A | 1/1972 | Morcom |
| 3,659,229 A | 4/1972 | Milton |
| 3,738,166 A | 6/1973 | Fisher |
| 3,772,685 A | 11/1973 | Masi |
| 3,777,222 A | 12/1973 | Harris |
| 3,956,986 A | 5/1976 | Wirz et al. |
| 4,067,060 A | 1/1978 | Poussart et al. |
| 4,091,418 A | 5/1978 | Ciciora |
| 4,152,649 A | 5/1979 | Choquet |
| 4,293,734 A | 10/1981 | Pepper |
| 4,296,756 A | 10/1981 | Dunning et al. |
| 4,302,011 A | 11/1981 | Pepper |
| 4,353,552 A | 10/1982 | Pepper |
| 4,524,421 A | 6/1985 | Searby et al. |
| 4,554,419 A | 11/1985 | King et al. |
| 4,636,632 A | 1/1987 | Ando |
| 4,644,101 A | 2/1987 | Jin et al. |
| 4,694,468 A | 9/1987 | Cullum |
| 4,731,694 A | 3/1988 | Grabner et al. |
| 4,770,281 A | 9/1988 | Hanks |
| 5,038,142 A | 8/1991 | Flower et al. |
| 5,159,159 A | 10/1992 | Asher |
| 5,205,173 A | 4/1993 | Allen |
| 5,231,381 A | 7/1993 | Duwaer |
| 5,241,308 A | 8/1993 | Young |
| 5,247,434 A | 9/1993 | Peterson et al. |
| 5,257,413 A | 10/1993 | Warner et al. |
| 5,276,787 A | 1/1994 | Searby |
| 5,285,474 A | 2/1994 | Chow et al. |
| 5,305,423 A | 4/1994 | Clynes |
| 5,309,172 A | 5/1994 | Fox |
| 5,311,302 A | 5/1994 | Berry et al. |
| 5,343,650 A | 9/1994 | Swan |
| 5,371,760 A | 12/1994 | Allen et al. |
| 5,386,219 A | 1/1995 | Greanias et al. |
| 5,448,263 A | 9/1995 | Martin |
| 5,463,388 A | 10/1995 | Boie et al. |
| 5,483,557 A | 1/1996 | Webb |
| 5,486,286 A | 1/1996 | Peterson et al. |
| 5,487,827 A | 1/1996 | Peterson et al. |
| 5,510,813 A | 4/1996 | Makinwa et al. |
| 5,557,653 A | 9/1996 | Paterson et al. |
| 5,566,096 A | 10/1996 | Wodlinger et al. |
| 5,581,505 A | 12/1996 | Lee |
| 5,596,638 A | 1/1997 | Paterson et al. |
| 5,675,329 A | 10/1997 | Barker et al. |
| 5,680,160 A | 10/1997 | LaPointe |
| 5,687,733 A | 11/1997 | McKown |
| 5,699,082 A | 12/1997 | Marks et al. |
| 5,708,460 A | 1/1998 | Young et al. |
| 5,729,219 A | 3/1998 | Armstrong et al. |
| 5,729,612 A | 3/1998 | Abel et al. |
| 5,742,894 A | 4/1998 | Jambhekar et al. |
| 5,743,859 A | 4/1998 | Wodlinger et al. |
| 5,744,027 A | 4/1998 | Connell et al. |
| 5,794,163 A | 8/1998 | Paterson et al. |
| 5,805,950 A | 9/1998 | Inglese et al. |
| 5,825,873 A | 10/1998 | Duncan et al. |
| 5,838,244 A | 11/1998 | Schmidt et al. |
| 5,856,822 A | 1/1999 | Du et al. |
| 5,859,522 A | 1/1999 | Theobald |
| 5,884,191 A | 3/1999 | Karpus et al. |
| 5,887,995 A | 3/1999 | Holehan |
| 5,889,236 A | 3/1999 | Gillespie et al. |
| 5,925,942 A | 7/1999 | Theobald |
| 5,947,334 A | 9/1999 | Rudick et al. |
| 5,953,674 A | 9/1999 | Hutchison |
| 5,970,092 A | 10/1999 | Currivan |
| 5,983,100 A | 11/1999 | Johansson et al. |
| 5,999,892 A | 12/1999 | Fan |
| 6,012,105 A | 1/2000 | Rubbmark et al. |
| 6,020,878 A | 2/2000 | Robinson |
| 6,030,499 A | 2/2000 | Soderholm |
| 6,038,457 A | 3/2000 | Barkat |
| 6,040,933 A | 3/2000 | Khaleghi et al. |
| 6,045,512 A | 4/2000 | Roteliuk et al. |
| 6,081,724 A | 6/2000 | Wilson |
| 6,097,943 A | 8/2000 | Nordwall |
| 6,105,600 A | 8/2000 | Wang |
| 6,108,064 A | 8/2000 | Minoura et al. |
| 6,118,435 A | 9/2000 | Fujita et al. |
| 6,119,022 A | 9/2000 | Osborn et al. |
| 6,138,036 A | 10/2000 | O'Cinneide |
| 6,138,245 A | 10/2000 | Son et al. |
| 6,141,000 A | 10/2000 | Martin |
| 6,163,690 A | 12/2000 | Lilja |
| 6,169,538 B1 | 1/2001 | Nowlan et al. |
| 6,192,238 B1 | 2/2001 | Piirainen |
| 6,193,152 B1 | 2/2001 | Fernando et al. |
| 6,259,729 B1 | 7/2001 | Seki |
| 6,283,763 B1 | 9/2001 | Matsuzaki et al. |
| 6,284,131 B1 | 9/2001 | Hogard et al. |
| 6,285,890 B1 | 9/2001 | Panian |
| 6,330,247 B1 | 12/2001 | Chang et al. |
| 6,337,681 B1 | 1/2002 | Martin |
| 6,351,271 B1 | 2/2002 | Mainwaring et al. |
| 6,366,530 B1 | 4/2002 | Sluiter et al. |
| 6,371,923 B1 | 4/2002 | Roteliuk et al. |
| 6,377,825 B1 | 4/2002 | Kennedy et al. |
| 6,380,581 B1 | 4/2002 | Noble et al. |
| 6,385,463 B1 | 5/2002 | Lieberman et al. |
| 6,388,655 B1 | 5/2002 | Leung |
| 6,392,638 B2 | 5/2002 | Hanajima et al. |
| 6,417,845 B1 | 7/2002 | Chen et al. |
| 6,441,807 B1 | 8/2002 | Yamaguchi |
| 6,448,959 B1 | 9/2002 | Kawaguchi et al. |
| 6,449,492 B1 | 9/2002 | Kenagy et al. |
| 6,456,517 B2 | 9/2002 | Kim et al. |
| 6,473,630 B1 | 10/2002 | Baranowski et al. |
| 6,476,795 B1 | 11/2002 | Derocher et al. |
| 6,477,390 B1 | 11/2002 | Gum et al. |
| 6,480,149 B1 | 11/2002 | Sutherland et al. |
| 6,492,979 B1 | 12/2002 | Kent et al. |
| 6,496,854 B1 | 12/2002 | Hagersten et al. |
| 6,504,530 B1 | 1/2003 | Wilson et al. |
| 6,509,847 B1 | 1/2003 | Anderson |
| 6,523,124 B1 | 2/2003 | Lunsford et al. |
| 6,526,133 B1 | 2/2003 | Izaki et al. |
| 6,526,315 B1 | 2/2003 | Inagawa et al. |
| 6,529,744 B1 | 3/2003 | Birkler et al. |
| 6,533,757 B1 | 3/2003 | Lampropoulos et al. |
| 6,546,262 B1 | 4/2003 | Freadman |
| 6,549,790 B1 | 4/2003 | Rubbmark et al. |
| 6,564,285 B1 | 5/2003 | Mills et al. |
| 6,567,102 B2 | 5/2003 | Kung |
| 6,590,568 B1 | 7/2003 | Astala et al. |

(56) References Cited

U.S. PATENT DOCUMENTS

| | | |
|---|---|---|
| 6,603,986 B1 | 8/2003 | Bozoukov |
| 6,626,013 B2 | 9/2003 | Ohta et al. |
| 6,636,203 B1 | 10/2003 | Wong et al. |
| 6,636,749 B2 | 10/2003 | Holmes et al. |
| 6,636,918 B1 | 10/2003 | Aguilar et al. |
| 6,665,803 B2 | 12/2003 | Lunsford et al. |
| 6,670,234 B2 | 12/2003 | Hsu et al. |
| 6,689,947 B2 | 2/2004 | Ludwig |
| 6,714,802 B1 | 3/2004 | Barvesten |
| 6,721,019 B2 | 4/2004 | Kono et al. |
| 6,738,514 B1 | 5/2004 | Shin et al. |
| 6,747,636 B2 | 6/2004 | Martin |
| 6,751,113 B2 | 6/2004 | Bhakta et al. |
| 6,765,812 B2 | 7/2004 | Anderson |
| 6,776,546 B2 | 8/2004 | Kraus et al. |
| 6,791,640 B1 | 9/2004 | Okamoto et al. |
| 6,801,211 B2 | 10/2004 | Forsline et al. |
| 6,804,146 B2 | 10/2004 | Johnson |
| 6,829,297 B2 | 12/2004 | Xia et al. |
| 6,873,534 B2 | 3/2005 | Bhakta et al. |
| 6,879,318 B1 | 4/2005 | Chan et al. |
| 6,880,998 B2 | 4/2005 | Kraus et al. |
| 6,888,537 B2 | 5/2005 | Benson et al. |
| 6,892,270 B2 | 5/2005 | Roohparvar |
| 6,917,282 B2 | 7/2005 | Giegerich |
| 6,919,927 B1 | 7/2005 | Hyodo |
| 6,928,110 B2 | 8/2005 | Ougi et al. |
| 6,928,299 B1 | 8/2005 | Rinne et al. |
| 6,928,512 B2 | 8/2005 | Ayukawa et al. |
| 6,930,900 B2 | 8/2005 | Bhakta et al. |
| 6,930,903 B2 | 8/2005 | Bhakta et al. |
| 6,933,991 B2 | 8/2005 | Sanelle et al. |
| 6,954,495 B2 | 10/2005 | Piirainen |
| 6,956,562 B1 | 10/2005 | Responte et al. |
| 6,961,015 B2 | 11/2005 | Kemahan et al. |
| 6,967,903 B2 | 11/2005 | Guanter |
| 6,968,208 B2 | 11/2005 | Kacines |
| 6,975,853 B2 | 12/2005 | Fang et al. |
| 6,983,169 B2 | 1/2006 | Vogel et al. |
| 6,990,044 B2 | 1/2006 | Kang |
| 7,003,316 B1 | 2/2006 | Elias et al. |
| 7,006,851 B2 | 2/2006 | Holmes et al. |
| 7,006,854 B2 | 2/2006 | Choi |
| 7,010,325 B1 | 3/2006 | Oh |
| 7,020,488 B1 | 3/2006 | Bleile et al. |
| 7,024,230 B2 | 4/2006 | Curtiss et al. |
| 7,030,854 B2 | 4/2006 | Baucom et al. |
| 7,031,670 B2 | 4/2006 | May |
| 7,046,230 B2 | 5/2006 | Zadesky et al. |
| 7,050,783 B2 | 5/2006 | Curtiss et al. |
| 7,062,260 B2 | 6/2006 | Vuori |
| 7,062,261 B2 | 6/2006 | Goldstein et al. |
| 7,064,748 B2 | 6/2006 | Cok |
| 7,097,903 B2 | 8/2006 | Kishioka et al. |
| 7,098,776 B2 | 8/2006 | Chang et al. |
| 7,111,540 B2 | 9/2006 | Rodriquez |
| 7,122,149 B2 | 10/2006 | Li et al. |
| 7,123,936 B1 | 10/2006 | Rydbeck et al. |
| 7,138,984 B1 | 11/2006 | Miles |
| 7,148,882 B2 | 12/2006 | Kamrath et al. |
| 7,149,511 B1 | 12/2006 | Bachner et al. |
| 7,149,552 B2 | 12/2006 | Lair |
| 7,154,481 B2 | 12/2006 | Cross et al. |
| 7,155,254 B2 | 12/2006 | Pinder |
| 7,171,239 B2 | 1/2007 | Tan et al. |
| 7,176,897 B2 | 2/2007 | Roberts |
| 7,184,794 B2 | 2/2007 | Hess et al. |
| 7,190,350 B2 | 3/2007 | Roberts |
| 7,190,720 B2 | 3/2007 | Fimoff et al. |
| 7,196,694 B2 | 3/2007 | Roberts |
| 7,205,983 B2 | 4/2007 | Raap et al. |
| 7,224,992 B2 | 5/2007 | Patino et al. |
| 7,240,836 B2 | 7/2007 | Vrotsos et al. |
| 7,245,293 B2 | 7/2007 | Hoshino et al. |
| 7,254,036 B2 | 8/2007 | Pauley et al. |
| 7,254,973 B2 | 8/2007 | Campian |
| 7,269,708 B2 | 9/2007 | Ware |
| 7,280,849 B1 | 10/2007 | Bailey |
| 7,286,436 B2 | 10/2007 | Bhakta et al. |
| 7,289,113 B2 | 10/2007 | Martin |
| 7,289,386 B2 | 10/2007 | Bhakta et al. |
| 7,296,107 B2 | 11/2007 | Lunsford et al. |
| 7,303,680 B2 | 12/2007 | Connell et al. |
| 7,312,784 B2 | 12/2007 | Baucom et al. |
| 7,312,791 B2 | 12/2007 | Hoshino et al. |
| 7,315,336 B2 | 1/2008 | North et al. |
| 7,318,892 B2 | 1/2008 | Connell et al. |
| 7,343,177 B2 | 3/2008 | Seshadri et al. |
| 7,343,439 B2 | 3/2008 | Mills et al. |
| 7,360,022 B2 | 4/2008 | Tian et al. |
| 7,363,054 B2 | 4/2008 | Elias et al. |
| 7,375,970 B2 | 5/2008 | Pauley et al. |
| 7,386,656 B2 | 6/2008 | Rajan et al. |
| 7,392,338 B2 | 6/2008 | Rajan et al. |
| 7,398,105 B2 | 7/2008 | Kalogeropoulos |
| 7,403,743 B2 | 7/2008 | Welch |
| 7,405,779 B2 | 7/2008 | Sanelle et al. |
| 7,423,557 B2 | 9/2008 | Kang |
| 7,424,312 B2 | 9/2008 | Pinder et al. |
| 7,435,636 B1 | 10/2008 | Hanafi |
| 7,437,221 B2 | 10/2008 | Hardman et al. |
| 7,442,050 B1 | 10/2008 | Bhakta et al. |
| 7,472,220 B2 | 12/2008 | Rajan et al. |
| 7,492,890 B2 | 2/2009 | Milani |
| 7,493,109 B2 | 2/2009 | Munje et al. |
| 7,511,702 B2 | 3/2009 | Hotelling |
| 7,523,035 B2 | 4/2009 | Rokusek et al. |
| 7,526,317 B2 | 4/2009 | Pinder et al. |
| 7,529,872 B1 | 5/2009 | Schubert et al. |
| 7,532,492 B2 | 5/2009 | Dobyns et al. |
| 7,532,537 B2 | 5/2009 | Solomon et al. |
| 7,535,463 B2 | 5/2009 | Wilson |
| 7,538,760 B2 | 5/2009 | Hotelling et al. |
| 7,551,899 B1 | 6/2009 | Nicolas et al. |
| 7,555,311 B2 | 6/2009 | Kangas et al. |
| 7,555,318 B2 | 6/2009 | Seshadri et al. |
| 7,558,130 B2 | 7/2009 | Grunzke |
| 7,558,529 B2 | 7/2009 | Seshadri et al. |
| 7,558,894 B1 | 7/2009 | Lydon et al. |
| 7,565,179 B2 | 7/2009 | Hyatt |
| 7,565,458 B2 | 7/2009 | Thijssen |
| 7,571,295 B2 | 8/2009 | Sakarda et al. |
| 7,580,312 B2 | 8/2009 | Rajan et al. |
| 7,581,127 B2 | 8/2009 | Rajan et al. |
| 7,590,796 B2 | 9/2009 | Rajan et al. |
| 7,598,607 B2 | 10/2009 | Chung et al. |
| 7,603,148 B2 | 10/2009 | Michalak |
| 7,609,178 B2 | 10/2009 | Son et al. |
| 7,609,567 B2 | 10/2009 | Rajan et al. |
| 7,612,436 B1 | 11/2009 | Lee et al. |
| 7,619,893 B1 | 11/2009 | Yu |
| 7,619,912 B2 | 11/2009 | Bhakta et al. |
| 7,620,433 B2 | 11/2009 | Bodley |
| 7,622,365 B2 | 11/2009 | Parekh |
| 7,622,895 B1 | 11/2009 | Griffin |
| 7,623,667 B2 | 11/2009 | Sander et al. |
| 7,626,579 B2 | 12/2009 | Hague et al. |
| 7,626,594 B1 | 12/2009 | Witehira et al. |
| 7,627,128 B2 | 12/2009 | Sander et al. |
| 7,627,307 B2 | 12/2009 | Droste et al. |
| 7,627,352 B2 | 12/2009 | Gauger et al. |
| 7,630,202 B2 | 12/2009 | Pauley et al. |
| 7,633,963 B1 | 12/2009 | Anderson et al. |
| 7,636,274 B2 | 12/2009 | Solomon et al. |
| 7,639,239 B2 | 12/2009 | Kajimoto et al. |
| 7,643,642 B2 | 1/2010 | Patino et al. |
| 7,649,577 B2 | 1/2010 | Sanelle et al. |
| 7,649,605 B2 | 1/2010 | Kim |
| 7,650,168 B2 | 1/2010 | Bailey |
| 7,659,885 B2 | 2/2010 | Kraus et al. |
| 7,663,607 B2 | 2/2010 | Hotelling et al. |
| 7,675,580 B2 | 3/2010 | Rho |
| 7,680,490 B2 | 3/2010 | Bloebaum et al. |
| 7,680,514 B2 | 3/2010 | Cook et al. |

(56) References Cited

U.S. PATENT DOCUMENTS

| | | |
|---|---|---|
| 7,683,889 B2 | 3/2010 | Ribikauskas et al. |
| 7,689,168 B2 | 3/2010 | House |
| 7,692,627 B2 | 4/2010 | Wilson |
| 7,692,637 B2 | 4/2010 | Davis |
| 7,701,329 B2 | 4/2010 | Donohue |
| 7,705,824 B2 | 4/2010 | Baucom et al. |
| 7,715,831 B2 | 5/2010 | Wakefield |
| 7,715,873 B1 | 5/2010 | Biere et al. |
| 7,716,411 B2 | 5/2010 | Panabaker et al. |
| 7,721,227 B2 | 5/2010 | Ronkainen |
| 7,724,589 B2 | 5/2010 | Rajan et al. |
| 7,730,338 B2 | 6/2010 | Rajan et al. |
| 7,738,068 B2 | 6/2010 | Lee |
| 7,755,612 B2 | 7/2010 | Park et al. |
| 7,760,187 B2 | 7/2010 | Kennedy |
| 7,761,724 B2 | 7/2010 | Rajan et al. |
| 7,769,187 B1 | 8/2010 | Farrar et al. |
| 7,777,581 B2 | 8/2010 | Pfaff et al. |
| 7,778,601 B2 | 8/2010 | Seshadri et al. |
| 7,779,185 B2 | 8/2010 | Schubert et al. |
| RE41,716 E | 9/2010 | Fernando et al. |
| 7,796,652 B2 | 9/2010 | Reitlingshoefer et al. |
| 7,800,592 B2 | 9/2010 | Kerr et al. |
| 7,811,097 B1 | 10/2010 | Bhakta et al. |
| 7,813,715 B2 | 10/2010 | McKillop et al. |
| 7,814,287 B2 | 10/2010 | Pratt |
| 7,818,036 B2 | 10/2010 | Lair et al. |
| 7,818,037 B2 | 10/2010 | Lair et al. |
| 7,821,506 B2 | 10/2010 | Sato et al. |
| 7,826,318 B2 | 11/2010 | Holden et al. |
| 7,835,809 B2 | 11/2010 | Griffin |
| 7,839,643 B1 | 11/2010 | Yu |
| 7,839,645 B2 | 11/2010 | Pauley et al. |
| 7,855,931 B2 | 12/2010 | LaBerge et al. |
| 7,857,225 B2 | 12/2010 | Challa et al. |
| 7,864,627 B2 | 1/2011 | Bhakta et al. |
| 7,869,608 B2 | 1/2011 | Sander et al. |
| 7,881,150 B2 | 2/2011 | Solomon et al. |
| 7,889,786 B2 | 2/2011 | Lapointe |
| 7,902,886 B2 | 3/2011 | Pfaff et al. |
| 7,903,090 B2 | 3/2011 | Soss et al. |
| 7,903,096 B2 | 3/2011 | Jeon et al. |
| 7,912,519 B2 | 3/2011 | Lee et al. |
| 7,916,574 B1 | 3/2011 | Solomon et al. |
| 7,930,002 B2 | 4/2011 | Gong |
| 7,932,893 B1 | 4/2011 | Berthaud |
| 7,940,839 B2 | 5/2011 | Lapointe et al. |
| 7,941,591 B2 | 5/2011 | Aviles |
| 7,952,566 B2 | 5/2011 | Poupyrev et al. |
| 7,966,578 B2 | 6/2011 | Tolmasky et al. |
| 7,973,773 B2 | 7/2011 | Pryor |
| 7,973,777 B2 | 7/2011 | Lee et al. |
| 7,973,778 B2 | 7/2011 | Chen |
| 7,978,721 B2 | 7/2011 | Jeddeloh et al. |
| 7,982,721 B2 | 7/2011 | Hio |
| 7,999,795 B2 | 8/2011 | Hamblin et al. |
| 8,001,434 B1 | 8/2011 | Lee et al. |
| 8,018,723 B1 | 9/2011 | Yu et al. |
| 8,019,589 B2 | 9/2011 | Rajan et al. |
| 8,022,933 B2 | 9/2011 | Hardacker et al. |
| 8,033,836 B1 | 10/2011 | Bhakta et al. |
| 8,041,881 B2 | 10/2011 | Rajan et al. |
| 8,055,833 B2 | 11/2011 | Danilak et al. |
| 8,057,419 B2 | 11/2011 | Ellingboe et al. |
| 8,060,774 B2 | 11/2011 | Smith et al. |
| 8,068,021 B1 | 11/2011 | Donohue |
| 8,072,430 B2 | 12/2011 | Kim et al. |
| 8,072,837 B1 | 12/2011 | Solomon et al. |
| 8,077,535 B2 | 12/2011 | Schakel et al. |
| 8,081,474 B1 | 12/2011 | Zohni et al. |
| 8,081,535 B2 | 12/2011 | Bhakta et al. |
| 8,081,536 B1 | 12/2011 | Solomon et al. |
| 8,081,537 B1 | 12/2011 | Bhakta et al. |
| 8,081,677 B2 | 12/2011 | Badalone |
| 8,082,523 B2 | 12/2011 | Forstall et al. |
| 8,089,795 B2 | 1/2012 | Rajan et al. |
| 8,090,897 B2 | 1/2012 | Rajan et al. |
| 8,093,702 B2 | 1/2012 | Lua et al. |
| 8,094,134 B2 | 1/2012 | Suzuki et al. |
| 8,094,673 B2 | 1/2012 | Proctor et al. |
| 8,102,496 B2 | 1/2012 | Kim |
| 8,103,215 B2 | 1/2012 | Rek |
| 8,103,928 B2 | 1/2012 | Hargan |
| 8,106,491 B2 | 1/2012 | Corisis et al. |
| 8,106,520 B2 | 1/2012 | Keeth et al. |
| 8,111,534 B2 | 2/2012 | Walker |
| 8,111,566 B1 | 2/2012 | Wang et al. |
| 8,112,266 B2 | 2/2012 | Rajan et al. |
| 8,115,291 B2 | 2/2012 | Baek et al. |
| 8,120,044 B2 | 2/2012 | Cho et al. |
| 8,122,207 B2 | 2/2012 | Rajan et al. |
| 8,127,185 B2 | 2/2012 | Jeddeloh |
| 8,127,204 B2 | 2/2012 | Hargan |
| 8,130,527 B2 | 3/2012 | Keeth |
| 8,130,560 B1 | 3/2012 | Rajan et al. |
| 8,134,378 B2 | 3/2012 | Keeth |
| 8,135,900 B2 | 3/2012 | Kunimatsu et al. |
| 8,143,710 B2 | 3/2012 | Cho |
| 8,144,453 B2 | 3/2012 | Brown et al. |
| 8,148,763 B2 | 4/2012 | Kim et al. |
| 8,148,807 B2 | 4/2012 | Lee et al. |
| 8,154,901 B1 | 4/2012 | Lee et al. |
| 8,154,935 B2 | 4/2012 | Rajan et al. |
| 8,158,967 B2 | 4/2012 | Tang et al. |
| 8,169,233 B2 | 5/2012 | Ferolito et al. |
| 8,169,841 B2 | 5/2012 | Johnson et al. |
| 8,173,507 B2 | 5/2012 | Lim et al. |
| 8,174,105 B2 | 5/2012 | Kwang et al. |
| 8,174,115 B2 | 5/2012 | Chung |
| 8,180,954 B2 | 5/2012 | Kilzer et al. |
| 8,181,048 B2 | 5/2012 | Rajan et al. |
| 8,184,228 B2 | 5/2012 | Han et al. |
| 8,185,778 B2 | 5/2012 | Kilzer et al. |
| 8,187,901 B2 | 5/2012 | Sheen |
| 8,188,982 B2 | 5/2012 | You et al. |
| 8,189,328 B2 | 5/2012 | Kanapathippillai et al. |
| 8,193,646 B2 | 6/2012 | Wood et al. |
| 8,199,116 B2 | 6/2012 | Jeon et al. |
| 8,207,945 B2 | 6/2012 | Jong et al. |
| 8,209,479 B2 | 6/2012 | Rajan et al. |
| 8,209,628 B1 | 6/2012 | Davidson |
| 8,218,705 B2 | 7/2012 | Moghaddam et al. |
| 8,223,799 B2 | 7/2012 | Karaoguz |
| 8,228,309 B2 | 7/2012 | Tamaki et al. |
| 8,244,971 B2 | 8/2012 | Rajan et al. |
| 8,248,255 B2 | 8/2012 | Tzidon et al. |
| 8,253,699 B2 | 8/2012 | Son |
| 8,261,041 B2 | 9/2012 | Kunimatsu |
| 8,264,903 B1 | 9/2012 | Lee et al. |
| 8,265,709 B2 | 9/2012 | Forstall |
| 8,265,822 B2 | 9/2012 | Nakashima et al. |
| 8,269,731 B2 | 9/2012 | Mölne |
| 8,269,733 B2 | 9/2012 | Hu |
| 8,270,148 B2 | 9/2012 | Griffith et al. |
| 8,279,361 B2 | 10/2012 | Chen et al. |
| 8,279,690 B1 | 10/2012 | Wang et al. |
| 8,280,714 B2 | 10/2012 | Rajan et al. |
| 8,286,102 B1 | 10/2012 | Wilensky |
| 8,287,291 B1 | 10/2012 | Bhakta et al. |
| 8,291,341 B2 | 10/2012 | Tseng et al. |
| 8,291,344 B2 | 10/2012 | Chaudhri |
| 8,296,496 B2 | 10/2012 | Mogul et al. |
| 8,300,016 B2 | 10/2012 | Lu et al. |
| 8,301,833 B1 | 10/2012 | Chen et al. |
| 8,310,452 B2 | 11/2012 | Takenaka et al. |
| 8,315,349 B2 | 11/2012 | Badalone |
| 8,319,743 B2 | 11/2012 | No et al. |
| 8,325,143 B2 | 12/2012 | Destura et al. |
| 8,327,104 B2 | 12/2012 | Smith et al. |
| 8,331,579 B2 | 12/2012 | Kato |
| 8,334,835 B2 | 12/2012 | Shen et al. |
| 8,334,850 B2 | 12/2012 | Tsai |
| 8,340,953 B2 | 12/2012 | Rajan et al. |
| 8,345,018 B2 | 1/2013 | Jong et al. |

(56) References Cited

U.S. PATENT DOCUMENTS

| | | |
|---|---|---|
| 8,345,427 B2 | 1/2013 | Pauley et al. |
| 8,349,228 B2 | 1/2013 | Kazama |
| 8,355,700 B2 | 1/2013 | Lee |
| 8,359,187 B2 | 1/2013 | Rajan et al. |
| 8,359,501 B1 | 1/2013 | Lee et al. |
| 8,359,600 B2 | 1/2013 | Kang et al. |
| 8,370,566 B2 | 2/2013 | Danilak et al. |
| 8,373,675 B2 | 2/2013 | Jeon et al. |
| 8,380,263 B2 | 2/2013 | Murakami et al. |
| 8,384,674 B1 | 2/2013 | Slothower et al. |
| 8,386,833 B2 | 2/2013 | Smith et al. |
| 8,387,045 B2 | 2/2013 | Yasutaka et al. |
| 8,397,013 B1 | 3/2013 | Rosenband et al. |
| 8,400,107 B2 | 3/2013 | Taguchi et al. |
| 8,405,528 B2 | 3/2013 | Aghaei et al. |
| 8,407,412 B2 | 3/2013 | Rajan et al. |
| 8,411,039 B2 | 4/2013 | Guo et al. |
| 8,416,210 B2 | 4/2013 | Jong et al. |
| 8,417,870 B2 | 4/2013 | Lee et al. |
| 8,424,599 B2 | 4/2013 | Atencio |
| 8,427,434 B1 | 4/2013 | Merolla |
| 8,441,377 B2 | 5/2013 | Liu |
| 8,446,781 B1 | 5/2013 | Rajan et al. |
| 8,451,238 B2 | 5/2013 | Kim et al. |
| 8,452,917 B2 | 5/2013 | Amer et al. |
| 8,458,436 B2 | 6/2013 | Kunimatsu et al. |
| 8,468,469 B1 | 6/2013 | Mendis et al. |
| 8,471,824 B2 | 6/2013 | Kim et al. |
| 8,473,670 B2 | 6/2013 | Sareen et al. |
| 8,477,111 B2 | 7/2013 | Lim |
| 8,479,110 B2 | 7/2013 | Johnson et al. |
| 8,487,900 B2 | 7/2013 | Chiu et al. |
| 8,488,325 B1 | 7/2013 | Yu |
| 8,489,837 B1 | 7/2013 | Lee |
| 8,493,384 B1 | 7/2013 | Reisman et al. |
| 8,497,884 B2 | 7/2013 | Cholewin et al. |
| 8,508,494 B2 | 8/2013 | Moore |
| 8,516,185 B2 | 8/2013 | Lee et al. |
| 8,516,187 B2 | 8/2013 | Chen et al. |
| 8,516,188 B1 | 8/2013 | Solomon et al. |
| 8,534,318 B2 | 9/2013 | Kanemaru et al. |
| 8,542,193 B2 | 9/2013 | Hardacker et al. |
| 8,542,209 B2 | 9/2013 | Lim |
| 8,553,012 B2 | 10/2013 | Baucom et al. |
| 8,564,559 B2 | 10/2013 | Hou |
| 8,566,505 B2 | 10/2013 | Kilzer et al. |
| 8,566,516 B2 | 10/2013 | Schakel et al. |
| 8,566,556 B2 | 10/2013 | Rajan et al. |
| 8,566,923 B2 | 10/2013 | Fredette et al. |
| 8,581,870 B2 | 11/2013 | Bokma et al. |
| 8,587,542 B2 | 11/2013 | Moore |
| 8,589,639 B2 | 11/2013 | Nakai et al. |
| 8,591,028 B2 | 11/2013 | Dobashi |
| 8,595,419 B2 | 11/2013 | Rajan et al. |
| 8,599,634 B1 | 12/2013 | Lee et al. |
| 8,601,204 B2 | 12/2013 | Rajan et al. |
| 8,606,968 B2 | 12/2013 | Blewett et al. |
| 8,607,003 B2 | 12/2013 | Bland et al. |
| 8,611,123 B2 | 12/2013 | Koh |
| 8,615,679 B2 | 12/2013 | Smith et al. |
| 8,619,452 B2 | 12/2013 | Rajan et al. |
| 8,624,851 B2 | 1/2014 | Kim et al. |
| 8,624,867 B2 | 1/2014 | Tamaki et al. |
| 8,631,193 B2 | 1/2014 | Smith et al. |
| 8,631,220 B2 | 1/2014 | Smith et al. |
| 8,638,311 B2 | 1/2014 | Kang et al. |
| 8,648,839 B2 | 2/2014 | Liaw et al. |
| 8,654,104 B2 | 2/2014 | Reisman et al. |
| 8,667,312 B2 | 3/2014 | Rajan et al. |
| 8,671,243 B2 | 3/2014 | Chen et al. |
| 8,671,244 B2 | 3/2014 | Rajan et al. |
| 8,674,947 B2 | 3/2014 | Henderson et al. |
| 8,675,429 B1 | 3/2014 | Wang et al. |
| 8,677,060 B2 | 3/2014 | Chen et al. |
| 8,683,362 B2 | 3/2014 | Shiplacoff et al. |
| 8,689,064 B1 | 4/2014 | Lee et al. |
| 8,692,815 B2 | 4/2014 | Deslippe et al. |
| 8,698,777 B2 | 4/2014 | Endo et al. |
| 8,700,834 B2 | 4/2014 | Horn et al. |
| 8,705,239 B1 | 4/2014 | Yu et al. |
| 8,707,104 B1 | 4/2014 | Jean |
| 8,710,862 B2 | 4/2014 | Ferolito et al. |
| 8,711,116 B2 | 4/2014 | Papakipos et al. |
| 8,712,477 B2 | 4/2014 | Yu et al. |
| 8,713,357 B1 | 4/2014 | Jean et al. |
| 8,713,379 B2 | 4/2014 | Takefman et al. |
| 8,717,303 B2 | 5/2014 | Ludwig |
| 8,723,826 B2 | 5/2014 | Chen et al. |
| 8,727,557 B2 | 5/2014 | Yuan et al. |
| 8,730,199 B2 | 5/2014 | Sleeman et al. |
| 8,738,851 B2 | 5/2014 | Kunimatsu et al. |
| 8,738,853 B2 | 5/2014 | Amer et al. |
| 8,743,076 B1 | 6/2014 | Ludwig |
| 8,745,321 B2 | 6/2014 | Rajan et al. |
| 8,745,514 B1 | 6/2014 | Davidson |
| 8,751,732 B2 | 6/2014 | Danilak et al. |
| 8,754,862 B2 | 6/2014 | Zaliva |
| 8,756,364 B1 | 6/2014 | Bhakta et al. |
| 8,757,198 B2 | 6/2014 | Santamaria et al. |
| 8,760,408 B2 | 6/2014 | Heesemans et al. |
| 8,760,936 B1 | 6/2014 | Rajan et al. |
| 8,763,545 B2 | 7/2014 | Tseng |
| 8,773,937 B2 | 7/2014 | Schakel et al. |
| 8,780,089 B2 | 7/2014 | Yuan et al. |
| 8,782,350 B2 | 7/2014 | Lee et al. |
| 8,787,060 B2 | 7/2014 | Lee |
| 8,793,608 B2 | 7/2014 | Sirpal et al. |
| 8,816,993 B2 | 8/2014 | Yuan et al. |
| 8,831,687 B1 | 9/2014 | Kotab |
| 8,832,577 B2 | 9/2014 | Sirpal et al. |
| 8,836,648 B2 | 9/2014 | Wilairat |
| 8,838,076 B2 | 9/2014 | Lee |
| 8,854,317 B2 | 10/2014 | Homma et al. |
| 8,866,785 B2 | 10/2014 | Ludwig |
| 8,872,728 B2 | 10/2014 | Fujiwaka |
| 8,872,798 B2 | 10/2014 | Rabu et al. |
| 8,878,809 B1 | 11/2014 | Kim et al. |
| 8,878,810 B2 | 11/2014 | Ludwig |
| 8,884,913 B2 | 11/2014 | Saynac et al. |
| 8,896,575 B2 | 11/2014 | Goertz et al. |
| 8,913,031 B2 | 12/2014 | Honda et al. |
| 8,917,262 B2 | 12/2014 | Liaw et al. |
| 8,941,879 B2 | 1/2015 | Takahashi |
| 8,947,381 B2 | 2/2015 | Jiyama et al. |
| 8,952,987 B2 | 2/2015 | Momeyer et al. |
| 8,954,887 B1 | 2/2015 | Tseng et al. |
| 8,970,540 B1 | 3/2015 | Hebenstreit et al. |
| 8,976,128 B2 | 3/2015 | Moore |
| 8,982,081 B2 | 3/2015 | Li |
| 8,988,353 B2 | 3/2015 | Shin et al. |
| 8,988,364 B2 | 3/2015 | Lee |
| 9,003,515 B2 | 4/2015 | Ganem |
| 9,003,591 B2 | 4/2015 | Sakashita et al. |
| 9,013,414 B2 | 4/2015 | Kung et al. |
| 9,018,030 B2 | 4/2015 | Li et al. |
| 9,030,427 B2 | 5/2015 | Yasumatsu |
| 9,035,897 B2 | 5/2015 | Kinoshita |
| 9,041,679 B2 | 5/2015 | Reisman et al. |
| 9,045,670 B2 | 6/2015 | Shitara et al. |
| 9,046,999 B1 | 6/2015 | Teller et al. |
| 9,047,005 B2 | 6/2015 | Hill et al. |
| 9,052,761 B2 | 6/2015 | Zhou |
| 9,058,061 B2 | 6/2015 | Aono et al. |
| 9,058,102 B2 | 6/2015 | Miyamoto |
| 9,063,597 B2 | 6/2015 | Liaw et al. |
| 9,069,204 B2 | 6/2015 | Zhou et al. |
| 9,069,416 B2 | 6/2015 | Garrett et al. |
| 9,069,460 B2 | 6/2015 | Moore |
| 9,092,057 B2 | 7/2015 | Varela et al. |
| 9,092,129 B2 | 7/2015 | Abdo et al. |
| 9,098,193 B2 | 8/2015 | Stoneham et al. |
| 9,103,691 B2 | 8/2015 | Wäller et al. |
| 9,116,569 B2 | 8/2015 | Stacy et al. |
| 9,116,609 B2 | 8/2015 | Bocirnea |

(56) References Cited

U.S. PATENT DOCUMENTS

| | | |
|---|---|---|
| 9,125,630 B2 | 9/2015 | Menzel |
| 9,130,651 B2 | 9/2015 | Tabe |
| 9,134,880 B2 | 9/2015 | Johnson et al. |
| 9,152,240 B2 | 10/2015 | Yeh |
| 9,152,258 B2 | 10/2015 | Behdasht et al. |
| 9,152,288 B2 | 10/2015 | Dietz |
| 9,195,389 B2 | 11/2015 | Park et al. |
| 9,305,531 B2 | 4/2016 | Miwa |
| 9,405,466 B2 | 8/2016 | Suraqui |
| 9,430,122 B2 | 8/2016 | Cassar |
| 9,495,805 B2 | 11/2016 | Shim et al. |
| 9,524,042 B1 | 12/2016 | Khafizov et al. |
| 9,538,346 B2 | 1/2017 | Kim et al. |
| 9,619,141 B2 | 4/2017 | Konami |
| 9,684,521 B2 | 6/2017 | Shaffer et al. |
| 9,690,474 B2 | 6/2017 | Chen et al. |
| 9,881,608 B2 | 1/2018 | Lebeau et al. |
| 9,972,297 B2 | 5/2018 | Xu et al. |
| 10,101,898 B2 | 10/2018 | Ameline |
| 10,222,891 B1 | 3/2019 | Smith |
| 10,425,284 B2 | 9/2019 | Dellinger et al. |
| 2001/0005692 A1 | 6/2001 | Song |
| 2001/0043291 A1 | 11/2001 | Kono et al. |
| 2002/0002629 A1 | 1/2002 | Fukushima |
| 2002/0002662 A1 | 1/2002 | Olarig et al. |
| 2002/0005111 A1 | 1/2002 | Ludwig |
| 2002/0008691 A1 | 1/2002 | Hanajima et al. |
| 2002/0033919 A1 | 3/2002 | Sanelle et al. |
| 2002/0045854 A1 | 4/2002 | Royo et al. |
| 2002/0082068 A1 | 6/2002 | Singhal |
| 2002/0085952 A1 | 7/2002 | Ellingboe et al. |
| 2002/0086711 A1 | 7/2002 | Flannery |
| 2002/0116959 A1 | 8/2002 | Ohta et al. |
| 2002/0118180 A1 | 8/2002 | Martin |
| 2002/0129315 A1 | 9/2002 | Onvural et al. |
| 2002/0130832 A1 | 9/2002 | Baucom et al. |
| 2002/0180763 A1 | 12/2002 | Kung |
| 2003/0117408 A1 | 6/2003 | Forsline et al. |
| 2003/0123328 A1 | 7/2003 | Guanter |
| 2003/0147041 A1 | 8/2003 | Oh et al. |
| 2003/0151589 A1 | 8/2003 | Bensen et al. |
| 2003/0179190 A1 | 9/2003 | Franzen |
| 2003/0217972 A1 | 11/2003 | Connell et al. |
| 2003/0232192 A1 | 12/2003 | Kishioka et al. |
| 2003/0234768 A1 | 12/2003 | Rekimoto et al. |
| 2003/0235452 A1 | 12/2003 | Kraus et al. |
| 2004/0084372 A1 | 5/2004 | Connell et al. |
| 2004/0108995 A1 | 6/2004 | Hoshino et al. |
| 2004/0109788 A1 | 6/2004 | Li et al. |
| 2004/0121855 A1 | 6/2004 | Giegerich |
| 2004/0191509 A1 | 9/2004 | Kishioka et al. |
| 2004/0207542 A1 | 10/2004 | Chang et al. |
| 2004/0212598 A1 | 10/2004 | Kraus et al. |
| 2004/0212599 A1 | 10/2004 | Cok et al. |
| 2004/0239624 A1 | 12/2004 | Ramian |
| 2004/0244554 A1 | 12/2004 | Rodriguez |
| 2004/0263488 A1 | 12/2004 | Martin |
| 2005/0018495 A1 | 1/2005 | Bhakta et al. |
| 2005/0021190 A1 | 1/2005 | Worrell et al. |
| 2005/0027928 A1 | 2/2005 | Avraham et al. |
| 2005/0045540 A1 | 3/2005 | Connell et al. |
| 2005/0052425 A1 | 3/2005 | Zadesky et al. |
| 2005/0094465 A1 | 5/2005 | Gervasi et al. |
| 2005/0099403 A1 | 5/2005 | Kraus et al. |
| 2005/0102444 A1 | 5/2005 | Cruz |
| 2005/0128853 A1 | 6/2005 | Ayukawa et al. |
| 2005/0156892 A1 | 7/2005 | Grant |
| 2005/0182893 A1 | 8/2005 | Suh |
| 2005/0204091 A1 | 9/2005 | Kilbuck et al. |
| 2005/0231461 A1 | 10/2005 | Raap et al. |
| 2005/0242034 A1 | 11/2005 | Connell et al. |
| 2005/0251617 A1 | 11/2005 | Sinclair et al. |
| 2005/0264521 A1 | 12/2005 | Liu et al. |
| 2005/0270037 A1 | 12/2005 | Haynes et al. |
| 2005/0280746 A1 | 12/2005 | North et al. |
| 2006/0001654 A1 | 1/2006 | Smits |
| 2006/0001800 A1 | 1/2006 | Sanelle et al. |
| 2006/0007222 A1 | 1/2006 | Uy |
| 2006/0022952 A1 | 2/2006 | Ryynanen |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033701 A1 | 2/2006 | Wilson |
| 2006/0044281 A1 | 3/2006 | Lai et al. |
| 2006/0066590 A1 | 3/2006 | Ozawa et al. |
| 2006/0075402 A1 | 4/2006 | Neiger et al. |
| 2006/0077186 A1 | 4/2006 | Park et al. |
| 2006/0078295 A1 | 4/2006 | Yamashita |
| 2006/0085757 A1 | 4/2006 | Andre et al. |
| 2006/0107719 A1 | 5/2006 | Campian |
| 2006/0114646 A1 | 6/2006 | Koibuchi et al. |
| 2006/0119586 A1 | 6/2006 | Grant et al. |
| 2006/0138630 A1 | 6/2006 | Bhakta |
| 2006/0138983 A1 | 6/2006 | Lee et al. |
| 2006/0139340 A1 | 6/2006 | Geaghan |
| 2006/0146014 A1 | 7/2006 | Lehtonen |
| 2006/0146032 A1 | 7/2006 | Kajimoto et al. |
| 2006/0161871 A1 | 7/2006 | Hotelling et al. |
| 2006/0167400 A1 | 7/2006 | Ellingboe et al. |
| 2006/0179088 A1 | 8/2006 | Kang |
| 2006/0195064 A1 | 8/2006 | Plahey et al. |
| 2006/0197736 A1 | 9/2006 | Baucom et al. |
| 2006/0197737 A1 | 9/2006 | Baucom et al. |
| 2006/0197750 A1 | 9/2006 | Kerr et al. |
| 2006/0203899 A1 | 9/2006 | Gee |
| 2006/0209039 A1 | 9/2006 | Destura et al. |
| 2006/0238495 A1 | 10/2006 | Davis |
| 2006/0244733 A1 | 11/2006 | Geaghan |
| 2006/0250377 A1 | 11/2006 | Zadesky et al. |
| 2006/0260711 A1 | 11/2006 | Fry et al. |
| 2006/0262099 A1 | 11/2006 | Destura et al. |
| 2006/0274050 A1 | 12/2006 | Lii |
| 2006/0284874 A1 | 12/2006 | Wilson |
| 2006/0294295 A1 | 12/2006 | Fukuzo |
| 2007/0008064 A1 | 1/2007 | Donohue |
| 2007/0035526 A1 | 2/2007 | Takenaka et al. |
| 2007/0040814 A1 | 2/2007 | Lee et al. |
| 2007/0066310 A1 | 3/2007 | Haar et al. |
| 2007/0070047 A1 | 3/2007 | Jeon et al. |
| 2007/0085837 A1 | 4/2007 | Ricks et al. |
| 2007/0097073 A1 | 5/2007 | Takashima et al. |
| 2007/0097151 A1 | 5/2007 | Rosenberg |
| 2007/0103449 A1 | 5/2007 | Laitinen et al. |
| 2007/0103454 A1 | 5/2007 | Elias |
| 2007/0113681 A1 | 5/2007 | Nishimura et al. |
| 2007/0137901 A1 | 6/2007 | Chen |
| 2007/0146313 A1 | 6/2007 | Newman et al. |
| 2007/0146343 A1 | 6/2007 | Prados |
| 2007/0148371 A1 | 6/2007 | Kazama |
| 2007/0153215 A1 | 7/2007 | Lee |
| 2007/0176902 A1 | 8/2007 | Newman et al. |
| 2007/0182864 A1 | 8/2007 | Stoneham et al. |
| 2007/0192563 A1 | 8/2007 | Rajan et al. |
| 2007/0195029 A1 | 8/2007 | Jeon et al. |
| 2007/0204075 A1 | 8/2007 | Rajan et al. |
| 2007/0204079 A1 | 8/2007 | Wu |
| 2007/0229477 A1 | 10/2007 | Ludwig |
| 2007/0236470 A1 | 10/2007 | Abanami et al. |
| 2007/0237170 A1 | 10/2007 | Proctor et al. |
| 2007/0246494 A1 | 10/2007 | Kim et al. |
| 2007/0262967 A1 | 11/2007 | Rho |
| 2007/0268261 A1 | 11/2007 | Lipson |
| 2007/0270179 A1 | 11/2007 | Lee et al. |
| 2007/0271513 A1 | 11/2007 | Andren |
| 2007/0273671 A1 | 11/2007 | Zadesky et al. |
| 2007/0291009 A1 | 12/2007 | Wright et al. |
| 2008/0007675 A1 | 1/2008 | Sanelle et al. |
| 2008/0010435 A1 | 1/2008 | Smith et al. |
| 2008/0018613 A1 | 1/2008 | Kim et al. |
| 2008/0024459 A1 | 1/2008 | Poupyrev et al. |
| 2008/0024712 A1 | 1/2008 | Kim |
| 2008/0025108 A1 | 1/2008 | Rajan et al. |
| 2008/0025122 A1 | 1/2008 | Schakel et al. |

(56) References Cited

U.S. PATENT DOCUMENTS

| | | |
|---|---|---|
| 2008/0025123 A1 | 1/2008 | Rajan et al. |
| 2008/0025124 A1 | 1/2008 | Rajan et al. |
| 2008/0025136 A1 | 1/2008 | Rajan et al. |
| 2008/0025137 A1 | 1/2008 | Rajan et al. |
| 2008/0026803 A1 | 1/2008 | Demuynck |
| 2008/0027697 A1 | 1/2008 | Rajan et al. |
| 2008/0027702 A1 | 1/2008 | Rajan et al. |
| 2008/0027703 A1 | 1/2008 | Rajan et al. |
| 2008/0028135 A1 | 1/2008 | Rajan et al. |
| 2008/0028136 A1 | 1/2008 | Schakel et al. |
| 2008/0028137 A1 | 1/2008 | Schakel et al. |
| 2008/0031030 A1 | 2/2008 | Rajan et al. |
| 2008/0031072 A1 | 2/2008 | Rajan et al. |
| 2008/0037353 A1 | 2/2008 | Rajan et al. |
| 2008/0056014 A1 | 3/2008 | Rajan et al. |
| 2008/0060854 A1 | 3/2008 | Perlin |
| 2008/0062169 A1 | 3/2008 | Heesemans et al. |
| 2008/0062773 A1 | 3/2008 | Rajan et al. |
| 2008/0066010 A1 | 3/2008 | Brodersen et al. |
| 2008/0068343 A1 | 3/2008 | Hoshino et al. |
| 2008/0082763 A1 | 4/2008 | Rajan et al. |
| 2008/0088600 A1 | 4/2008 | Prest et al. |
| 2008/0088602 A1 | 4/2008 | Hotelling |
| 2008/0094367 A1 | 4/2008 | De et al. |
| 2008/0098331 A1 | 4/2008 | Novick et al. |
| 2008/0100568 A1 | 5/2008 | Koch et al. |
| 2008/0100584 A1 | 5/2008 | Hague et al. |
| 2008/0100590 A1 | 5/2008 | Hur et al. |
| 2008/0103753 A1 | 5/2008 | Rajan et al. |
| 2008/0104314 A1 | 5/2008 | Rajan et al. |
| 2008/0104344 A1 | 5/2008 | Shimozono et al. |
| 2008/0105600 A1 | 5/2008 | Connell et al. |
| 2008/0109206 A1 | 5/2008 | Rajan et al. |
| 2008/0109595 A1 | 5/2008 | Rajan et al. |
| 2008/0109597 A1 | 5/2008 | Schakel et al. |
| 2008/0109598 A1 | 5/2008 | Schakel et al. |
| 2008/0109629 A1 | 5/2008 | Karamcheti et al. |
| 2008/0115006 A1 | 5/2008 | Smith et al. |
| 2008/0117573 A1 | 5/2008 | Im et al. |
| 2008/0120443 A1 | 5/2008 | Rajan et al. |
| 2008/0122315 A1 | 5/2008 | Maruyama et al. |
| 2008/0123459 A1 | 5/2008 | Rajan et al. |
| 2008/0126687 A1 | 5/2008 | Rajan et al. |
| 2008/0126688 A1 | 5/2008 | Rajan et al. |
| 2008/0126689 A1 | 5/2008 | Rajan et al. |
| 2008/0126692 A1 | 5/2008 | Rajan et al. |
| 2008/0130910 A1 | 6/2008 | Jobling et al. |
| 2008/0133825 A1 | 6/2008 | Rajan et al. |
| 2008/0136790 A1 | 6/2008 | Hio |
| 2008/0146285 A1 | 6/2008 | Lee et al. |
| 2008/0146297 A1 | 6/2008 | Ho |
| 2008/0150911 A1 | 6/2008 | Harrison |
| 2008/0158171 A1 | 7/2008 | Wong et al. |
| 2008/0165255 A1 | 7/2008 | Christie et al. |
| 2008/0169960 A1 | 7/2008 | Rosenbury |
| 2008/0174570 A1 | 7/2008 | Jobs et al. |
| 2008/0177662 A1 | 7/2008 | Smith et al. |
| 2008/0204427 A1 | 8/2008 | Heesemans et al. |
| 2008/0210843 A1 | 9/2008 | Han et al. |
| 2008/0211786 A1 | 9/2008 | Park et al. |
| 2008/0215192 A1 | 9/2008 | Hardman et al. |
| 2008/0231605 A1 | 9/2008 | Yang |
| 2008/0238884 A1 | 10/2008 | Harish |
| 2008/0239857 A1 | 10/2008 | Rajan et al. |
| 2008/0239858 A1 | 10/2008 | Rajan et al. |
| 2008/0240223 A1 | 10/2008 | Badalone |
| 2008/0250408 A1 | 10/2008 | Tsui et al. |
| 2008/0252607 A1 | 10/2008 | De Jong et al. |
| 2008/0252616 A1 | 10/2008 | Chen |
| 2008/0259046 A1 | 10/2008 | Carsanaro |
| 2008/0272478 A1 | 11/2008 | Anderson et al. |
| 2008/0290435 A1 | 11/2008 | Oliver et al. |
| 2008/0295839 A1 | 12/2008 | Habashi |
| 2008/0297487 A1 | 12/2008 | Hotelling et al. |
| 2008/0298113 A1 | 12/2008 | Liu et al. |
| 2008/0304431 A1 | 12/2008 | Karaoguz |
| 2008/0308946 A1 | 12/2008 | Pratt |
| 2009/0002312 A1 | 1/2009 | Son |
| 2009/0007684 A1 | 1/2009 | Kurtz et al. |
| 2009/0014876 A1 | 1/2009 | Youn et al. |
| 2009/0022256 A1 | 1/2009 | Fitzgerald |
| 2009/0024789 A1 | 1/2009 | Rajan et al. |
| 2009/0026600 A1 | 1/2009 | Koon et al. |
| 2009/0027836 A1 | 1/2009 | Wakihara |
| 2009/0036111 A1 | 2/2009 | Danford et al. |
| 2009/0036176 A1 | 2/2009 | Ure |
| 2009/0039492 A1 | 2/2009 | Kang et al. |
| 2009/0045489 A1 | 2/2009 | Koon et al. |
| 2009/0046110 A1 | 2/2009 | Sadler et al. |
| 2009/0051659 A1 | 2/2009 | Mickelborough |
| 2009/0052218 A1 | 2/2009 | Kang |
| 2009/0058829 A1 | 3/2009 | Kim et al. |
| 2009/0061823 A1 | 3/2009 | Chu |
| 2009/0065948 A1 | 3/2009 | Wang |
| 2009/0066660 A1 | 3/2009 | Ure |
| 2009/0067256 A1 | 3/2009 | Bhattacharyya et al. |
| 2009/0072662 A1 | 3/2009 | Sadler et al. |
| 2009/0073138 A1 | 3/2009 | Lee et al. |
| 2009/0083665 A1 | 3/2009 | Anttila et al. |
| 2009/0085225 A1 | 4/2009 | Park |
| 2009/0085608 A1 | 4/2009 | Alzheimer |
| 2009/0085881 A1 | 4/2009 | Keam |
| 2009/0086420 A1 | 4/2009 | Stockham et al. |
| 2009/0090950 A1 | 4/2009 | Forbes et al. |
| 2009/0091536 A1 | 4/2009 | Callaghan |
| 2009/0091962 A1 | 4/2009 | Chung et al. |
| 2009/0103675 A1 | 4/2009 | Moghaddam et al. |
| 2009/0127668 A1 | 5/2009 | Choi |
| 2009/0128991 A1 | 5/2009 | Mauritzson |
| 2009/0140985 A1 | 6/2009 | Liu |
| 2009/0143652 A1 | 6/2009 | Warburton et al. |
| 2009/0153340 A1 | 6/2009 | Pinder et al. |
| 2009/0158152 A1 | 6/2009 | Kodimer et al. |
| 2009/0160781 A1 | 6/2009 | Henderson et al. |
| 2009/0166846 A1 | 7/2009 | Pratt et al. |
| 2009/0179780 A1 | 7/2009 | Tambe |
| 2009/0180257 A1 | 7/2009 | Park et al. |
| 2009/0184921 A1 | 7/2009 | Scott et al. |
| 2009/0197394 A1 | 8/2009 | Parekh |
| 2009/0206431 A1 | 8/2009 | Bolken et al. |
| 2009/0213066 A1 | 8/2009 | Hardacker et al. |
| 2009/0224822 A1 | 9/2009 | Alzheimer et al. |
| 2009/0225053 A1 | 9/2009 | Hu |
| 2009/0231290 A1 | 9/2009 | Chen |
| 2009/0237970 A1 | 9/2009 | Chung |
| 2009/0255705 A1 | 10/2009 | Pratt |
| 2009/0256807 A1 | 10/2009 | Nurmi |
| 2009/0259806 A1 | 10/2009 | Kilzer et al. |
| 2009/0261457 A1 | 10/2009 | Pratt |
| 2009/0271731 A1 | 10/2009 | Lin et al. |
| 2009/0285031 A1 | 11/2009 | Rajan et al. |
| 2009/0289912 A1 | 11/2009 | Chen et al. |
| 2009/0295747 A1 | 12/2009 | Hsieh et al. |
| 2009/0296341 A1 | 12/2009 | Eldershaw |
| 2009/0300314 A1 | 12/2009 | LaBerge et al. |
| 2009/0300444 A1 | 12/2009 | Jeddeloh |
| 2009/0302484 A1 | 12/2009 | Lee et al. |
| 2009/0309142 A1 | 12/2009 | Akram |
| 2009/0315741 A1 | 12/2009 | Kim |
| 2009/0319703 A1 | 12/2009 | Chung |
| 2009/0321861 A1 | 12/2009 | Oliver et al. |
| 2009/0321947 A1 | 12/2009 | Pratt |
| 2009/0323206 A1 | 12/2009 | Oliver et al. |
| 2009/0327979 A1 | 12/2009 | Haverinen et al. |
| 2010/0005390 A1 | 1/2010 | Bong |
| 2010/0017872 A1 | 1/2010 | Goertz et al. |
| 2010/0020039 A1 | 1/2010 | Ricks et al. |
| 2010/0026640 A1 | 2/2010 | Kim et al. |
| 2010/0031186 A1 | 2/2010 | Tseng et al. |
| 2010/0035656 A1 | 2/2010 | Pan |
| 2010/0039393 A1 | 2/2010 | Pratt et al. |
| 2010/0045612 A1 | 2/2010 | Mölne |
| 2010/0045621 A1 | 2/2010 | Kang et al. |
| 2010/0052880 A1 | 3/2010 | Laitinen et al. |

(56) References Cited

U.S. PATENT DOCUMENTS

| | | |
|---|---|---|
| 2010/0053103 A1 | 3/2010 | No et al. |
| 2010/0053116 A1 | 3/2010 | Daverman et al. |
| 2010/0053532 A1 | 3/2010 | Lai |
| 2010/0058211 A1 | 3/2010 | Lee et al. |
| 2010/0066764 A1 | 3/2010 | Refai |
| 2010/0077829 A1 | 4/2010 | Batista et al. |
| 2010/0079398 A1 | 4/2010 | Shen et al. |
| 2010/0085500 A1 | 4/2010 | Kim |
| 2010/0088654 A1 | 4/2010 | Henhoeffer |
| 2010/0090973 A1 | 4/2010 | Algreatly |
| 2010/0090982 A1 | 4/2010 | Oba et al. |
| 2010/0097347 A1 | 4/2010 | Lin |
| 2010/0110748 A1 | 5/2010 | Best |
| 2010/0117959 A1 | 5/2010 | Hong et al. |
| 2010/0127983 A1 | 5/2010 | Irani et al. |
| 2010/0134429 A1 | 6/2010 | You et al. |
| 2010/0134448 A1 | 6/2010 | Park et al. |
| 2010/0149101 A1 | 6/2010 | Guo et al. |
| 2010/0149124 A1 | 6/2010 | Kim et al. |
| 2010/0149129 A1 | 6/2010 | Homma et al. |
| 2010/0153879 A1* | 6/2010 | Rimas-Ribikauskas ................... G06F 3/0414 715/810 |
| 2010/0156814 A1 | 6/2010 | Weber et al. |
| 2010/0156818 A1 | 6/2010 | Burrough et al. |
| 2010/0156823 A1 | 6/2010 | Paleczny et al. |
| 2010/0164745 A1 | 7/2010 | Migos et al. |
| 2010/0164884 A1 | 7/2010 | Chiu et al. |
| 2010/0171711 A1 | 7/2010 | Mak-Fan et al. |
| 2010/0177057 A1 | 7/2010 | Flint et al. |
| 2010/0188327 A1 | 7/2010 | Frid et al. |
| 2010/0188353 A1 | 7/2010 | Yoon et al. |
| 2010/0188365 A1 | 7/2010 | Tamaki et al. |
| 2010/0194709 A1 | 8/2010 | Tamaki et al. |
| 2010/0201651 A1 | 8/2010 | Baucom et al. |
| 2010/0206560 A1 | 8/2010 | Atencio |
| 2010/0207900 A1 | 8/2010 | Kung et al. |
| 2010/0208082 A1 | 8/2010 | Buchner et al. |
| 2010/0214239 A1 | 8/2010 | Wu |
| 2010/0214499 A1 | 8/2010 | Sanelle et al. |
| 2010/0220065 A1 | 9/2010 | Ma |
| 2010/0222735 A1 | 9/2010 | Plahey et al. |
| 2010/0225608 A1 | 9/2010 | Zhou et al. |
| 2010/0240390 A1 | 9/2010 | Russ et al. |
| 2010/0241984 A1 | 9/2010 | Nurmi et al. |
| 2010/0241989 A1 | 9/2010 | Wen |
| 2010/0245282 A1 | 9/2010 | Lai |
| 2010/0250112 A1* | 9/2010 | Ushida ................ G01C 21/3614 701/532 |
| 2010/0251119 A1 | 9/2010 | Geppert et al. |
| 2010/0257304 A1 | 10/2010 | Rajan et al. |
| 2010/0259490 A1 | 10/2010 | Lee |
| 2010/0271888 A1 | 10/2010 | Rajan et al. |
| 2010/0277432 A1 | 11/2010 | Tsai |
| 2010/0281280 A1 | 11/2010 | Rajan et al. |
| 2010/0293460 A1 | 11/2010 | Budelli |
| 2010/0302281 A1 | 12/2010 | Kim |
| 2010/0328230 A1 | 12/2010 | Faubert et al. |
| 2010/0332635 A1 | 12/2010 | Rogel et al. |
| 2011/0001706 A1 | 1/2011 | Sanford et al. |
| 2011/0007023 A1 | 1/2011 | Abrahamsson et al. |
| 2011/0012921 A1 | 1/2011 | Cholewin et al. |
| 2011/0016250 A1 | 1/2011 | Lee et al. |
| 2011/0018695 A1 | 1/2011 | Bells et al. |
| 2011/0025969 A1 | 2/2011 | Chen et al. |
| 2011/0029868 A1 | 2/2011 | Moran et al. |
| 2011/0035540 A1 | 2/2011 | Fitzgerald et al. |
| 2011/0037609 A1 | 2/2011 | Kim et al. |
| 2011/0037726 A1 | 2/2011 | Lee |
| 2011/0044064 A1 | 2/2011 | Flu et al. |
| 2011/0045813 A1 | 2/2011 | Choi |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050592 A1 | 3/2011 | Kim et al. |
| 2011/0050593 A1 | 3/2011 | Kim et al. |
| 2011/0050594 A1* | 3/2011 | Kim ................... G06F 3/04847 345/173 |
| 2011/0050608 A1 | 3/2011 | Homma et al. |
| 2011/0050653 A1 | 3/2011 | Miyazawa et al. |
| 2011/0051334 A1 | 3/2011 | Griffith et al. |
| 2011/0057613 A1 | 3/2011 | Taguchi et al. |
| 2011/0057889 A1 | 3/2011 | Sakatsume |
| 2011/0059777 A1 | 3/2011 | Rao |
| 2011/0061021 A1 | 3/2011 | Kang et al. |
| 2011/0063248 A1 | 3/2011 | Yoon |
| 2011/0066790 A1 | 3/2011 | Mogul et al. |
| 2011/0080417 A1 | 4/2011 | Lin et al. |
| 2011/0084921 A1 | 4/2011 | Kang et al. |
| 2011/0088416 A1 | 4/2011 | Koethler |
| 2011/0095783 A1 | 4/2011 | Ferolito et al. |
| 2011/0102336 A1 | 5/2011 | Seok et al. |
| 2011/0102347 A1 | 5/2011 | Im et al. |
| 2011/0107212 A1 | 5/2011 | Jeong |
| 2011/0109573 A1 | 5/2011 | Deslippe et al. |
| 2011/0109829 A1 | 5/2011 | Mathew et al. |
| 2011/0110047 A1 | 5/2011 | Pauley et al. |
| 2011/0113208 A1 | 5/2011 | Jouppi et al. |
| 2011/0115738 A1 | 5/2011 | Suzuki et al. |
| 2011/0117968 A1 | 5/2011 | Eromaki |
| 2011/0118029 A1 | 5/2011 | Lukas et al. |
| 2011/0122084 A1 | 5/2011 | Jeon et al. |
| 2011/0141052 A1 | 6/2011 | Bemstein et al. |
| 2011/0152739 A1 | 6/2011 | Roncadi et al. |
| 2011/0164047 A1 | 7/2011 | Pance |
| 2011/0169745 A1 | 7/2011 | Fang et al. |
| 2011/0169775 A1 | 7/2011 | Liaw et al. |
| 2011/0175805 A1 | 7/2011 | Rottler et al. |
| 2011/0175844 A1 | 7/2011 | Berggren |
| 2011/0175845 A1 | 7/2011 | Honda et al. |
| 2011/0175902 A1 | 7/2011 | Mahowald |
| 2011/0181552 A1 | 7/2011 | Goertz et al. |
| 2011/0205446 A1 | 8/2011 | Hardacker et al. |
| 2011/0210942 A1 | 9/2011 | Kitamori et al. |
| 2011/0210943 A1 | 9/2011 | Zaliva |
| 2011/0227830 A1 | 9/2011 | Chun |
| 2011/0227836 A1 | 9/2011 | Li et al. |
| 2011/0227877 A1 | 9/2011 | Chen |
| 2011/0239110 A1 | 9/2011 | Garrett et al. |
| 2011/0248941 A1 | 10/2011 | Abdo et al. |
| 2011/0254793 A1 | 10/2011 | Ban et al. |
| 2011/0260984 A1 | 10/2011 | Paleczny |
| 2011/0260994 A1 | 10/2011 | Saynac et al. |
| 2011/0261002 A1 | 10/2011 | Verthein |
| 2011/0273394 A1 | 11/2011 | Young et al. |
| 2011/0273396 A1 | 11/2011 | Chung |
| 2011/0291945 A1 | 12/2011 | Ewing et al. |
| 2011/0291953 A1 | 12/2011 | Cheok et al. |
| 2011/0302493 A1 | 12/2011 | Runstedler et al. |
| 2011/0310537 A1 | 12/2011 | Imamura et al. |
| 2011/0314423 A1 | 12/2011 | Ohmiya et al. |
| 2012/0007821 A1 | 1/2012 | Zaliva |
| 2012/0008436 A1 | 1/2012 | Rajan et al. |
| 2012/0011310 A1 | 1/2012 | Rajan et al. |
| 2012/0011386 A1 | 1/2012 | Rajan et al. |
| 2012/0013566 A1 | 1/2012 | Chung |
| 2012/0018871 A1 | 1/2012 | Lee et al. |
| 2012/0019448 A1 | 1/2012 | Pitkanen et al. |
| 2012/0023450 A1 | 1/2012 | Noto et al. |
| 2012/0032876 A1 | 2/2012 | Tabe |
| 2012/0034954 A1 | 2/2012 | Tabe |
| 2012/0037878 A1 | 2/2012 | Liu |
| 2012/0038045 A1 | 2/2012 | Lee |
| 2012/0042204 A1 | 2/2012 | Smith et al. |
| 2012/0044172 A1 | 2/2012 | Ohki et al. |
| 2012/0056846 A1 | 3/2012 | Zaliva |
| 2012/0059976 A1 | 3/2012 | Rosenband et al. |
| 2012/0059978 A1 | 3/2012 | Rosenband et al. |
| 2012/0060123 A1 | 3/2012 | Smith |
| 2012/0063194 A1 | 3/2012 | Beek et al. |
| 2012/0069647 A1 | 3/2012 | Kramer et al. |
| 2012/0070973 A1 | 3/2012 | Sandhu et al. |
| 2012/0074584 A1 | 3/2012 | Lee et al. |
| 2012/0077314 A1 | 3/2012 | Park et al. |

(56) References Cited

U.S. PATENT DOCUMENTS

| | | |
|---|---|---|
| 2012/0081290 A1 | 4/2012 | Heo |
| 2012/0086670 A1 | 4/2012 | Teil et al. |
| 2012/0102401 A1 | 4/2012 | Ijas et al. |
| 2012/0105358 A1 | 5/2012 | Momeyer et al. |
| 2012/0105367 A1 | 5/2012 | Son et al. |
| 2012/0105370 A1 | 5/2012 | Moore |
| 2012/0106228 A1 | 5/2012 | Lee |
| 2012/0109037 A1 | 5/2012 | Ellingboe et al. |
| 2012/0109621 A1 | 5/2012 | Rajan et al. |
| 2012/0117507 A1 | 5/2012 | Tseng et al. |
| 2012/0124281 A1 | 5/2012 | Rajan et al. |
| 2012/0126883 A1 | 5/2012 | Juengling |
| 2012/0127685 A1 | 5/2012 | Corisis et al. |
| 2012/0135567 A1 | 5/2012 | Akram et al. |
| 2012/0135569 A1 | 5/2012 | Corisis |
| 2012/0138927 A1 | 6/2012 | Kang |
| 2012/0140583 A1 | 6/2012 | Chung |
| 2012/0147684 A1 | 6/2012 | Schakel et al. |
| 2012/0154328 A1 | 6/2012 | Kono |
| 2012/0159387 A1 | 6/2012 | Oh et al. |
| 2012/0159402 A1* | 6/2012 | Nurmi .............. G06F 3/04883 715/863 |
| 2012/0162087 A1 | 6/2012 | Hou |
| 2012/0162213 A1 | 6/2012 | Shim et al. |
| 2012/0180043 A1 | 7/2012 | Tsirkin et al. |
| 2012/0182249 A1 | 7/2012 | Endo et al. |
| 2012/0182296 A1 | 7/2012 | Han |
| 2012/0192108 A1 | 7/2012 | Kolb |
| 2012/0194461 A1 | 8/2012 | Lim |
| 2012/0194462 A1 | 8/2012 | Lim |
| 2012/0201088 A1 | 8/2012 | Rajan et al. |
| 2012/0203958 A1 | 8/2012 | Jones et al. |
| 2012/0203993 A1 | 8/2012 | Virgin et al. |
| 2012/0204079 A1 | 8/2012 | Takefman et al. |
| 2012/0206165 A1 | 8/2012 | Ferolito et al. |
| 2012/0212420 A1 | 8/2012 | Shin |
| 2012/0223900 A1 | 9/2012 | Jiyama et al. |
| 2012/0226924 A1 | 9/2012 | Rajan et al. |
| 2012/0229403 A1 | 9/2012 | Jong et al. |
| 2012/0229404 A1 | 9/2012 | Jong et al. |
| 2012/0229405 A1 | 9/2012 | Jong et al. |
| 2012/0231853 A1 | 9/2012 | Takahashi et al. |
| 2012/0239874 A1 | 9/2012 | Lee et al. |
| 2012/0240044 A1 | 9/2012 | Johnson et al. |
| 2012/0242610 A1 | 9/2012 | Yasumatsu |
| 2012/0244348 A1 | 9/2012 | Park et al. |
| 2012/0250386 A1 | 10/2012 | Lee et al. |
| 2012/0252426 A1 | 10/2012 | Nagaoka et al. |
| 2012/0254519 A1 | 10/2012 | Ellis |
| 2012/0254747 A1 | 10/2012 | Bocirnea |
| 2012/0266072 A1 | 10/2012 | Karaoguz |
| 2012/0268361 A1 | 10/2012 | Shotel et al. |
| 2012/0271990 A1 | 10/2012 | Chen et al. |
| 2012/0274662 A1 | 11/2012 | Kim et al. |
| 2012/0289290 A1 | 11/2012 | Chae et al. |
| 2012/0290946 A1 | 11/2012 | Schrock et al. |
| 2012/0293449 A1 | 11/2012 | Dietz |
| 2012/0299980 A1 | 11/2012 | Fujikawa |
| 2012/0306764 A1 | 12/2012 | Kamibeppu |
| 2012/0306765 A1 | 12/2012 | Moore |
| 2012/0306766 A1 | 12/2012 | Moore |
| 2012/0306775 A1 | 12/2012 | Miyachi et al. |
| 2012/0306788 A1 | 12/2012 | Chen et al. |
| 2012/0312806 A1 | 12/2012 | Burt et al. |
| 2012/0313888 A1 | 12/2012 | Lee et al. |
| 2012/0317433 A1 | 12/2012 | Ellis et al. |
| 2013/0002610 A1 | 1/2013 | Ho et al. |
| 2013/0007399 A1 | 1/2013 | Smith et al. |
| 2013/0009869 A1 | 1/2013 | Wilensky |
| 2013/0016586 A1 | 1/2013 | Craig |
| 2013/0019076 A1 | 1/2013 | Amidi et al. |
| 2013/0021285 A1 | 1/2013 | Kimura et al. |
| 2013/0021295 A1 | 1/2013 | Kimura et al. |
| 2013/0027350 A1 | 1/2013 | Liaw et al. |
| 2013/0027358 A1 | 1/2013 | Liaw et al. |
| 2013/0044062 A1 | 2/2013 | Bose et al. |
| 2013/0050122 A1 | 2/2013 | Kang et al. |
| 2013/0050141 A1 | 2/2013 | Park et al. |
| 2013/0054881 A1 | 2/2013 | Ellis et al. |
| 2013/0055134 A1 | 2/2013 | Knor |
| 2013/0060994 A1 | 3/2013 | Higgins et al. |
| 2013/0061019 A1 | 3/2013 | Fitzpatrick et al. |
| 2013/0061101 A1 | 3/2013 | Fitzpatrick et al. |
| 2013/0063364 A1 | 3/2013 | Moore |
| 2013/0063389 A1 | 3/2013 | Moore |
| 2013/0076649 A1 | 3/2013 | Myers et al. |
| 2013/0076941 A1 | 3/2013 | Palanciuc et al. |
| 2013/0082970 A1 | 4/2013 | Frey et al. |
| 2013/0082979 A1 | 4/2013 | Rabu et al. |
| 2013/0085215 A1 | 4/2013 | Shitara et al. |
| 2013/0086309 A1 | 4/2013 | Lee et al. |
| 2013/0093687 A1 | 4/2013 | Papakipos et al. |
| 2013/0100070 A1 | 4/2013 | Zheng et al. |
| 2013/0100087 A1 | 4/2013 | Liaw et al. |
| 2013/0102371 A1 | 4/2013 | Silva |
| 2013/0103377 A1 | 4/2013 | Rajan et al. |
| 2013/0103897 A1 | 4/2013 | Rajan et al. |
| 2013/0106802 A1 | 5/2013 | Liaw et al. |
| 2013/0109928 A1 | 5/2013 | Menzel |
| 2013/0120284 A1 | 5/2013 | Chen et al. |
| 2013/0120298 A1 | 5/2013 | Zhou |
| 2013/0120302 A1 | 5/2013 | Kang et al. |
| 2013/0124993 A1 | 5/2013 | Daisy |
| 2013/0125322 A1 | 5/2013 | Sakashita et al. |
| 2013/0125803 A1 | 5/2013 | Tseng |
| 2013/0127765 A1 | 5/2013 | Behdasht et al. |
| 2013/0132661 A1 | 5/2013 | Schakel et al. |
| 2013/0132779 A1 | 5/2013 | Smith et al. |
| 2013/0132838 A1 | 5/2013 | Daisy |
| 2013/0141388 A1 | 6/2013 | Ludwig et al. |
| 2013/0154968 A1 | 6/2013 | Tomimori |
| 2013/0154981 A1 | 6/2013 | Park et al. |
| 2013/0160514 A1 | 6/2013 | Mitze |
| 2013/0169981 A1 | 7/2013 | Takahashi |
| 2013/0178701 A1 | 7/2013 | Pless et al. |
| 2013/0181928 A1 | 7/2013 | Li |
| 2013/0181931 A1 | 7/2013 | Kinoshita |
| 2013/0188336 A1 | 7/2013 | Yuan et al. |
| 2013/0188424 A1 | 7/2013 | Rajan et al. |
| 2013/0191585 A1 | 7/2013 | Rajan et al. |
| 2013/0205102 A1 | 8/2013 | Jones et al. |
| 2013/0215064 A1 | 8/2013 | Cholewin et al. |
| 2013/0238849 A1 | 9/2013 | Amer et al. |
| 2013/0254456 A1 | 9/2013 | Chen et al. |
| 2013/0254497 A1 | 9/2013 | Chen et al. |
| 2013/0268853 A1 | 10/2013 | Gommier et al. |
| 2013/0275795 A1 | 10/2013 | Ellis et al. |
| 2013/0282962 A1 | 10/2013 | Rub et al. |
| 2013/0307809 A1 | 11/2013 | Sudou |
| 2013/0307827 A1 | 11/2013 | Reisman et al. |
| 2013/0321317 A1 | 12/2013 | Hirukawa |
| 2013/0321340 A1 | 12/2013 | Seo et al. |
| 2013/0332796 A1 | 12/2013 | Ellis |
| 2013/0332876 A1 | 12/2013 | Johnson et al. |
| 2013/0335357 A1 | 12/2013 | Hou |
| 2014/0006948 A1 | 1/2014 | Yang et al. |
| 2014/0028601 A1 | 1/2014 | Moore |
| 2014/0040568 A1 | 2/2014 | Lee et al. |
| 2014/0040569 A1 | 2/2014 | Solomon et al. |
| 2014/0057102 A1 | 2/2014 | Park et al. |
| 2014/0066139 A1 | 3/2014 | Ure |
| 2014/0095769 A1 | 4/2014 | Borkenhagen |
| 2014/0096092 A1 | 4/2014 | Johnson |
| 2014/0099235 A1 | 4/2014 | Ellingboe et al. |
| 2014/0104219 A1 | 4/2014 | Ludwig |
| 2014/0104220 A1 | 4/2014 | Ludwig |
| 2014/0132548 A1 | 5/2014 | Ludwig |
| 2014/0132549 A1 | 5/2014 | Ludwig |
| 2014/0134433 A1 | 5/2014 | Park et al. |
| 2014/0134434 A1 | 5/2014 | Park et al. |
| 2014/0139473 A1 | 5/2014 | Kang et al. |
| 2014/0143659 A1 | 5/2014 | Xue et al. |
| 2014/0156919 A1 | 6/2014 | Chen et al. |
| 2014/0156920 A1 | 6/2014 | Chen et al. |

(56) References Cited

U.S. PATENT DOCUMENTS

| | | | |
|---|---|---|---|
| 2014/0168128 A1 | 6/2014 | Reisman et al. |
| 2014/0191962 A1 | 7/2014 | Kim |
| 2014/0208248 A1 | 7/2014 | Davidson |
| 2014/0210727 A1 | 7/2014 | Wassingbo |
| 2014/0210786 A1 | 7/2014 | Ludwig |
| 2014/0247216 A1 | 9/2014 | Fang |
| 2014/0303436 A1 | 10/2014 | Pless et al. |
| 2014/0340358 A1 | 11/2014 | Martinoli |
| 2014/0368455 A1 | 12/2014 | Croisonnier et al. |
| 2015/0068526 A1 | 3/2015 | Habashi |
| 2015/0097791 A1 | 4/2015 | Lisseman et al. |
| 2015/0197670 A1 | 7/2015 | Shitara et al. |
| 2015/0212571 A1 | 7/2015 | Kitada |
| 2015/0234518 A1 | 8/2015 | Teller et al. |
| 2015/0253609 A1 | 9/2015 | Zhou et al. |
| 2016/0041715 A1 | 2/2016 | Sirpal et al. |
| 2016/0226713 A1 | 8/2016 | Dellinger et al. |

FOREIGN PATENT DOCUMENTS

| | | |
|---|---|---|
| KR | 1020110004203 A | 1/2011 |
| KR | 1020110049431 A | 5/2011 |
| WO | 2005114369 A2 | 12/2005 |
| WO | 2008012491 A1 | 1/2008 |
| WO | 2008037275 A1 | 4/2008 |
| WO | 2008125130 A1 | 10/2008 |
| WO | 2008131058 A2 | 10/2008 |
| WO | 2010073731 A1 | 7/2010 |
| WO | 2011100444 A2 | 8/2011 |
| WO | 2011126893 A2 | 10/2011 |
| WO | 2012149911 A1 | 11/2012 |

OTHER PUBLICATIONS

US 7,965,579 B1, 06/2011, Solomon et al. (withdrawn)
Intel, "Intel® 64 and IA-32 Architectures Software Developer's Manual," vol. 1: Basic Architecture, Order No. 253665-037US, Jan. 2011, pp. 1-540 (2 of 8).
Intel, "Intel® 64 and IA-32 Architectures Software Developer's Manual," vol. 1: Basic Architecture, Order No. 253665-037US, Jan. 2011, pp. 1-540 (3 of 8).
Intel, "Intel® 64 and IA-32 Architectures Software Developer's Manual," vol. 1: Basic Architecture, Order No. 253665-037US, Jan. 2011, pp. 1-540 (4 of 8).
Intel, "Intel® 64 and IA-32 Architectures Software Developer's Manual," vol. 1: Basic Architecture, Order No. 253665-037US, Jan. 2011, pp. 1-540 (5 of 8).
Intel, "Intel® 64 and IA-32 Architectures Software Developer's Manual," vol. 1: Basic Architecture, Order No. 253665-037US, Jan. 2011, pp. 1-540 (6 of 8).
Intel, "Intel® 64 and IA-32 Architectures Software Developer's Manual," vol. 1: Basic Architecture, Order No. 253665-037US, Jan. 2011, pp. 1-540 (7 of 8).
Intel, "Intel® 64 and IA-32 Architectures Software Developer's Manual," vol. 1: Basic Architecture, Order No. 253665-037US, Jan. 2011, pp. 1-540 (8 of 8).
Intel, "Intel® 64 and IA-32 Architectures Software Developer's Manual," vol. 2A: Instruction Set Reference, A-M, Order No. 253666-037US, Jan. 2011, pp. 1-848.
Intel, "Intel® 64 and IA-32 Architectures Software Developer's Manual," vol. 2A: Instruction Set Reference, A-M, Order No. 253666-037US, Jan. 2011, pp. 1-848 (1 of 10).
Intel, "Intel® 64 and IA-32 Architectures Software Developer's Manual," vol. 2A: Instruction Set Reference, A-M, Order No. 253666-037US, Jan. 2011, pp. 1-848 (2 of 10).
Intel, "Intel® 64 and IA-32 Architectures Software Developer's Manual," vol. 2A: Instruction Set Reference, A-M, Order No. 253666-037US, Jan. 2011, pp. 1-848 (3 of 10)
Intel, "Intel® 64 and IA-32 Architectures Software Developer's Manual," vol. 2A: Instruction Set Reference, A-M, Order No. 253666-037US, Jan. 2011, pp. 1-848 (4 of 10).
Intel, "Intel® 64 and IA-32 Architectures Software Developer's Manual," vol. 2A: Instruction Set Reference, A-M, Order No. 253666-037US, Jan. 2011, pp. 1-848 (5 of 10)
Intel, "Intel® 64 and IA-32 Architectures Software Developer's Manual," vol. 2A: Instruction Set Reference, A-M, Order No. 253666-037US, Jan. 2011, pp. 1-848 (6 of 10).
Intel, "Intel® 64 and IA-32 Architectures Software Developer's Manual," vol. 2A: Instruction Set Reference, A-M, Order No. 253666-037US, Jan. 2011, pp. 1-848 (7 of 10).
Intel, "Intel® 64 and IA-32 Architectures Software Developer's Manual," vol. 2A: Instruction Set Reference, A-M, Order No. 253666-037US, Jan. 2011, pp. 1-848 (8 of 10).
Intel, "Intel® 64 and IA-32 Architectures Software Developer's Manual," vol. 2A: Instruction Set Reference, A-M, Order No. 253666-037US, Jan. 2011, pp. 1-848 (9 of 10).
Intel, "Intel® 64 and IA-32 Architectures Software Developer's Manual," vol. 2A: Instruction Set Reference, A-M, Order No. 253666-037US, Jan. 2011, pp. 1-848 (10 of 10).
Intel, "Intel® 64 and IA-32 Architectures Software Developer's Manual," vol. 3A: System Programming Guide, Part 1, Order No. 253668-037US, Jan. 2011, pp. 1-842.
Intel, "Intel® 64 and IA-32 Architectures Software Developer's Manual," vol. 3A: System Programming Guide, Part 1, Order No. 253668-037US, Jan. 2011, pp. 1-842 (1 of 12).
Intel, "Intel® 64 and IA-32 Architectures Software Developer's Manual," vol. 3A: System Programming Guide, Part 1, Order No. 253668-037US, Jan. 2011, pp. 1-842 (2 of 12).
Intel, "Intel® 64 and IA-32 Architectures Software Developer's Manual," vol. 3A: System Programming Guide, Part 1, Order No. 253668-037US, Jan. 2011, pp. 1-842 (3 of 12).
Intel, "Intel® 64 and IA-32 Architectures Software Developer's Manual," vol. 3A: System Programming Guide, Part 1, Order No. 253668-037US, Jan. 2011, pp. 1-842 (4 of 12).
Intel, "Intel® 64 and IA-32 Architectures Software Developer's Manual," vol. 3A: System Programming Guide, Part 1, Order No. 253668-037US, Jan. 2011, pp. 1-842 (5 of 12).
Intel, "Intel® 64 and IA-32 Architectures Software Developer's Manual," vol. 3A: System Programming Guide, Part 1, Order No. 253668-037US, Jan. 2011, pp. 1-842 (6 of 12).
Intel, "Intel® 64 and IA-32 Architectures Software Developer's Manual," vol. 3A: System Programming Guide, Part 1, Order No. 253668-037US, Jan. 2011, pp. 1-842 (7 of 12).
Intel, "Intel® 64 and IA-32 Architectures Software Developer's Manual," vol. 3A: System Programming Guide, Part 1, Order No. 253668-037US, Jan. 2011, pp. 1-842 (8 of 12).
Intel, "Intel® 64 and IA-32 Architectures Software Developer's Manual," vol. 3A: System Programming Guide, Part 1, Order No. 253668-037US, Jan. 2011, pp. 1-842 (9 of 12).
Intel, "Intel® 64 and IA-32 Architectures Software Developer's Manual," vol. 3A: System Programming Guide, Part 1, Order No. 253668-037US, Jan. 2011, pp. 1-842 (10 of 12).
Intel, "Intel® 64 and IA-32 Architectures Software Developer's Manual," vol. 3A: System Programming Guide, Part 1, Order No. 253668-037US, Jan. 2011, pp. 1-842 (11 of 12).
Intel, "Intel® 64 and IA-32 Architectures Software Developer's Manual," vol. 3A: System Programming Guide, Part 1, Order No. 253668-037US, Jan. 2011, pp. 1-842 (12 of 12).
Intel, "Intel® 64 and IA-32 Architectures Software Developer's Manual," vol. 3B: System Programming Guide, Part 2, Order No. 253669-034US, Mar. 2010, pp. 1-936.
Intel, "Intel® 64 and IA-32 Architectures Software Developer's Manual," vol. 3B: System Programming Guide, Part 2, Order No. 253669-034US, Mar. 2010, pp. 1-936 (1 of 13)
Intel, "Intel® 64 and IA-32 Architectures Software Developer's Manual," vol. 3B: System Programming Guide, Part 2, Order No. 253669-034US, Mar. 2010, pp. 1-936 (2 of 13).
Intel, "Intel® 64 and IA-32 Architectures Software Developer's Manual," vol. 3B: System Programming Guide, Part 2, Order No. 253669-034US, Mar. 2010, pp. 1-936 (3 of 13).
Intel, "Intel® 64 and IA-32 Architectures Software Developer's Manual," vol. 3B: System Programming Guide, Part 2, Order No. 253669-034US, Mar. 2010, pp. 1-936 (4 of 13).

(56) References Cited

OTHER PUBLICATIONS

Intel, "Intel® 64 and IA-32 Architectures Software Developer's Manual," vol. 3B: System Programming Guide, Part 2, Order No. 253669-034US, Mar. 2010, pp. 1-936 (5 of 13).
Intel, "Intel® 64 and IA-32 Architectures Software Developer's Manual," vol. 3B: System Programming Guide, Part 2, Order No. 253669-034US, pp. 1-936 (6 of 13).
Intel, "Intel® 64 and IA-32 Architectures Software Developer's Manual," vol. 3B: System Programming Guide, Part 2, Oder No. 253669-034US, Mar. 2010, pp. 1-936 (7 of 13).
Intel, "Intel® 64 and IA-32 Architectures Software Developer's Manual," vol. 3B: System Programming Guide, Part 2, Order No. 253669-034US, Mar. 2010, pp. 1-936 (8 of 13).
Intel, "Intel® 64 and IA-32 Architectures Software Developer's Manual," vol. 3B: System Programming Guide, Part 2, Order No. 253669-034US, Mar. 2010, pp. 1-936 (9 of 13).
Intel, "Intel® 64 and IA-32 Architectures Software Developer's Manual," vol. 3B: System Programming Guide, Part 2, Order No. 253669-034US, Mar. 2010, pp. 1-936 (10 of 13).
Intel, "Intel® 64 and IA-32 Architectures Software Developer's Manual," vol. 3B: System Programming Guide, Part 2, Order No. 253669-034US, Mar. 2010, pp. 1-936 (11 of 13).
Intel, "Intel® 64 and IA-32 Architectures Software Developer's Manual," vol. 3B: System Programming Guide, Part 2, Order No. 253669-034US, Mar. 2010, pp. 1-936 (12 of 13).
Intel, "Intel® 64 and IA-32 Architectures Software Developer's Manual," vol. 3B: System Programming Guide, Part 2, Order No. 253669-034US, Mar. 2010, pp. 1-936 (13 of 13).
Intel, "Intel® GW80314 I/0 Companion Chip," Datasheet, Order No. 273757-003US, Nov. 2004, pp. 1-88.
International Search Report and Written Opinion—PCTUS2012035992—ISAEPO—dated Oct. 4, 2012.
International Search Report PCT Application No. PCTUS2009065741 dated Feb. 24 2010 3 pages.
International Written Opinion PCT Application No. PCTUS2009065741 dated Feb. 24 2010 5 pages.
Iqbal, Asif et al., "An Overview of Microkernel, Hypervisor and Microvisor Virtualization Approaches for Embedded Systems," Lund University, 2009, pp. 1-15.
IS&T/SPIE, "Electronic Imaging," Hyatt Regency Hotel, Jan. 2011, pp. 1-153.
Jacobsson, Sarah, "Nexus one's Screen is Gorgeous, But With Issues," PC World, Feb. 32, 2010, pp. 1-5.
Jedec Standard, DDR3 SDRAM Standard, JESD79-3D, Revision of JESD79-3C, Nov. 2008, Sep. 2009, pp. 1-220.
Jeong, Jae-Woo, et al., "Parfait: A New Scheduler Framework supporting Heterogeneous Xen-ARM schedulers," Jan. 2011, pp. 1-5.
Jiang, Hai, et al., "Data Conversion for Process/Thread Migration and Checkpointing," Wayne State University, 2003 International Conference on Parallel Processing (ICPP'03), 2003, pp. 1-8.
Kalady, Saidalavi, et al., "Implementation of a Pulley Hardware-assisted VMM for x86 Architecture," Preceedings of the World congress on Engineering 2009 vol. 1, 2009, pp. 1-5.
Kalla, Naveen et al. "Embedded VMM for Portable Virtual Machines." Date unknown. Prior to 2010. Cited in A. Kunk, P. Bohman, and E. Shaw "VMM based rootkit detection on Android," in University of Illinois at Urbana Champaign, May 2010, pp. 1-11.
Karthick, A. R., "Memory Management and RMAP VM of 2.6," 14 slides, Jan. 2004.
Kaser, Dominik, et al., "FingerGlass: Efficient Multiscale Interaction on Multitouch Screens," 2011, pp. 1-10.
Keyword-highlights in JP2008033739A—"Touch screen interaction method and apparatus based on tactile force feedback and pressure measurement," Jul. 31, 2006.
King, Samuel T., et al., "Operating Systems Extensions to Support Host Based Virtual Machines," Department of Electrical Engineering and Computer Science, University of Michigan, 2002, pp. 1-14.
Kishan, "Virtual Memory Exercises," Windows Internals Course, University of Tokyo, Jul. 2003, pp. 1-3.

Klare, B. et al., "Assessment of H.264 Video Compression on Automated Face Recognition Performance in Surveillance and Mobile Video Scenarios," Proc. SPIE 7667, Biometric Technology for Human Identification VII, 76670X (Apr. 14, 2010), 8 pages.
Kloster, J. F. et al., "On the Feasibility of Memory Sharing," Jun. 2006, pp. 1-132.
Kloster, Jacob Faber, et al., "Efficient Memory Sharing in the Xen Virtual Machine Monitor," Aalborg University, Jan. 2006, pp. 1-86.
Kotzmann, Thomas, et al., "Design of the Java HotSpot Client Complier for Java 6," May 2008, pp. 1-32.
Kozuch, Michael A. et al., "Migration without Virtualization," Intel Research Pittsburg, 2005, pp. 1-5.
Kozuch, Michael, et al., "Internet Suspend/Resume," Carnegie Mellon University and Intel Research Pittsburgh, 2002, pp. 1-7.
Kratz, Sven et al., "Extending the Virtual Trackball Metaphor to Rear Touch Input," 2010, pp. 1-4.
Kratz, Sven et al., "Gesture Recognition Using Motion Estimation on Mobile Phones," 2007, pp. 1-5.
Krause, Mike et al., "Implementing PCI 1/0 Virtualization Standards," Apr. 6, 2011, pp. 1-8.
Lagar-Cavilla, Andres et al."Interactive Resource-Intensive Applications Made Easy," 2007 pp. 1-21.
Lanman, Douglas, et al., "Content-Adaptive Parallax Barriers: Optimizing Dual-layer 3D Displays using Low-Rank Light Field Factorization," 2010, pp. 1-10.
Lee, C. J. et al., "DRAM-Aware Last-Level Cache Writeback: Reducing Write-Caused Interference in Memory Systems," Apr. 2010, pp. 1-21.
Li, J., "A Nanosensor Device for Cellphone Integration and Chemical Sensing Network," OHS CELL-ALL Phase II Workshop, Jul. 29, 2010, 22 pages.
Liebergeld, Steffen, "Efficient Virtualization on ARM Platforms," Techishe Universitat Dresden, May 6, 2009, pp. 1-52.
Lin, M. et al., "Testable Design for Advanced Serial-Link Transceivers," 2007, pp. 1-6.
Lin, X. et al., A 2.5-to 3.5-Gb/s Adaptive FIR Equalizer With Continuous-Time Wide-Bandwidth Delay Line in 0.25-?m CMOS, IEEE Journal of Solid-State Circuits, vol. 41, No. 8, Aug. 2006, pp. 1908-1918.
Liu, C. Y. et al., "Comparison of Signaling and Equalization Schemes in High Speed SerDes (10-25Gbps)," DesignCon 2007, pp. 1-23.
Liu, J. et al., "Equalization in High-Speed Communication Systems," IEEE Circuits and Systems Magazine, 2004, pp. 1-14.
Lowell, David E. et al., "Devirtualizable Virtual Machines Enabling General, Single-Node, Online Maintenance," Hewlett-Packard Laboratories, Oct. 7, 2004, pp. 1-13.
Lynch, James P., "Nokia 6100 LCD Display Driver," 2010, pp. 1-55.
MacKenzie, I. Scoti, et al., "The Tactile Touchpad," Conference on Human Factors in Computing Systems, 1997, pp. 1-5.
Markatos, E., "On Using Network RAM as a non-volatile Buffer," Aug. 1998, pp. 1-15.
Marmor, Michael F., et al., "Visual Insignificance of the Foveal Pit," 2008, pp. 1-7.
Maxim, "1Gbps to 12.5Gbps; Passive Equalizer for Backplanes and Cables," MAX3787, 19-0406, Rev. 1, Dec. 2005, pp. 1-15
Maxim, "Designing a Simple, Small, Wide-band and Low-Power Equalizer for FR4 Copper Links (Featuring the MAX3785, IGbps to 6.4Gbps Equalizer)," DesignCon 2003, HFTA-06.0, 2003, pp. 1-14.
McCallum, David C. et al., "ARC-Pad: Absolute+Relative Cursor Positioning for Large Displays with a Mobile Touchscreen," University of Manitoba, Oct. 7, 2009, pp. 1-4.
McCammon, Rob, "Android Solutions," Open Kernel Labs, 2009, slides 1-11.
McCammon, Rob, "Streamlining Android Migration with Virtualization," ARM and Android, Jul. 19, 2012, pp. 1-4.
McCammon, Rob, "Using Virtualization to Create Mass-Market Smartphones," Technology in Depth, 2011, pp. 1-4.
McGill, Kathleen et al., "Process Migration for Resilient Applications," Dartmouth College, 2011, pp. 1-14.
Memory Management 55 slides, CSE 451: Operating Systems Winter 2007, University of Washington, Jan. 28, 2007.

(56) References Cited

OTHER PUBLICATIONS

Micron Technology Announces Syncflash Memory, A New Flash Technology, 1999, pp. 1.
Micron, "NAND Flash Memory," 16Gb, 32Gb, 64Gb, 128Gb Asynchronous/Synchronous NANO Features, 2009, pp. 1-158.
Mijat, Roberto et al., "Virtualization is Coming to a Platform Near You," ARM, 2011, pp. 1-12.
Molnos, Anca et al., "Composable Processor Virtualization for Embedded Systems," 2010pp. 1-10.
Moore, Ryan W. et al., "Addressing the Challenges of DBT for the ARM Architecture," University of Pittsburgh. 2009, pp. 1-10.
Muthitacharoen, Athicha, et al., "A Low-bandwidth Network File System," Laboratory for Computer Science, MIT, Department of Computer Science, NYU, Oct. 21, 2001, pp. 1-14.
National Semiconductor, "EQ50F100—2.5 to 6.125 Gbps fixed equalizer; for 10 Gigabit Ethernet, storage and telecom backplanes," 2004, pp. 1-2.
"Cellphone Hardware Applications," pp. 1-24. Source unknown. Released prior to Q4 of 2010.
"Interfacing 4-wire and 5-wire resistive touchscreens to the LPC247x," Nov. 13, 2008.
"International Technology Roadmap for Semiconductors," 2009 Edition, Assembly and Packaging, pp. 1-70.
3D Packing Newsletter on 3D IS, TSV, WLP & Embedded Technologies, Dec. 2009, pp. 1-16.
3D-IC Alliance, "IMIS™—Intimate Memory Interface Specification," Revision 1.0, Jun. 1, 2008, pp. 1-33.
Akhshabi, Saamer et al., "An Experimental Evaluation of Rate-Adaptation Algorithms in Adaptive Streaming over HTTP," Feb. 23, 2011, pp. 1-12.
Altera, "Using Pre-Emphasis and Equalization with Stratix GX," White Paper, Sep. 2003, ver. 1.0, pp. 1-11.
AMD, "BIOS and Kernel Developer's Guide (BKDG) for AMD Family 14h Models OOh-OFh Processors," BKDG for AMD Family 14h Models OOh-OFh Processors, Feb. 16, 2011, Rev. 3.04, pp. 1-403.
AMP, "DDR2 DIMM 25 Degree Imm CL 240 position," DDR2 DIMM 25 Degree 240—Solder tail, 2005, p. 1.
AMP, "DDR2 DIMM Socket Imm CL 240 position," DDR2 DIMM 240—Solder tail, 1998, p. 1.
Analui, B., "Signal Integrity Issues in High-Speed Wireline Links: Analysis and Integrated System Solutions," Thesis, 2005, pp. 1-194.
ARM, "The ARM Architecture," 2010, pp. 1-43.
Arora, A., "Sensing by the people, for the people & of the people," Apr. 21, 2008, 48 pages.
Avissar, 0. et al., "Heterogeneous Memory Management for Embedded Systems," CASES '01, Nov. 16-17, 2001, pp. 1-10.
Bahar, Barus et al., "Mobile-Phone Based Gesture Recognition," Proceedings of the Enterface, 2007, pp. 1-8.
Baker, Bonnie C. et al., "The Power Behind Resistive Touch Screens," Texas Instruments, 2007, pp. 1-9.
Balakrishnan, H., "Background: Single-Link Communication," Fall 2001, Sep. 5, 2001, pp. 1-6.
Balasubramanian, Niranjan et al., "Energy Consumption in Mobile Phones: A Measurement Study and Implications for Network Applications," University of Massachusetts Amherst, Nov. 4, 2009, pp. 1-14.
Bar-Niv, A., "Balanced equalization: The 10GBASE-KX4 formula for error-free transmission over backplanes," Networking Solutions, Mar. 2005, pp. 1-4.
Barr, T. W. et al., "Translation Caching: Skip, Don't Walk (the Page Table)," ISCA '10, Jun. 19-23, 2010, pp. 1-12.
Ben-Yehuda, Muli, et al., "The Turtles Project: Design and Implementation of Nested Virtualization," IBM Research, Oct. 2010, slides 1-92.
Bhardwaj, Rishi, et al., "A Choices Hypervisor on the ARM Architecture," University of Illinois, Apr. 2006, pp. 1-5.
Bickford, Jeffrey, et al., "Rootkits on Smart Phones: Attacks, Implication and Opportunities," Jun. 10, 2010, pp. 1-6.
Bien, F., "Reconfigurable Equalization for 10-Gb/sec Serial Data Links in a 0.18-?m CMOS Technology," Dissertation, Dec. 2006, pp. 1-121.
Bihlmayr, Wolfgang et al., "OLED Display Driver for the HCS08 Family," Freescale Semiconductor Application Note, Mar. 2007, pp. 1-42.
Bornstein, Dan, "Android Dalvik VM Internals," May 29, 2008, slides 1-58.
Brash, David, "Extensions to the ARMv7-A Architecture," Aug. 2010, pp. 1-21.
Brueck, et al., "Certificate of Correction," U.S. Pat. No. 7,818,444 B2, Oct. 19, 2010.
Buchali, F. et al., "Fast Eye Monitor for 10 Gbit/s and its Application for Optical PMD Compensation," 2000 Optical Society of America, pp. 1-4.
Buckwalter, J. F., "Deterministic Jitter in Broadband Communication," Thesis, 2006, pp. 1-220.
Bungale, Parashanth, "Arm Virtualization: CPU & MMU Issues," VMware, 2010, slides 1-16.
Burdach, M., "Physical Memory Forensics," 53 slides, Black Hat USA (2006), Aug. 1, 2006.
Carroll, Aaron et al., "An Analysis of Power consumption in a Smartphone," 2010 USENIX Conference, 2010, pp. 1-14.
Casiez, G., et al., "RubberEdge: Improved Interaction with Mobile Devices via Elastic-Edged Touchpads," Apr. 2008, pp. 1-1.
Chandramouli, S., "A Broadband Passive Delay Line Structure in 0.18 Micron CMOS for a Gigabit Feed Forward Equalizer," Thesis, 2004, pp. 1-52.
Chandrasekaran, Dinesh et al., "Hardware-assisted Secure Virtualization," 2009, pp. 1-8.
Chapman, Matthew, et al., "MagiXen: Combining Binary Translation and Virtualization," HP Enterprise Systems and Software Laboratory, May 4, 2007, pp. 1-15.
Chaudhary, Vipin et al., "Techniques for Migrating Computations on the Grid," 2006, pp. 1-19.
Chen, J. et al., "High Speed Signaling Design: from 1 Gbps to 10 Gbps," DesignCon East 2004, pp. 1-17.
Chen, J., et al., "On Static Binary Translation and Optimization for ARM based Applications," Apr. 6, 2008, pp. 1-10.
Chen, Wei et al., "An Emulator for Executing IA-32 Application on ARM-Based Systems," Journal of Computers, vol. 5, Jul. 7, 2010, pp. 1133-1141.
Chen, Y.-H., "Ad-ST AC & 3DIC Technology of ITRI," 2010, pp. 1-14.
Chipounov, Vitaly et al., "Dynamically Translating x86 to LLVM using QEMU," 2010, pp. 1-5.
Chun, B., et al., "Augmented Smartphone Applications Through Clone Cloud Execution," Intel Research Berkeley, May 18, 2009, pp. 1-5.
Chun, B., et al., "CloneCloud: Elastic Execution between Mobile Device and Cloud," 2011, pp. 1-14.
CIS 501: Introduction to Computer Architecture, Unit 4: Memory Hierarchy II: Main Memory, CIS 501 (Martin/Roth): Main Memory, Fall 2004, pp. 1-12.
Citrix, "The 'Nirvana Phone,' Concept Specification and Draft Reference Architecture," 2010, pp. 1-10.
Clark, Christopher, "Live Migration of Virtual Machines," 2005, pp. 1-14.
Cook, H. et al., "Virtual Local Stores: Enabling Software-Managed Memory Hierarchies in Mainstream Computing Environments," Technical Report No. UCB/EECS-2009-131, Sep. 24, 2009, pp. 1-24.
Cox, Landon P. et al., "Pocket Hypervisors: Opportunities and Challenges," Mar. 8, 2007, pp. 1-6.
Office Action dated Jul. 15, 2013 in corresponding Canadian patent application No. 2731708.
On, Calvin, "ANA: A Method for ARM-on-ARM Execution," Sep. 2007, MIT, pp. 1-62.
Onoue, Koichi et al., "A Virtual Machine Migration System Based on a SPU Emulator," Virtualization Technology in Distributed Computing, Nov. 17, 2006, pp. 1-8.
Opdenacker, M., "Linux USB drivers," Sep. 15, 2009, pp. 1-95.

(56) References Cited

OTHER PUBLICATIONS

Osman, Steven et al., "The Design and Implementation of Zap: A System for Migrating Computing Environments," OSOi, Dec. 2002, pp. 1-16.
Ousterhout, J. et al., "The Case for RAMClouds: Scalable High-Performance Storage Entirely in DRAM," SIGOPS Operating Systems Review, vol. 43, No. 4, Dec. 2009, pp. 92-105.
Pai, Ankur et al., "Customizable Multimedia Devices in Virtual Environments," Georgia Institute of Technology, 2008, pp. 1-18.
Park, H.-J., "Signal Integrity for High Speed Circuit Design," Tutorial 9 (ISSCC 2006), pp. 1-91.
Park, Miri et al., "Real-time Operating System Virtualization for Xen-Arm," 2009, pp. 1-2.
Partial International Search Report—PCTUS2012035992—ISAEPO—dated Jul. 17, 2012.
Pasricha, Sudeep et al., "Reducing Backlight Power Consumption for Streaming Video Application on Mobile Handheld Devices," University of California, Nov. 2, 2003, pp. 1-7.
Patterson, Robert, "Human Factors of Stereoscopic Displays," Washington State University, Jul. 5, 2009, pp. 1-14.
PCI-SIG et al., "Single Root I/0 Virtualization and Sharing Specification Revision 1.0," Sep. 11, 2007, pp. 1-84.
Pelzl, Jan et al., "Virtualization Technologies for Cars, Solutions to increase safety and security of vehicular ECUs," 2008, pp. 1-10.
Pering, T. et al., "The PSI Board: Realizing a Phone-Centric Body Sensor Network," 4th International Workshop on Wearable and Implantable Body Sensor Networks, Mar. 2007, pp. 1-6.
Pering, T., "Intel and Personal Wellness," 22 pages, Aug. 2009.
Phadke, S. et al., "MLP Aware Heterogeneous Memory System," 2011 EDAA, pp. 1-6.
Potter, Shaya, "Virtualization Mechanisms for Mobility, Security and system Administration," Columbia University, 2010, pp. 1-241.
Probst, Mark et al., "Register Liveness Analysis for Optimizing Dynamic Binary Translation," 2002, pp. 1-10.
Ramesh, G., "Design of De-Emphasis and Equalization Circuits for Gigabit Serial Interconnects," An Applications Workshop for High-Performance Design, Sep. 2005, pp. 1-28.
Red Hat, "Virtualization Guide: Red Hat Virtualization," Red Hat Inc., 2007, pp. 1-104.
Refai, Wail Mohsen, "Office Communication," U.S. Appl. No. 12/233,386, dated May 27, 2011.
Riecke, Bernhard E. et al., "Selected Technical and Perceptual Aspects of Virtual reality Displays," Technical Report No. 154, Oct. 2006, pp. 1-17.
Ross, Arun et al., "A Calibration Model for Fingerprint Sensor Interoperability," SPIE Conference on Biometric Technology for Human Identification, Apr. 2006, pp. 1-12.
Rudolph, Larry, "A Virtualization Infrastructure that Supports Pervasive Computing," VMware, IEEE CS, 2009, pp. 1-6.
Ryu, W. H. et al., "High-Frequency Simultaneous Switching Output Noise (SSO) Simulation Methodology for a DDR333/400 Data Interface," Jun. 27, 2002, pp. 1-6.
Sahami, Alireza et al., "Rich Tactile Output on Mobile Devices," Nov. 2008, pp. 1-12.
Sangorrin, Daniel et al., "Dual operation System Architecture for Real-Time Embedded Systems," Jul. 6, 2010, slides 1-24.
Satyanarayanan, M et al., "Bringing the Cloud Down to Earth: Transient PCs Everywhere," Carnegie Mellon University, Sep. 2010, pp. 1-11.
Satyanarayanan, M. et al., "Pervasive Personal Computing in an Internet Suspend/Resume System," IEEE Computer Society, Mar. 2007, pp. 1-10.
Satyanarayanan, M. et al., "Towards seamless mobility on pervasive hardware," Mar. 1, 2005, pp. 1-33.
Schrader, Bernhard, "Multi Root I/O Virtualization," FCS TEC-Team, Fujitsu Siemens, Nov. 2, 2008, slides 1-9.
Schrader, J. H. R., "Wireline Equalization using Pulse-Width Modulation," 2007, pp. 1-152.

Schrader, J. H. R., "Wireline Equalization using Pulse-Width Modulation," IEEE 2006 Custom Intergrated Circuits Conference (CICC), 2006, pp. 591-598.
Schrader, J.H.R et al., "CMOS Transmitter using Pulse-Width Modulation Pre-Emphasis achieving 33dB Loss compensation at 5-Gb/s," 2005 Symposium on VLSI Circuits Digest of Technical Papers, pp. 388-391.
Schrader, J.H.R et al., Pulse-Width Modulation Pre-Emphasis Applied in a Wireline Transmitter, Achieving 33 dB Loss Compensation at 5-Gb/s in 0.13—?m CMOS, IEEE Journal of Solid-State Circuits, vol. 41, No. 4, Apr. 2006, pp. 990-999.
Semtech, "Advanced Communications and Sensing," Jul. 25, 2011, pp. 1-61.
Seo, Sangwon, "Research on System Virtualization using Xen Hypervisor for ARM based secure mobile phones," Seminar Security in Telecommunications, Jan. 14, 2010, pp. 1-11.
Shafer, M. et al., "Connector and Chip Vendors Unite to Produce a High-Performance 10 Gb/s NRZ-Capable Serial Backplane," DesignCon 2003; High-Performance System Design Conference, 2003, pp. 1-19.
Shao, J. et al., "The Bit-reversal SDRAM Address Mapping," 2005, pp. 1-8.
Sidiropoulos, S., "High Performance Inter-Chip Signalling," Technical Report No. CSL-TR-98-760, Apr. 1998, pp. 1-139.
Silvia, "Adaptive HTTP Streaming for open Codecs," Oct. 9, 2010, pp. 1-6.
Smaldone, Stephen, "Leveraging Smart Phones to Reduce Mobility Footprints," 2009, 14 pages.
Smith, J. E. et al., "Achieving High Performance via Co-Designed Virtual Machines," Oct. 1998, pp. 1-6.
Sousa, Joao Pedro et al., "Aura: an Architectural Framework for User Mobility in Ubiquitous Computing Environments," Carnegie Mellon University Research Showcase, Aug. 1, 2002, pp. 1-15.
Sousa, Joao Pedro, et al., "The Aura Software Architecture: an Infrastructure for Ubiquitous Computing," Carnegiz Mellon University Research Showcase, Aug. 1, 2003, pp. 1-48.
Stackhouse, B. et al., "A 65 nm 2-Billion Transistor Quad-Core Itanium Processor," IEEE Journal of Solid-State Circuits, vol. 44, No. 1, Jan. 2009, pp. 18-31.
Stockhammer, Thomas, "Dynamic Adaptive Streaming Over HTTP-Design Principles and Standards," Qualcomm Incorporated, Feb. 23, 2011, pp. 1-3.
Stojanovic, V. et al., "Adaptive Equalization and Data Recovery in a Dual-Mode (PAM2/4) Serial Link Transceiver," 2004, pp. 1-4.
Stojanovic, V. et al., "Modeling and Analysis of High-Speed Links," pp. 1-49, Mar. 2003.
Jon Knight, "Qualcomm Sues Apple Over iPhone X Gestures," GadgetHacks, Article, Dec. 4, 2017, available at https://smartphones.gadgethacks.com/news/qualcomm-sues-apple-over-iphone-x-gestures-0181495/.
Youtube video, "iPhone X swipe gestures introduced 2010 by webOS (Apple Keynote 2017 Snippets)," Sep. 13, 2017, uploaded by Nafetz, available at https://www.youtube.com/watch?v=gEhkQRP2zDk&vl=en.
Youtube video, "Palm Pre Revisited: The Best Don't Always Succeed," uploaded by Jon Rettinger, Nov. 5, 2016, available at https://www.youtube.com/watch?v=9pAgJ9x-2IA&feature=youtu.be&t=38.
Stojanovic, V., "Channel-Limited High-Speed Links: Modeling, Analysis and Design," Dissertation, Sep. 2004, pp. 1-180.
Suchitha V, "Simulation methodology using SigXp 15.1 (SPB) for enabling DDR2-533 memory interface based on Intel® 945GMS design," Session No. 6.10, Intel, Sep. 13, 2006, pp. 1-36.
Sud, Shivani, et al., "Dynamic Migration of Computation through virtualization of the mobile platform," Intel Labs, Oct. 26, 2009, slides 1-16.
Sudan, K. et al., "Micro-Pages: Increasing DRAM Efficiency with Locality-Aware Data Placement," ASPLOS'IO, Mar. 13-17, 2010, pp. 1-12.
Sun, R. et al., "A Low-Power 20-Gb/s Continuous-Time Adaptive Passive Equalizer," Thesis, 2005, pp. 1-71.
Takefman, M. L. et al., U.S. Appl. No. 61/457,233, filed Feb. 8, 2011.

(56) References Cited

OTHER PUBLICATIONS

Texas Instruments, "DC to 4-GBPS Dual 1:2 Multiplexer/Repeater/Equalizer," SN65LVCP40, SLLS623D-Sep. 2004—Revised Feb. 2006, pp. 1-22.
Tiruvuru, R. et al., "Transmission Line based FIR Structures for High Speed Adaptive Equalization," ISCAS 2006, IEEE, 2006, pp. 1051-1054.
Toms, T. R., QUALCOMM, CDMA Technologies,"An Assessment of 3D Interconnect, Equipment Readiness and ITRS 3D," Jul. 16, 2008, pp. 1-23.
Turudic, A. et al., "Pre-Emphasis and Equalization Parameter Optimization with Fast, Worst-Case/Multibillion-Bit Verification," DesignCon 2007, Jan. 2007, pp. 1-28.
Understanding the Linux Virtual Memory Manager, Chapter 3: Page Table Management, pp. 33-52, Mel Gorman, Apr. 2004.
User's Guide, "Motorola Backflip with Motoblur," 2010, pp. 1-67.
Van Schaik, Carl et al., "High-Performance Microkernels and Virtualization on ARM and Segmented Architectures," 2007, pp. 1-11.
Varanasi, Prashant, "Implementing Hardware-Supported Virtualization in OKL4 on ARM," Nov. 30, 2010, pp. 1-51 (1 of 2).
Varanasi, Prashant, "Implementing Hardware-Supported Virtualization in OKL4 on ARM," Nov. 30, 2010, pp. 52-86 (2 of 2).
VMware, "Understanding Full virtualization, Paravirutalization, and Hardware Assist," Sep. 11, 2007, pp. 1-17.
Vrazel, M. G. et al., "Overcoming Signal Integrity Issues with Wideband Crosstalk Cancellation Technology," DesignCon 2006, pp. 1-25.
Wang, B. et al., "6b9b Encoding Scheme for Improving Single-Ended Interface Bandwidth and Reducing Power Consumption without Pin Count Increase," IEEE, 2007, pp. 25-28.
Wang, Z. et al., "Exploiting Smart-Phone USB Connectivity for Fun and Profit," ACSAC '10, Dec. 6-10, 2010, 10 pages.
Welte, H., "Anatomy of contemporary GSM cellphone hardware," Apr. 16, 2010, pp. 1-11.
Wijering, Jeroen, "What is Video Streaming?," LongTail Community Blog, Apr. 27, 2011, pp. 1-6.
Wilton, S. J. E., "Implementing Logic in FPGA Memory Arrays: Heterogeneous Memory Architectures," 2002, pp. 1-6.
Wintek, "Specifications for LCD Module," 2010, pp. 1-28.
Witt, K et al., "Test & Simulation Results in Support of SAS-2," Vitesse, 17 slides, Jan. 2006.
Wolback, Adam et al., "Transient customization of Mobile Computing Infrastructure," Carnegie Mellon University, Apr. 20, 2008, pp. 1-5.
Wolf, Chris, "Let's Get Virtual: A Look at Today's Server Virtualization Architectures," Burton Group Data center Strategies, May 14, 2007, pp. 1-42.
Xiao, Feng et al., "Mobile Imaging: The Big Challenge of the Small Pixel," SPIE-IS&T vol. 7250, 2009, pp. 1-9.
Xu, Fan et al., "A Dynamic Binary Translation Framework Based on Page Fault Mechanism in Linux Kernel," IEEE International Conference on Computer and Information Technology, 2010, pp. 1-6.
Ye, D. et al., "Prototyping a Hybrid Main Memory Using a Virtual Machine Monitor," Oct. 2008, 15 slides.
Yuen, R. et al., "A 5Gb/s Transmitter with Reflection Cancellation for Backplane Transceivers," 2006, pp. 1-4.
Zctoak, Coden, "Special Topic: Mobile Cloud Computing and Applications," ZTE Communications, vol. 9, Mar. 2011, pp. 1-70.
Zhou, Honbo et al., "Receiver Makes Right Data Conversion in PVM," Oak Ridge National Laboratory, 1995, pp. 1-8.
Zwicker, M. et al., "Antialiasing for Automultiscopic 3D displays," 2006, pp. 1.
Dall, C., et al., "KVM for ARM," Columbia University, 12th annual Linux Symposium, 2010, pp. 1-12.
D'Ambrosia, J. et al. "40 Gigabit Ethernet and 100 Gigabit Ethernet Technology Overview," Nov. 2008, pp. 1-16.
Date, M., et al., "Small-Depth-Error Display Using Depth Fused 3D (DFD)," Feb. 2009, pp. 1-4.
Deering, Michael F., "The Limits of Human Vision," Sun Microsystems, 1998, pp. 1-6.
Deshane, Todd, "An Attack-Resistant and Rapid Recovery Desktop System," Clarkson University, Dissertation, Aug. 2010, pp. 1-130.
Deshane, Todd, et al., "Xen Hypervisor Deployment, Management, and Cloud Computing Tools," Clarkson University, 2010, slides 1-151.
Dhiman, G. et al., "PDRAM: A Hybrid PRAM and DRAM Main Memory System," DAC '09, Jul. 26-31, 2009, pp. 1-6.
Doudalis, Ioannis, et al., "Hare++: Hardware Assisted Reverse Execution Revisited," Georgia Institute of Technology, Mar. 2011, pp. 1-8.
Downs, Rick, "Using Resistive touch screens for human/machine interface," 2005, pp. 1-6.
Ebcioglu, Kernal, et al., "A JAVA ILP Machine Based on Fast Dynamic Compilation," IBM T.J. Watson Research Center, 1997, pp. 1-13.
Encoding—116 slides, University of Illinois, Urbana Champaign, Course CS 438, Mar. 2008.
Ericson, Finn, "Interactive Handheld Phantograms," KTH Computer Science and Communication, Thesis, 2010, pp. 1-38.
U.S. Appl. No. 11/226,061, filed Sep. 13, 2005.
U.S. Appl. No. 11/449,435, filed Jun. 7, 2006.
Fitzroy-Dale, Nicholas, "Architecture Optimization," University of new South Wales, Mar. 2010, pp. 1-152.
Foster, G., "Measurements of Pre-Emphasis on Altera® Stratix® GX with the BERTScope 12500A," Ver. 1, Jun. 2005, pp. 1-7.
Fujitsu, "125Gbps Parallel CDR Transceiver (0.18um)," 2002, pp. 1-2.
Galloway, P. et al., "Using Creative Silicon Technology to Extend the Useful Life of Backplane and Card Substrates at 3.125 Gbps and Beyond," DesignCon 2001, 2001 High-Performance System Design Conference, pp. 1-7.
Garlan, David, et al., "Project Aura: Toward Distraction-Free Pervasive Computing," IEEE, 2002, pp. 1-10.
Garlepp, B. W. et al., "A Portable Digital DLL for High-Speed CMOS Interface Circuits," IEEE Journal of Solid-State Circutts, vol. 34, No. 5, May 1999, pp. 632-644.
Gesler, Wilson S., "Physical Limits of Acuity and Hyperacuity," University of Texas, Oct. 26, 1983, pp. 1-8.
Gilbert, Benjamin, et al., "Pocket ISR: Virtual Machines Anywhere," Carnegie Mellon University, Mar. 2010, pp. 1-19.
Gondi, S. et al., "A 10-Gb/s CMOS Merged Adaptive Equalizer/CDR Circuit for Serial-Link Receivers," 2006 Symposium on VLSI Circuits Digest ofTechnical Papers, IEEE, 2006, pp. 1-2.
Gondi, S. et al., "A IOGb/s CMOS Adaptive Equalizer for Backplane Applications," 2005 IEEE International Solid-State Circuits Conference, 2005, pp. 1-3.
Goodarce, John et al., "Virtualization Across the ARM Ecosystem," ARM, Sep. 9, 2009, pp. 1-9.
Grozing, M. et al., "Sampling Receive Equalizer with Bit-Rate Flexible Operation up to 10 Gbit/s," IEEE, 2006, pp. 516-519.
Grundy, K. et al., "Designing Scalable 10G Backplane Interconnect Systems Utilizing Advanced Verification Vlethodologies," DesignCon 2006, pp. 1-20.
Gustin, M., "40 and 100 Gigabit Ethernet PCS and PMA Overview," Ethernet Summit, Feb. 2010, pp. 1-15.
Hartig, Hermann, "The L4 Microkemel," Artist Summer School in Europe, Sep. 2010, slides 1-99.
Heiser, Gernot et al., "The OKL4 Microvisor: convergence Point of Microkemels and Hypervisors," Aug. 30, 2010, pp. 1-5.
Heiser, Gernot, "Hypervisors for Consumer Electronics," University of New South Wales, 2009,. pp. 1-5.
Hertzum, Morten et al., "TouchGrid: Touchpad pointing by recursively mapping taps to smaller display regions," Behaviour and Information Technology, vol. 24, No. 5, 2005, pp. 1-18.
Hiraishi, A. et al., "Preferable Improvements and Changes to FB-DiMM High-Speed Channel for 9.6Gbps Operation," ELPIDA, Jan. 26, 2007, pp. 1-35.
Hoe, J.C., "18-447 Lecture 21: Virtual Memory: Page Tables and TLBs," Apr. 13, 2009, pp. 1-11.
Hofer, Heidi, et al., "Organization of the Human Trichromatic Cone Mosaic," Oct. 19, 2005, pp. 1-11.

(56) References Cited

OTHER PUBLICATIONS

Hollis, T. et al., "Reduction of Duty Cycle Distortion through Band-Pass Filtering," 2005, pp. 1-4.

Hollis, T. M. et al., "Mitigating ISi Through Self-Calibrating Continuous-Time Equalization," IEEE Transactions on circuits and Systems-I: Regular Papers, vol. 53, No. 10, Oct. 2006, pp. 2234-2245.

Hollis, T. M. et al., "Self-Calibrating Continuous-Time Equalization Targeting Inter-symbol Interference," 2006, pp. 1-4.

Hollis, T. M., "Circuit and Modeling Solutions for High-Speed Chip-To-Chip Communication," Dissertation, Apr. 2007, pp. 1-225.

Hollis, T. M., "Inter-symbol Interference in Manchester Encoded Data," pp. 1-7, Oct. 2006.

Hong, S., "NAND Flash-based Disk Cache Using SLC/MLC Combined Flash Memory," SNAPI 2010, 25 pages.

HowStuffWorks, "How the iPhone works," 2007, pp. 1-4.

Huang, H. et al., "Design and Implementation of Power-Aware Virtual Memory," 2003, pp. 1-14.

Hung, Perry L., "Varmosa: Just-in-time Binary Translation of Operating System Kernels," Jun. 2009, pp. 1-58.

Hur, Y. S. et al., "Equalization and Near-End Crosstalk (NEXT) Noise Cancellation for 20-Gbit/sec 4 PAM Backplane Serial 1/0 Interconnections," Dissertation, Dec. 2005, pp. 1-143.

Hynix, "I/O Interface Design Technology Using ADS," 2005, 41 slides.

Hyser, Chris et al., "Autonomic Virtual Machine Placement in the Data Center," Feb. 26, 2008, pp. 1-11.

Immersion, "Creating the HD Haptic Experience in Mobile Devices," 2011, pp. 1-3.

Intel, "Intel PXA27x Processor Family," Memory Subsystem, Jul. 2004, pp. 1-138.

Intel, "Intel® 64 and IA-32 Architectures Software Developer's Manual," vol. 1: Basic Architecture, Order No. 253665-037US, Jan. 2011, pp. 1-540 (1 of 8).

\* cited by examiner

GESTURE-EQUIPPED TOUCH SCREEN SYSTEM, METHOD, AND COMPUTER PROGRAM PRODUCT

CROSS-REFERENCE TO RELATED APPLICATIONS

The present application is a continuation of and claims priority to U.S. patent application Ser. No. 16/377,142 filed Apr. 5, 2019 which, in turn, is a continuation of and claims priority to U.S. patent application Ser. No. 16/153,763 filed Oct. 6, 2018, now U.S. Pat. No. 10,275,086, which, in turn, is a continuation of and claims priority to U.S. patent application Ser. No. 15/072,354, filed Mar. 16, 2016, now U.S. Pat. No. 10,133,397; which, in turn, is a continuation of and claims priority to U.S. patent application Ser. No. 13/567,004, filed Aug. 3, 2012, now U.S. Pat. No. 9,417,754; which, in turn, claims priority to U.S. Provisional Application No. 61/515,835, filed Aug. 5, 2011, U.S. Provisional Application No. 61/566,577, filed Dec. 2, 2011, U.S. Provisional Application No. 61/569,213, filed Dec. 9, 2011, and U.S. Provisional Application No. 61/581,918, filed Dec. 30, 2011, the entire contents of all of which are incorporated herein by reference.

If any definitions (e.g., figure reference signs, specialized terms, examples, data, information, etc.) from any related material (e.g., parent application, other related application, material incorporated by reference, material cited, extrinsic reference, etc.) conflict with this application (e.g., abstract, description, summary, claims, etc.) for any purpose (e.g., prosecution, claim support, claim interpretation, claim construction, etc.), then the definitions in this application shall apply.

BACKGROUND AND FIELD OF INVENTION

Embodiments of the present invention generally relate to touch screens.

BRIEF SUMMARY

In one embodiment, an apparatus is provided, comprising: displaying a first user interface on a display, the first user interface including an object; while displaying the first user interface on the display, detecting a first input by a first contact on a touch-sensitive surface at a location in the first user interface that corresponds to the object of the first user interface; in response to detecting the first input by the first contact, in accordance with a determination that the first contact has a contact duration that is less than a duration threshold, displaying the object; and in response to detecting the first input by the first contact, in accordance with a determination that the first contact has a contact duration that is greater than the duration threshold, dynamically changing the appearance of the object, wherein the dynamic change in the appearance of the object is based at least in part on the duration of the first contact and wherein the dynamic change in the appearance of the object includes displaying, in sequence, at least some of a plurality of images based at least in part on the duration of the first contact.

In still yet another embodiment, an apparatus is provided, comprising: at least one non-transitory memory storing instructions and a plurality of applications; a touch screen; an actuator; and one or more processors in communication with the at least one non-transitory memory, the touch screen, and the actuator, wherein the one or more processors execute the instructions to cause the apparatus to: before a navigation application is launched, display, on the touch screen, a navigation application-specific icon associated with the navigation application via a home screen, the home screen for choosing among the plurality of applications; detect a first gesture that is applied to the touch screen on the navigation application-specific icon and that is capable of causing a plurality of touch states in connection with the navigation application-specific icon; when a cessation of a first touch state of the plurality of touch states is detected in connection with the navigation application-specific icon, launch the navigation application; without requiring the navigation application to be launched beforehand and when a second touch state of the plurality of touch states is detected in connection with the navigation application-specific icon, display at least one navigation application-specific option of a navigation application-specific menu on the home screen that is blurred to appear to be at a greater depth as compared to the navigation application-specific menu; before a browser application is launched, display, on the touch screen, a browser application-specific icon associated with the browser application via the home screen; detect a second gesture that is applied to the touch screen on the browser application-specific icon and that is capable of causing the plurality of touch states in connection with the browser application-specific icon; when a cessation of the first touch state of the plurality of touch states is detected in connection with the browser application-specific icon, launch the browser application; without requiring the browser application to be launched beforehand and when the second touch state of the plurality of touch states is detected in connection with the browser application-specific icon, display at least one browser application-specific option of a browser application-specific menu on the home screen that is blurred to appear to be at a greater depth as compared to the browser application-specific menu, the displayed at least one browser application-specific option including an option for access to bookmarks utilizing the browser application; before a media application is launched, display, on the touch screen, a media application-specific icon associated with the media application via the home screen; detect a third gesture that is applied to the touch screen on the media application-specific icon and that is capable of causing the plurality of touch states in connection with the media application-specific icon; when a cessation of the first touch state of the plurality of touch states is detected in connection with the media application-specific icon, launch the media application; without requiring the media application to be launched beforehand and when the second touch state of the plurality of touch states is detected in connection with the media application-specific icon, display at least one media application-specific option of a media application-specific menu on the home screen that is blurred to appear to be at a greater depth as compared to the media application-specific menu, the displayed at least one media application-specific option including an option for selecting at least one track utilizing the media application; before a communication application is launched, display, on the touch screen, a communication application-specific icon associated with the communication application via the home screen; detect a fourth gesture that is applied to the touch screen on the communication application-specific icon and that is capable of causing the plurality of touch states in connection with the communication application-specific icon; when a cessation of the first touch state of the plurality of touch states is detected in connection with the communication application-specific icon, launch the communication application; without requiring the communication application to be launched beforehand and when the second touch state of the plurality of touch states is detected in connection with the communication application-specific icon, display at least one communication application-specific option of a communication application-specific menu on the home screen that is blurred to appear to be at a greater depth as compared to the communication application-specific menu, the displayed at least one communication application-specific option including an option for access to one or more communication techniques for a contact; before a calendar application is launched, display, on the touch screen, a calendar application-specific icon associated with the calendar application via the home screen; detect a fifth gesture that is applied to the touch screen on the calendar application-specific icon and that is capable of causing the plurality of touch states in connection with the calendar application-specific icon; when a cessation of the first touch state of the plurality of touch states is detected in connection with the calendar application-specific icon, launch the calendar application; without requiring the calendar application to be launched beforehand and when the second touch state of the plurality of touch states is detected in connection with the calendar application-specific icon, display at least one calendar application-specific option of a calendar application-specific menu on the home screen that is blurred to appear to be at a greater depth as compared to the calendar application-specific menu, the displayed at least one calendar application-specific option including an option for creating an appointment utilizing the calendar application; before a camera application is launched, display, on the touch screen, a camera application-specific icon associated with the camera application via the home screen; detect a sixth gesture that is applied to the touch screen on the camera application-specific icon and that is capable of causing the plurality of touch states in connection with the camera application-specific icon; when a cessation of the first touch state of the plurality of touch states is detected in connection with the camera application-specific icon, launch the camera application; without requiring the camera application to be launched beforehand and when the second touch state of the plurality of touch states is detected in connection with the camera application-specific icon, display at least one camera application-specific option of a camera application-specific menu on the home screen that is blurred to appear to be at a greater depth as compared to the camera application-specific menu, the displayed at least one camera application-specific option including an option for setting a camera setting; before a phone application is launched, display, on the touch screen, a phone application-specific icon associated with the phone application via the home screen; detect a seventh gesture that is applied to the touch screen on the phone application-specific icon and that is capable of causing the plurality of touch states in connection with the phone application-specific icon; when a cessation of the first touch state of the plurality of touch states is detected in connection with the phone application-specific icon, launch the phone application; and without requiring the phone application to be launched beforehand and when the second touch state of the plurality of touch states is detected in connection with the phone application-specific icon, display at least one phone application-specific option of a phone application-specific menu on the home screen that is blurred to appear to be at a greater depth as compared to the phone application-specific menu, the displayed at least one phone application-specific option including an option for accessing at least one of a voicemail or a favorite utilizing the phone application.

In still yet another embodiment, an apparatus is provided, comprising: at least one non-transitory memory storing instructions and a plurality of applications; a touch screen; an actuator; and one or more processors in communication with the at least one non-transitory memory, the touch screen, and the actuator, wherein the one or more processors execute the instructions to cause the apparatus to: before a navigation application is launched, display, on the touch screen, a navigation application-specific icon associated with the navigation application via a home screen, the home screen for choosing among the plurality of applications; detect a first gesture that is applied to the touch screen on the navigation application-specific icon and that is capable of causing a plurality of touch states in connection with the navigation application-specific icon; in the event of a cessation of a first touch state of the plurality of touch states caused by the detection of the first gesture on the navigation application-specific icon, launch the navigation application; during at least a portion of the detection of the first gesture, blur at least a portion of the home screen other than a menu associated with the navigation application-specific icon, for providing a first gesture-touch duration feedback in connection with the navigation application-specific icon; in the event of detection of a second touch state of the plurality of touch states caused by the detection of the first gesture on the navigation application-specific icon, permit access to navigation information utilizing the menu associated with the navigation application-specific icon; before a browser application is launched, display, on the touch screen, a browser application-specific icon associated with the browser application via the home screen; detect a second gesture that is applied to the touch screen on the browser application-specific icon and that is capable of causing the plurality of touch states in connection with the browser application-specific icon; in the event of detection of a cessation of the first touch state of the plurality of touch states caused by the detection of the second gesture on the browser application-specific icon, launch the browser application; during at least a portion of the detection of the second gesture, blur at least a portion of the home screen other than a menu associated with the browser application-specific icon, for providing a second gesture-touch duration feedback in connection with the browser application-specific icon; in the event of detection of the second touch state of the plurality of touch states caused by the detection of the second gesture on the browser application-specific icon, permit access to bookmarks utilizing the menu associated with the browser application-specific icon; before a media application is launched, display, on the touch screen, a media application-specific icon associated with the media application via the home screen; detect a third gesture that is applied to the touch screen on the media application-specific icon and that is capable of causing the plurality of touch states in connection with the media application-specific icon; in the event of detection of a cessation of the first touch state of the plurality of touch states caused by the detection of the third gesture on the media application-specific icon, launch the media application; during at least a portion of the detection of the third gesture, blur at least a portion of the home screen other than a menu associated with the media application-specific icon, for providing a third gesture-touch duration feedback in connection with the media application-specific icon; in the event of detection of the second touch state of the plurality of touch states caused by the detection of the third gesture on the media application-specific icon, permit access to at least one track utilizing the menu associated with the media application-specific icon; before a communication application is launched, display, on the touch screen, a communication application-specific icon associated with the communication application via the home screen; detect a fourth gesture that is applied to the touch screen on the communication application-specific icon and that is capable of causing the plurality of touch states in connection with the communication application-specific icon; in the event of detection of a cessation of the first touch state of the plurality of touch states caused by the detection of the fourth gesture on the communication application-specific icon, launch the communication application; during at least a portion of the detection of the fourth gesture, blur at least a portion of the home screen other than a menu associated with the communication application-specific icon, for providing a fourth gesture-touch touch duration feedback in connection with the communication application-specific icon; in the event of detection of the second touch state of the plurality of touch states caused by the detection of the fourth gesture on the communication application-specific icon, permit access to one or more communication techniques for a contact; before a calendar application is launched, display, on the touch screen, a calendar application-specific icon associated with the calendar application via the home screen; detect a fifth gesture that is applied to the touch screen on the calendar application-specific icon and that is capable of causing the plurality of touch states in connection with the calendar application-specific icon; in the event of detection of a cessation of the first touch state of the plurality of touch states caused by the detection of the fifth gesture on the calendar application-specific icon, launch the calendar application; during at least a portion of the detection of the fifth gesture, blur at least a portion of the home screen other than a menu associated with the calendar application-specific icon, for providing a fifth gesture-touch duration feedback in connection with the calendar application-specific icon; in the event of the second touch state of the plurality of touch states caused by the detection of the fifth gesture on the calendar application-specific icon, permit creation of an appointment utilizing the menu associated with the calendar application-specific icon; before a camera application is launched, display, on the touch screen, a camera application-specific icon associated with the camera application via the home screen; detect a sixth gesture that is applied to the touch screen on the camera application-specific icon and that is capable of causing the plurality of touch states in connection with the camera application-specific icon; in the event of detection of a cessation of the first touch state of the plurality of touch states caused by the detection of the sixth gesture on the camera application-specific icon, launch the camera application; during at least a portion of the detection of the sixth gesture, blur at least a portion of the home screen other than a menu associated with the camera application-specific icon, for providing a sixth gesture-touch duration feedback in connection with the camera application-specific icon; in the event of detection of the second touch state of the plurality of touch states caused by the detection of the sixth gesture on the camera application-specific icon, permit setting of a camera setting utilizing the menu associated with the camera application-specific icon; before a phone application is launched, display, on the touch screen, a phone application-specific icon associated with the phone application via the home screen; detect a seventh gesture that is applied to the touch screen on the phone application-specific icon and that is capable of causing the plurality of touch states in connection with the phone application-specific icon; in the event of detection of a cessation of the first touch state of the plurality of touch states caused by the detection of the seventh gesture on the phone application-specific icon, launch the phone application; and during at least a portion of the detection of the seventh gesture, blur at least a portion of the home screen other than a menu associated with the phone application-specific icon, for providing a seventh gesture-touch duration feedback in connection with the phone application-specific icon; and in the event of detection of the second touch state of the plurality of touch states caused by the detection of the seventh gesture on the phone application-specific icon, permit access to at least one of a voicemail or a favorite utilizing the menu associated with the phone application-specific icon.

In still yet another embodiment, an apparatus is provided, comprising: at least one non-transitory memory storing instructions and a plurality of applications; a touch screen; an actuator; and one or more processors in communication with the at least one non-transitory memory, the touch screen, and the actuator, wherein the one or more processors execute the instructions to cause the apparatus to: before a navigation application is launched, display, on the touch screen, a navigation application-specific icon associated with the navigation application via a home screen, the home screen for choosing among the plurality of applications; detect a first gesture that is applied to the touch screen on the navigation application-specific icon and that is capable of causing a plurality of touch states in connection with the navigation application-specific icon; in the event of a cessation of a first touch state of the plurality of touch states caused by the detection of the first gesture on the navigation application-specific icon, launch the navigation application; during at least a portion of the detection of the first gesture, blur at least a portion of the home screen other than a navigation application-specific menu, for providing a first gesture-touch duration feedback in connection with the navigation application-specific icon; in the event of detection of a second touch state of the plurality of touch states caused by the detection of the first gesture on the navigation application-specific icon, display at least one navigation application-specific option of the navigation application-specific menu, the displayed at least one navigation application-specific option including an option for access to navigation information utilizing the navigation application; before a browser application is launched, display, on the touch screen, a browser application-specific icon associated with the browser application via the home screen; detect a second gesture that is applied to the touch screen on the browser application-specific icon and that is capable of causing the plurality of touch states in connection with the browser application-specific icon; in the event of detection of a cessation of the first touch state of the plurality of touch states caused by the detection of the second gesture on the browser application-specific icon, launch the browser application; during at least a portion of the detection of the second gesture, blur at least a portion of the home screen other than a browser application-specific menu, for providing a second gesture-touch duration feedback in connection with the browser application-specific icon; in the event of detection of the second touch state of the plurality of touch states caused by the detection of the second gesture on the browser application-specific icon, display at least one browser application-specific option of the browser application-specific menu, the displayed at least one browser application-specific option including an option for access to bookmarks utilizing the browser application; before a media application is launched, display, on the touch screen, a media application-specific icon associated with the media application via the home screen; detect a third gesture that is applied to the touch screen on the media application-specific icon and that is capable of causing the plurality of touch states in connection with the media application-specific icon; in the event of detection of a cessation of the first touch state of the plurality of touch states caused by the detection of the third gesture on the media application-specific icon, launch the media application; during at least a portion of the detection of the third gesture, blur at least a portion of the home screen other than a media application-specific menu, for providing a third gesture-touch duration feedback in connection with the media application-specific icon; in the event of detection of the second touch state of the plurality of touch states caused by the detection of the third gesture on the media application-specific icon, display at least one media application-specific option of the media application-specific menu, the displayed at least one media application-specific option including an option for selecting at least one track utilizing the media application; before a communication application is launched, display, on the touch screen, a communication application-specific icon associated with the communication application via the home screen; detect a fourth gesture that is applied to the touch screen on the communication application-specific icon and that is capable of causing the plurality of touch states in connection with the communication application-specific icon; in the event of detection of a cessation of the first touch state of the plurality of touch states caused by the detection of the fourth gesture on the communication application-specific icon, launch the communication application; during at least a portion of the detection of the fourth gesture, blur at least a portion of the home screen other than a communication application-specific menu, for providing a fourth gesture-touch touch duration feedback in connection with the communication application-specific icon; in the event of detection of the second touch state of the plurality of touch states caused by the detection of the fourth gesture on the communication application-specific icon, display at least one communication application-specific option of the communication application-specific menu, the displayed at least one communication application-specific option including an option for access to one or more communication techniques for a contact; before a calendar application is launched, display, on the touch screen, a calendar application-specific icon associated with the calendar application via the home screen; detect a fifth gesture that is applied to the touch screen on the calendar application-specific icon and that is capable of causing the plurality of touch states in connection with the calendar application-specific icon; in the event of detection of a cessation of the first touch state of the plurality of touch states caused by the detection of the fifth gesture on the calendar application-specific icon, launch the calendar application; during at least a portion of the detection of the fifth gesture, blur at least a portion of the home screen other than a calendar application-specific menu, for providing a fifth gesture-touch duration feedback in connection with the calendar application-specific icon; in the event of detection of the second touch state of the plurality of touch states caused by the detection of the fifth gesture on the calendar application-specific icon, display at least one calendar application-specific option of the calendar application-specific menu, the displayed at least one calendar application-specific option including an option for creating an appointment utilizing the calendar application; before a camera application is launched, display, on the touch screen, a camera application-specific icon associated with the camera application via the home screen; detect a sixth gesture that is applied to the touch screen on the camera application-specific icon and that is capable of causing the plurality of touch states in connection with the camera application-specific icon; in the event of detection of a cessation of the first touch state of the plurality of touch states caused by the detection of the sixth gesture on the camera application-specific icon, launch the camera application; during at least a portion of the detection of the sixth gesture, blur at least a portion of the home screen other than a camera application-specific menu, for providing a sixth gesture-touch duration feedback in connection with the camera application-specific icon; in the event of detection of the second touch state of the plurality of touch states caused by the detection of the sixth gesture on the camera application-specific icon, display at least one camera application-specific option of the camera application-specific menu, the displayed at least one camera application-specific option including an option for setting a camera setting; before a phone application is launched, display, on the touch screen, a phone application-specific icon associated with the phone application via the home screen; detect a seventh gesture that is applied to the touch screen on the phone application-specific icon and that is capable of causing the plurality of touch states in connection with the phone application-specific icon; in the event of detection of a cessation of the first touch state of the plurality of touch states caused by the detection of the seventh gesture on the phone application-specific icon, launch the phone application; during at least a portion of the detection of the seventh gesture, blur at least a portion of the home screen other than a phone application-specific menu, for providing a seventh gesture-touch duration feedback in connection with the phone application-specific icon; and in the event of detection of the second touch state of the plurality of touch states caused by the detection of the seventh gesture on the phone application-specific icon, display at least one phone application-specific option of the phone application-specific menu, the displayed at least one phone application-specific option including an option for accessing at least one of a voicemail or a favorite utilizing the phone application.

BRIEF DESCRIPTION OF THE SEVERAL VIEWS OF THE DRAWINGS

So that the features of various embodiments of the present invention can be understood, a more detailed description, briefly summarized above, may be had by reference to various embodiments, some of which are illustrated in the accompanying drawings. It is to be noted, however, that the accompanying drawings illustrate only embodiments and are therefore not to be considered limiting of the scope of various embodiments of the invention, for the invention may admit to other effective embodiments. The following detailed description makes reference to the accompanying drawings that are now briefly described.

So that the features of various embodiments of the present invention can be understood, a more detailed description, briefly summarized above, may be had by reference to various embodiments, some of which are illustrated in the accompanying drawings. It is to be noted, however, that the accompanying drawings illustrate only embodiments and are therefore not to be considered limiting of the scope of the invention, for the invention may admit to other effective embodiments. The following detailed description makes reference to the accompanying drawings that are now briefly described.

Figure 1:
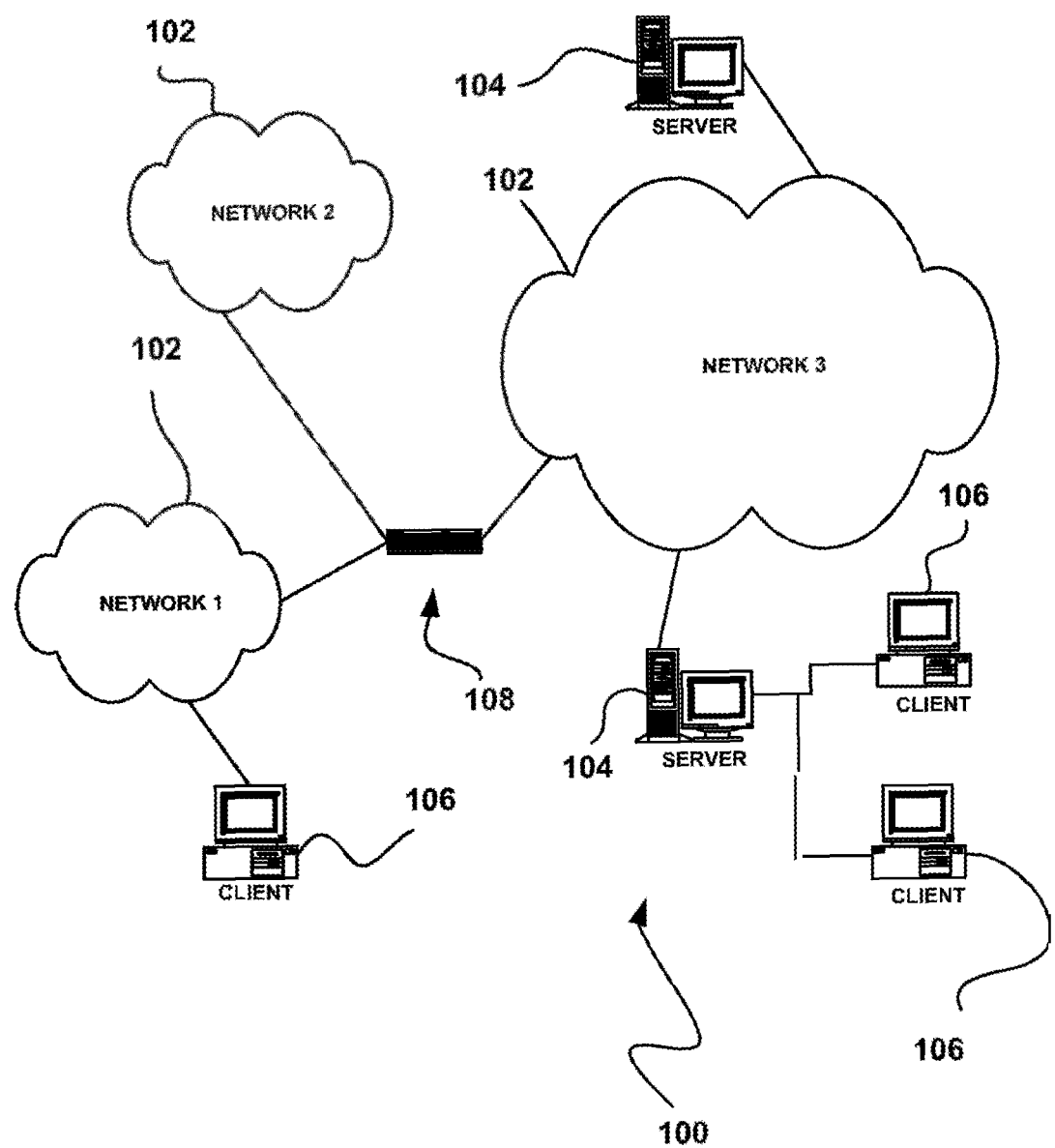
FIG. 1 illustrates a network architecture, in accordance with one embodiment.

While the invention is susceptible to various modifications, combinations, and alternative forms, various embodiments thereof are shown by way of example in the drawings and will herein be described in detail. It should be understood, however, that the accompanying drawings and detailed description are not intended to limit the invention to the particular form disclosed, but on the contrary, the intention is to cover all modifications, combinations, equivalents and alternatives falling within the spirit and scope of the present invention as defined by the relevant claims.

DETAILED DESCRIPTION

Terms that are special to the field of the invention or specific to this description may, in some circumstances, be defined in this description. Further, the first use of such terms (which may include the definition of that term) may be highlighted in italics just for the convenience of the reader. Similarly, some terms may be capitalized, again just for the convenience of the reader. It should be noted that such use of italics and/or capitalization and/or other formatting, highlighting etc, by itself, should not be construed as somehow limiting such terms: beyond any given definition, and/or to any specific embodiments disclosed herein, etc.

In this description there may be multiple figures that depict similar structures with similar parts or components. Thus, as an example, to avoid confusion an Object in FIG. 1 may be labeled and/or referenced as "Object (1)" and a similar, but not identical, Object in FIG. 2 is labeled and/or referenced as "Object (2)", etc. Again, it should be noted that use of such labeling and reference manner, by itself, should not be construed as somehow limiting such terms: beyond any given definition, and/or to any specific embodiments disclosed herein, etc.

In the following detailed description and in the accompanying drawings, specific terminology and images are used in order to provide a thorough understanding. In some instances, the terminology and images may imply specific details that are not required to practice all embodiments. Similarly, the embodiments described and illustrated are representative and should not be construed as precise representations, as there are prospective variations on what is disclosed that may be obvious to someone with skill in the art. Thus this disclosure is not limited to the specific embodiments described and shown but embraces all prospective variations that fall within its scope. For brevity, not all steps may be detailed, where such details will be known to someone with skill in the art having benefit of this disclosure.

In the following detailed description and in the accompanying drawings, some embodiments and their constituent parts may have been simplified for clarity of explanation. In some cases, a complex system may be broken down into its constituent parts and pieces and each part or piece explained separately. The explanations for each part or piece may possibly use a separate figure along with accompanying text to describe variations and alternative implementations. In some cases, complex elements have been simplified to more clearly define their function. In many cases, a system may be comprised of multiple complex elements with each element being a more complex version of a simple part or piece that has been explained separately. It is not possible to describe every possible combination of complex elements in all possible systems. Thus, the description herein is not limited to just the specific embodiments of parts or pieces described with each figure or in an accompanying explanation, or even those example systems described, but rather the possible combinations of complex elements based on the parts and pieces described.

DEFINITIONS

A computer system (e.g., a host system, host, computer, etc.) may include one or more storage systems (or storage subsystems, disk systems, disk subsystems, etc.) that may include storage arrays that include storage devices. A storage device may include a solid-state storage device, hard-disk drive (HD or HDD), or other device (e.g., tape, optical media, etc.).

A solid-state storage device may refer to a solid-state disk (SSD), but the solid-state storage device is not necessarily an SSD. A solid-state storage device may, for example, comprise memory devices such as flash memory devices (e.g., NAND, NOR, MLC, SLC, etc.), but may also comprise other forms of solid-state memory devices or memory components (e.g., SRAM, DRAM, MRAM, volatile memory, non-volatile memory, etc.), a combination of different types of solid-state components and/or other memory devices, or a combination of solid-state memory with other types of storage devices (e.g., hybrid disk, etc.). An SSD may be in a form-factor that is a drop-in replacement for a hard-disk (3.5", 2.5" form factors, etc.) or may be in any other form-factor or with any interface (e.g., Compact Flash CF, MultiMediaCard MMC, miniSD, Memory Stick, SmartMedia, TransFlash, Secure Digital SD, DIMM or other memory module form factor, PCI Express Card, mini PCI-E card, etc.). An SSD may use a standard storage interface (e.g., IDE, SAS, SATA, etc.) or an IO bus interface (e.g., PCI, PCI-E, USB, LightPeak, etc.), a networking interface (e.g., Ethernet, FCoE, Infiniband, etc.), a CPU bus interface (e.g., Intel QPI, HyperTransport, etc.), or other interface (e.g., PCI-E over Ethernet, etc.). An SSD in a storage array may have a capacity of more than 100 Gbytes and contain tens of NAND flash memory chips. A typical 1 Gbit NAND flash memory chip may contain 1024 flash blocks with each flash block containing 64 flash pages and each flash page containing 2 kbytes.

Storage arrays may also include a combination of SSD and HDD, or combinations of various storage devices (e.g., magnetic, optical, tape, solid-state, etc.).

A solid-state storage device may use a disk controller (e.g., storage controller, controller, ASIC, other chips component(s), etc.) to provide the computer system with a standard storage (e.g., disk, storage networking, etc.) interface (e.g., IDE, SATA, SAS, Fibre Channel (FC), etc.), a standard peripheral (e.g., IO bus, IO attach, etc.) interface (e.g., PCI-E, USB, PCI Express, PCI, etc.), other standard interface (e.g., Ethernet, wireless 802.11, etc.), a proprietary (e.g., non-standard, etc.) interface, a combination of these (e.g., PCI-E over Ethernet, FC over Ethernet (FCoE), etc.), or other storage, networking, interconnect interface(s) etc.

A storage array controller (often also called disk controller, host-bus adapter, etc.) may be logically located between the computer system and one or more SSDs or HDDs in a disk subsystem. In the context of the present description, the use of the term disk controller has been avoided as a term to describe a controller that controls one or more disks. The term storage array controller has been used herein for a controller that controls one or more disks. In some cases, each disk (HDD or SSD etc.) may have its own disk controller, thus causing potential confusion over terms. Alternative terms for storage array controller may include host-bus adapter, host adapter, host controller. However, the term host-bus adapter (often abbreviated HBA) and similar terms have been avoided herein to avoid confusion with HBA used here for host block address.

An SSD may include its own SSD controller, but, in some cases, a storage array controller may have more resources than an SSD controller. A storage array controller may use resources, such as memory, CPU, logic, non-volatile memory, etc., as well as unique information (e.g., because a storage array controller is higher than the SSD controller in the storage array hierarchy, i.e., further from the storage devices) in order to manage and control a storage array as well as provide information to an SSD controller.

A computer system typically contains one or more CPUs. A CPU may execute (e.g., run, etc.) an operating system (e.g., Microsoft Windows, Linux. MacOS, etc.). An operating system (OS) typically sees a storage array as a collection of disk sectors or just sectors (and sectors may also be called blocks). Disk sectors may be 512 bytes in length (and typically are in the 2011 timeframe). The sectors or blocks of a storage device are typically addressed as logical blocks using a logical block address (LBA).

To avoid confusion, the term host block address (HBA) is used herein for the LBA used to address a storage array controller. Unless explicitly stated otherwise, it is assumed that the host block size (HBS) is equal to the disk block size (DBS). The HBA may be a composite or union of a logical unit number (LUN) that identifies a logical portion of the storage array or disk or other device in the storage array; an LBA; the virtual machine (VM), if any; a UserID that identifies the user application; a VolumeID that identifies a logical target volume; and other data that may be used for logical access or management purposes. To simplify the description, clarify the figures, and in particular to make it clear that operations may be performed on different LUNs, the LUN may be shown separately from HBA in figures.

A disk number (D) may identify a disk or other storage device in the storage array. A disk logical block address (DBA) is the LBA that identifies the disk sector on the disk or other storage device. An array block address (ABA) is a composite or union of D and DBA, written <D, DBA>. The storage array may be a RAID array, JBOD, or any other particular type of storage array.

A disk controller for an HDD or SSD maintains the relationship between an ABA (or the DBA portion of the ABA) and the disk sectors that are physically part of a storage device (often called the physical disk sectors or physical sectors).

To summarize, with just a single disk, the host may provide an LBA directly to the disk; the disk controller may convert the LBA to the physical disk sector (e.g., for an HDD) or to the PBN (e.g., for an SSD). In the presence of a storage array controller the host may still provide an LBA, but now to the storage array controller (and thus the LBA may be referred to as an HBA to avoid confusion); the storage array controller may then map this HBA to an ABA and may provide the ABA (or possibly just the DBA portion of the ABA) to the disk; the disk (e.g., an HDD or SSD, etc.) may then convert this DBA or ABA (treating the DBA portion of the ABA as though it were just an LBA, which it is) to a physical disk address: either the physical disk sector (e.g., for an HDD) or PBN (e.g., for an SSD).

In various embodiments, structures and their functions, operations and algorithms (e.g., methods, functions, etc.) may be described in terms of software operations, code and pseudo-code. It should be noted that the algorithms may be performed in hardware; software; firmware; microcode; a combination of hardware, software, firmware or microcode; or in any other manner that performs the same function and/or has the same effect. In various embodiments, the data structures, or parts of the structures, may be stored in the storage array controller in SRAM, DRAM, embedded flash, or other memory. Additionally, the data structures, or parts of them, may be stored outside the storage array controller. For example, the data structures may be stored on any of the storage devices of a storage array (the local storage or remote storage, i.e., remote from the storage array connected to the storage array controller) or on a host system (the local host or a remote host, i.e., remote from the host connected to the storage array controller).

A storage command may be directed to a storage device and may specify one or more operations, such as read, write, etc. A storage command may be referred to as a disk command or just command. To help prevent such confusion, the term storage command may be used when referencing commands in general. The term disk command (or disk write, etc.) may be utilized for the command as it arrives at (or is received by) the disk (either SSD or HDD, usually via a standard interface or storage bus, such as SATA, etc.). The term host command (or host write, etc.) may be utilized for the command as it leaves (or is transmitted by) the OS. A disk command may be the same as a host command when there is a direct connection between the OS on a host system and a single disk.

A storage array controller may perform certain functions instead of (or in addition to) an OS running on a host system; and a storage array controller may also perform certain functions instead of (or in addition to) disk controller(s) in a storage array. A storage array controller may be logically located between a host system and storage array (or disk subsystem, storage subsystem, etc.). Each disk may contain its own disk controller, but a storage array controller may have more resources than a disk controller. The algorithms described here allow a storage array controller and attached storage accelerator units (SAUs) to use resources, such as memory, non-volatile memory, etc., as well as unique information (because a storage array controller is higher than a disk controller in a storage array hierarchy, i.e., further from the storage devices) in order to manage and control a storage array as well as provide information to disk controller(s). For example, a storage array controller may be aware of LUNs but a disk controller may not be aware of LUNs. This hierarchical management approach has advantages and potential uses that are explained throughout this description in the forms of various algorithms that may be employed by themselves or in combination.

A device driver is typically (though not necessarily) software that may be manufactured with and sold with a storage array controller. In various embodiments, the device driver may be implemented in software, hardware, firmware or a combination, and may be designed, manufactured and/or sold separately.

In one embodiment, a computer system may comprise multiple virtual machines (VMs), each VM including an operating system, and a hypervisor.

Each OS may include a file system and one or more storage drivers. The file system (sometimes considered part of an OS) may translate or convert from file-based access (i.e., in terms of directories, file names and offsets, etc.) to disk-based access (i.e., in terms of LBAs etc.). The storage driver (sometimes considered part of an OS) may be responsible for handling a disk or other storage device(s). The storage driver may be separate and distinct from the device driver. The storage driver may or may not be part of a storage stack, which is the software that controls access to a file system.

In the context of solid-state storage, typically flash memory, when a flash page (or some other portion) of a storage device is no longer required (i.e., it is obsolete, no longer valid, or is invalid, etc.) that flash page may be marked as dirty. When an entire flash block (e.g., typically between 16 to 256 flash pages) is dirty, the entire flash block may be erased and free space may be reclaimed. If free space on the device is low, a flash block may be chosen that has some dirty flash pages and some clean (i.e., pages that are not dirty, are good, or valid, etc.) flash pages. The clean flash pages may be transferred (i.e., written, moved or copied) to a new flash block. All the original clean flash pages may be marked as dirty and the old flash block may be erased. In the context of solid-state storage, this process of transferring flash pages to new flash blocks and erasing old flash blocks may be referred to as garbage collection Example embodiments described in this disclosure include one or more computer systems with one or more central processor units (CPUs) and possibly one or more I/O systems coupled to one or more storage systems that contain one or more storage array controllers and one or more storage devices.

In one embodiment, the storage system may include one or more bus structures. Depending on the constraints (e.g., signaling methods used, the intended operating frequencies, space, power, cost, and other constraints, etc.) various alternate bus structures may be used. A point-to-point bus may provide the optimal performance in systems requiring high-speed interconnections, due to the reduced signal degradation compared to bus structures having branched signal lines, switch devices, or stubs. However, when used in systems requiring communication with multiple devices or subsystems, a point-to-point or other similar bus will often result in significant added cost (e.g., component cost, board area, increased system power, etc.) and may reduce the potential memory density due to the need for intermediate devices (e.g., buffers, re-drive circuits, etc.).

Functions and performance similar to that of a point-to-point bus can be obtained by using switch devices. Switch devices and other similar solutions offer advantages (e.g., increased memory packaging density, lower power, etc.) while retaining many of the characteristics of a point-to-point bus. Multi-drop bus solutions provide an alternate solution, and though often limited to a lower operating frequency can offer a cost/performance advantage for many applications. Optical bus solutions permit significantly increased frequency and bandwidth potential, either in point-to-point or multi-drop applications, but may incur cost and space impacts.

Although not necessarily shown in all the Figures, the storage systems may also include one or more separate control (e.g., command distribution, information retrieval, data gathering, reporting mechanism, signaling mechanism, register read/write, configuration, etc.) buses (e.g., a presence detect bus, an I2C bus, an SMBus, combinations of these and other buses or signals, etc.) that may be used for one or more purposes including the determination of the storage device and/or storage system attributes (generally after power-up), the reporting of fault or other status information to part(s) of the system, calibration, temperature monitoring, the configuration of storage device(s) and/or storage subsystem(s) after power-up or during normal operation or for other purposes. Depending on the control bus characteristics, the control bus(es) might also provide a means by which the valid completion of operations could be reported by storage device(s) to the storage controller(s), or the identification of failures occurring during the execution of storage controller requests, etc.

As used herein, the term bus refers to one of the sets of conductors (e.g., signals, wires, traces, and printed circuit board traces or connections in an integrated circuit) connecting two or more functional units in a computing system. The data bus, address bus and control signals may also be referred to together as constituting a single bus. A bus may include a plurality of signal lines (or signals), each signal line having two or more connection points that form a main transmission line that electrically connects two or more transceivers, transmitters and/or receivers.

As used herein, a signal (or line, signal line, etc.) refers to one or more electrical conductors or optical carriers, generally configured as a single carrier or as two or more carriers, in a twisted, parallel, or concentric arrangement, used to transport at least one logical signal. A logical signal may be multiplexed with one or more other logical signals generally using a single physical signal but logical signal(s) may also be multiplexed using more than one physical signal.

As used herein, memory devices are generally defined as integrated circuits that are composed primarily of memory (e.g., storage, etc.) cells, such as DRAMs (Dynamic Random Access Memories), SRAMs (Static Random Access Memories), FeRAMs (Ferro-Electric RAMs), MRAMs (Magnetic Random Access Memories), Flash Memory (e.g., NAND flash, NOR flash, etc.) and other forms of random access and related memories that store information in the form of electrical, optical, magnetic, chemical, biological, combination(s) of these, and/or in other forms.

Dynamic memory device types may include FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs, DDR2, DDR3, DDR4, or any of the expected follow-on devices and related technologies such as Graphics RAMs, Video RAMs, LP RAM (Low Power DRAMs) which are often based on the fundamental functions, features and/or interfaces found on related DRAMs.

Flash memory device types may include: NAND, NOR, SLC, MLC, TLC using any interface (e.g., standard interface (e.g., ONFI, etc.); non-standard interface; etc.). Flash memory device types may also include any of the expected follow-on devices and related technologies.

Memory devices may include chips (die) and/or single or multi-chip or multi-die packages of various types, assemblies, forms, and configurations. In multi-chip packages, the memory devices may be packaged with other device types (e.g., other memory devices, logic chips, CPUs, hubs, buffers, intermediate devices, analog devices, programmable devices, etc.) and may also include passive devices (e.g., resistors, capacitors, inductors, etc.). These multi-chip packages may include cooling enhancements (e.g., an integrated heat sink, heat slug, fluids, gases, micromachined structures, micropipes, capillaries, etc.) that may be further attached to the carrier or another nearby carrier or other heat removal or cooling system. Other forms of packaging (e.g., assemblies, modules, cards, units, molding, encapsulation, etc.) for memory devices are also possible.

Although not necessarily shown in all the Figures, storage and memory support devices (e.g., storage controller(s), network controller(s), chipset(s), adapter(s), expander(s), buffer(s), buffer circuit(s), buffer chip(s), register(s), intermediate circuit(s), power supply regulator(s), VRMs, hub(s), re-driver(s), PLL(s), DLL(s), non-volatile memory, SRAM, DRAM, logic circuits, analog circuits, digital circuits, diodes, switches, LEDs, crystals, active components, passive components, combinations of these and other circuits, etc.) may be comprised of multiple separate chips (e.g., die, dies, dice, integrated circuits, etc.) and/or components, may be combined as multiple separate chips onto one or more substrates, may be combined into a single package (e.g., using die stacking, multi-chip packaging, etc.) or even integrated onto a single device based on tradeoffs such as: technology, power, space, weight, cost, etc.

One or more of the various passive devices (e.g., resistors, capacitors, inductors, combination(a) of these, etc.) may be integrated into the support chip packages, or into the substrate, board, PCB, or raw card itself, based on tradeoffs such as: technology, power, space, cost, weight, etc. These packages may include an integrated heat sink or other cooling enhancements (e.g., such as those described above, etc.) that may be further attached to the carrier or another nearby carrier or other heat removal or cooling system.

Memory and storage devices, intermediate devices and circuits, hubs, buffers, registers, clock devices, passives and other memory and storage support devices etc. and/or other components may be attached (e.g., coupled, connected, etc.) to the storage system(s) and/or subsystem(s) and/or other component(s) via various methods including solder interconnects, conductive adhesives, socket structures, pressure contacts, electrical/mechanical/optical and/or other methods that enable communication between two or more devices (e.g., via electrical, optical, wireless, combinations of these, or alternate means, etc.).

The one or more storage system(s) and/or subsystem(s) and/or other components/devices may be connected (e.g., electrically, optically, wireless, etc.) to the CPU complex, computer system or other system environment via one or more methods such as soldered interconnects, connectors, pressure contacts, conductive adhesives, optical interconnects (e.g., laser, LED, optic fiber, etc.), wireless links (e.g., coupling, coils, etc.) and/or other signal communication and/or power delivery methods. Physical connector systems may include mating connectors (male/female), conductive contacts and/or pins on one carrier mating with a male or female connector, optical connections, pressure contacts (often in conjunction with a retaining, alignment, and/or closure mechanism) and/or one or more of various other communication and power delivery methods. The interconnection(s) may be disposed along one or more edges of an assembly (e.g., module, card, adapter, etc.) and/or placed a distance from the storage or other subsystem depending on such application requirements as ease of upgrade, ease of repair, cost, available space and/or volume, heat transfer constraints, component size and shape and other related physical, electrical, optical, visual/physical access, requirements and constraints, etc. Electrical interconnections on a card are often referred to as contacts, pins, connection pins, tabs, etc. Electrical interconnections on a connector are often referred to as contacts or pins.

The integrity, reliability, availability, serviceability, performance etc. of a communication path, data storage contents, and all functional operations associated with each element of a storage system or storage subsystem may be improved by using one or more fault detection and/or correction methods. Any or all of the various elements of a storage system or storage subsystem may include error detection and/or correction methods such as CRC (cyclic redundancy code, or cyclic redundancy check), ECC (error-correcting code), EDC (error detecting code, or error detection and correction), LDPC (low-density parity check), parity, checksum or other encoding/decoding methods suited for this purpose. Further reliability enhancements may include operation re-try (e.g., repeat, re-send, etc.) to overcome intermittent or other faults such as those associated with the transfer of information, the use of one or more alternate, stand-by, or replacement communication paths to replace failing paths and/or lines, complement and/or re-complement techniques or alternate methods used in computer, storage, communication, and related systems.

Additional functions that may reside local to the storage subsystem and/or storage system include write and/or read buffers, one or more levels of cache, protocol translation, error detection and/or correction circuitry, data scrubbing, local power management circuitry and/or reporting, operational and/or status registers, initialization circuitry, performance monitoring and/or control, and other functions.

Terminology

The terminology used herein is for the purpose of describing particular embodiments only and is not intended to be limiting of the invention. As used herein, the singular forms (e.g., a, an, the, etc.) are intended to include the plural forms as well, unless the context clearly indicates otherwise.

The terms comprises and/or comprising, when used in this specification, specify the presence of stated features, integers, steps, operations, elements, and/or components, but do not preclude the presence or addition of one or more other features, integers, steps, operations, elements, components, and/or groups thereof.

In the following description and claims, the terms include and comprise, along with their derivatives, may be used, and are intended to be treated as synonyms for each other.

In the following description and claims, the terms coupled and connected may be used, along with their derivatives. It should be understood that these terms are not necessarily intended as synonyms for each other. For example, connected may be used to indicate that two or more elements are in direct physical or electrical contact with each other. Further, coupled may be used to indicate that that two or more elements are in direct or indirect physical or electrical contact. For example, coupled may be used to indicate that that two or more elements are not in direct contact with each other, but the two or more elements still cooperate or interact with each other.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a circuit, component, module or system. Furthermore, aspects of the present invention may take the form of a computer program product embodied in one or more computer readable medium(s) having computer readable program code embodied thereon.

In this description a portable multifunction device (a device) is used as an example. It should be understood, however, that one or more of the embodiments described herein may be applied to any device (e.g., consumer device, phone, phone system, cell phone, internet phone, music player, video player, camera, social interaction device, radios, TV, watch, personal communication device, electronic wallet, smart jewelry, personal computer, tablet, laptop computer, computer, server, embedded system, electronic glasses, displays, projector, computer appliance, kitchen appliance, home control appliance, lighting control, network device, router, switch, TiVO, AppleTV, GoogleTV, set-top box, cable box, modem, cable modem, PC, tablet, media box, streaming device, entertainment center, GPS device, automobile system, ATM, toy, gaming system, camera, video camera, music device, storage device, back-up device, exercise machine, e-book reader, PDA, combinations of these, etc.).

The device may support one or more applications e.g., search applications contacts and/or friends applications, messaging applications, telephone applications, video conferencing applications, e-mail applications, communications applications, voice recognition applications, instant messaging (IM) applications, blog and/or blogging applications, photographic applications (e.g., catalog, management, upload, editing, etc.), shopping, payment, digital camera applications, digital video camera applications, web browsing and browser applications, digital music player applications, digital video player applications, cloud applications, office productivity applications, backup and storage applications, other applications or combinations or multiple instances (e.g., versions, etc.) of these, etc.

Devices themselves may include (e.g., comprise, be capable of including, have features to include, have attachments, communicate with, etc.) one or more devices, e.g., as separate components, working in cooperation, as a collection of devices, as a multi-function device, with sockets or ports for extra devices and/or components, attached (e.g., direct attach, network attached, etc.) devices, upgrade components, expansion devices and/or modules, etc.

The device may have (e.g., execute, perform, capable of being programmed to perform, etc.) multiple functions (e.g., telephone, video conferencing, e-mail, instant messaging, blogging, digital photography, digital video, web browsing, digital music playing, social interaction, shopping, searching, combinations of these, etc.). Instructions for performing the device functions may be included in a computer readable storage medium or other computer program product configured for execution by one or more processors.

Language

The terminology and language used herein is for the purpose of describing particular embodiments only and is not intended to be limiting.

As used herein, the singular forms (e.g., a, an, the, one, etc.) are intended to include the plural forms as well, unless the context clearly indicates otherwise.

As used herein, the terms comprises and/or comprising, when used in this specification, specify the presence of stated features, numbers, integers, steps, operations, elements, and/or components, etc, but do not preclude the presence or addition of one or more other features, numbers, integers, steps, operations, elements, components, etc. and/or groups thereof.

In the following description and claims, the terms include and comprise, along with their derivatives, may be used, and are intended to be treated as synonyms for each other.

In the following description and claims, the terms coupled and connected may be used, along with their derivatives. It should be understood that these terms are not necessarily intended as synonyms for each other. For example, connected may be used to indicate that two or more elements are in direct physical or electrical contact with each other. Further, coupled may be used to indicate that that two or more elements are in direct or indirect physical or electrical contact. For example, coupled may be used to indicate that that two or more elements are not in direct contact with each other, but the two or more elements still cooperate or interact with each other.

The corresponding structures, materials, acts, and equivalents of all means or step plus function elements in the following claims are intended to include any structure, material, or act for performing the function in combination with other claimed elements as specifically claimed.

This description is presented for purposes of illustration and explanation, but is not intended to be exhaustive or limited to the invention in the forms disclosed. Modifications, permutations, combinations, and variations of embodiments will be understood and apparent to those of ordinary skill in the art without departing from the scope and spirit of this description.

The embodiments chosen and described herein are presented in order to best explain the principles of the embodiments and their practical applications, and to enable others of ordinary skill in the art to understand the embodiments with various modifications as are suited to the particular use contemplated.

As will be understood and appreciated by one skilled in the art, one or more embodiments described herein may be a system, device, method, or computer program product, etc. Accordingly, one or more embodiments described herein may take the form of an entirely hardware embodiment, an entirely software embodiment (including firmware, resident software, micro-code, etc.) or an embodiment combining software and hardware aspects that may all generally be referred to herein as a circuit, component, module or system. Furthermore, one or more embodiments described herein may take the form of a computer program product embodied in one or more computer readable medium(s) having computer readable program code embodied thereon.

Figure 2:
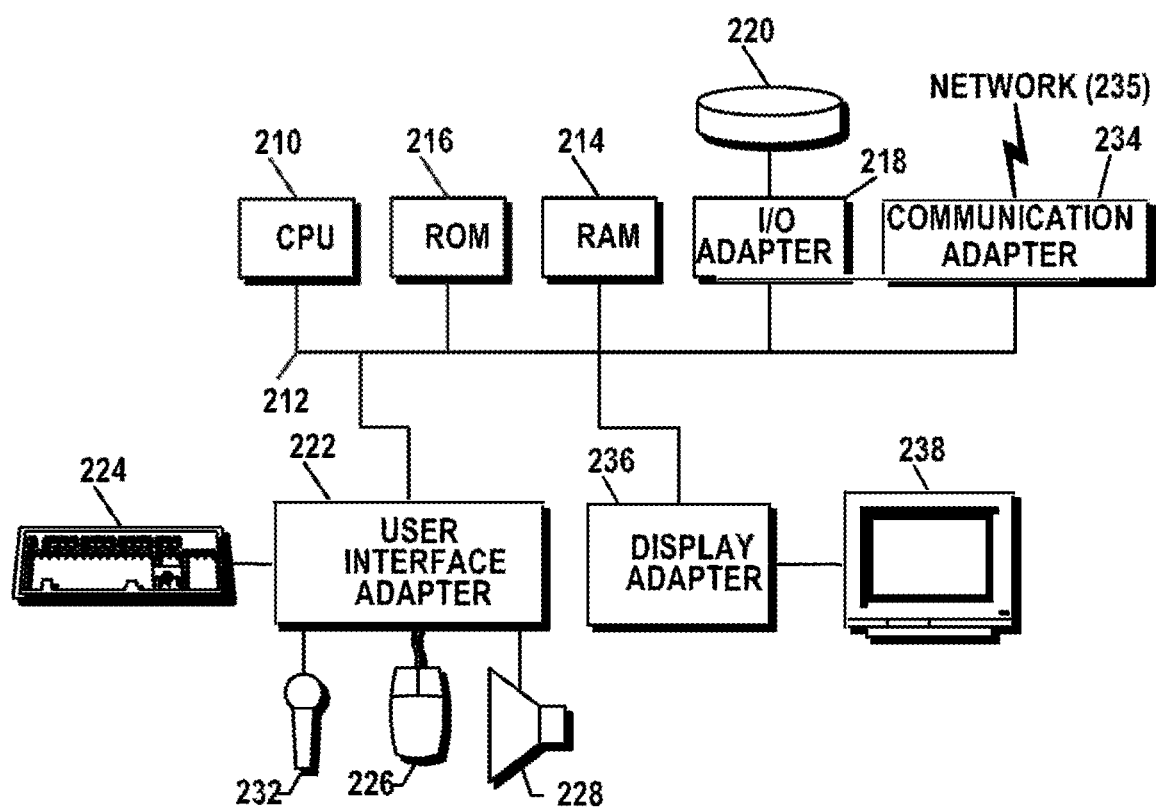
FIG. 2 shows a representative hardware environment that may be associated with the servers and/or clients of FIG. 1, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), tablet computer, peripheral (e.g., printer, etc.), any component of a computer, and/or any other type of logic. In order to facilitate communication among the networks 102, at least one gateway 108 is optionally coupled therebetween.

FIG. 2 shows a representative hardware environment that may be associated with the servers 104 and/or clients 106 of FIG. 1, in accordance with one embodiment. Such figure illustrates a typical hardware configuration of a mobile device in accordance with one embodiment having a central processing unit 210, such as a microprocessor, and a number of other units interconnected via a system bus 212.

The mobile device shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the mobile device to a communication network 235 (e.g., a data processing network) and a display adapter 236 for connecting the bus 212 to a display device 238.

The mobile device may have resident thereon any desired operating system. It will be appreciated that an embodiment may also be implemented on platforms and operating systems other than those mentioned. One embodiment may be written using JAVA, C, Objective C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
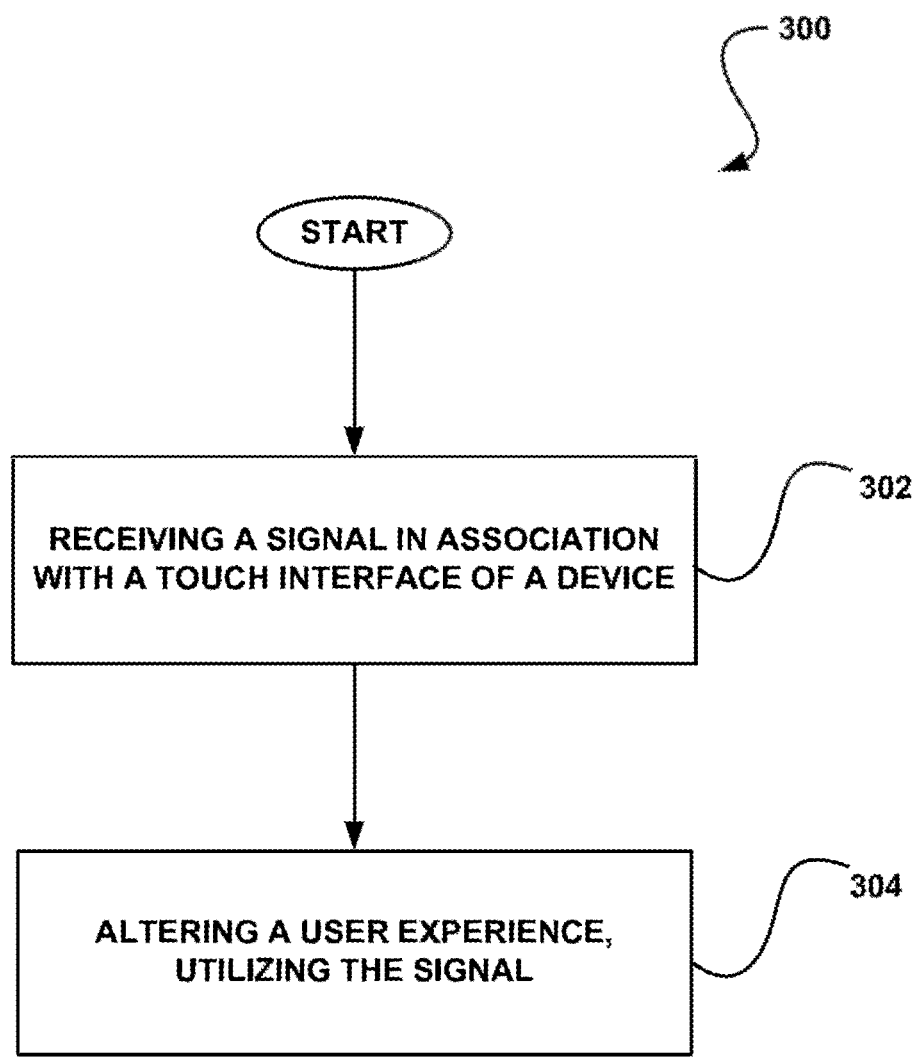
FIG. 3 shows a method for altering a user experience based on a received signal, in accordance with one embodiment.

FIG. 3 shows a method 300, in accordance with one embodiment. As an option, the method may be implemented in the context of the architecture and environment of any subsequent Figure(s). Of course, however, the method may be implemented in any desired environment.

As shown in operation 302, a signal is received in association with a touch interface of a device. In one embodiment, the signal may include a pressure signal which is indicative of a magnitude of pressure. In the context of the present description, such pressure signal may include any signal that is a function of or related to a pressure applied to the device. In one embodiment, such pressure signal may be indicative of a magnitude of pressure being applied to a touch interface of the device. In various embodiments, such pressure signal may be generated by a pressure sensor including, but not limited to those described in the context of subsequently described embodiments, or any other mechanism, for that matter, that is capable of generating the pressure signal.

In other embodiments, the signal may include a touch signal indicative of a touch interface being touched. In the context of the present description, such touch signal may or may not be indicative of a magnitude of pressure being applied to a touch interface of the device. For example, such touch signal may, in one embodiment, simply indicate whether applied pressure is sensed, or not, e.g., not necessarily gauge any more than two pressure states, including pressure-sensed and pressure-not-sensed, etc.

Also in the context of the present description, the aforementioned device may include any device including, but not limited to those described in the context of this and/or subsequently described embodiments. Further, in various embodiments, the touch interface may or may not be combined with a display. For example, if the touch interface is combined with a display, the touch interface may include a touch screen. Thus, the touch interface may, in various embodiments, include, but is not limited to a touch screen or any other interface responsive to touch that is described in the context of this and/or subsequently described embodiments.

In one optional embodiment, the touch interface may be positioned on a first face of a device that includes a display on a second face thereof. Further, the first face and second face may include any respective faces (e.g., front, back, left side, right side, top side, bottom side, etc.) that are different. Just by way of example, in various embodiments, the first face and the second face may be on opposite faces of the device of the device. Further, the first face may include a side face and the second face may include a front face of the device. Even still, the first face may include a back face and the second face may include a front face of the device. Of course, the touch interface may be positioned on the same face as the display, in other embodiments.

As indicated in operation 304, a user experience may be altered, utilizing the signal. In the context of the present description, the user experience may include any aspect of the device that is capable of being directly or indirectly experienced by a user including, but not limited to those described in the context of this and/or subsequently described embodiments.

For example, in the context of an embodiment involving the pressure signal, the user experience may be altered as a function of the magnitude of the pressure being applied to the touch interface, utilizing the pressure signal. Just by way of example, in various embodiments, the user experience may be altered by causing input to the device, by causing output from the device, by causing processing by the device, etc. In other embodiments involving a touch signal, the user experience may be altered in any manner, utilizing the touch signal (dependent or independent of any fluctuation of pressure).

Of course, the foregoing embodiments may be altered by adding and/or removing various features. For example, in one embodiment, the pressure signal may be received which is indicative of the magnitude of pressure being applied to a touch interface positioned on a first face of a device that includes a display on a second face thereof. To this end, the user experience may be altered as a function of the magnitude of the pressure being applied to the touch interface, utilizing the pressure signal.

In another embodiment, a pressure signal may be received which is indicative of a magnitude of pressure being applied to a touch screen. To this end, the user experience may be altered as a function of the magnitude of the pressure being applied to the touch screen, utilizing the pressure signal. In still yet another optional embodiment, a touch signal may be received which is indicative of a touch interface being touched, where the touch interface is positioned on a first face of a device that includes a display on a second face thereof. To this end, the user experience may be altered, utilizing the touch signal. Again, any of the features described above (or hereinafter, for that matter) may or may not be combined in any desired manner.

More illustrative information will now be set forth regarding various optional architectures and features with which the foregoing techniques discussed in the context of any of the present or previous figure(s) may or may not be implemented, per the desires of the user. For instance, various optional examples and/or options associated with the operations 302 and/or 304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4:
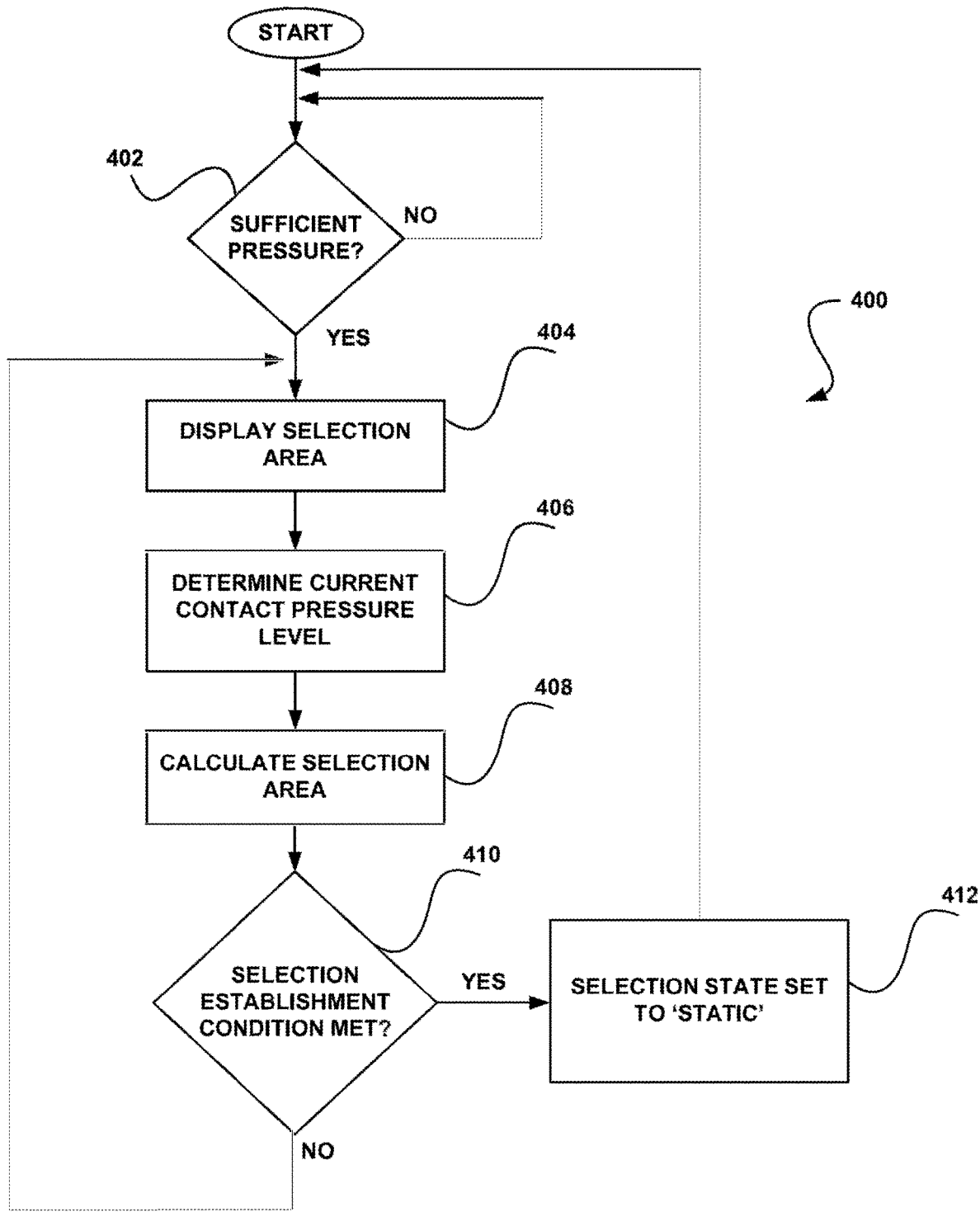
FIG. 4 shows a method for defining a selection made within a user interface based in part on contact pressure, in accordance with one embodiment.

FIG. 4 shows a method 400 for defining a selection made within a user interface based in part on contact pressure, in accordance with one embodiment. As an option, the method 400 may be implemented in the context of the architecture and environment of the previous Figures or any subsequent Figure(s). Of course, however, the method 400 may be carried out in any desired environment. It should also be noted that the aforementioned definitions may apply during the present description.

As shown, it is determined whether sufficient initial contact pressure is being exerted on an interaction surface. See determination 402.

In the context of the present description, an interaction surface refers to a surface through which a user may interact with a device. It may take up the majority of a device face, or just a subset. In various embodiments, an interaction surface may be sensitive to one or more types of interaction, including but not limited to, contact, pressure, and/or proximity. In one embodiment, an interaction surface is receptive to multitouch input. In another embodiment, an interaction surface may be non-planar. In yet another embodiment, an interaction surface may be transparent, and combined with a display. In still another embodiment, an interaction surface may be replaceable. Some embodiments of an interaction surface may have more than one texture, to provide tactile guides to a user when used on the back face of a device. Other embodiments of an interaction surface are non-rectangular.

In various embodiments, an interaction surface may utilize one or more forms of technology to sense contact. These contact-sensing technologies may include, but are not limited to, capacitive, resistive, optical, surface acoustic wave based, and/or any other contact sensing technologies now known or later developed.

In various embodiments, an interaction surface may utilize one or more forms of technology to sense proximity. These proximity-sensing technologies may include, but are not limited to, capacitive, resistive, eddy current, optical, ultrasonic, heat, electric field based, and/or any other contact sensing technologies now known or later developed.

In various embodiments, an interaction surface may utilize one or more forms of technology to sense pressure. These pressure-sensing technologies may include, but are not limited to, conductive, resistive, piezoelectric, and/or any other pressure sensing technologies now known or later developed. In some embodiments, an interaction surface may be able to only detect the total pressure being exerted on the surface. In other embodiments, an interaction surface may be able to discern the contact pressures associated with one or more points or areas of contact.

In the context of the present description, contact pressure is the pressure associated with one or more contact points or contact areas, the pressure being exerted on an interaction surface. For example, in one embodiment, contact pressure may be the pressure exerted on an interaction surface by a single finger press.

In the context of the present description, a contact area refers to the area of an interaction surface which is in physical contact with an implement of interaction. In various embodiments, the contact area may be described, stored, and processed, as a collection of cells that are part of an array. In one embodiment, this array may directly correspond to pixels of a display. In another embodiment, the array may correspond to a grid of discrete areas on an interaction surface which sense contact, pressure, or both. In still another embodiment, the contact area is represented as a primitive shape (e.g., circle, square, etc.) which best fits the actual area in contact with an implement of interaction.

In the context of the present description, an implement of interaction refers to an object which is detectable by an interaction surface in one or more ways (e.g., proximity, contact, pressure, etc.). In various embodiments, implements of interaction may include, but are not limited to, fingers, skin, a stylus, and/or any other object with which a user may interact with a device.

In the context of the present description, a contact point refers to a single location on an interaction surface which is associated with physical contact with an implement of interaction. In various embodiments, the contact point may be determined from a contact area. For example, in one embodiment, a contact point may be located in the center of its associated contact area. In another embodiment, a contact point may be located on an edge of its associated contact area.

Determining whether sufficient initial contact pressure is being exerted on an interaction surface depends on a threshold contact pressure. In some embodiments, the smallest degree of contact pressure may be sufficient, such that the definition of a selection may be triggered by any contact. In other embodiments, the definition of a selection does not occur until a non-negligible threshold contact pressure has been detected. In one embodiment, this threshold contact pressure may be defined by the user. In this way, accidental definitions of a selection may be avoided.

In some embodiments, determination 402 may be performed only after certain events have occurred. For example, in one embodiment, the determination may be made only after receipt of an input or combination of inputs. Possible inputs include, but are not limited to, object proximity to the interaction surface, activation of a hardware switch or button, activation of a software switch or button, and/or any other input capable of being detected. In one embodiment, the determination may not be made until the host device is woken from a sleep state. In another embodiment, the determination itself may also wake the host device from a sleep state.

If the result of determination 402 is that there is sufficient initial contact pressure being exerted on an interaction surface, the current contact pressure level is determined. See operation 404.

In the context of the present description, a contact pressure level is the pressure reading generated from the raw data received from a touch sensor. In various embodiments, the contact pressure level may be represented by a number. For example, in some embodiments, the contact pressure level may be represented by an integer. In another embodiment, the contact pressure level may be represented by a floating-point number. In various embodiments, the contact pressure level may be represented by a percentage of the measurable range of contact pressures. In one embodiment, the contact pressure level may be represented by a unit less number. In another embodiment, the contact pressure level may be represented by an actual measure of the contact pressure, associated with a unit of pressure.

In various embodiments, the contact pressure level may be represented by a touch state. In the context of the present description, a touch state refers to a predefined subset of the range of measurable contact pressures. For example, in one embodiment, contact pressure levels may be represented as one of four predefined touch states: no touch, light touch, medium touch, and heavy touch. As an option, the lowest touch state may require some form of proximity. In some embodiments, the user may be able to specify how the measurable range of contact pressures is partitioned across a predefined number of touch states. In one embodiment, the number and boundaries of touch states may be defined system-wide, for all applications. In another embodiment, the number and boundaries of touch states may be defined on a per-application basis.

As shown, the selection area is calculated. See operation 406. In the context of the present description, the selection area refers to a region of the display, or a region of an object pictured on the display, which has been chosen for selection. The calculation of the selection area may be based upon one or more factors, including, but not limited to, a contact pressure level, a touch state, a contact area, a contact point, a selection boundary, a selection boundary geometry, and/or any other information derived from user interaction. In some embodiments, the selection area may be described as the pixels contained within a selection boundary.

In the context of the present description, a selection boundary describes the boundary of an associated selection area, and is based upon a selection boundary geometry. Additionally, in the context of the present description, a selection boundary geometry refers to the shape of a selection boundary. In some embodiments, a selection boundary geometry may not have reference to actual size or location. For example, in one embodiment, a selection boundary geometry may be described using fractional coordinates on a unit square.

In various embodiments, a selection area may be described, stored, and/or processed as the area contained within a selection boundary. A selection boundary may be represented by a selection boundary geometry, a screen location, and one or more transformations, such as scale or orientation. In one embodiment, the screen location is the point on which the transformed selection boundary geometry is centered.

In some embodiments, the selection area may be described, stored, and/or processed, as a collection of cells that are part of an array. In one embodiment, this array may directly correspond to pixels of a display. In another embodiment, the array may correspond to a grid based on a coordinate system specific to an object being displayed. In still another embodiment, the selection area may be described, stored, and processed as a mathematical function that defines the boundary of the selection area.

In one embodiment, the shape of a selection boundary may be one of a plurality of selection boundary geometries predefined within an operating system. In another embodiment, the shape of a selection boundary may be predefined within an application, independent of selection boundary geometries defined within the operating system. In yet another embodiment, the selection boundary geometry may be specified by a user. In still another embodiment, the geometry of the selection boundary may depend upon at least one form of user input, including but not limited to contact pressure, number of fingers in contact with the screen, device orientation, location of user fingers, and/or any other form of user input. Finally, in another embodiment, the geometry of a selection boundary may depend upon the content within or near a location associated with the selection (e.g., contact point, finger location, focal point of user's eyes, cursor location, etc.).

In some embodiments, selection boundaries may have geometries based upon simple shapes, including, but not limited to, ovals, circles, triangles, squares, rectangles, and/or higher order polygons. In other embodiments, selection boundaries may be based upon regular shapes (e.g., a star, a plus sign, etc.). In one embodiment, a selection boundary may be based upon the geometry of a contact area.

There are numerous ways in which a selection boundary may be described, stored, and/or processed. In various embodiments, a selection boundary may be represented by the combination of an established selection boundary geometry with a location, a scale, and/or a rotation.

In one embodiment, a selection boundary may be described using the vertex coordinates of a selection boundary geometry, in conjunction with location, scale, and/or rotation factors. For example, a rectangular selection boundary geometry may be described by the coordinates of the four corners. As an option, the vertices of a selection boundary geometry may be described using coordinates within the unit square.

In another embodiment, a selection boundary may be described using a mathematical function representing an established selection boundary geometry, in conjunction with location, scale, and/or rotation factors. For example, an elliptical selection boundary geometry may be described by an ellipse function whose foci depend upon the scale factor.

In yet another embodiment, a selection boundary may be described using a spline-based representation of a selection boundary geometry, in conjunction with location, scale, and/or rotation factors. For example, a curled selection boundary geometry may be described using splines combined with location, scale, and rotation factors.

In other embodiments, a selection boundary may be described by a bitmap representation of a selection boundary geometry, in conjunction with location, scale, and/or rotation factors. For example, in one embodiment, a bitmap representation of a contact area may be used as a selection boundary geometry associated with a selection boundary. In another embodiment, a bitmap representation of an irregular shape may be used as a selection boundary geometry associated with a selection boundary. In this way, geometries which may be difficult to describe using vertices, formulas, or splines may be used as the bases for a selection boundary.

The selection area is calculated by determining the selection boundary. In various embodiments, the selection boundary may be determined by transforming an appropriate selection boundary geometry as a function of user input, including but not limited to, contact pressure level, contact point, contact area, number of fingers detected, device orientation, etc. Once the selection boundary has been determined, the selection area is known.

In various embodiments, the selection boundary may be defined by transforming the scale of an appropriate selection boundary geometry as a function of user input. For example, in one embodiment, a selection boundary with a circular geometry may have a larger radius at higher contact pressure levels. In another embodiment, a rectangular selection boundary geometry may be scaled linearly by a factor proportional to the contact pressure level. In some embodiments, the relationship between selection boundary geometry scale and a contact pressure level is proportional. In other embodiments, the relationship between selection boundary geometry scale and a contact pressure level is inversely proportional, such that higher pressure may make the geometry smaller.

In various embodiments, the selection boundary may be defined by transforming the orientation of an appropriate selection boundary geometry as a function of user input. For example, in one embodiment, a selection boundary with a star-shaped geometry may be rotated further clockwise at higher contact pressure levels. In some embodiments, the relationship between selection boundary geometry orientation and a contact pressure level is proportional, such that an increase in pressure may result in a clockwise rotation. In other embodiments, the relationship between selection boundary geometry orientation and a contact pressure level is inversely proportional, such that higher pressure may cause a counterclockwise rotation.

In some embodiments, a selection boundary may have an anchor point. In the context of the present description, an anchor point refers to a point located on or near the selection boundary geometry which remains fixed as the geometry is transformed. In one embodiment, a selection boundary may have a scaling anchor point, which remains fixed as the geometry is scaled. For example, a square selection boundary may have a scaling anchor point in the upper left corner, causing the square to expand down and to the right, keeping the upper left corner stationary.

In another embodiment, a selection boundary may have a rotational anchor point, which is used as an axis of rotation as the selection boundary geometry is rotated. For example, a star-shaped selection boundary may have a rotational anchor point located in the center, such that it rotates along an axis of symmetry.

In various embodiments, the calculation of the selection area may depend upon the context of the selection. Specifically, the selection boundary may be dependent upon the type of content on or near a point or area associated with the selection, including but not limited to, a contact point, a contact area, a cursor, a user focus, etc. In various embodiments, the selection boundary geometry and the manner in which it transforms as a function of user input may be context dependent. For example, in one embodiment, a selection made on or near a text field may cause the selection boundary geometry to be rectangular, with a scaling anchor point located in an upper corner appropriate for the text language (e.g., upper left corner for English, upper right corner for Arabic, etc.). In another embodiment, a selection on or near a text field may cause the rectangular boundary geometry to scale in increments of the same scale as the height and width of the text. In this way, it may be clear to the user which text has been selected, as there may never exist a selection boundary which contains only half a line or character.

In another embodiment, a selection on or near a text field may result in a rectangular selection boundary geometry which scales proportionally to a contact pressure level in a manner similar to how text is selected using a cursor. In this way, a user may select text in a familiar manner, while only having to vary the pressure being exerted on a contact point, for example. In one embodiment, the text selection begins to increase once a predefined contact pressure level has been achieved. As an option, the rate at which the selection grows may be a function of the contact pressure level, once the predefined contact pressure level has been achieved and the selection grown initiated. In another embodiment, the text selection scaling may be tiered, such that at one touch state, the selection grows character by character, at an intermediate touch state the selection grows word by word, and so on, such that the user is able to enlarge the text selection in increments of characters, words, lines, paragraphs, and pages, depending on the touch state. As an option, the selection may also be incremented by sentences.

In other embodiments, the above-mentioned methods for selecting text using a selection which expands in the direction the text would be read may also be applied to the selection of other linear subject matter. For example, in one embodiment, this method may be used to select a video segment. As an option, the selection scaling may be tiered, growing from frame-by-frame to second-by-second to minute-by-minute, and so on. In another embodiment, this method may be used in the selection of a portion of chronologically arranged material. Possible material with a temporal arrangement may include, but is not limited to, a collection of photos, messages in an email account, text messages, web browser history, and/or any other collection of items which may be arranged chronologically.

In various embodiments, a selection made within a graphic (e.g., photograph, drawing, movie still, bitmapped or rasterized text, etc.) may utilize a default selection boundary geometry with a default scaling anchor point. In one embodiment, the user may be able to predefine the default selection boundary geometry and/or default scaling anchor point, to be used when making a selection within a graphic. In still another embodiment, the default selection boundary geometry and/or default scaling anchor point may be predefined within the operating system. As an option, these defaults may be predefined on a per-application basis.

In various embodiments, a selection made within a photograph may result in the use of a context-specific selection boundary geometry which transforms in a context specific manner. For example, in one embodiment, a selection made within a photograph containing one or more people may utilize the rough shape of the subjects' faces as a selection boundary geometry. As an option, the selection boundary geometry may be composed of the perimeter of all faces within a certain distance of a point related to the selection (e.g., contact point, user focus, etc.), the distance being proportional to a user input (e.g., contact pressure level, touch state, etc.). Face selection may be used to assist the user in establishing the identity of photographed individuals, allowing future identification to be performed automatically using facial recognition. In one embodiment, facial and other forms of recognition may be performed by a host device, a remote computer, a cloud service, or any other computational resource, or combination of these and other resources.

In another embodiment, a selection made within a photograph on or near an eye may utilize a rough shape of the eye as a selection boundary geometry. As an option, the exactness of the method used to automatically detect the shape of an eye may vary as a function of a user input, such as contact pressure level. Eye selection may be used to assist the user in removing the "red eye" effect sometimes seen in photographs.

In one embodiment, a selection made within a graphic may cause the selection boundary geometry to be defined by the collection of pixels near a point associated with the selection (e.g., contact point, user focus, etc.) which are similar in at least one aspect. Possible aspects include, but are not limited to, color, one or more dimensions of an associated color space, brightness, transparency, and/or any other aspect that may be associated with a pixel. As an option, the degree of similarity between pixels required to influence the selection boundary geometry may be a function of a user input, such as a contact pressure level. In this way, a user may be assisted in separating an object within the graphic from a background or other visual elements.

In various embodiments, there may exist limits to the amount a selection boundary geometry may be transformed as a function of user input. For example, in one embodiment, the selection boundary geometry may increase in size as the contact pressure level increases, until an upper contact pressure threshold is reached. Contact pressure levels beyond the upper threshold may not increase the size of the selection boundary geometry any further. In another embodiment, the scale of the selection boundary geometry may be limited by a lower contact pressure threshold, such that reducing the contact pressure level below the threshold may not reduce the scale of the selection boundary geometry any further. In yet another embodiment, both upper and lower contact pressure thresholds may be implemented. In other embodiments, this concept of thresholds may be applied to other variable aspects of the selection boundary, such as the orientation of the selection boundary geometry, and as a function of other user input, including but not limited to the location of a contact point, the size of a contact area, user focus, and/or any other type of user input.

In one embodiment, the user may be able to predefine one or more contact pressure thresholds associated with the limits of a transformation of the selection boundary geometry. As an option, the user may also predefine the limits of the transformation, in addition to the maximum and/or minimum contact pressure level which may affect said transformation. In another embodiment, these contact pressure thresholds and/or transformation limits may be predefined within the operating system. In still another embodiment, the contact pressure thresholds may be automatically optimized over time, by observing the typical range of pressures the user exerts in various use scenarios.

In one embodiment, the selection boundary geometry and/or transformation of the selection boundary geometry may depend upon the proximity of an object to an interaction surface, rather than an aspect of physical contact with an interaction surface.

In various embodiments, the selection boundary may depend, at least in part, upon the user focus. In the context of the present description, user focus refers to a point or area on a display which is the visual and/or interactive focus of the user. For example, in one embodiment, the user focus may be determined by tracking the eyes of a user with one or more device-mounted cameras, and calculating where the user is looking. This may also be referred to as user gaze, or user gaze tracking. As an option, eye movement may also be monitored, to ascertain the manner in which the user is using the device (e.g., methodically reading text, quickly scanning text, examining a picture, visually searching for an icon, etc.). In another embodiment, the user focus may be defined as the location of a cursor in a text environment. In still another embodiment, the user focus may be established through user input, such as a finger tap.

Various aspects of the selection boundary may depend upon the user focus. For example, in one embodiment, the user focus may be used to determine the context of a selection. In another embodiment, the user focus may be used to determine the location of a selection, allowing the user to make a selection without having to change the location of a contact point. In still another embodiment, the tracking of eye movement may be used to determine the type of selection (e.g., reading eye movement may trigger a text selection, etc.).

Once the selection boundary has been determined using an appropriate selection boundary geometry that has been transformed as a function of a user input, the selection area may be calculated.

As shown, the selection area is displayed. See operation 408. In various embodiments, a selection area may be displayed using one or more selection functions. In the context of the present description, a selection function refers to a function of one or more inputs which determines one or more properties of a selection. For example, in one embodiment, possible selection function inputs may include, but are not limited to, touch state, contact pressure level, selection state, finger locations, device orientation, user focus, pressure uncertainty, touch uncertainty, contact point, contact area, gestures, application type and/or context, application flags, operating system flags, and/or any other form of user or system input.

Within the context of the present description, pressure uncertainty refers to any data associated with the uncertainty inherent in measuring pressure exerted on an interaction surface. Pressure uncertainty may include, but is not limited to, the uncertainty of a measured contact pressure level, a multidimensional array of values representing the variance of contact pressure measured for each cell/pixel in the vicinity of a contact point, an uncertainty value inherent to a particular pressure sensor, and/or any other type of data associated with uncertainty in pressure measurement.

Within the context of the present description, touch uncertainty refers to any data associated with the uncertainty inherent in sensing contact with an interaction surface. Touch uncertainty may include, but is not limited to, the error range associated with the location of a contact point, a multidimensional array of values representing the probabilities of contact measured for each cell/pixel in the vicinity of a contact point, an uncertainty value inherent to a particular touch sensor, and/or any other type of data associated with uncertainty in sensing contact.

Within the context of the present description, a selection state refers to whether a selection is 'dynamic' and still able to vary as a function of user input, or 'static', and not currently varying as a function of user input.

In various embodiments, a selection function may determine one or more presentation properties of a selection. For example, possible presentation properties may include, but are not limited to, shading, color, contrast, brightness, line style, animation routine, transparency, pattern, border style, area style, and/or any other visual property that may describe an object on a display. Examples of animation routines include, but are not limited to, "marching ants", changing colors, flashing, simulated optical distortions, pulsing highlights, and/or any other routine which varies location, transparency, color, content, and/or any other graphical property over time. In some embodiments, an animation routine may be a function of user input.

In various embodiments, a selection function may vary one or more presentation properties as a function of contact pressure. In this way, the user has visual feedback as to the level of pressure they are exerting on the device. For example, in one embodiment, the selection function may indicate the contact pressure level by shading the selection with a color which is somewhere between a pair of colors which represent the extrema of measurable contact pressure levels.

In various embodiments, a selection function may determine one or more fundamental properties of a selection. Within the context of this description, fundamental selection properties may include, but are not limited to, selection boundary geometry, transformation(s) to be applied to the selection boundary geometry as a function of user input, anchor point(s), and/or any other property which may be associated with a selection area.

In various embodiments, the application of a selection function may display a secondary boundary. Within the context of this description, a secondary boundary is any boundary, radius, or area associated with a selection area, which is not the selection boundary. For example, in one embodiment, a secondary boundary may be the area within which facial detection is being performed, as opposed to the selection boundary, which may be the outline of detected faces. In another embodiment, a secondary boundary may be the area within which eye detection is being performed. In yet another embodiment, the secondary boundary may represent the pressure uncertainty or touch uncertainty associated with a contact area.

In various embodiments, the secondary boundary may be displayed in addition to, or instead of, the selection boundary. For example, in one embodiment where face detection is being performed as part of calculating the selection area, the selection boundary may be indicated with a solid color line while the secondary boundary may be indicated with a thin dotted line.

In various embodiments, the area unique to the secondary boundary (i.e. the portion of the enclosed area which does not overlap with the selection area) may have presentation properties that differ from the selection area. For example, in one embodiment, a user may make a text selection of which the intended boundaries are uncertain. The portion of the text which was almost certainly intended to be selected may be shaded in green, while the text which may or may not have been selected intentionally may be shaded in red. The user intention may be extrapolated from uncertainty associated with the contact and/or contact pressure used to make the selection, in accordance with one embodiment.

In various embodiments, the secondary boundary may be used to indicate uncertainty associated with a form of machine recognition including, but not limited to, facial recognition, OCR, and/or any other form of machine recognition. For example, faces within a selection which have been recognized with a threshold degree of confidence may be outlined in green, while faces whose recognition is suspect (i.e. multiple viable matches, etc.) may be outlined in red (i.e. a secondary border).

As shown, after the selection area has been displayed, it is determined whether the selection establishment conditions have been met. See determination 410.

Within the context of the present description, selection establishment conditions refer to one or more predefined conditions whose satisfaction may cause the selection state to switch from 'dynamic' to 'static'. For example, in one embodiment, once the selection establishment conditions have been satisfied, the selection may no longer vary with contact pressure levels until determination 402 once again detects sufficient initial contact pressure. In various embodiments, the selection establishment conditions may be defined within a selection function.

In various embodiments, one or more selection establishment conditions may depend upon changes in the contact pressure level. For example, in some embodiments, selection establishment may be conditioned upon whether the contact pressure level drops below a predefined level. In one embodiment, this threshold contact pressure level may be defined as being a set amount of pressure less than the current contact pressure level. In this way, a user may reduce the contact pressure a small amount to modify their selection, with further reduction causing a selection establishment condition to be satisfied. In another embodiment, the threshold contact pressure level may be a set pressure amount.

In various embodiments, a selection establishment condition may depend upon contact pressure velocity, or the rate at which the contact pressure level is changing. For example, in one embodiment, a user may be able to satisfy a selection establishment condition by quickly reducing the contact pressure level to a predefined level within a predefined amount of time. In another embodiment, selection establishment may be conditioned upon whether a user has increased the contact pressure level to a predefined level within a predefined amount of time. In yet another embodiment, a selection may be established by exceeding a predefined contact pressure velocity, without regard to the actual pressure levels. As a specific example, a user may establish their selection by a quick pulse of their finger, without having to reach a particular pressure level.

In various embodiments, a selection establishment condition may depend upon how much time has elapsed since a particular event. For example, in one embodiment, a selection may be established if the user maintains a contact pressure level for a predefined amount of time. As an option, there may be a predefine tolerance level for pressure variations which may not reset this timing, allowing for small fluctuations in contact pressure which may be difficult for a user to control. In another embodiment, a selection establishment condition may be satisfied once a predefined amount of time has elapsed since the satisfaction of determination 402.

In various embodiments, a selection establishment condition may depend upon forms of user input that are not related to contact pressure. These forms of user input may include, but are not limited to, gestures, a change in the number of fingers in contact with the device, change in device orientation, surpassing a threshold level of accelerations (e.g., wrist flick, etc.), and/or any other form of user input. It should be noted that selection establishment may also be conditioned upon the satisfaction of a combination of any of the previously described conditions.

If it is determined that the selection establishment conditions have not been met, the selection is updated in a loop through performing operations 404, 406, and 408. The selection may continue to vary as a function of user input until the selection establishment conditions have been met.

If it is determined that the selection establishment conditions have been met, the selection state is changed from 'dynamic' to 'static'. See operation 412.

Setting the selection state to 'static' means the selection is no longer being modified by user input. In various embodiments, the selection function may depend in part on the selection state. For example, in one embodiment, when the selection state is 'static', the secondary boundary may be removed from the display. In another embodiment, a 'static' selection state may cause the selection area to be displayed in a different color, or with a different style of selection boundary. In yet another embodiment, changing a selection state from 'dynamic' to 'static' may cause one or more application and/or operating system flags to be set.

In various embodiments, changing a selection state from 'dynamic' to 'static' may prompt the user to choose an action to be performed on or with the contents of the selection. For example, in one embodiment, after the desired faces have been highlighted and the user has reduced the contact pressure level below the dynamic selection minimum threshold pressure, they may be prompted to confirm the identity of the selected faces. In another embodiment, after a text selection has been given a 'static' selection state, the user may be prompted with operations that may be performed on the selected text, including but not limited to copy, cut, paste, spell check, style (e.g., bold, underlined, italic, etc.), font, font size, and/or any other operation which may be performed on text.

In some embodiments, once a selection has become 'static', it can no longer be modified and may be destroyed upon creation of a new selection. In other embodiments, a user may further modify a static selection by first applying a contact pressure sufficient to satisfy determination 402. In one embodiment, satisfying determination 402 with a static selection already in existence may change the selection state of the previous selection from static to dynamic, allowing further variation as a function of user input. In another embodiment, satisfying determination 402 with a static selection already in existence may create a new selection, as a function of user input, which is combined with the previously made selection. In yet another embodiment, a user may chose whether to replace a previously made selection or augment (i.e. add to, subtract from, etc.) a previously made selection with a new selection. As an option, the user choice may be indicated through gesture, voice command, toggling a hardware control, toggling a software control, and/or any other form of user input.

In various embodiments, method 400 may be adapted to allow for the definition, establishment, and modification of selections through other types of user input. Other types of user input may include, but are not limited to, proximity to an interaction surface, number of contact points, gestures, and/or any other form of user input. For example, in one embodiment, a user may expand a text selection by bringing their finger into proximity to the interaction surface.

Figure 5:
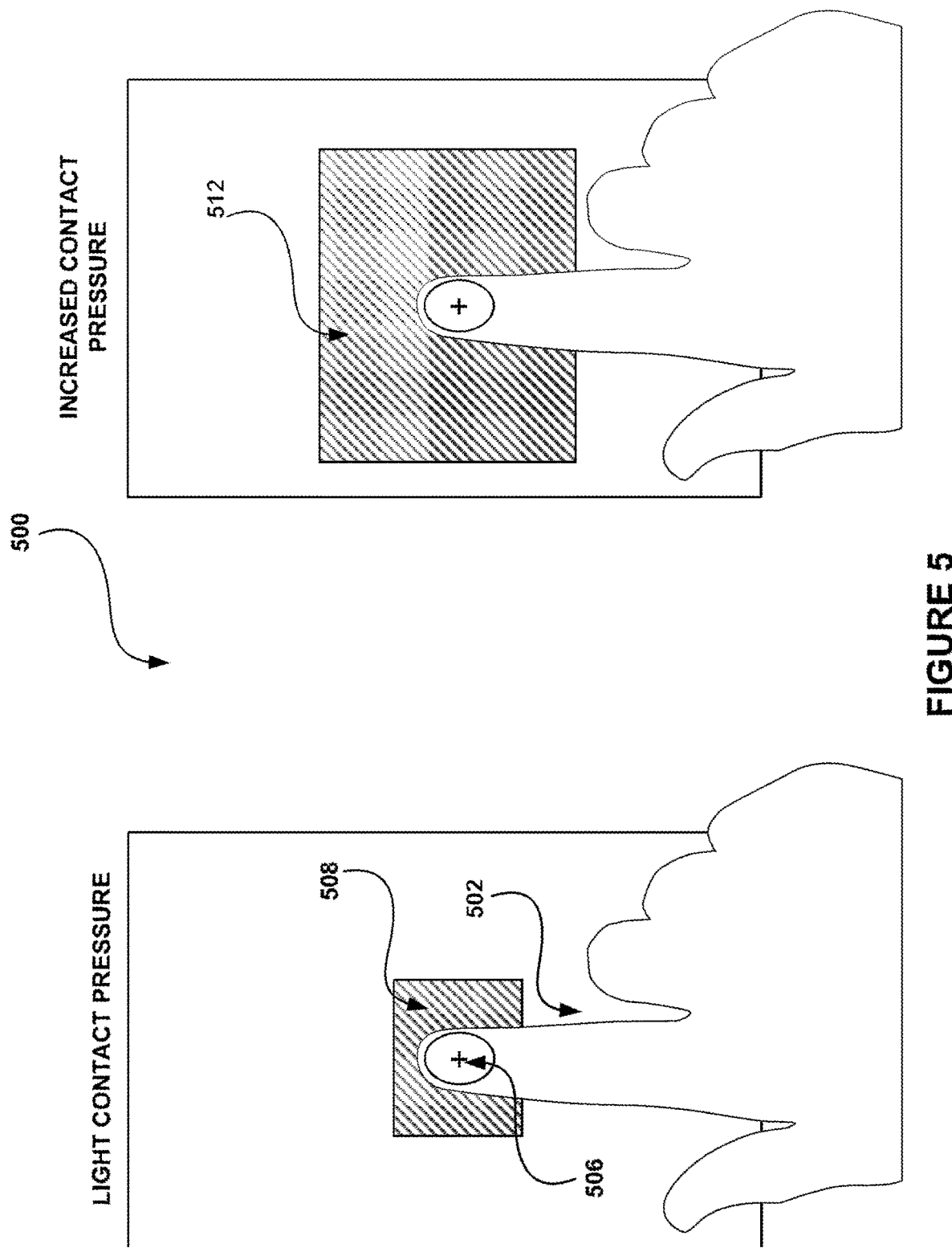
FIG. 5 shows a pressure-sensitive user interface for making a selection, in accordance with one embodiment.

FIG. 5 shows a pressure sensitive user interface 500 for making a selection, in accordance with one embodiment. As an option, the user interface 500 may be implemented in the context of the architecture and environment of the previous Figures or any subsequent Figure(s). Of course, however, the user interface 500 may be implemented in any desired environment. The aforementioned definitions may apply during the present description.

As shown, the user interface 500 may be utilized in making a selection based in part on pressure exerted by the user upon one or more interaction surfaces located on a device. For example, in one embodiment, a user's finger 502 may exert a small amount of force over contact area 504, which is centered on contact point 506 located on a pressure sensitive touch screen. If the contact pressure level is sufficient, then a selection area 508 having a selection boundary 510 is calculated and displayed. As the contact pressure is increased, the selection boundary expands to encompass a larger selection area 512.

Figure 6:
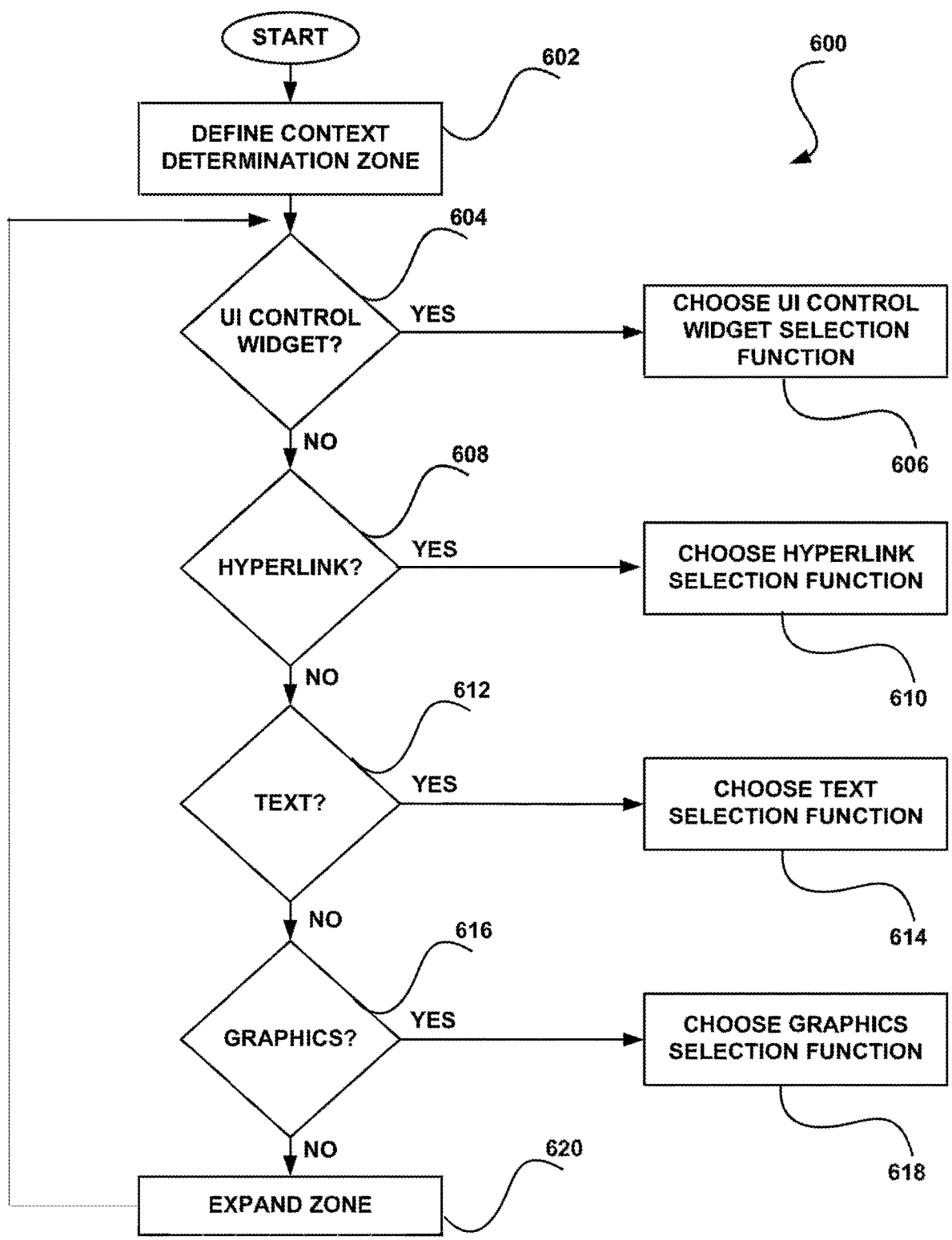
FIG. 6 shows a method for determining the context of a contact pressure-based selection and choosing an appropriate selection function, in accordance with one embodiment.

FIG. 6 shows a method 600 for determining the context of a contact pressure-based selection and choosing an appropriate selection function, in accordance with one embodiment. As an option, the method 600 may be implemented in the context of the architecture and environment of the previous Figures or any subsequent Figure(s). Of course, however, the method 600 may be implemented in any desired environment. The aforementioned definitions may apply during the present description.

As shown, the context determination zone is defined. See operation 602. Within the context of the present description, a context determination zone refers to the area that is examined while determining the context of a selection. In various embodiments, the context determination zone may be initially defined as a function of one or more elements of user input upon which the selection itself is based. For example, in one embodiment, the context determination zone may be initially defined to be the contact area. In another embodiment, the context determination zone may be a predefined shape (e.g., circle, square, etc.) of predefined size, centered on the contact point. As an option, the user may be able to specify the initial size and shape of the context determination zone. In yet another embodiment, the context determination zone may be located such that the contact point is off-center, to provide a more intuitive user experience (e.g., the zone may be offset to compensate for the user's view being obstructed by their finger, etc.).

In still another embodiment, the context determination zone may have a predefined size. As an option, the predefined initial size for a context determination zone may be chosen such that it is smaller than any user interface elements which may be detected. As an additional option, the predefined initial size may be chosen such that it is large enough to assist a user in distinguishing between potential selection targets which are close to each other.

As shown, once the context determination zone has been defined, it is then determined whether there is a user interface control widget within the context determination zone. See determination 604.

Within the context of the present description, a user interface control widget refers to any element within a user interface which may receive user input, which are typically non-textual. For example, in various embodiments, user interface control widgets may include, but are not limited to, buttons, radio boxes, check boxes, drop down lists, sliders, tabs, and/or any other non-textual UI widget.

In some embodiments, user interface control widgets may also include hyperlinks which are isolated from a text field. For example, text that responds to user interaction like a button, but is not located within a selectable text field. Selectable text fields and hyperlinks embedded within a text field (e.g., links within a web page, links within a word processing document, etc.) are specifically excluded from this definition of user interface control widgets, as they are treated as separate cases within this method.

In various embodiments, the determination as to whether there is a user interface control widget within the context determination zone begins with determining whether there is a UI control widget located at the contact point upon which the zone is based. In this way, time is not wasted determining the context of a well-aimed contact point.

If a UI control widget is not located at the contact point, then it may be determined if there is a UI control widget in the vicinity, within the context determination zone. In various embodiments, this determination may be performed using the bounding boxes associated with user interface elements. Within the context of the present description, a bounding box refers to a rectangle within which a user interface control widget may reside. In some embodiments, a bounding box may be the smallest rectangle which may contain a particular user interface control widget. In this way, detection of user interface control widgets whose shape is not rectangular is simplified.

For example, in one embodiment, the determination as to whether there is a user interface control widget within the context determination zone may be performed by determining if the boundary of the context determination zone intersects with the bounding box of any user interface control widgets. As an option, if the initial size of the context determination zone is larger than a predefined minimum (e.g., smallest bounding box associated with a typical UI control widget, smallest bounding box present within the present UI, etc.), the determination may also verify the absence of any bounding boxes completely contained within the context determination zone, on the initial pass.

In another embodiment, the determination may be performed by calculating the distances between the center of the context determination zone and the center of every UI control widget present in the interface, and comparing them with a distance related to the size of the context determination zone.

If it is determined in 604 that there is at least one user interface control widget within the context determination zone, then a context sensitive UI control widget selection function is chosen. See operation 606. In various embodiments, once an appropriate selection function is chosen, a selection is defined based upon user input. In one embodiment, the selection is defined using method 4.

Within the context of the present description, a context sensitive selection function refers to a selection function adapted for use in making a selection in a context which has been automatically determined. In various embodiments, a context sensitive selection function may include logic to use a different context sensitive selection function to define the user's selection, based upon user input. In this way, a user may be able to indicate that the initial context determination is not correct, and that another selection function should be used.

For example, in one embodiment, a context sensitive UI control widget selection function may include logic such that, if the contact pressure level exceeds a predefined limit $P_0$, further definition of the selection is handled by a different context sensitive selection function, such as one adapted for selecting hyperlinks. In another embodiment, a contact pressure level exceeding $P_0$ may cause the context determination zone to expand, and the process of choosing an appropriate selection function to resume, ignoring the UI control widget previously detected within the zone. As an option, future determinations may ignore all UI control widgets. In this way, a context-aware user selection initiated with a contact point in the vicinity of a UI control widget may be redirected to a different type of subject matter without forcing the user to reposition their finger, for example.

In various embodiments, a context sensitive UI control widget selection function may depend upon the context determination zone. For example, in one embodiment, a context sensitive UI control widget selection function may use the context determination zone as a secondary boundary. In this way, the selection function may be able to continue searching the context determination zone for additional UI control widgets.

In various embodiments, a context sensitive UI control widget selection function may include logic to handle the case where there is more that one UI control widget within the context determination zone. In one embodiment, the selection function may choose the UI control widget whose center is closest to the center of the context determination zone. In another embodiment, the selection function may choose the UI control widget whose bounding box has greatest overlap with the context determination zone. In still another embodiment, the selection function may choose the UI control widget whose bounding box has an edge or corner closest to the center of the context determination zone.

In various embodiments, a context sensitive UI control widget selection function may include logic to allow the user to toggle between multiple widgets found within the context determination zone. For example, in one embodiment, the selection function may include a list of all UI control widgets found at least partially within the context determination zone. As an option, the widgets may be arranged in the list in order of distance from the center of the context determination zone. In another embodiment, the selection function may traverse the list sequentially, selecting a different widget. As an option, the list traversal may occur as a function of user input, including but not limited to, gestures, contact pressure velocity, accelerometer data, and/or any other user input. In still another embodiment, switching between different widgets found within the context determination may occur after a predefined amount of time has elapsed, and the selection establishment conditions have not yet been satisfied. In yet another embodiment, a context sensitive UI control widget selection function may use user focus to choose between multiple UI control widgets found within the context determination zone.

In various embodiments, a context sensitive UI control widget selection function may visually indicate the selection of a widget to the user before the selection has been established. For example, in one embodiment, the selection function may highlight the outline of the widget. In another embodiment, the selection function may shade the widget using a predefined mask of the widget. In still another embodiment, the selection function may shade and/or outline the widget bounding box. In yet another embodiment, the selection function may change and aspect of text associated with the widget, aspects including but not limited to font, text style, text color, and/or any other text property. As a specific example, a context sensitive UI control widget selection function may cause the name of a button to be displayed in blue italics if it is the current context-based selection derived from user input. In this way, the user may see what control is about to be activated before satisfying the selection establishment conditions.

In various embodiments, a context sensitive UI control widget selection function may have selection establishment conditions that depend upon the type of user interface control widget that is being selected. Some user interface control widgets are multi-state in nature (e.g., sliders, drop down lists, etc.), while others are bi-state (e.g., buttons, check boxes, etc.). In some embodiments, it may be assumed that when a user satisfies the selection establishment conditions for a bi-state UI control widget, they intend for the state of the widget to be toggled. The selection establishment conditions for multi-state UI control widgets, on the other hand, may include the election of a widget state.

For example, in one embodiment, the selection establishment conditions for a multi-state widget may include one or more primary conditions to establish that the user intends for that particular multi-state widget to be selected, and a secondary condition, to establish the state of that widget.

In various embodiments, the secondary condition may be satisfied (and the widget state chosen) through user input which includes, but is not limited to, contact pressure. As an option, after the primary selection establishment conditions have been satisfied, the selection function may disregard pre-established pressure triggers (e.g., $P_0$, global pressure triggers, etc.) until the secondary selection establishment condition has been satisfied.

For example, in one embodiment, once the primary conditions for selecting a slider widget have been satisfied, a user may select a slider value by varying the contact pressure level between two predefined threshold pressures which represent the slider state extrema. In another embodiment, the contact pressure level at the time of satisfaction of the primary conditions may be used as a zero point, represented by the middle of the slider values. Increasing the contact pressure may increase the slider value, decreasing the contact pressure may decrease the slider value. In other embodiments, these methods may be used to traverse the items within a drop down list, or any other multi-state UI control widgets which may be assigned a value.

In various embodiments, the secondary selection establishment conditions may be finally satisfied using methods previously discussed, including but not limited to, a contact pressure velocity trigger.

Once the selection establishment conditions have been satisfied, the state of the UI control widget may be set. For example, a button may be toggled, a check box may be checked or unchecked, a slider value may be set, etc.

As a specific example of one embodiment, from a user perspective, a user may make contact with and exert pressure upon an interaction surface, with a contact point near a drop down menu. The user may increase the contact pressure until the drop down menu is highlighted. After maintaining that contact pressure level for a few seconds, the list of menu items becomes visible, after which the user may select an item by varying the contact pressure. Once the desired menu item is highlighted, the user may execute a rapid increase in pressure to finalize the selection of that menu item.

If it is determined in 604 that there is no user interface control widget within the context determination zone, it is then determined whether there is an embedded hyperlink within the context determination zone. See determination 608.

Within the context of the present description, an embedded hyperlink refers to a hyperlink which is embedded within a text field. For example, in one embodiment, embedded hyperlinks may include, but are not limited to, text or image links within a web page, text or image links within a word processing document, and/or any other type of link which may be contained within a document. It should be noted that any link which may be classified as a hyperlink may fall within this definition of embedded hyperlink, or within the definition of a UI control widget.

In various embodiments, the determination as to whether there is an embedded hyperlink within the context determination zone begins with determining whether there is an embedded hyperlink located at the contact point upon which the zone is based.

If an embedded hyperlink is not located at the contact point, then it may be determined if there is an embedded hyperlink in the vicinity, within the context determination zone. In various embodiments, the methods described for locating a UI control widget within the context determination zone may also be applied to determining whether there is an embedded hyperlink in the zone. In one embodiment, the bounding boxes may be handled by the application displaying the document in which an embedded hyperlink may be found. In another embodiment, the bounding boxes may be handled at a lower level, by the operating system.

If it is determined in 608 that there is at least one embedded hyperlink within the context determination zone, then a context sensitive embedded hyperlink selection function is chosen. See operation 610. In various embodiments, once an appropriate selection function is chosen, a selection may be defined based upon user input. In one embodiment, the selection may be defined using method 4.

In various embodiments, a context sensitive embedded hyperlink selection function may include logic to use a different context sensitive selection function to define the user's selection, based upon user input. In this way, a user may be able to indicate that the initial context determination is not correct, and that another selection function should be used.

For example, in one embodiment, a context sensitive embedded hyperlink selection function may include logic such that, if the contact pressure level exceeds a predefined limit $P_2$, further definition of the selection is handled by a different context sensitive selection function, such as one adapted for selecting text. In another embodiment, a contact pressure level exceeding $P_2$ may cause the context determination zone to expand, and the process of choosing an appropriate selection function to resume, ignoring the embedded hyperlink previously detected within the zone. As an option, future determinations may ignore all embedded hyperlinks. In this way, a context-aware user selection initiated with a contact point in the vicinity of an embedded hyperlink may be redirected to a different type of subject matter without forcing the user to reposition their finger, for example.

In various embodiments, a context sensitive embedded hyperlink selection function may depend upon the context determination zone. For example, in one embodiment, a context sensitive embedded hyperlink selection function may use the context determination zone as a secondary boundary. In this way, the selection function may be able to continue searching the context determination zone for additional embedded hyperlinks.

In various embodiments, a context sensitive embedded hyperlink selection function may include logic similar to that used in a context sensitive UI control widget selection function to handle the case where there is more that one embedded hyperlink within the context determination zone. Additionally, in various embodiments, a context sensitive embedded hyperlink selection function may include logic similar to that used in a context sensitive UI control widget selection function to allow a user to toggle between multiple embedded hyperlinks found within the context determination zone.

In various embodiments, a context sensitive embedded hyperlink selection function may visually indicate the selection of an embedded hyperlink before the selection has been established. For example, in one embodiment, the selection function may change the color of an embedded text hyperlink. In another embodiment, the selection function may change the font, style, or font size of an embedded text hyperlink. In yet another embodiment, the selection function may highlight the borders of a linked image. In this way, the user may see which embedded hyperlink is about to be activated before satisfying the selection establishment conditions.

In various embodiments, a context sensitive embedded hyperlink selection function may have selection establishment conditions which change, depending upon previous user input. For example, in one embodiment, if the contact pressure level surpasses a value of $P_1$, but not $P_2$, the selection establishment condition may change to require the selection of an option from a hyperlink contextual menu. The contextual menu may provide options common to web browsers, including but not limited to "open link", "copy link", and/or any other action which may be performed on or with a hyperlink. In various embodiments, the selection of the contextual menu item may be established using methods including, but not limited to, those described for multi-state UI control widgets, or other types of selections.

In various embodiments, once the selection establishment conditions have been satisfied, the selected embedded hyperlink may be activated.

If it is determined in 608 that there are no embedded hyperlinks within the context determination zone, it is then determined whether there is a selectable text field within the context determination zone. See determination 612.

Within the context of the present description, a selectable text field refers to a field of text which a user may select and perform operations upon (e.g., copy, cut, paste, etc.). In one embodiment, a selectable text field may also include any rasterized text which is recognized using an optical character recognition routine.

In various embodiments, the determination as to whether there is a selectable text field within the context determination zone begins with determining whether there is a selectable text field located at the contact point upon which the zone is based.

If a selectable text field is not located at the contact point, then it may be determined if there is a selectable text field in the vicinity of the contact point and within the context determination zone. In various embodiments, the methods described for locating a UI control widget within the context determination zone may also be applied to determining whether there is a selectable text field in the zone, including the use of bounding boxes.

If it is determined in 612 that there is at least one selectable text field intersecting with or within the context determination zone, then a context sensitive selectable text selection function is chosen. See operation 614. In various embodiments, once an appropriate selection function is chosen, a selection may be defined based upon user input. In one embodiment, the selection may be defined using method 4.

In various embodiments, if there is a selectable text field located at the contact point, the context sensitive selectable text selection function may behave like other text selection functions. For example, in one embodiment, the selection of the text would start at the contact point, and expand with pressure in the direction in which the text would be read.

In various embodiments, if there is a selectable text field within the context determination zone, but not at the contact point, the selection function may define the selection based upon the entire selectable text field. For example, in one embodiment, the text within selectable text field found in the context determination zone may be selected starting at the beginning of the text field, even if it is not near the contact point. In another embodiment, the selection of the text begins at the location closest to the contact point.

In various embodiments, a context sensitive selectable text selection function may depend upon the context determination zone. For example, in one embodiment, a context sensitive selectable text selection function may use the context determination zone as a secondary boundary. In this way, the selection function may be able to continue searching the context determination zone for additional selectable text fields.

In various embodiments, a context sensitive selectable text selection function may include logic to handle the case where there is more than one selectable text field within the context determination zone. In one embodiment, the selection function may choose the selectable text field which is closest to the contact point, the selection not extending beyond that text field. In another embodiment, the selection function may start the text selection in the selectable text field closest to the contact point; once all of the text in that closest field has been selected, the selection may continue to expand into the next closest text field, starting at the beginning of the field. In still another embodiment, the selection function may include logic similar to that used in a context sensitive UI control widget selection function to handle the case where there is more that one selectable text field within the context determination zone. Additionally, in yet another embodiment, a context sensitive selectable text selection function may include logic similar to that used in a context sensitive UI control widget selection function to allow a user to toggle between multiple selectable text fields found within the context determination zone.

In various embodiments, a context sensitive selectable text selection function may include logic to use a different context sensitive selection function to define the user's selection, based upon user input. In this way, a user may be able to indicate that the initial context determination is not correct, and that another selection function should be used.

For example, in one embodiment, a context sensitive selectable text selection function may include logic such that, if the contact pressure level exceeds a predefined limit $P_4$, further definition of the selection is handled by a different context sensitive selection function, such as one adapted for selecting graphics. In another embodiment, a contact pressure level exceeding $P_4$ may cause the context determination zone to expand, and the process of choosing an appropriate selection function to resume, ignoring the selectable text field previously detected within the zone. As an option, future determinations may ignore all selectable text fields. In this way, a context-aware user selection initiated with a contact point in the vicinity of a selectable text field may be redirected to a different type of subject matter without forcing the user to reposition their finger, for example.

In various embodiments, a context sensitive selectable text selection function may visually indicate the selection of a selectable text field before the selection has been established. For example, in one embodiment, the selection function may shade the selected text within a selectable text field. In another embodiment, the selection function may highlight the borders of an entire selectable text field which has been selected.

In various embodiments, a context sensitive selectable text selection function may have selection establishment conditions which change, depending upon previous user input. For example, in one embodiment, if the contact pressure level surpasses a value of $P_3$, but not $P_4$, the selection establishment condition may change to require the selection of an option from a text selection contextual menu. The contextual menu may provide options including, but not limited to, copy, cut, paste, style, send via email, send via SMS, lookup online, and/or any other action which may be performed on selected text. In various embodiments, the selection of the contextual menu item may be established using methods including, but not limited to, those described for multi-state UI control widgets, or other types of selections.

If it is determined in 612 that there is no text within the context determination zone, it is then determined whether there is a selectable graphic within the context determination zone. See determination 616.

Within the context of the present description, a selectable graphic refers to an image or display, or a portion of an image or display, which a user is able to select and perform operations upon (e.g., copy, cut, paste, save, etc.). In one embodiment, a selectable graphic may refer to any portion of a user interface which is able to be captured with a screenshot.

In various embodiments, the determination as to whether there is a selectable graphic within the context determination zone begins with determining whether there is a selectable graphic located at the contact point upon which the zone is based.

If a selectable graphic is not located at the contact point, then it may be determined if there is a selectable graphic in the vicinity of the contact point and within the context determination zone. In various embodiments, the methods described for locating a UI control widget within the context determination zone may also be applied to determining whether there is a selectable text field in the zone, including the use of bounding boxes. As an option, in addition to determining the boundaries of the bounding boxes within the context determination zone, it may also be determined whether they are able to be selected (e.g., checking a system flag, DRM, copy protection, etc.).

If it is determined in 616 that there is at least one selectable graphic within the context determination zone, then a context sensitive selectable graphic selection function is chosen. See operation 618. In various embodiments, once an appropriate selection function is chosen, a selection may be defined based upon user input. In one embodiment, the selection may be defined using method 4.

In various embodiments, if there is a selectable graphic located at the contact point, the context sensitive selectable graphic selection function may behave like other graphic selection functions. For example, in one embodiment, the selection of the graphic may be defined using method 4.

In various embodiments, if there is a selectable graphic within the context determination zone, but not at the contact point, the selection function may define the selection based upon the entire selectable graphic object. For example, in one embodiment, an image file embedded in a document near the contact point and at least partially within the context determination zone may be selected in its entirety. In another embodiment, said image file may be partially selected, starting at a location within the image that is closest to the contact point, and scaling as a function of user input and in a manner defined by the selection function.

In various embodiments, a context sensitive selectable graphic selection function may depend upon the context determination zone. For example, in one embodiment, a context sensitive selectable graphic selection function may use the context determination zone as a secondary boundary. In this way, the selection function may be able to continue searching the context determination zone for additional selectable graphic objects.

In various embodiments, a context sensitive selectable graphics selection function may include logic to handle the case where there is more than one selectable graphic object within the context determination zone. In one embodiment, the selection function may choose the selectable graphic object which is closest to the contact point.

In another embodiment, the selection function may include logic similar to that used in a context sensitive UI control widget selection function to handle the case where there is more that one selectable graphic object within the context determination zone. Additionally, in yet another embodiment, a context sensitive selectable graphic selection function may include logic similar to that used in a context sensitive UI control widget selection function to allow a user to toggle between multiple selectable graphic objects found within the context determination zone.

In various embodiments, a context sensitive selectable graphics function may pass control to another user interface function, depending upon user input. In this way, a user may be able to indicate that the initial context determination is not correct, and that they wish to activate a different user interface routine (e.g., application launcher, favorites list, system settings, etc.).

For example, in one embodiment, a context sensitive selectable graphic selection function may include logic such that, if the contact pressure level exceeds a predefined limit $P_6$, further user input is handled by a different context sensitive selection function, such as one adapted for selecting graphics. In another embodiment, a contact pressure level exceeding $P_4$ may cause the context determination zone to expand, and the process of choosing an appropriate selection function to resume, ignoring the selectable graphic previously detected within the zone. As an option, future determinations may ignore all selectable graphics. In this way, a context-aware user selection initiated with a contact point in the vicinity of a selectable graphic may be redirected to a different type of subject matter without forcing the user to reposition their finger, for example.

In various embodiments, a context sensitive selectable graphics selection function may visually indicate the selection of a selectable graphic object before the selection has been established. For example, in one embodiment, the selection function may shade the selected graphic object. In another embodiment, the selection function may highlight the borders of a graphic object which has been selected.

In various embodiments, a context sensitive selectable graphics selection function may have selection establishment conditions which change, depending upon previous user input. For example, in one embodiment, if the contact pressure level surpasses a value of $P_5$, but not $P_6$, the selection establishment condition may change to require the selection of an option from a graphic selection contextual menu. The contextual menu may provide options including, but not limited to, copy, cut, paste, set as wallpaper, send via email, send via SMS, and/or any other action which may be performed on selected graphics. In various embodiments, the selection of the contextual menu item may be established using methods including, but not limited to, those described for multi-state UI control widgets, or other types of selections.

If it is determined in 616 that there is no selectable graphics within the context determination zone, then the determination zone is expanded. See operation 620.

In one embodiment, the context determination zone may be expanded by a fixed number of pixels. In another embodiment, the determination zone may be expanded by a scaling factor. Once the context determination zone has been expanded, the context determinations are performed again.

In one embodiment, if the context determination zone reaches a predefined threshold size, the user may be informed that a context could not be determined and a selection cannot be made. Other forms of user feedback indicating a failure to determine context include an alert, a prompt, audio feedback, visual feedback, LED light, and/or any other type of feedback.

In various embodiments, the user may be able to specify which contexts they wish to be detected automatically. In some embodiments, additional types of subject matter may be detectable, including types of text data, such as dates, email addresses, phone numbers, and/or any other type of text information.

In some embodiments, contextual selections may be performed using method 600 only in situations where a contact pressure based form of user interaction has not been defined. In other embodiments, contextual selections may be made system wide using method 600 or similar methods.

Figure 7:
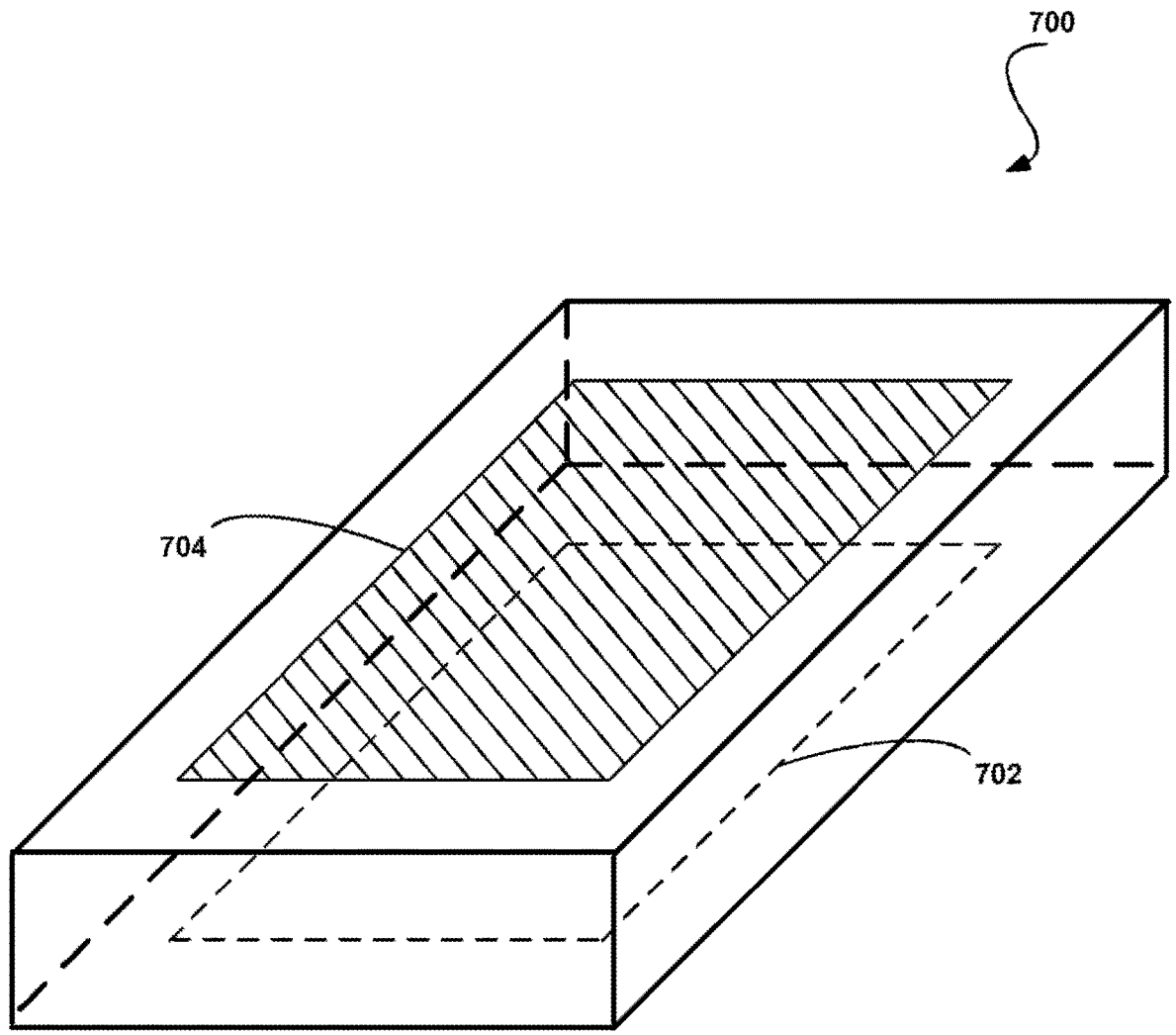
FIG. 7 shows a device having a backtouch interface, in accordance with one embodiment.

FIG. 7 shows a device 700 having a backtouch interface, in accordance with one embodiment. As an option, the device 700 may be implemented in the context of the architecture and environment of the previous Figures or any subsequent Figure(s). Of course, however, the device 700 may be implemented out in any desired environment. It should also be noted that the aforementioned definitions may apply during the present description.

In the context of the present description, a device with a backtouch interface refers to a device with one or more backtouch sensors or backtouch switches. In one embodiment, a device with a backtouch interface may also include one or more other sensors and/or buttons, including but not limited to cameras, hardware buttons, and/or any other type of device or control. A device with a backtouch interface may also be referred to as a backtouch-enabled device.

Within the context of the present description, a backtouch sensor refers to an interaction surface located on a device which has reduced user visibility while the device is being operated, because it is obscured by the device itself. For example, in one embodiment, a backtouch sensor may be located on the back of the device, facing away from the user as they look at a display on the front side. A backtouch sensor may result in a better user interface experience since the user is able to interact with the device without obscuring the front display with an implement of interaction.

Additional embodiments may be described using the terms 'front' and 'back', but a backtouch-enabled device is not limited to those having parallel surfaces. Within the context of the present description, the terms 'front' or 'front surface' and 'back' or 'back surface' refer to any two surfaces of any portion, piece, section, slice, component, part, and/or face of a device or its parts.

In various embodiments, a backtouch interface may also be a display. For example, in one embodiment, a device may have high-resolution touchscreens on the front and back. In another embodiment of a multi-display, backtouch-enabled device, the front face may be a high-resolution touchscreen and the back face may be a low-resolution touchscreen. As an option, one or more of the touch screens in these embodiments may be black and white. In still another embodiment, the front and back displays may utilized different display technologies and/or different display properties. For example, in one embodiment, the front display may be a high-resolution trans missive touchscreen and the back display may be a low-resolution reflective touchscreen.

As shown, device 700 is an example of one embodiment of a backtouch-enabled device, possessing a backtouch sensor 702 and a display 704. In various embodiments, the display 704 may also be an interaction surface.

As previously defined, an interaction surface is a surface capable of sensing touch, pressure, proximity, or any combination thereof. In various embodiments, a backtouch sensor may be capable of sensing one or more of touch, pressure, or proximity.

For example, in one embodiment, a backtouch sensor may be a track pad. Within the context of the present description, a track pad is a touch sensitive pointing device which can detect the motion and position of an implement of interaction (e.g., user finger, stylus, etc.).

In various embodiments, a backtouch sensor may include a resistive touch sensor. In one embodiment, a resistive touch sensor is made up of two thin, conducting layers separated by a narrow gap. When an implement of interaction presses down on the outer layer, the two layers make contact at that point. A voltage may be applied across the upper layer, from top to bottom. The resistive touch sensor may act as a voltage divider; by measuring the output voltage on the lower layer, the vertical position of the touch position may be sensed. Swapping the voltage to the sides of the upper layer may allow the horizontal touch position to be sensed.

In various embodiments, a backtouch sensor may include a capacitive touch sensor. In one embodiment, a capacitive touch sensor is made of two layers of parallel conductive lines, separated by an insulator. The layers are arranged such that the conductive lines are perpendicular. When an implement of interaction is placed over the conducting lines, there is a change in capacitance. A high frequency signal may be applied to pairs of conducting lines; the resulting current that passes between the conducting lings is proportional to the capacitance between the conducting lines. This current may be used to sense the touch or proximity of an implement of interaction. A capacitive touch sensor may be capable of detecting more than one contact point or contact area.

The backtouch-enabled device shown in FIG. 7 is one exemplary embodiment. The geometry of a backtouch-enabled device need not be confined to parallel surfaces, with a distinct front and back. For example, in one embodiment, the device may have fold-out sections with interaction surfaces which become backtouch interfaces once the sections are folded out. In another embodiment, the backtouch-enabled device may be composed of curved parts, multiple parts, or complex plan form parts. In still another embodiment, the backtouch-enabled device may not be rectilinear in any outline and/or cross section. In yet another embodiment, the device may have one or more curved or non-planar surfaces, including but not limited to surfaces which are concave or convex. In some embodiments, the device may have one or more surfaces which are rigid or hard. In other embodiments, the device may have one or more surfaces which are soft or flexible. In still other embodiments, the device may change shape, depending on the mode of operation (e.g., slide-out hardware keyboard, plug-in modules, etc.).

In one embodiment, a backtouch-enabled device may have one or more backtouch sensors located on plane(s) parallel to the plane of a display. For example, see device 700. In another embodiment, a backtouch-enabled device may have one or more backtouch sensors located on plane(s) that are at an angle to the plane of a display.

In one embodiment, a backtouch sensor may be located on a plane which is completely obscured from the display. In another embodiment, a backtouch sensor may be located on a plane which is partially obscured from the display. For example, a backtouch sensor may be located on the back side of a transparent or translucent display.

In one embodiment, a backtouch interface is an interaction surface which may be made up of one or more touch sensors, one or more pressure sensors, one or more proximity sensors, one or more switches, or any combination of one or more such sensors or switches. In another embodiment, the switches which are part of a backtouch interface may be real or virtual, displayed or mechanical, soft or hard, or any combination of these properties.

In various embodiments, gestures and interactions described in terms of a backtouch interface may also be performed on sidetouch (left and right sides of a device) and captouch (top and bottom sides of a device) interfaces.

Figure 8:
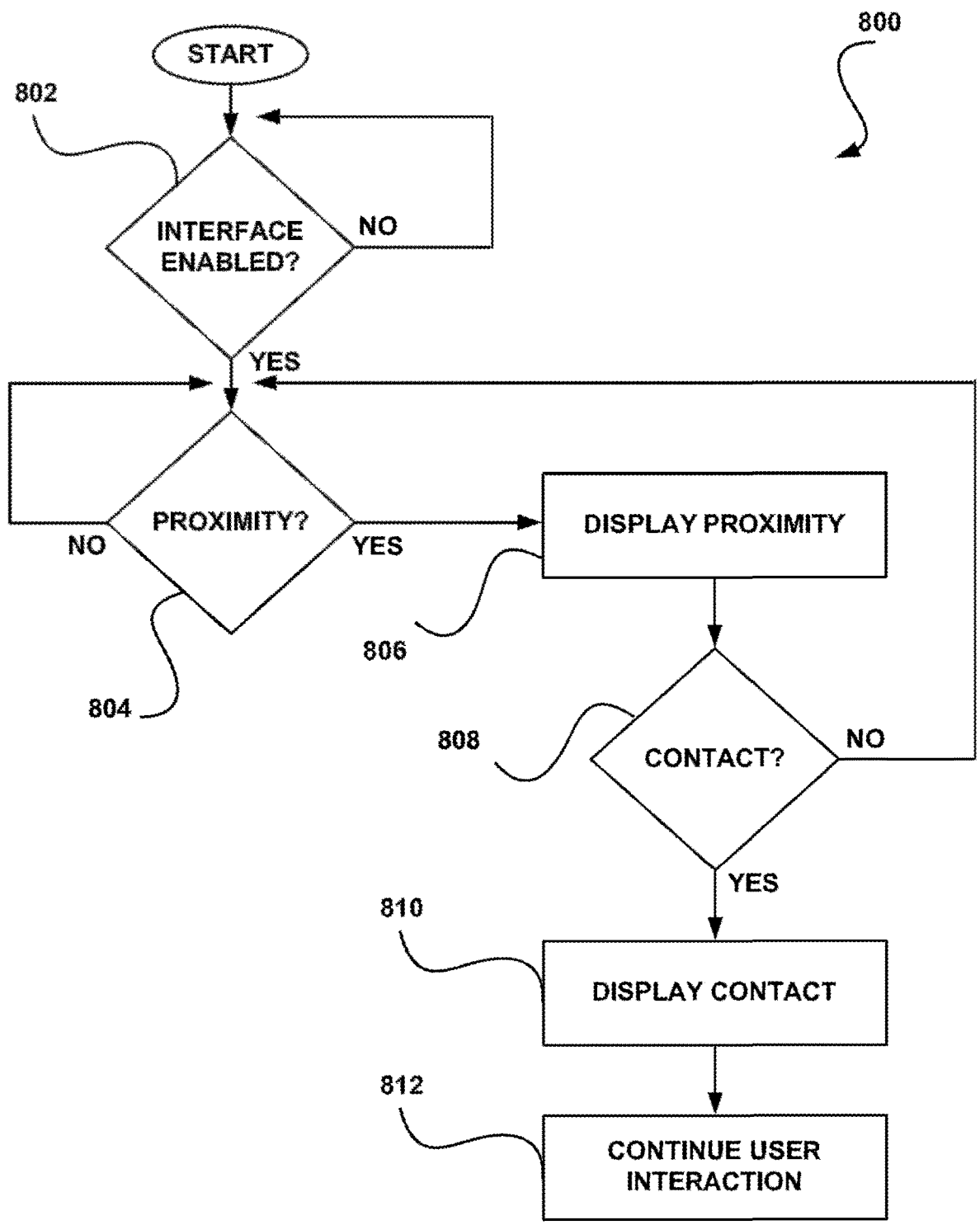
FIG. 8 shows a method for providing feedback to the user of a backtouch interface, in accordance with one embodiment.

FIG. 8 shows a method 800 for providing feedback to the user of a backtouch interface, in accordance with one embodiment. As an option, the method 800 may be implemented in the context of the architecture and environment of the previous Figures or any subsequent Figure(s). Of course, however, the method 800 may be implemented in any desired environment. The aforementioned definitions may apply during the present description.

As shown, it is determined whether the backtouch interface is enabled. See determination 802.

Within the context of the present description, an enabled interface or surface refers to an interface or surface which is not disabled. Within the context of the present description, a disabled interface or surface refers to an interface or surface which is not passing user input to any process, system, application, or routine. In one embodiment, a disabled interface may continue to sense user input, even though it is not used. In another embodiment, a disabled interface may be able to recognize a predefined form or type of user input which then places the interface in an enabled state. As a specific example, in one embodiment, a disabled backtouch interface may not be used to make a selection until it detects a predefined pattern of increases and decreases of contact pressure. In this way, interfaces may be disabled to avoid unwanted input, and easily enabled when desired.

It is important to note that in various embodiments, an interface or surface may be enabled with respect to one type of user input, and disabled with respect to another type of user input. For example, it may be possible for an interaction surface to be enabled with respect to touch interactions, and disabled with respect to contact pressure or proximity.

In various embodiments, a backtouch interface may be enabled in response to user input. For example, in one embodiment, a backtouch interface may be enabled in response to a predefined gesture performed on an interaction surface receptive to touch. In another embodiment, a backtouch interface may be enabled in response to a predefined pattern of increases and decreases of contact pressure exerted upon an interaction surface receptive to pressure. In yet another embodiment, a backtouch interface may be enabled by a predefined series of taps or impacts with the device. As an option, the taps or impacts may be detected by an accelerometer. In still another embodiment, a backtouch interface may be enabled by toggling a hardware or software control (e.g., button, switch, etc.).

In various embodiments, a backtouch interface may be enabled without specific user input. For example, in one embodiment, a backtouch interface may be enabled by a backtouch-enabled application. In another embodiment, a backtouch interface may be enabled when the device orientation is within a predefined range. In yet another embodiment, a backtouch interface may always be enabled.

If it is determined that the backtouch interface is enabled, then it is determined whether there is an implement of interaction in proximity of the backtouch interface. See determination 804.

In various embodiments, there may be a threshold proximity that may be achieved before determination 804 is satisfied. In one embodiment, a user may define the threshold proximity. In another embodiment, the threshold proximity may be predefined within the operating system. In still another embodiment, the threshold proximity may be predefined on a per-application basis.

If it is determined that an implement of interaction is in proximity to the backtouch interface, a visual indication of the proximity is displayed. See operation 806.

In various embodiments, the location of the implement of interaction in proximity to the backtouch interface may be indicated to the user. For example, in some embodiments, a point associated with the location of the implement may be displayed. In one embodiment, the point may be the centroid of the area with the highest proximity value. As an option, the point may be represented as a circle, a crosshair, and/or any other shape or icon.

In one embodiment, the point associated with the location of the implement may be displayed using a predefined color. As an option, the user may be able to select the color used. In yet another embodiment, the point may be displayed by inverting the preexisting contents of the display located at that point.

In various embodiments, an area associated with the location of the implement may be displayed. For example, in one embodiment, the area may be the area with proximity values above a preset threshold value. In another embodiment, the area may be a circle centered upon the centroid of maximum proximity values. As an option, the size of the circle may be similar to a fingertip.

In one embodiment, the area associated with the location of the implement may be displayed with colored shading. As an option, the user may preset the color of the shading. In another embodiment, the area may be indicated by increasing the color brightness (e.g., moving towards white within a color space, etc.) of the display content within the area. In yet another embodiment, the area may be displayed by reducing the color brightness (e.g., moving towards black within a color space, etc.) of the display content outside the area. As an option, the area may be displayed with a sharp boundary, or with a softened boundary, creating a glow effect.

In various embodiments, the degree of proximity of the implement of interaction to the backtouch interface may be indicated to the user. For example, in one embodiment, the color of a point or area being displayed may be given a degree of transparency dependent upon the proximity values, allowing the original display content to be viewed. As an option, the proximity value may be averaged over the area, and a single transparency value given to the color applied. In another embodiment, the color of the content displayed within the area may be given a color brightness based upon the proximity, such that the area is white right before contact is made. In yet another embodiment, the color of the content displayed outside the area may be given a color brightness based upon an inverse relationship with the proximity, such that all but the area is black right before contact is made.

As shown, it is determined if an implement of interaction is in contact with the backtouch interface. See determination 808. If it is determined that there is no contact, the proximity may continue to be determined and displayed.

If it is determined that an implement of interaction is in contact with the backtouch interface, a visual indication of the contact is displayed. See operation 810.

In various embodiments, a visual indication of contact with a backtouch interface may differ from a visual indication of contact with a front display, where the contact point and area is usually obscured by an implement of interaction. For example, in one embodiment, the contact point may be displayed, instead of or in addition to the contact area. In another embodiment, the visual representation of the interior of the contact area may be colored. In yet another embodiment, the contact area may be represented by an iconic version of a fingerprint. In still another embodiment, the contact area may be distorted so as to appear to bulge out of the display. As an option, this distortion may increase as a function of contact pressure.

As shown, once the user has been given feedback regarding contact with the backtouch interface, further user interaction is handled by a different routine. See operation 8. For example, methods 4 or 6 may be implemented at this point, utilizing backtouch contact pressure and contact point to define a selection.

Figure 9:
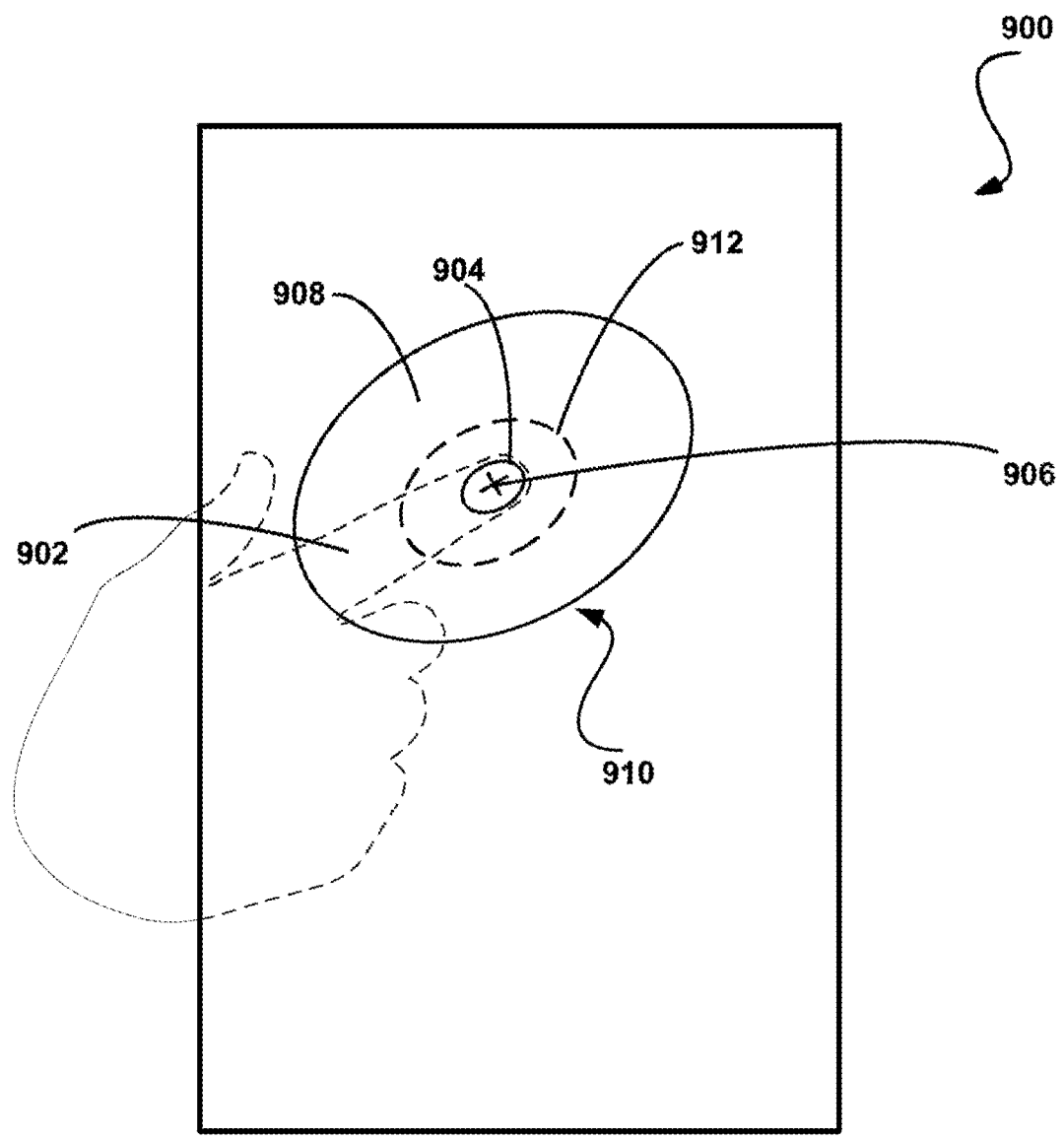
FIG. 9 shows a pressure-sensitive user interface for making a selection using a backtouch interface, in accordance with one embodiment.

FIG. 9 shows a pressure-sensitive user interface 900 for making a selection using a backtouch interface, in accordance with one embodiment. As an option, the user interface 900 may be implemented in the context of the architecture and environment of the previous Figures or any subsequent Figure(s). Of course, however, the user interface 900 may be implemented in any desired environment. The aforementioned definitions may apply during the present description.

As shown, the user interface 900 may be utilized in making a selection based in part on pressure exerted by the user upon a backtouch interface. For example, in one embodiment, a user's finger 902 may exert a small amount of force over contact area 904, which is centered on contact point 906. In one embodiment, contact area 904 and contact point 906 may be displayed on top of the content already being displayed, to assist the user in making contact at the desired location. In another embodiment, the contact point 906 may be displayed as a symbol, such as a plus sign, which may be rotated to an orientation estimated to match that of the contacting finger. As an option, the finger orientation may be estimated using the size and shape of the contact area, detected location of other fingers, and/or any other user input or observable properties.

If the contact pressure level is sufficient, then a selection area 908 having a selection boundary 910 and a secondary boundary 912 (indicating uncertainty related to the contact area) is calculated and displayed. As an option, the selection may be defined using method 4 or 6, or any other method of defining a selection based upon contact pressure.

Figure 10:
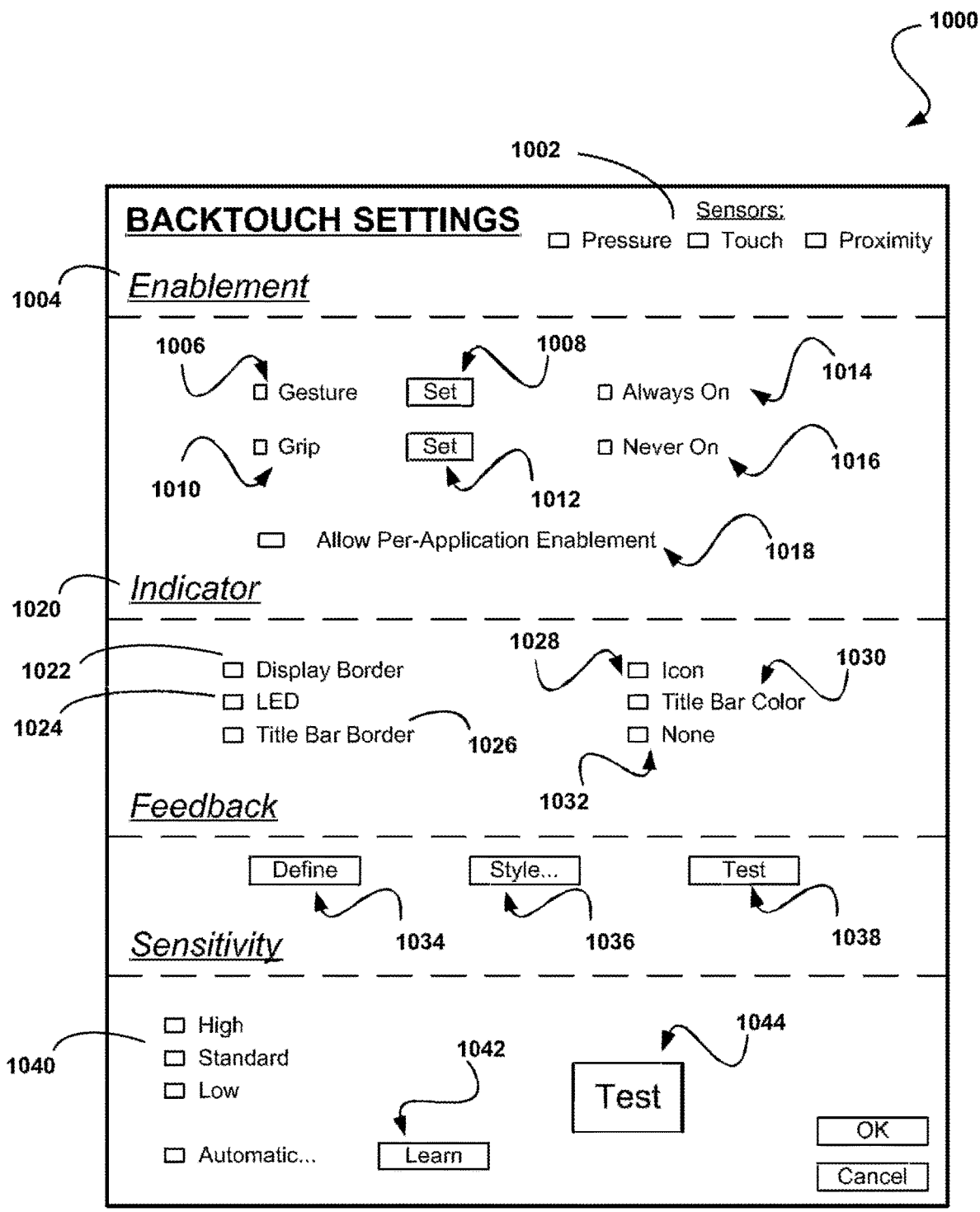
FIG. 10 shows a user interface for defining settings associated with a backtouch interface, in accordance with one embodiment.

FIG. 10 shows a user interface 1000 for defining settings associated with a backtouch interface, in accordance with one embodiment. As an option, the user interface 1000 may be implemented in the context of the architecture and environment of the previous Figures or any subsequent Figure(s). Of course, however, the user interface 1000 may be implemented in any desired environment. The aforementioned definitions may apply during the present description.

In one embodiment, the user interface 1000 may include a plurality of check boxes 1002 which represent various types of user interactions detectable by the backtouch interface. The types of interactions may include, but are not limited to, pressure, touch, proximity, and/or any other type of user interaction. Through these checkboxes, a user may limit a backtouch interface to only certain types of interactions. As an option, the user interface 1000 may only present checkboxes for interaction types detectable by the particular backtouch interface associated with the settings being defined.

In one embodiment, the user interface 1000 may include a plurality of check boxes 1004 which represent various methods of enabling a backtouch interface. As an option, in one embodiment, more than one method of activation may be selected.

In one embodiment, the collection of backtouch interface enablement methods 1004 may include a checkbox 1006 which allows the interface to be activated by a gesture. In one embodiment, the gesture may be predefined within an application or operating system. In another embodiment, the user interface 1000 may include a button 1008 to allow a user to specify a gesture to activate the backtouch interface. As an option, the user may be presented with an interface where they may specify the gesture by performing it. In yet another embodiment, the user may choose from a plurality of predefined gestures.

In one embodiment, the collection of backtouch interface enablement methods 1004 may include a checkbox 1010 which allows the interface to be activated by a grip. In the context of the present description, a grip refers to the set of sensor data associated with a particular manner of holding a device. The sensor data associated with a grip may include, but is not limited to, points and areas of contact on one or more interaction surfaces, device orientation, contact pressure levels exerted in one or more contact areas, proximity data (e.g., proximity to portions of a users hand not in contact with the device, etc.), and/or any other sensor data.

In one embodiment, the backtouch interface-enabling grip may be predefined within an application or operating system. In another embodiment, the user interface 1000 may include a button 1012 to allow a user to specify a grip to enable the backtouch interface. As an option, the user may be presented with an interface where they may specify the grip by performing it. In yet another embodiment, the user may choose from a plurality of predefined grips.

In one embodiment, the collection of backtouch interface enablement methods 1004 may include a checkbox 1014 which keeps the backtouch interface enabled whenever the device is powered on, similar to a primary touch screen, for example. In another embodiment, the collection of backtouch interface enablement methods 1004 may include a checkbox 1016 which keeps the backtouch interface disabled.

In one embodiment, the user interface 1000 may include a check box 1018 which allows the criteria for backtouch interface enablement to be set on a per-application basis. As an option, check box 1018 may allow any application to override the preferences set with the plurality of check boxes 1004.

In one embodiment, the user interface 1000 may include a plurality of check boxes 1020 which represent various methods of indicating that a backtouch interface is enabled. As an option, in one embodiment, more than one indicator may be selected.

In one embodiment, the collection of indicator check boxes 1020 may include a checkbox 1022 which indicates that the backtouch interface is enabled by displaying a colored border around the edge of a display. In one embodiment, the colored border may be animated.

In one embodiment, the collection of indicator check boxes 1020 may include a checkbox 1024 which indicates that the backtouch interface is enabled using an LED. In one embodiment, the LED may indicate the enabled backtouch interface through a specific color, with other colors being reserved for indicating other device states. In another embodiment, the LED may pulse or flash when the backtouch interface is enabled.

In one embodiment, the collection of indicator check boxes 1020 may include a checkbox 1026 which indicates that the backtouch interface is enabled by displaying a colored border around a status bar (e.g., a minimal bar common to most user interfaces, etc.). In one embodiment, the colored border may be animated.

In one embodiment, the collection of indicator check boxes 1020 may include a checkbox 1028 which indicates that the backtouch interface is enabled by displaying an icon. In one embodiment, the icon may be located within a status bar.

In one embodiment, the collection of indicator check boxes 1020 may include a checkbox 1030 which indicates that the backtouch interface is enabled by changing the color of a status bar. In one embodiment, the color change may be animated.

In one embodiment, the collection of indicator check boxes 1020 may include a checkbox 1032 which allows the backtouch interface to be enabled without any indication to the user. As an option, this preference may be overridden by an application.

In various embodiments, the user interface 1000 may allow a user to configure the type and style of feedback provided while an enabled backtouch interface is being used. For example, in one embodiment, the user interface 70.0002.3-00 may include a button 1034 which allows a user to specify whether or not feedback is provided while the backtouch interface is being used. As an option, this preference may be overridden by applications (e.g., an application may be configured such that it provides backtouch interface feedback independent of any system preferences, etc.).

In one embodiment, the user interface 1000 may include a button 1036, which presents a user interface which allows a user to specify the style of feedback provided when a backtouch interface is being used. For example, a user may configure the feedback provided when an implement of interaction is in proximity to, contact with, and/or exerting pressure on the backtouch interface.

In one embodiment, the user interface 1000 may include a button 1038, which allows a user to test the style parameters they defined using button 1036. For example, in one embodiment, button 1038 may present a user interface where a user may experiment with a backtouch interface, observing the feedback styles they have configured. As an option, this interface may provide a quick way to reconfigure the feedback style.

In various embodiments, the user interface 1000 may allow a user to configure the sensitivity of a backtouch interface. In the context of the present description, the sensitivity of a backtouch interface refers to the threshold level of interaction (e.g., proximity, contact, pressure, etc.) which a backtouch interface may receive before treating the interaction as being intentionally made by a user. In this way, backtouch interactions incidental to device usage may be ignored, while intentional backtouch user interactions may be acted upon.

In one embodiment, the user interface 70.0002.3-00 may include a plurality of checkboxes 1040 that represent a plurality of backtouch interface sensitivity levels. The backtouch interface sensitivity levels may include, but are not limited to, predefined levels (e.g., "high", "standard", "low", etc.), user defined levels, automatically defined levels, and/or any other type of sensitivity level.

In one embodiment, the user interface 1000 may allow a user to specify the sensitivity levels for particular aspects of a backtouch interface (e.g., proximity, contact, pressure, etc.). As an option, the user interface may provide the user with the ability to save and load user defined backtouch interface sensitivity profiles.

In the context of the present description, an interface sensitivity profile refers to a collection of sensitivity parameters associated with various aspects of an interaction interface. The sensitivity parameters may include, but are not limited to, an activation threshold, a maximum signal beyond which interaction is ignored, sample rate(s), and/or any other parameter which may be associated with an interaction interface. As an option, the sensitivity parameters may be specific to particular types of interaction (e.g., proximity, contact, pressure, etc.).

In the context of the present description, an activation threshold refers to a threshold signal below which interaction is ignored. An activation threshold may be set for different types of user interaction (e.g., pressure, contact, proximity, etc.). For example, in one embodiment, an interaction surface may have a pressure activation threshold of P, below which all pressure interactions are ignored.

It is important to recognize the distinction between activation and enablement. In various embodiments, activation serves as a filter of incidental interactions, defining the weakest sensor signal which may not be ignored. Enablement serves a similar purpose, to ignore unwanted interactions; a disabled interface may not act upon any sensor signals except those related to enabling the interface. In other words, activation filters sensor signals based on strength, while enablement filters sensor signals based on the signal itself.

In one embodiment, the plurality of checkboxes 1040 may include an "automatic" checkbox, representing a backtouch interface sensitivity profile automatically determined by the device. As an option, if an automatic sensitivity profile has not been created, the user may be presented with the option of initiating the process of automatically determining an optimal backtouch interface sensitivity profile.

In one embodiment, the user interface 1000 may include a button 1042 which allows a user to initiate the process of automatically determining an optimal backtouch interface sensitivity profile. In the context of the present description, an optimal interface sensitivity profile refers to a sensitivity profile which would allow an interface to remain enabled all the time, with minimal accidental inputs. In one embodiment, the process of automatically determining an optimal backtouch interface sensitivity profile may include gathering data over a predefined amount of time. As an option, the time remaining may be displayed in user interface 1000. During this learning period, the backtouch enablement preferences specified in checkboxes 1004 may be overridden, and instead the user is required to enable the backtouch interface with a specific method, chosen such that accidental enablement is highly unlikely (e.g., two step activation using gestures, hardware switch with on-screen confirmation, etc.). This facilitates separating intentional interactions from incidental interactions. Once enabled, the backtouch interface may remain enabled for a short period of time. During the learning period, the device may gather data, including but not limited to sensor data from the backtouch interface, changes in orientation, backtouch interface enablements, and/or any other data related to use of the device. Once the learning period has elapsed, the gathered data may be used to estimate the levels of meaningless, incidental backtouch interaction, such as interaction due to holding the device. As an option, in another embodiment, the user may be able to specify the length of the learning period. In yet another embodiment, the user may be able to specify desired accuracy of the sensitivity level, balancing the reduction of unwanted interactions with a possible increase in intentional interactions being missed.

In one embodiment, the user interface 1000 may include a button 1044 which allows a user to test the specified sensitivity settings. For example, in one embodiment, button 1044 may present a user interface which provides feedback regarding interactions with the backtouch interface. As an option, the testing user interface may utilize a default set of backtouch feedback settings, if the user had previously turned feedback off. In another embodiment, button 1044 may activate a backtouch interface, and present feedback to the user within user interface 1000. As an option, user interface 1000 may ignore any input received from the backtouch interface, only provide feedback related to the user interactions. In this way, a user may test the settings with the backtouch interface without accidentally interacting with any checkboxes, buttons, or other element of user interface 1000.

In various embodiments, the interfaces of FIG. 10, as well as any other previous or subsequent interfaces, may take the form of webpages displayed utilizing a web browser on any desired computer, handheld device, etc. In such case, any of the parameters or other input disclosed herein may be entered without the use of the host device, whereby such parameters or other input (or derivatives thereof) may be pushed to the device for configuration/updating purposes.

Figure 11:
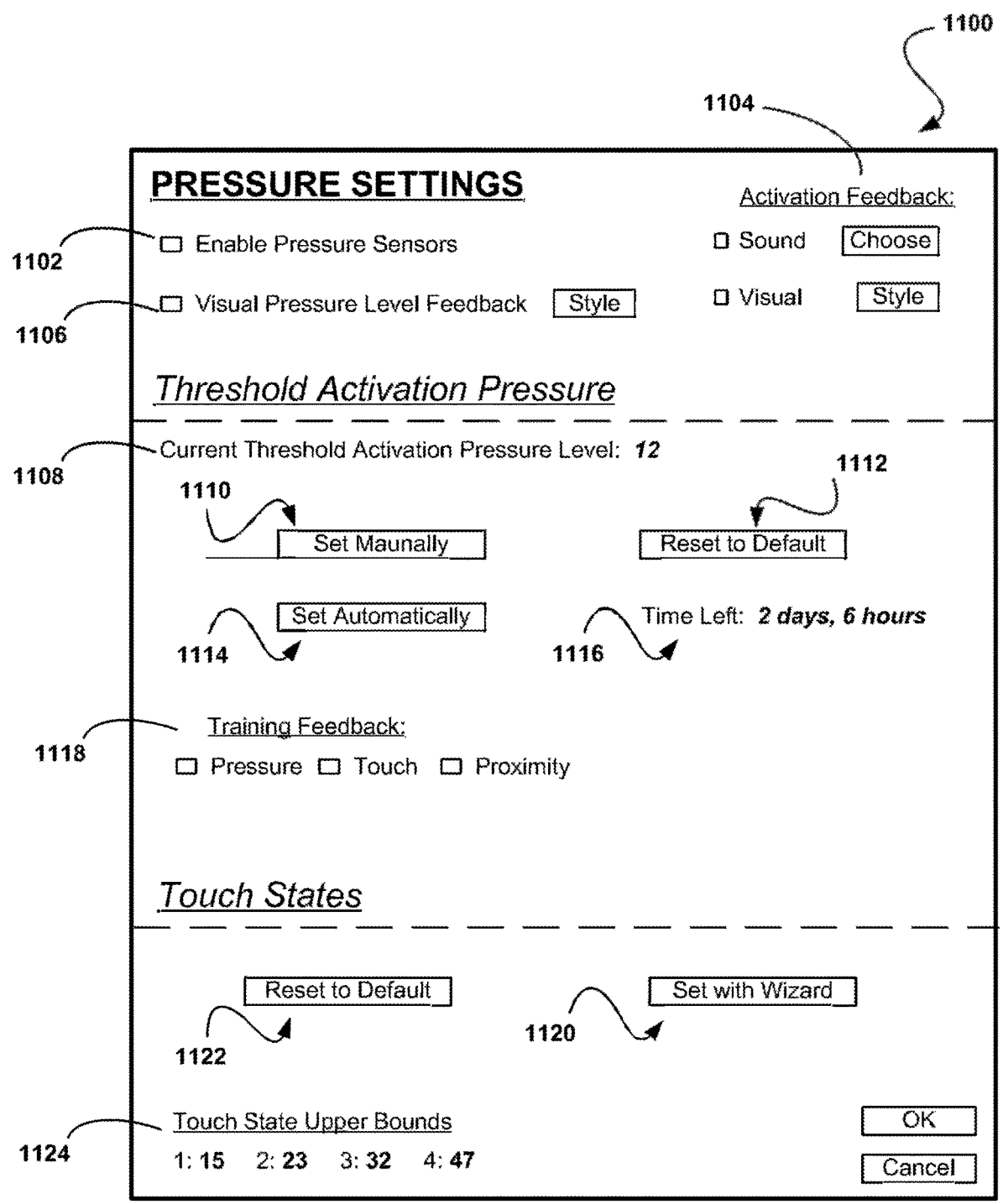
FIG. 11 shows a user interface for defining settings associated with a pressure-sensitive interface, in accordance with one embodiment.

FIG. 11 shows a user interface 1100 for defining settings associated with a pressure-sensitive interface, in accordance with one embodiment. As an option, the user interface 1100 may be implemented in the context of the architecture and environment of the previous Figures or any subsequent Figure(s). Of course, however, the user interface 1100 may be implemented in any desired environment. The aforementioned definitions may apply during the present description.

In one embodiment, the user interface 1100 may include a checkbox 1102 to allow the user to enable the pressure-receptive aspect of one or more interaction surfaces. In one embodiment, this checkbox may enable all pressure-receptive surfaces. In another embodiment, the user may be able to specify which pressure-receptive surfaces shall be enabled. In various other embodiments, enablement of pressure-receptive surfaces may be accomplished through user input outside of user interface 1100. Pressure-receptive surface enabling user input may include, but is not limited to, gestures, software buttons, hardware buttons, accelerometer data, contact pressure patterns, and/or any other form of user input.

In one embodiment, the user interface 1100 may include a plurality of check boxes 1104 which allow a user to specify which types of feedback to provide when the pressure-sensitive interface(s) is activated, if any at all. For example, in one embodiment, the user may specify a sound which plays whenever the pressure-sensitive interface is activated. In another embodiment, the user may specify a form of visual feedback to be given when the pressure-sensitive interface is activated. As an option, the user may select from a plurality of predefined forms of feedback.

In one embodiment, the user interface 1100 may include a checkbox 1106 which allows a user to specify whether they want visual feedback regarding contact pressure level. As previously described, contact pressure level may be visually represented in a number of ways, including, but not limited to, a color which is part of a two color spectrum, a percentage, a unitless number, and/or any other representation of a value located within a finite range. In one embodiment, user interface 1100 may allow a user to specify the type of contact pressure level feedback. As an option, a separate user interface may be presented to the user to define the form of the feedback.

In various embodiments, the user interface 1100 may be used to define the pressure activation threshold. In the context of the present description, a pressure activation threshold is the smallest contact pressure level which may not be ignored. In one embodiment, the current pressure activation threshold level 1108 may be displayed within user interface 1100. The current pressure activation threshold level may be displayed as a unitless number, a percentage of the maximum measurable contact pressure level, a color, a scale, and/or any other method of representing a value located within a finite range.

In one embodiment, the user interface 1100 may include a button 1110 which allows a user to manually specify the pressure activation threshold level. In one embodiment, the user may be presented with an interface where they may enter a specific value to be used as the pressure activation threshold. In another embodiment, the user may be prompted to exert the desired threshold pressure on a pressure-sensitive interface, confirming their selection by maintaining the desired contact pressure for a predefined amount of time. As an option, the user may be prompted to repeat this process more than one time, after which the resulting pressure levels may be averages. In yet another embodiment, the user may be given the chance to test the newly specified pressure activation threshold level.

In one embodiment, the user interface 1100 may include a button 1112 which resets the pressure activation threshold level to a predefined, default value. As an option, the user may be prompted to confirm this action before the default value is applied.

In one embodiment, the user interface 1100 may include a button 1114 which initiates a process which determines an optimal pressure activation threshold level. In the context of the present description, an optimal pressure activation threshold level refers to an activation threshold which would allow an interface to remain enabled all the time, with minimal erroneous inputs. In one embodiment, the process of automatically determining an optimal pressure activation threshold level may include gathering data over a predefined amount of time. As an option, the time remaining may be displayed in user interface 1100.

During this learning period, the pressure activation threshold may temporarily be set to a level sufficiently high that an accidental activation is highly unlikely. This facilitates separating intentional interactions from incidental interactions. During the learning period, the device may gather data, including but not limited to sensor data from the pressure-sensitive interface, changes in orientation, pressure-sensitive interface activations, and/or any other data related to use of the device. Once the learning period has elapsed, the gathered data may be used to estimate the levels of meaningless, incidental pressure interaction, such as interaction due to holding the device. As an option, in another embodiment, the user may be able to specify the length of the learning period. In yet another embodiment, the user may be able to specify desired accuracy of the pressure activation threshold level optimization, balancing the reduction of unwanted interactions with a possible increase in intentional interactions being missed.

In one embodiment, the user interface 1100 may display the amount of time remaining in an ongoing learning period. See, for example, text field 1116. In various embodiments, the time remaining in the learning period may be displayed in user interfaces other than 1100. User interfaces where the remaining time may be displayed include, but are not limited to, a status bar, a contextual menu, a shortcut menu, a pop-up interface adapted for managing various interaction interfaces, and/or any other user interface.

In one embodiment, the user interface 1100 may include a plurality of checkboxes 1118 which represent a plurality of forms of feedback associated with the automatic determination of an optimal pressure activation threshold level. During the learning period, it may be helpful to provide the user with feedback every time the pressure-sensitive interface is activated. The forms of feedback include, but are not limited to, a sound, vibration, screen flash, and/or any other form of feedback. In one embodiment, the feedback associated with the automatic determination of an optimal pressure activation threshold level may override preferences set elsewhere. In another embodiment, the user may specify the parameters of these forms of feedback.

The user interface 1100 may be used to define and manage touch states. In one embodiment, a preset number of global touch states may be defined, which the operating system and applications may make use of. In another embodiment, the touch states may be defined on a per-application basis.

In one embodiment, the user interface 1100 may include a button 1120 which presents the user with a user interface that facilitates the definition of touch states. As an option, the user may be able to select from a plurality of predefined touch state definitions. Additionally, the user interface 1100 may display the currently defined touch states. See, for example, text field 1124. The touch states may be represented as a unitless number, a percentage of the range of allowable contact pressure levels, a color, and/or any other representation of a contact pressure level.

In one embodiment, the user interface 1100 may include a button 1122 which allows the user to reset the touch state definitions to a predefined default definition. As an option, the user may be prompted for confirmation before resetting the touch state definition to default values.

Figure 12:
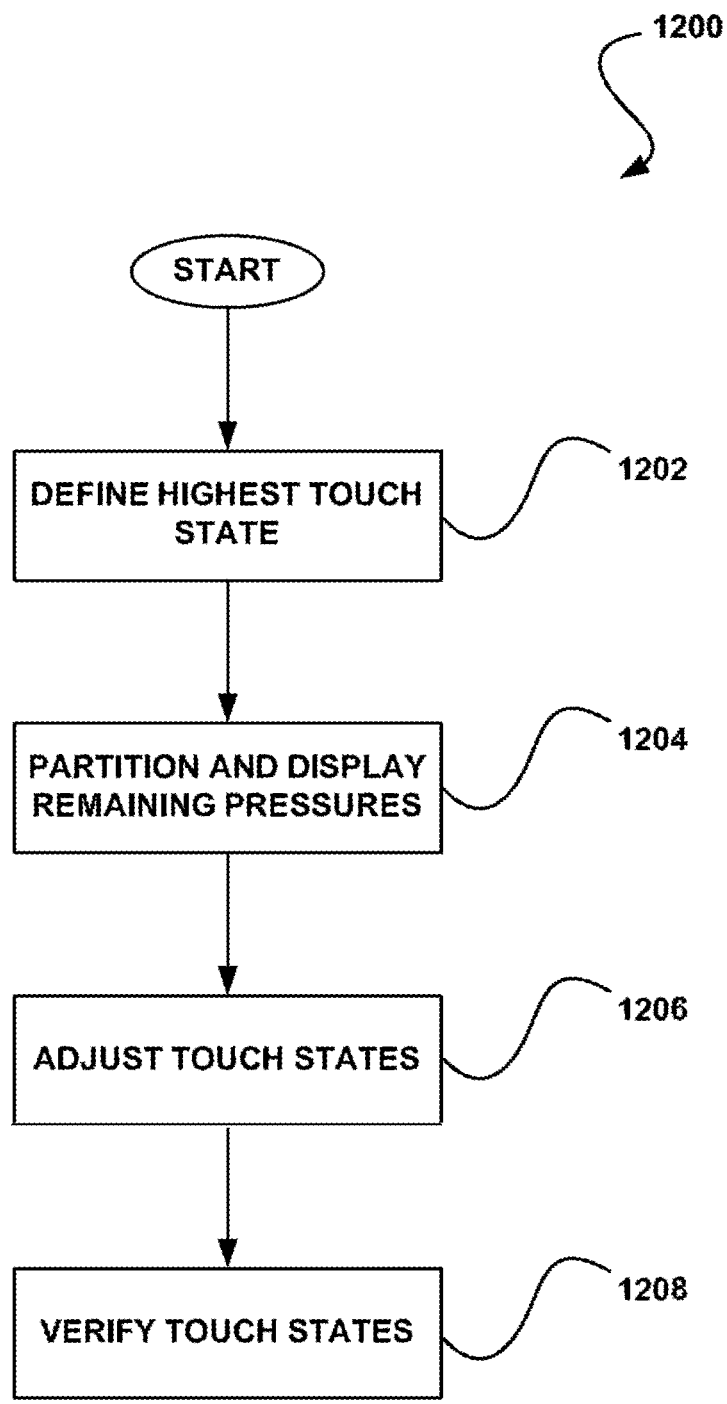
FIG. 12 shows a method for assisting a user in defining touch states, in accordance with one embodiment.

FIG. 12 shows a method 1200 for assisting a user in defining touch states, in accordance with one embodiment. As an option, the method 1200 may be implemented in the context of the architecture and environment of the previous Figures or any subsequent Figure(s). Of course, however, the method 1200 may be implemented in any desired environment. The aforementioned definitions may apply during the present description.

As shown, the highest touch state is defined. See operation 1202. In one embodiment, the highest touch state may be predefined within the operating system. In another embodiment, the highest touch state may be specified by the user, in the form of a contact pressure value.

In various embodiments, the highest touch state may be defined through user interaction with a pressure-sensitive interface. For example, in one embodiment, a user may be prompted to exert a level of contact pressure beyond which the highest touch state may be triggered. As an option, the user may be prompted to exert this pressure multiple times, with the resulting values averaged. In another embodiment, the user may be prompted to exert the highest contact pressure level which is comfortable, and then defining the highest touch state using a contact pressure level slightly lower than that being exerted.

Once the highest touch state has been defined, the remaining spectrum of contact pressures is partitioned into the remaining touch states and displayed. See operation 1204.

In the context of the present description, the spectrum of contact pressures refers to the range of contact pressure levels a user may exert to interact with the device. For example, in one embodiment, the lower end of a spectrum of contact pressures may be equivalent to the pressure activation threshold level. In various embodiments, there may be multiple contact pressure spectrums defined. For example, in one embodiment, there may exist a distinct spectrum of contact pressures for each pressure-sensitive interaction surface. In another embodiment, there may exist a spectrum of contact pressures which is partitioned into touch states (a touch state spectrum), and a different spectrum of contact pressures for use with contact pressure levels (a contact pressure level spectrum).

In one embodiment, the touch state spectrum may have extrema defined by the user. As an option, the lower bound of the touch state spectrum may be the same as pressure activation threshold level.

In one embodiment, the touch state spectrum may be partitioned such that all touch states contain the same fraction of the touch state spectrum. In another embodiment, the touch state spectrum may be partitioned such that all touch states have equal portions of the touch state spectrum except for the highest touch state. In yet another embodiment, the touch state spectrum may be partitioned such that the touch states are weighted, some containing larger fractions of the spectrum than others. As an option, the weight factors may be predefined or may be user definable.

In one embodiment, the partitioned touch state spectrum may be displayed as a geometric shape (e.g., circle, rectangle, etc.) which has been segmented according to the touch state partitions. In another embodiment, the partitioned touch state spectrum may be displayed as an array of percentages of the total spectrum. In yet another embodiment, the touch state spectrum may be displayed as an array of contact pressure levels associated with the boundaries of the partitions.

Once the touch state spectrum has been partitioned and displayed, the user is given the opportunity to adjust the touch states. See operation 1206.

In one embodiment, the user may adjust the contact pressure levels associated with the touch states by specifying the numerical values of specific contact pressure levels. In another embodiment, the user may adjust the touch states by interacting with a graphical representation of the partitioned touch state spectrum. In yet another embodiment, the user may adjust the touch states by defining new partitions using a pressure-sensitive interface. As an option, the user may exert the desired contact pressure level to set the boundaries of a touch state.

Once the touch states have been adjusted, the newly partitioned touch state spectrum is verified. See operation 1208.

In one embodiment, the touch state spectrum may be verified by asking the user to confirm their choice through a user interface. In another embodiment, the user may verify the touch state spectrum by utilizing it in a testing interface. As an option, the user may be given visual feedback regarding the exact contact pressure level being exerted, in addition to the current touch state.

Figure 13:
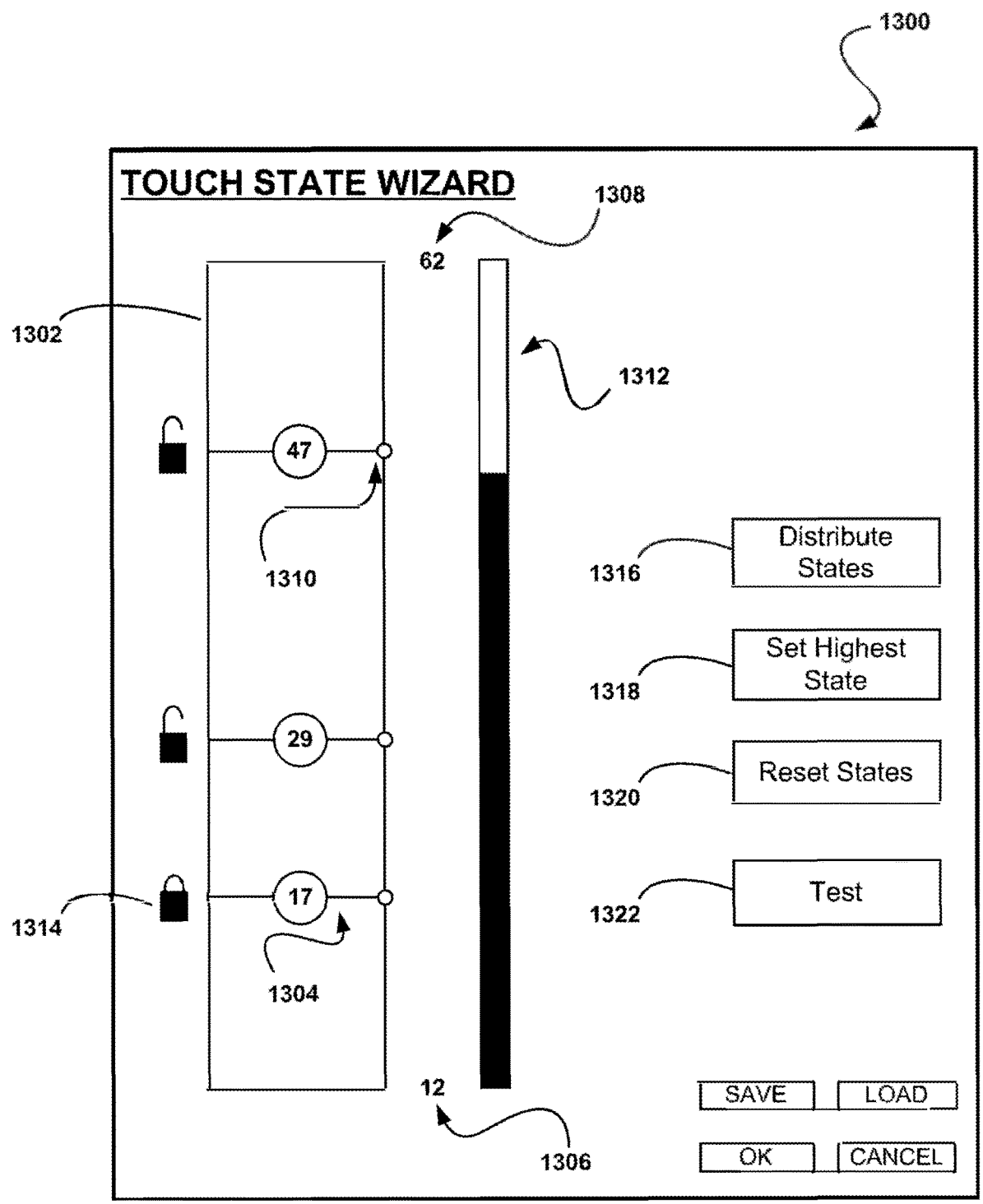
FIG. 13 shows a user interface for assisting a user in defining touch states, in accordance with one embodiment.

FIG. 13 shows a user interface 1300 for assisting a user in defining touch states, in accordance with one embodiment. As an option, the user interface 1300 may be implemented in the context of the architecture and environment of the previous Figures or any subsequent Figure(s). Of course, however, the user interface 1300 may be implemented in any desired environment. The aforementioned definitions may apply during the present description.

In one embodiment, the user interface 1300 may include a graphical representation 1302 of a touch state spectrum, hereinafter referred to as touch space spectrum rendering 1302. As another embodiment, the touch space spectrum rendering 1302 may be colored with the spectrum of colors between two colors representing spectrum extrema. As an option, the same colors used to provide pressure dependent feedback to the user of a pressure-sensitive interface may be used here.

The touch space spectrum rendering 1302 found in user interface 1300 may be broken up into ranges of contact pressure representing touch states. In various embodiments, the touch space spectrum rendering may be partitioned by one or more touch state dividers 1304. In one embodiment, the touch state dividers may simply be a line drawn between two touch states. In another embodiment, the touch state dividers may also display the contact pressure level separating those two touch states.

In various embodiments, a plurality of touch states may be defined. In one embodiment, the user may specify the number of touch states to define. In another embodiment, the number of touch states may defined within the operating system. In still another embodiment, the number of touch states may be defined on a per-application basis, by the applications themselves or by the user (if so allowed by the application). In yet another embodiment, there may exist a set of default touch states of a fixed number which may be overridden by a different set of touch states defined within an application.

In various embodiments, the touch space spectrum rendering 1302 found in user interface 1300 may have a labeled scale. For example, in one embodiment, the lower boundary 1306 of the lowest touch state (e.g., the touch state associated with the lowest contact pressures) may be displayed. As an option, the lower boundary of the touch space spectrum may be equivalent to the pressure activation threshold, which the user may define using, for example, user interface 1100.

In another embodiment, the upper boundary 1308 of the touch space spectrum rendering may be displayed. As an option, upper boundary 1308 may be automatically set to a value slightly higher than the lower boundary of the highest touch state, since the highest touch state is made up of all pressures above that lower boundary. In this way, the scale of the touch space spectrum rendering is not skewed due to the potentially large range of contact pressures making up the highest touch state. In yet another embodiment, the touch space spectrum rendering may change in scale due to user interaction, with upper boundary 1308 being automatically updated.

In various embodiments, the touch state dividers 1304 found in the user interface 1300 may possess touch state divider handles 1310 with which a user may adjust the partitioning of touch states. For example, in one embodiment, a user may touch and drag a touch state divider handle to change the value of the associated divider. In another embodiment, a user may select a touch state divider handle; after the touch state divider handle has been selected, the divider may be assigned a value equivalent to whatever contact pressure level the user exerts for a predefined amount of time. As a specific example, a user may select a touch state divider handle and then press on an interaction surface. Once the desired contact pressure level is reached, the user maintains the pressure for 3 seconds, after which the value of the touch state divider is updated.

In one embodiment, the user interface 1300 may include a contact pressure gauge 1312 which reports the contact pressure level currently being exerted, to assist the user in selecting a practical partitioning of the touch state spectrum. In another embodiment, the scale of the contact pressure gauge may match that of touch state spectrum rendering 1302. As an option, the scale of both contact pressure gauge 1312 and touch state spectrum rendering 1302 may be set to accommodate the larger of two values: the current contact pressure level, or a value slightly higher than the lower boundary of the highest touch state.

In various embodiments, the touch state dividers 1304 found in the user interface 1300 may each be associated with a plurality of icon buttons 1314 which a user may use to lock a touch state divider at a particular value. In one embodiment, adjusting one touch state divider may cause all other unlocked dividers to shift such that the remaining portions of the touch state spectrum are partitioned as evenly as possible. As an option, the user interface 1300 may include a button to unlock all touch state dividers. In another embodiment, the user interface 1300 may include a button 1316 which distributes all unlocked touch state dividers evenly throughout the remaining parts of the touch state spectrum.

In one embodiment, the user interface 1300 may include a button 1318 which allows the user to establish the highest touch state boundary through pressure-based user input. In another embodiment, the user may be prompted to establish this touch state boundary as soon as user interface 1300 is displayed, in accordance with method 1200. In one embodiment, the user may only specify the highest touch state, with the remaining touch state spectrum being evenly partitioned across the touch states.

In one embodiment, the user interface 1300 may include a button 1320 which resets all touch state boundaries to default values. In another embodiment, the highest touch state boundary may be preserved, only able to be reset within the interface used to define it that may be displayed in response to activating button 1318.

In various embodiments, the user interface 1300 may include a button 1322 which allows a user to test the currently defined touch states. For example, in one embodiment, a user may be asked to achieve various touch states, and maintain them for a certain period of time. In another embodiment, the user may be presented with an interface similar to 1300, but where the touch state spectrum rendering 1302 and the contact pressure gauge 1312 are more predominantly displayed. As an option, a sound may be played every time a touch state boundary is crossed.

Figure 14:
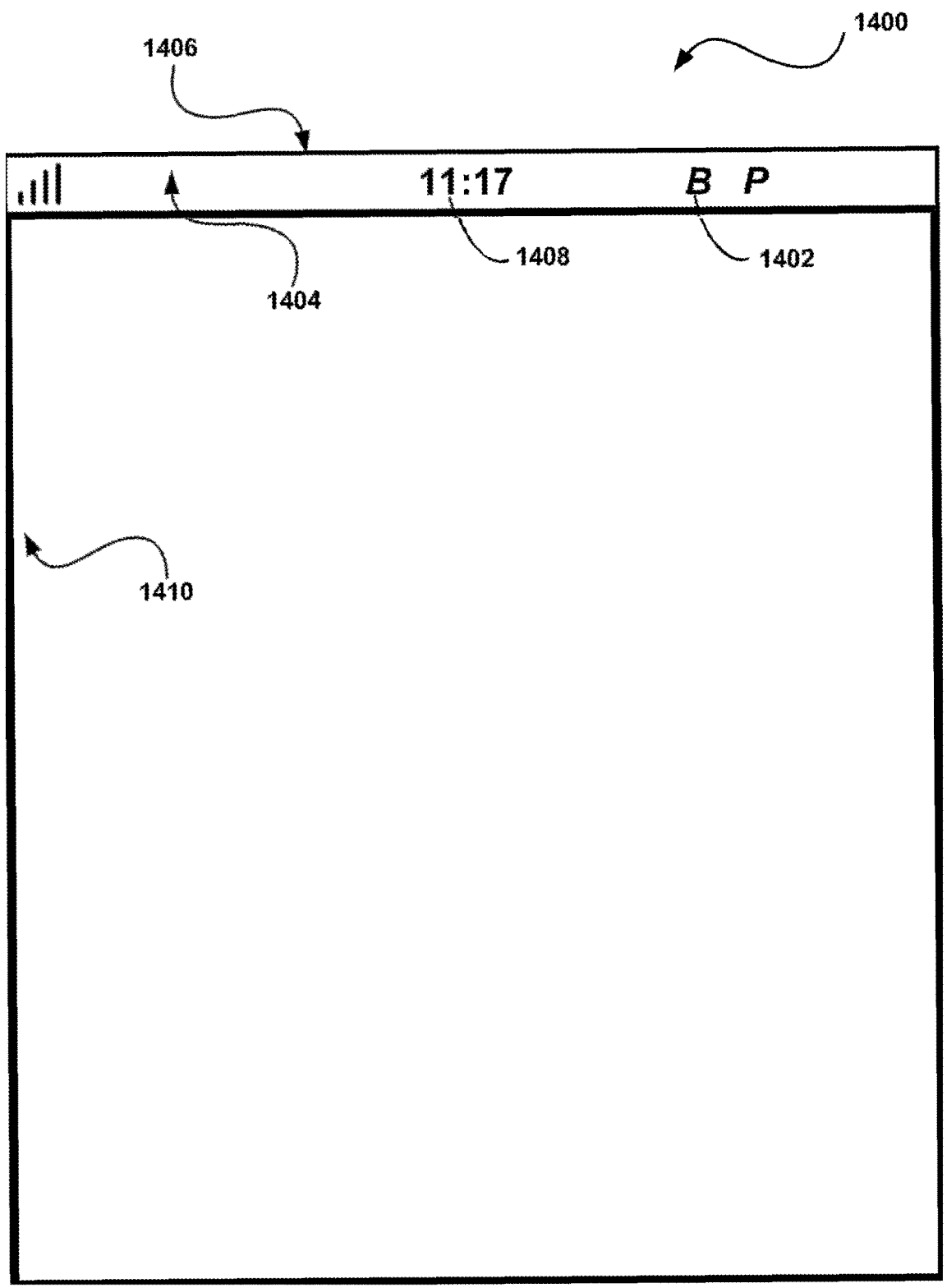
FIG. 14 shows a user interface for indicating that a backtouch or pressure-sensitive interface is activated, in accordance with one embodiment.

FIG. 14 shows a user interface 1400 for indicating that a backtouch and/or pressure-sensitive interface is activated, in accordance with one embodiment. As an option, the user interface 1400 may be implemented in the context of the architecture and environment of the previous Figures or any subsequent Figure(s). Of course, however, the user interface 1400 may be implemented in any desired environment. The aforementioned definitions may apply during the present description.

In one embodiment, the user interface 1400 may include one or more icons 1402 to indicate that a backtouch and/or pressure-sensitive interface has been activated. As an option, the icons may also indicate whether an interface is enabled. For example, an icon may only be visible if the interface is enabled, and only in color if the interface is activated. In another embodiment, the icons may have a color which depends upon the contact pressure level currently being exerted on that particular interface.

In various embodiments, the user interface 1400 may include a status bar 1404 which provides the user feedback regarding various device functions, in addition to other information, such as the date and/or time. The status bar itself may be used to indicate whether a backtouch and/or pressure-sensitive interface has been activated. For example, in one embodiment, the status bar may have a shading color which depends upon the contact pressure level currently being exerted on an activated interface. This may be done in conjunction with displaying an icon 1402 to indicate which interface has been activated. In another embodiment, the change in color may be restricted to just the border 1406 of the status bar. In yet another embodiment, the type of interface which has been activated may be indicated through an animation routine, including, but not limited to, a pulsing of the border, a cyclical variation of transparency of the status bar shading, "marching ants" along the status bar border, and/or any other animation routine.

In one embodiment, the status bar 1404 within the user interface 1400 may include one or more items of textual information 1408. The items of textual information may include, but are not limited to, date, time, network type, battery level, other device or application status information, and/or any other type of textual information.

In one embodiment, the activation of a backtouch and/or pressure-sensitive interface may be indicated through the presentation properties of the textual information 1408. Presentation properties for textual information which may be altered to indicate the activation of an interface include, but are not limited to, font, style, size, color, animation routine (e.g., flashing text, cycling colors, etc.), and/or any other type of presentation property. In another embodiment, activation of a backtouch and/or pressure-sensitive interface may be indicated by temporarily replacing textual information 1408 with a message, which may include, but is not limited to, the identity of the activated interface.

In one embodiment, the user interface 1400 may indicate the activation of a backtouch and/or pressure-sensitive interface by displaying a border 1410 around the display. As an option, border 1410 may change color depending upon the current contact pressure level.

Figure 15:
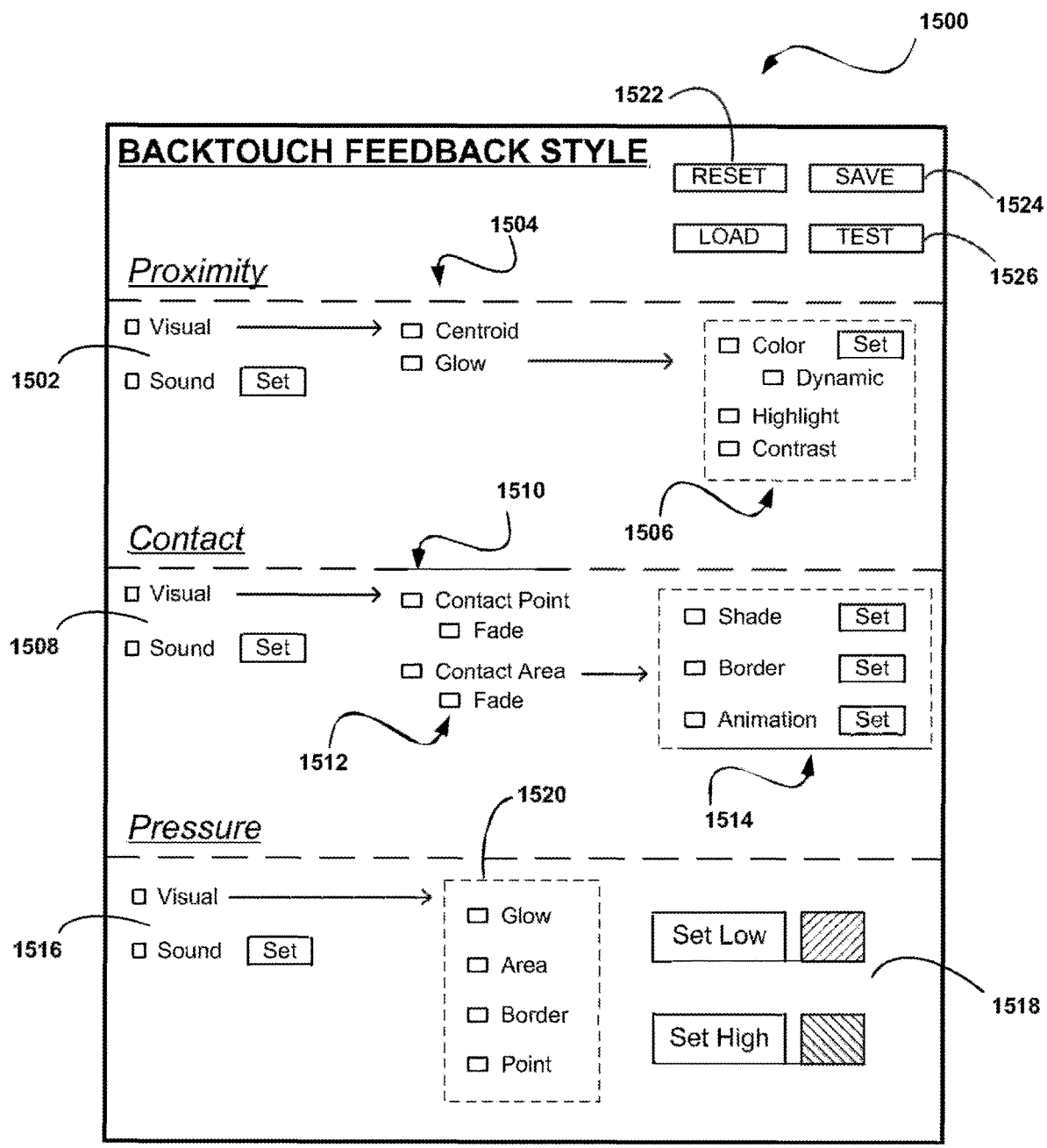
FIG. 15 shows a user interface for defining a backtouch feedback style, in accordance with one embodiment.

FIG. 15 shows a user interface 1500 for defining a backtouch feedback style, in accordance with one embodiment. As an option, the user interface 1500 may be implemented in the context of the architecture and environment of the previous Figures or any subsequent Figure(s). Of course, however, the user interface 1500 may be implemented in any desired environment. The aforementioned definitions may apply during the present description.

When interacting with a backtouch interface, it may or may not be important to provide the user with some form of feedback regarding the location and/or activity of their chosen implement of interaction. Providing interaction feedback allows the user to interact with the device using an interaction surface they may not be able to see.

In one embodiment, the user interface 1500 may include a plurality of checkboxes 1502 which represent various types of feedback which may be provided as an implement of interaction is in proximity to the backtouch interface. The types of feedback may include, but are not limited to, visual (e.g., screen flashes, status bar icons, iconic depictions of the location of the implement, etc.), sound, vibration, and/or any other form of feedback. In another embodiment, one or more of these types of feedback may be configured by the user. For example, in one embodiment, the user may select a sound to be played whenever an implement of interaction is in proximity to the backtouch interface. In yet another embodiment, the feedback may be limited to only those instances where the proximity to the backtouch interface appears intentional, rather than incidental. As a specific example, in one embodiment, feedback might be given for a fingertip, but not for a palm which is in proximity to the backtouch interface due to the user's grip.

In one embodiment, the user interface 1500 may include a plurality of checkboxes 1504 which represent various types of visual feedback that may indicate that an implement of interaction is in proximity to a backtouch interface. The types of visual feedback include, but are not limited to, graphical representation of probable implement location, status bar icon, screen flash, and/or any other type of visual feedback.

In various embodiments, a backtouch interface may be able to estimate the location of an implement of interaction in proximity to the backtouch interaction surface. This information can be used to provide useful feedback to the user. For example, in one embodiment, a point associated with the location may be displayed. As an option, the point may be the centroid of the area with the highest proximity value within a predefine threshold. In another embodiment, the point may be replaced or combined with an icon, shape, or symbol.

In another embodiment, the user may be provided with proximity feedback in the form of a visual representation of the proximity data received from the backtouch interface. As an option, the proximity values may be scaled such that the visual representation has the appearance of a glow, centered on the estimated location of the implement.

In one embodiment, the user interface 1500 may include a plurality of checkboxes 1506 which represent various styles of visual proximity feedback. The styles include, but are not limited to, dynamic coloring, the feedback described in conjunction with operation 806 of method 800, and/or any other type or style of visual feedback. In the context of the present description, dynamic coloring refers to coloring which varies as a function of proximity to the backtouch interface. For example, in one embodiment, the color of the visual proximity feedback may vary between two colors which represent the least discernable proximity and the greatest proximity before contact. As an option, the colors may include a transparency factor, so the visual feedback does not obstruct display contents any more than necessary.

In one embodiment, the user interface 1500 may include a plurality of checkboxes 1508 which represent various types of feedback which may be provided as an implement of interaction comes in contact with the backtouch interface. The types of feedback may include, but are not limited to, visual (e.g., screen flashes, status bar icons, iconic depictions of the location of the implement, etc.), sound, vibration, and/or any other form of feedback. In another embodiment, one or more of these types of feedback may be configured by the user. For example, in one embodiment, the user may select a sound to be played whenever an implement of interaction makes contact with the backtouch interface. In yet another embodiment, the feedback may be limited to only those instances where the contact with the backtouch interface is estimated to be intentional, rather than incidental. As a specific example, in one embodiment, feedback might be given for contact with a fingertip, but not for a palm which is in contact with the backtouch interface due to the user's grip.

In one embodiment, the user interface 1500 may include a plurality of checkboxes 1510 which represent various types of visual feedback indicating contact with the backtouch interface. The types of visual feedback include, but are not limited to, graphical representations of contact location and extent (e.g., contact point, contact area, etc.), a status bar icon, screen flash, and/or any other type of visual feedback, including those described in other embodiments.

In one embodiment, the user interface 1500 may include a plurality of checkboxes 1512 which cause the visual feedback indicating contact with the backtouch interface to fade after a set amount of time. In another embodiment, the user may specify the amount of time before fading begins, how quickly the fade occurs, and/or the limits of the fade (e.g., completely disappear, fade to 70% transparency, etc.). As an option, the fading of the visual feedback may be reversed if the implement of interaction moves beyond a preset threshold while still in contact with the backtouch interface.

In one embodiment, the user interface 1500 may include a plurality of checkboxes 1514 which allow the user to specify the style of visual feedback associated with making contact with the backtouch interface. The styles may include, but are not limited to, shading of a contact area, line style of the border of a contact area, animation routine, and/or any other style aspect of visual feedback, including those described in other embodiments.

In one embodiment, the user interface 1500 may include a plurality of checkboxes 1516 which represent various types of feedback which may be provided as an implement of interaction exerts pressure on the backtouch interface. The types of feedback may include, but are not limited to, visual (e.g., screen flashes, status bar icons, iconic depictions of the contact pressure of the implement, etc.), sound, vibration, and/or any other form of feedback. In another embodiment, one or more of these types of feedback may be configured by the user. For example, in one embodiment, the user may select a sound to be played whenever an implement of interaction exceeds a predefined contact pressure level with the backtouch interface. In another embodiment, the sound may play whenever there is a change in touch state. In yet another embodiment, the feedback may be limited to only those instances where the contact pressure on the backtouch interface is estimated to be intentional, rather than incidental. As a specific example, in one embodiment, feedback might be given for a finger press, but not for a palm squeeze incidental to the user's grip.

In one embodiment, the user interface 1500 may include buttons 1518 which allow the user to specify the colors which represent the extrema of measurable contact pressure levels. As an option, the colors may be specified with a transparency value.

In one embodiment, the user interface 1500 may include a plurality of checkboxes 1520 which represent various venues for presenting visual feedback based upon the current contact pressure level. The venues for pressure-related visual feedback include, but are not limited to, an area equivalent to or based upon the contact area, the contact point, the border of the display, the status bar, and/or any other type or example of visual feedback, including those described in other embodiments.

In one embodiment, the user interface 7.002.8-00 may include a button 1522 which returns all settings defined within user interface 7.002.8-00 to predefined default values. As an option, the user may be prompted to confirm the reset before restoring the default values.

In one embodiment, the user interface 7.002.8-00 may include buttons 1524 which allow a user to save and load collections of backtouch feedback settings. As an option, the user may be prompted to confirm loading a new collection of settings before overwriting the current collection.

In one embodiment, the user interface 1500 may include a button 1526 which allows a user to test the current backtouch feedback style settings. In one embodiment, button 1526 may enable the backtouch interface (if not already enabled) and allow the user to experience the current backtouch feedback style without being able to interact with user interface 1500 through the backtouch interface. In other words, the user may be able to expose the backtouch interface to a range of proximity, contact, and pressure interactions without accidentally changing any of the settings found within 1500.

In another embodiment, button 1526 may present to the user a user interface which allows the user to experience the current backtouch feedback style settings within a variety of simulated scenarios. The simulated scenarios may include, but are not limited to, web browsing, photo viewing, an application launcher, an eBook, word processing, and/or any other common use scenario. As an option, the simulated use scenarios may be defined such that the user is able to experience the current feedback style in a wide range of color schemes, subject matter, degrees of screen clutter, etc.

As a specific example of a backtouch feedback style collection in use, in one embodiment, a user may configure the backtouch interface through user interface 1500 such that having a finger in proximity to the backtouch interface causes a faint blue glow to appear on the display, over the location of the finger. The blue glow becomes brighter as the distance between the finger and the backtouch interface decreases, until contact is made. Upon contact, the display shows a small plus sign at the contact point and a thin "marching ants" border around the contact area. The contact area is not shaded. As the user increases contact pressure, the contact area is shaded red, which becomes more opaque as the pressure increases.

Figure 16:
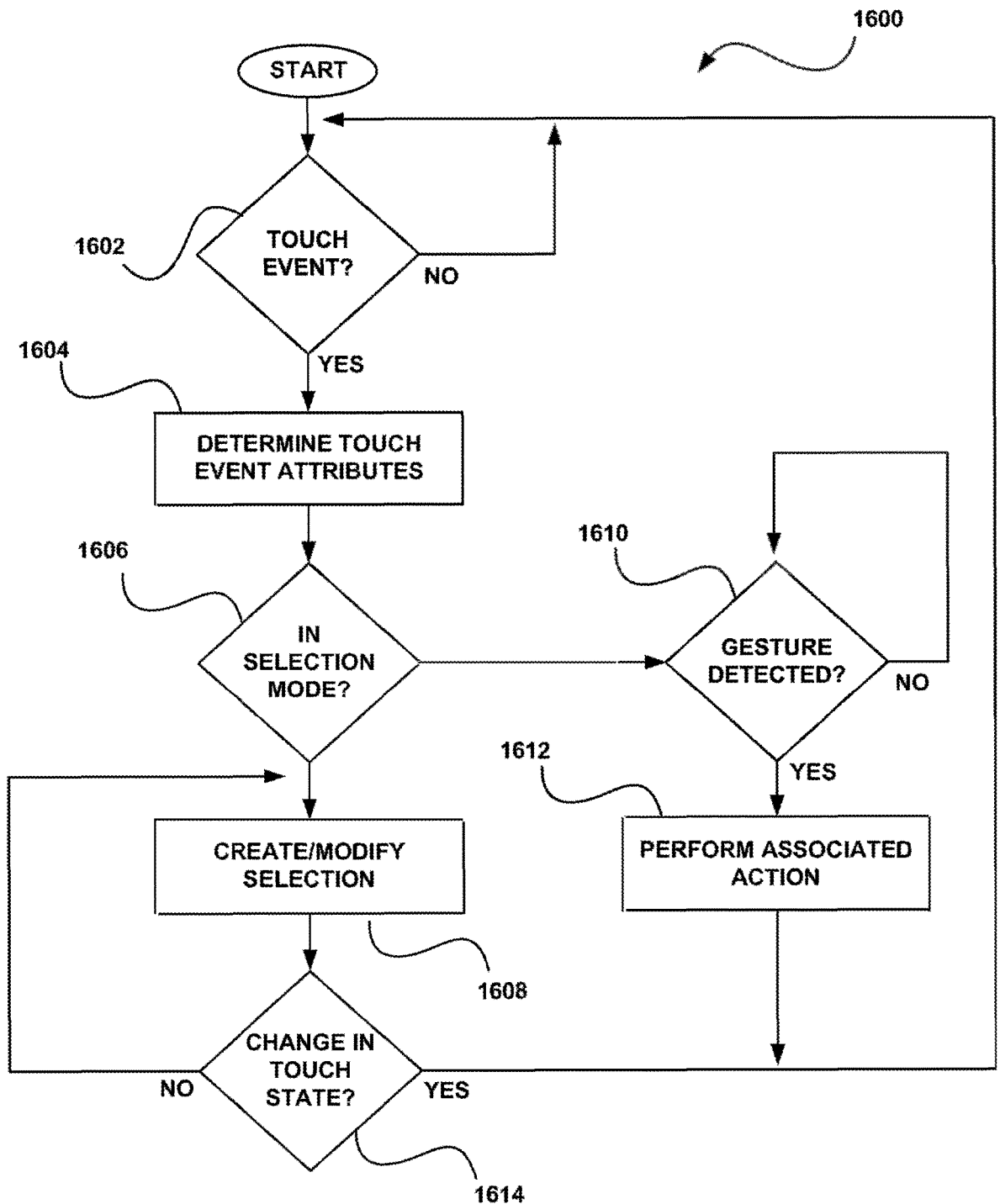
FIG. 16 shows an alternative method for defining a selection made within a user interface based in part on contact pressure, in accordance with one embodiment.

FIG. 16 shows an alternative method 1600 for defining a selection made within a user interface based in part on contact pressure, in accordance with one embodiment. As an option, the method 1600 may be implemented in the context of the architecture and environment of the previous Figures or any subsequent Figure(s). Of course, however, the method 1600 may be carried out in any desired environment. It should also be noted that the aforementioned definitions may apply during the present description.

As shown, it is determined if a touch event has occurred. See determination 1602.

In the context of the present description, a touch event refers to an event in which an implement of interaction comes into contact with an interaction surface. For example, in one embodiment, pressing on a pressure-sensitive back-touch interface with a finger may be a touch event. Another example may be making contact with a touch-sensitive display with a stylus.

If it is determined that a touch event has occurred, then the touch event attributes are determined. See operation 1604.

In the context of the present description, touch event attributes refer to one or more measurable aspects of the user interaction which resulted in a touch event. The measurable aspects may include, but are not limited to, touch state, contact area, contact point, contact pressure level, pressure uncertainty, touch uncertainty, and/or any other measurable aspect of user interaction.

As shown, it is determined whether the system is in a selection mode. See determination 1606.

In the context of the present description, a selection mode refers to a system state where a user may create or modify a selection in a display. In various embodiments, a selection mode may be represented by a system flag. Examples of when a system may be in a selection mode include, but are not limited to, instances where a selection already exists, instances where a user has indicated a desire to create a selection.

In various embodiments, a system may be placed in a selection mode through user input. For example, in one embodiment, the user may activate a selection mode by performing a predefined gesture on an interaction surface. In another embodiment, a user may activate a selection mode by exerting contact pressure on an interaction surface for a sufficient amount of time, the contact pressure exceeding a predefined threshold.

If the system is in a selection mode, then a selection is created and/or modified as a function of the touch event attributes, then displayed. See operation 1608.

In one embodiment, the selection may be created, modified, and/or displayed using one or more selection functions. In another embodiment, a display function may be applied in addition to a selection function, to display the selection.

In the context of the present description, a display function refers to a function of one or more inputs which determines one or more properties of a display. Properties of a display may include, but are not limited to, color values for individual pixels, brightness of a display backlight or portions of a backlight, and/or any other properties of a display. Display functions may apply to an entire display and/or multiple displays.

In one embodiment, the selection may be displayed with a secondary boundary representing the uncertainty in the selection. As a specific example, there may be displayed a small, pale green tinged transparent circle to show the area that the device is certain the user selected and a surrounding pale-red tinged transparent area (a secondary boundary) representing the area where the device thinks the user may have tried to select, but is not certain.

Operation 1608 may continue to be performed, updating the selection with each iteration, until there is a change in the touch state. See determination 1614.

If it is determined in 1606 that the system is not in a selection mode, then it is determined if a gesture has been detected. See determination 1610. In one embodiment, a user may be given feedback when a gesture is detected. Possible feedback may include, but is not limited to, sound, flashing display, appearance of an icon, a colored border on the display, and/or any other form of user feedback.

If a gesture has been detected, then an associated action is performed. See operation 1612. In one embodiment, any gesture may be mapped to any command or operation of the device. In another embodiment, a user may be provided feedback when the action is performed. Possible feedback may include, but is not limited to, sound, flashing display, appearance of an icon, a colored border on the display, and/or any other form of user feedback.

A gesture may be associated with a variety of different actions. These actions may include, but are not limited to, scrolling a display or user interface element, zooming in or out, modifying the display brightness, and/or any other action. With respect to making or modifying a selection through method 1600, it is important to note that, in one embodiment, a gesture may be associated with placing the system in a selection mode.

Figure 17:
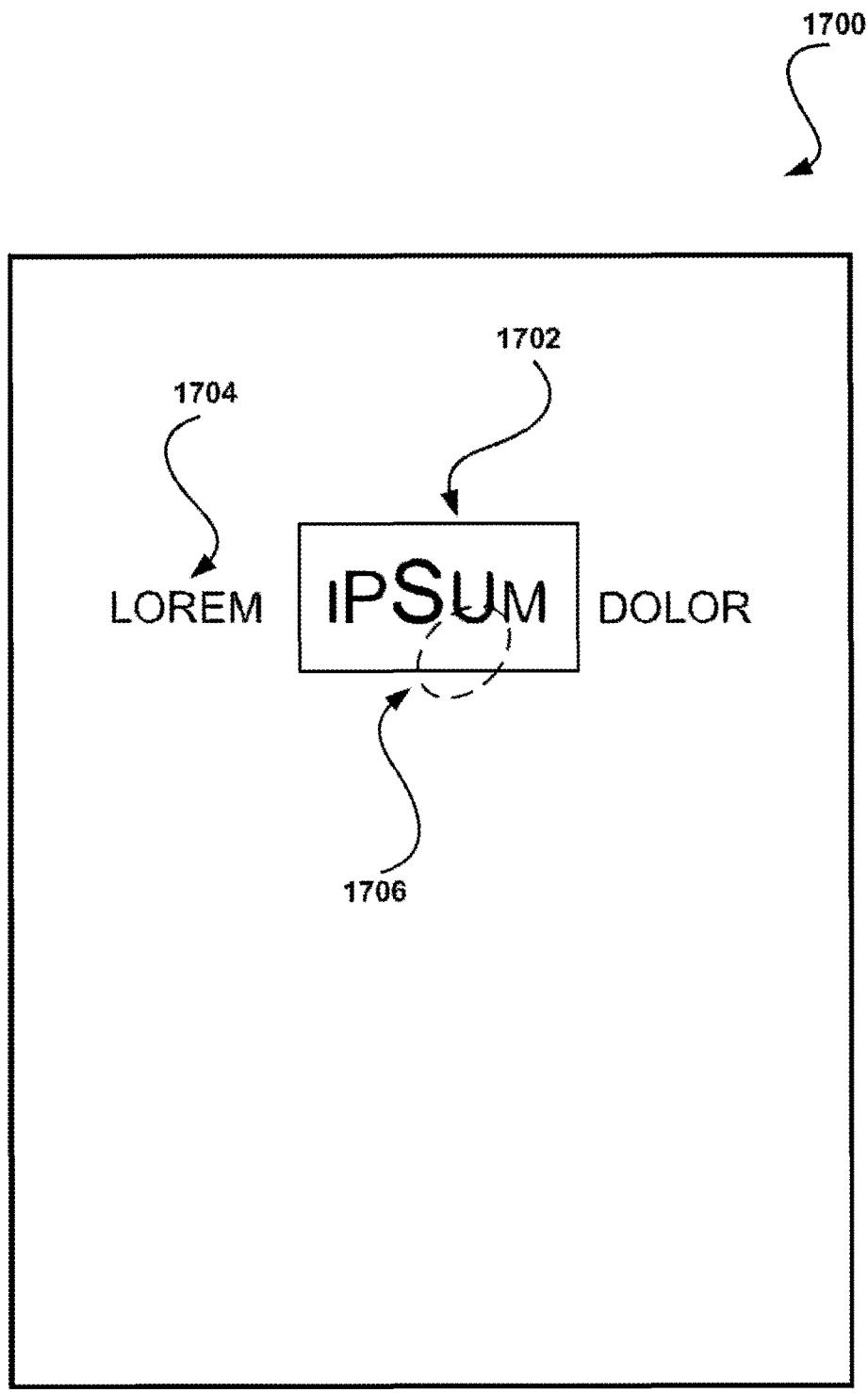
FIG. 17 shows a user interface for performing operations on a selection, in accordance with one embodiment.

FIG. 17 shows a user interface 1700 for performing operations on a selection, in accordance with one embodiment. As an option, the user interface 1700 may be implemented in the context of the architecture and environment of the previous Figures or any subsequent Figure(s). Of course, however, the user interface 1700 may be implemented in any desired environment. The aforementioned definitions may apply during the present description.

After selecting an object, using methods, interfaces, and embodiments described above or others, a user may wish to perform an operation upon the object. Providing easily accessible methods to perform operations on a selected object may enhance the user experience. The availability of multiple interaction surfaces and/or multiple sensitivities increases the number of simple, intuitive ways a user may interact with the device.

In various embodiments, once a selection is static, a user may perform operations on the selected object. Possible operations include, but are not limited to, replication operations (i.e. copy, cut, paste, etc.), relocation operations, text-specific operations, image-specific operations, cross-application operations, and/or any other type of operation.

In various embodiments, a user may perform replication operations on a selected object through simple gestures and other types of user input. For example, in one embodiment, a user may copy a selected object to a clipboard (i.e. temporary storage, etc.) by pressing sharply on a pressure-sensitive front interaction surface, on top of the selected object. In another embodiment, a user may cut a selected object by pinching the object (i.e. applying contact pressure on the object through a front and back interaction surface), then applying greater contact pressure on the front interaction surface than the back interaction surface. In yet another embodiment, a user may perform a paste operation, replacing the selected object with the contents of a clipboard, by pinching the selected object, then applying greater contact pressure on the back interaction surface than the front interaction surface. Of course, in other embodiments, these operations and those following may be assigned to any other gesture, depending upon the location, number, and sensing ability of the host device's interaction surface(s).

In various embodiments, a user may perform relocation operations on a selected object through simple gestures and other types of user input. For example, in one embodiment, a user may move a selected object by making contact with the object on an interaction surface (front or back) and dragging the contact point to relocate the object. As an option, if the selection was made within a sequential or ordered environment (i.e. word processing document, etc.), the selected object may become transparent or translucent while being relocated, so the user may better see the insertion point (i.e. cursor, etc.). As shown in this example, the same dragging gesture may have different effects, depending on the state of the selection (i.e. static vs. active, etc.).

In various embodiments, a user may perform text-specific operations on a selected text object using simple gestures and other types of user input. See, for example, user interface 1700 in FIG. 17. As shown, a selection 1702 has been made within a block of text 1704. In accordance with one embodiment, a user has temporarily magnified the selected text by bringing a finger into proximity to a back interaction surface, said proximity localized in an area 1706 on the selection. As an option, the degree of magnification may increase as the finger is brought closer to the interaction surface.

Another example of a text-specific operation is data detection, in accordance with one embodiment. For example, in one embodiment, a user may perform a data detection operation on a selected text object by pressing on the selection with two fingers through a back interaction surface. In various embodiments, the data detection operation may highlight detectable information found within the selected text including, but not limited to, email addresses, phone numbers, dates and times, addresses, web addresses, and/or any other form of information. In another embodiment, the data detection may only highlight types of information which may be further acted upon by the device, such that after detection, a user may initiation further action by touching the highlighted information. For example, in one embodiment, touching a highlighted phone number may dial the number, touching a highlighted address may activate a navigation application, touching a date may create an appointment in a calendar application, and so forth.

Other examples of text-specific operations may include, but are not limited to, highlighting, modifying the style (i.e. bold, italic, underline, strikethrough, color, shadow, etc.), modifying the font, modifying the font size, translating to a different language, and/or any other operation which may be performed on text. In one embodiment, a user may perform a gesture, such as a two finger, double press on the selected text, to bring up a menu of different text operations (or any other operation in the present description). In another embodiment, each operation may be assigned a different gesture.

In various embodiments, a user may perform image-specific operations on a selected object through simple gestures intuitively related to the operation being performed. For example, in one embodiment, a user may apply facial recognition and/or red eye removal by simply tapping (on a front or back interaction surface) on peoples faces within the selection. In another embodiment, a user may resize the selected object using the two finger pinch-to-zoom gesture. In still another embodiment, a user may rotate the selected object by making two points of contact on the object, then twisting the contacting hand. In yet another embodiment, a user may warp or distort a selected object by applying different levels of contact pressure to the selection via a front or back interaction surface. As an option, a front interaction may cause puckering, while a back interaction may cause bulging.

In various embodiments, a user may perform cross-application operations on a selected object through simple gestures. Cross-application operations may include, but are not limited to, placing the selected object in a new email or SMS message, placing the selected object in a social network posting, sending the object to an application capable of performing further operations (i.e. image editing application, word processing application, etc.), and/or any other operation which may involve another application. In other embodiments, a user may be presented with application-specific operations in a menu, in addition to cross-application operations, upon performing a predefined gesture.

Figure 18:
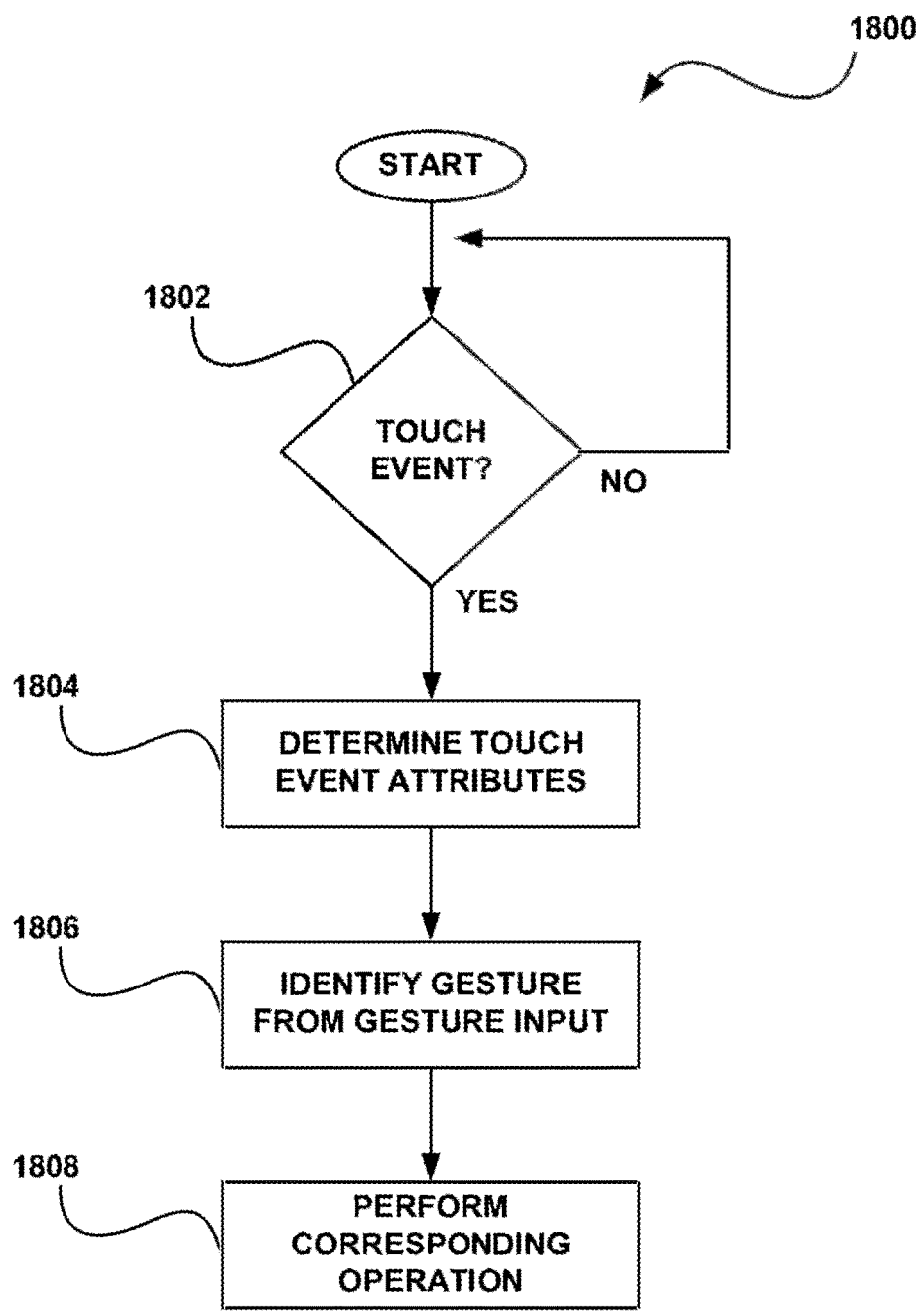
FIG. 18 shows a method for utilizing contact pressure-based gestures, in accordance with one embodiment.

FIG. 18 shows a method 1800 for utilizing contact pressure-based gestures, in accordance with one embodiment. As an option, the method 1800 may be implemented in the context of the architecture and environment of the previous Figures or any subsequent Figure(s). Of course, however, the method 1800 may be carried out in any desired environment. It should also be noted that the aforementioned definitions may apply during the present description.

As shown, it is determined if a touch event has occurred. See determination 1802.

If it is determined that a touch event has occurred, then the initial touch event attributes are determined. See operation 1804.

As shown, the gesture is identified from gesture input. See operation 1806.

In the context of the present description, gesture input refers to the collection of inputs, flags, and signals by which a gesture is identified and parameterized. For example, in one embodiment, a two-finger pinch gesture may be identified by two contact points combined with their motion with respect to each other, and parameterized by the extent of the motion. Possible gesture inputs may include, but are not limited to, touch event attributes (both initial and over time), system and/or application flags, switches, buttons, states, sensor data, and/or any other possible input.

For example, in one embodiment, a gesture may be made up of one or more contact points on an interaction surface, each associated with a different contact pressure level.

In various embodiments, a gesture may be identified from gesture input. Some gestures may be able to be identified solely from initial touch event attributes. Other gestures may only be identified after the gesture has been performed for some period of time. As a specific example, a two finger pinch gesture and a two finger swipe are indistinguishable based solely on initial touch event attributes. However, once the swipe or pinch motion has begun, the gestures are immediately distinguished from each other.

In various embodiments, gestures may include one or more contact pressures being exerted upon an interaction surface. In some embodiments, pressure may be used to distinguish between two gestures. For example, in one embodiment, two gestures involving a two finger pinch on the front display and one finger contact with the backtouch interface may be defined based on the contact pressure level exerted on the back touch interface. In other embodiments, pressure may be used to specify one or more dimensions of the operation linked to a gesture. For example, in one embodiment, a swipe gesture to control scrolling of a text field may use contact pressure to determine the speed of the scrolling (e.g., higher pressure yields faster scrolling, etc.). In still other embodiments, contact pressure may be used to both identify as well as parameterize a gesture.

Once the gesture has been identified, the corresponding operation is performed. See operation 1808.

In various embodiments, a gesture may be associated with the modification of one or more device audio settings. For example, in one embodiment, a user may adjust the device volume by applying contact pressure to a back interaction surface, and dragging the contact point up and down to increase or decrease the device volume. As an option, the ringer volume may be adjusted by dragging left and right. In another embodiment, a user may change where audio is sent (i.e. internal speakers, headphone jack, Bluetooth device, etc.) by quickly pressing twice on a back interaction surface, then selecting an audio destination from a pop-up menu presented in response to the rapid double press. In yet another embodiment, a user may mute the audio by applying pressure on front and back interaction surfaces (i.e. a pinching motion), in a predefined corner of the device. In various embodiments, some or all of these device audio related operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided. Of course, these and the following operations may be associated with any gesture or other user input, in various embodiments.

In various embodiments, a gesture may be associated with the modification of one or more display attributes. For example, in one embodiment, a user may adjust the intensity of a display backlight by applying contact pressure with three fingers on the display of interest. As an option, the backlight intensity may vary as a function of average contact pressure among the three contacts. In another embodiment, a user may activate a "night mode" (i.e. use of a monochrome red/black color space, inverting the display, etc.) by sequentially applying and releasing contact pressure on each corner of a front interaction surface. In various embodiments, some or all of these display attribute related operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided.

In various embodiments, a gesture may be associated with the modification of one or more device attributes. For example, in various embodiments, a device may have a status bar along one side of a display which indicates the status of device hardware including, but not limited to, Wi-Fi signal strength, cellular network type and signal strength, Bluetooth status (i.e. on, off, etc.), system volume, battery remaining, etc. In some embodiments, a user may modify the status of these device attributes by interacting with status bar icons. For example, in one embodiment, a user may apply front surface contact pressure, above a predefined threshold for a predefined amount of time, to a status bar icon to turn off the associated device hardware (i.e. Wi-Fi, cellular modem, Bluetooth, etc.). In another embodiment, a user may apply similar pressure via a back interaction surface to a deactivated status bar icon to turn the associated hardware back on. As an option, applying said contact pressure may present the user with a menu of options associated with that device hardware (i.e. Wi-Fi networks to join, Bluetooth devices to pair, activate cellular voice/data/both, etc.).

In yet another embodiment, a user may apply contact pressure to a status bar battery indicator icon to activate a menu populated with one or more predefined collections of settings for various power scenarios (i.e. extreme cutbacks for low battery, high performance for charged battery, maximum performance while charging, etc.). In this way, a user may activate a power saving mode that allows them to stay connected to a Wi-Fi network while saving power by diming the display (i.e. while web browsing), and a different power saving mode which turns off Wi-Fi without having to dim the display as much (i.e. reading an eBook, etc.).

In various embodiments, some or all of these device attribute related operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided.

In various embodiments, a gesture may be associated with application-specific operations. For example, in some embodiments, a user may interact with an email client through multiple interaction surfaces. In one embodiment, a user may scroll through a list of messages and select one for viewing using a back interaction surface. In another embodiment, a user may apply a contact pressure on a back interaction surface, then swipe downward, to forward the current message. In yet another embodiment, a user may apply a contact pressure on a back interaction surface, then swipe upward, to reply to the current message. As an option, a user may perform this gesture using two fingers to reply to all recipients of the message.

In other embodiments, a user may interact with a web browser through multiple interaction surfaces. In one embodiment, for example, a user may apply contact pressure on a link within a webpage, then perform a quick flicking gesture, in any direction, to open the link in a background tab or window. In another embodiment, a user may open a link in a new tab or window by pressing on the link through a back interaction surface for a predetermined amount of time.

In still other embodiments, a user may interact with a camera application through multiple interaction surfaces. For example, in one embodiment, a user may indicate a point to be used for white balancing by making contact with the displayed point through a back interaction surface. In another embodiment, a user may adjust one or more camera properties by applying different amounts of contact pressure on an icon shown on the front display. Possible camera properties may include, but are not limited to, aperture settings, simulated film speed, f-stop, degree of fill flash, and/or any other camera property or setting.

In even more embodiments, a user may interact with a movie player through a back interaction surface. For example, in one embodiment, a menu may fade into view when a user applies a contact pressure on the back interaction surface. The menu may allow the user to perform one or more movie-related operations, including but not limited to, toggling subtitles, selecting an audio track, selecting a chapter or bookmark, and/or any other movie related operation or setting.

In other embodiments, a user may interact with a navigation application using a back interaction surface. For example, in one embodiment, a user may cycle through a plurality of map layers by applying different levels of contact pressure on the back interaction surface. Possible map layers may include, but are not limited to, satellite images, street maps, weather maps, traffic maps, points of interest, navigational route, and/or any other type of map or navigational information.

In various embodiments, some or all of these application-specific operations may be available through gesture only after the user provides some form of activation input (i.e. touching an icon in the status bar, performing a simple gesture, etc.). In this way, gesture collisions (i.e. assignment of more than one operation to the same gesture, etc.) may be avoided.

In various embodiments, gestures may be associated with operations that are carried out as functions of the gesture input, when the gesture is performed and identified.

In various embodiments, the operations associated with a gesture may be carried out as a function of the associated gesture dynamics. In the context of the present description, gesture dynamics are aspects of a gesture that may vary without changing the identity of the gesture. Possible aspects may include, but are not limited to, contact point velocity, contact point acceleration, contact pressure velocity, contact pressure acceleration, time to complete gesture, and/or any other aspect which may be associated with a gesture.

In various embodiments, the association between gesture and operation may be context-dependent. In some embodiments, the association depends on application context (e.g., which application is active, etc.). For example, in one embodiment, a gesture which scrolls a text field in one application may turn a page when performed in a different application.

In other embodiments, the association may depend on application or state context (e.g., whether or not there is an active selection, whether or not a control has been activated, etc.). For example, in one embodiment, a gesture which may be used to select text may move text if performed when text has already been selected.

In other embodiments, the association may be independent of context, such that performing the gesture may cause the same operation to be carried out, regardless of what application is active. For example, a gesture which brings up an interface to adjust screen brightness and volume may be defined such that it is always available.

In various embodiments, a user may be given feedback as a gesture is performed. For example, in one embodiment, a representation of the gesture may be temporarily displayed as the gesture is performed. In this way, a user may be more aware of the form of the gesture they are performing. As an option, the geometry of the displayed gesture may be smoothed or otherwise modified.

Figure 19:
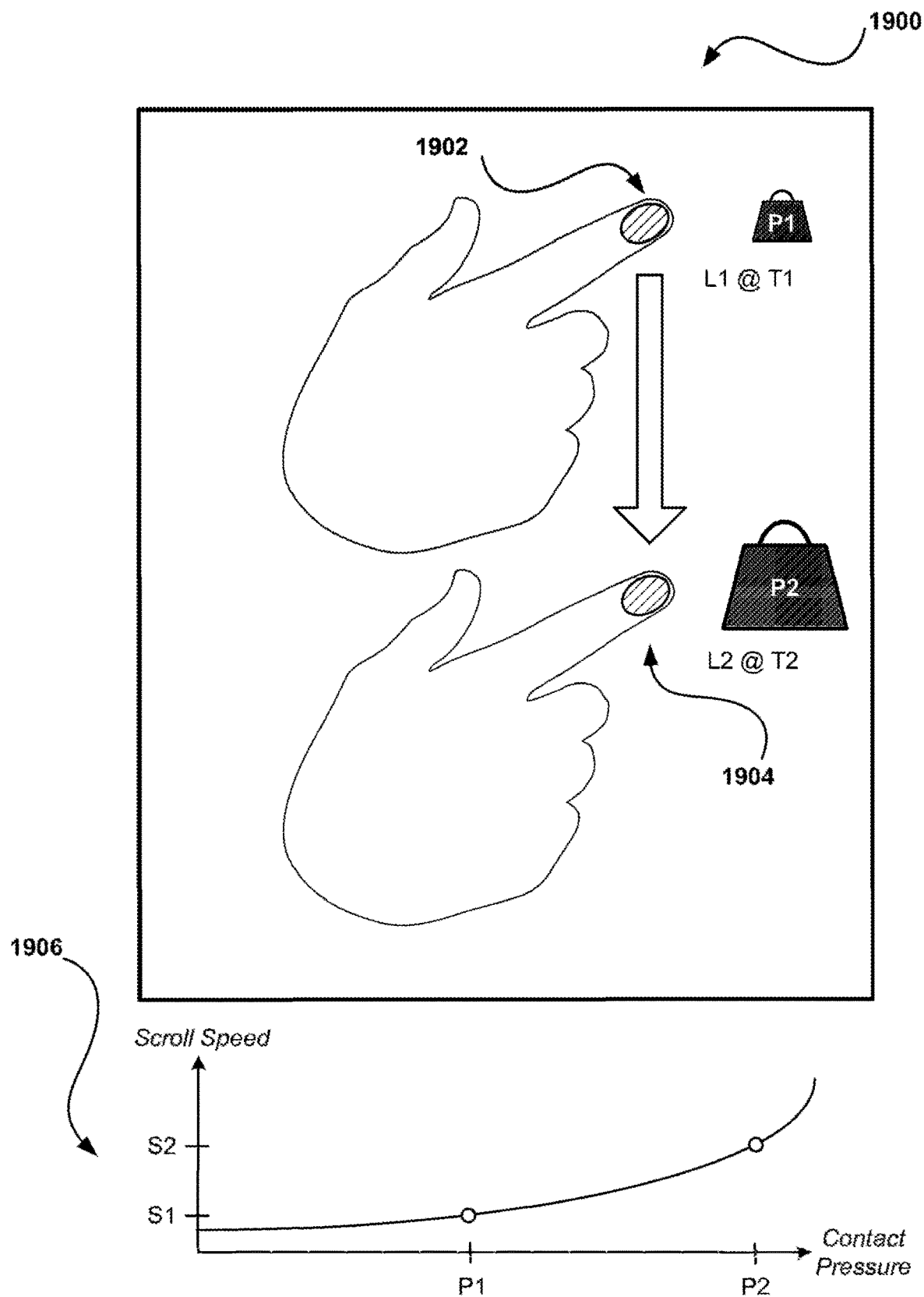
FIG. 19 shows an example of a contact pressure-based gesture for scrolling a text field, in accordance with one embodiment.

FIG. 19 shows an exemplary contact pressure-based gesture 1900 for scrolling a text field, in accordance with one embodiment. As an option, the gesture 1900 may be implemented in the context of the architecture and environment of the previous Figures or any subsequent Figure(s). Of course, however, the gesture 1900 may be carried out in any desired environment. It should also be noted that the aforementioned definitions may apply during the present description.

In one embodiment of a pressure-based gesture, the display properties of one or more display(s) may be altered by the gesture, including the scroll speeds of one or more scrollable objects (e.g., text fields, images, cover art, etc.). Scrolling is a common operation, and is often assigned to a gesture in touch-based devices.

In one embodiment of a pressure-based gesture, one or more inputs may alter the scrolling speeds of one or more areas on the display. As a specific example, a user may wish to scroll quickly through a very large collection of objects (e.g., contact names, pages of text, photographs, etc.), and desires to control the speed of scrolling in a simple fashion. While performing a classic swipe gesture to scroll through the collection, the user may also apply increasing contact pressure to a pressure-sensitive surface as a means of controlling the scroll speed (e.g., increased contact pressure yields increased scroll speed, etc.). A swipe, slide or other simple gesture may be used.

See, for example, exemplary pressure-based gesture 1900. As shown, the gesture starts at touch event 1902, which involves a single finger is making contact at location L1, at time T1, while exerting contact pressure P1, in accordance with one embodiment. The gesture ends at touch event 1904, with touch event attributes L2, T2, and P2. In one embodiment, the sliding motion from L1 to L2 may be described as a swipe gesture.

As shown in plot 1906, as the contact pressure increases from P1 to P2, the scroll speed increases as well, from S1 to S2. In one embodiment, scroll speed may be a display function (in this case, a function of contact pressure). As an option, pressure-dependent display functions may be stepwise, changing in response to changes in discrete touch states, or continuous functions of a contact pressure level.

In various embodiments, pressure-based gestures may be classified as either dynamic gestures or static gestures. In the context of the present description, a dynamic gesture is a gesture that requires movement across or in proximity to an interaction surface. For example, in one embodiment, a swipe gesture may be classified as a dynamic gesture.

In the context of the present description, a static gesture refers to a gesture which does not involve movement across or in proximity to an interaction surface. Examples of static gestures may include, but are not limited to, button presses (real or virtual), multi-finger taps, operating a mechanical switch, a squeeze, and/or any other gesture which does not require motion.

In one embodiment of a pressure-based gesture that alters display properties, a scroll speed display function may be defined such that scroll speed increases in a non-linear fashion with respect to the contact pressure exerted in a swipe gesture.

In various embodiments, pressure-based gestures may be associated with different operations. For example, in one embodiment, pressure-based gestures may alter one or more display properties. Display properties may include, but are not limited to, backlight intensity, pixel color, scroll bar sensitivity, slideshow rate, and/or any other property associated with a display or its contents. As a specific example, a device may be in a sleep mode with the display and backlight inactive. A user may move his finger into proximity of a backtouch sensor in order to activate the display and the display backlight intensity to a low intensity level. By increasing the pressure on the backtouch sensor, the backlight intensity may be increased. Alternatively, the backlight intensity may be initially activated at a high level (e.g., depending on ambient light sensor etc.). In this case increasing pressure on the backtouch display may dim the backlight.

In one embodiment of a pressure-based gesture that alters a scroll speed, as the gesture magnitude is increased, the rate of scroll speed increase is increased. In other words, the scroll acceleration is increased.

In the context of the present description, gesture magnitude refers to the magnitude of the associated gesture dynamics. For example, in one embodiment, the gesture magnitude of a swipe gesture may include the length of the swipe and/or the contact pressure exerted during the swipe.

In one embodiment of a pressure-based gesture to control scroll acceleration, the scroll acceleration may depend on the gesture acceleration. Thus, if the contact is such that the contact point is accelerating with time (e.g., positive contact point acceleration), the scroll acceleration may be positive. In another embodiment, if the contact point acceleration is negative then the scroll acceleration may be negative (e.g., scroll speed decreased, etc.).

In one embodiment of a pressure-based gesture to control scroll acceleration, the scroll acceleration may be both positive and negative, depending on the contact point movement.

In one embodiment of a pressure-based gesture to control scroll acceleration, other display functions may also be altered. Possible display functions include, but are not limited to, selection(s), color, shape, image and/or text magnification, indicator(s) to provide feedback to user, and/or any other display function.

The addition of pressure dependence to already established touch gestures may facilitate user interactions with the device. Often, the efficacy of a gesture is limited by the size of the device. For example, on a device which uses the pinch-to-zoom gesture, zooming far in or out may require repetition of the gesture multiple times, due to screen size.

In one embodiment, the pinch-to-zoom touch gesture may be enhanced as a pressure-based gesture; after performing the pinch motion, the user exerts pressure on the two contact points. So long as the pressure remains above a predefined threshold, the zoom operation may continue inward/outward without requiring additional pinch motions. As an option, the speed of the zooming may be modified by changing the contact pressure level. As another option, any differences in contact pressure level between the two contact points may be dealt with by using the average pressure.

In another embodiment, the swipe to scroll touch gesture may be enhanced as a pressure-based gesture; after performing the swipe, the user exerts pressure on the contact point without further motion. So long as the pressure remains above a predefined threshold, the scroll operation may continue without requiring additional swiping motions. As an option, the scroll speed may vary as a function of the contact pressure level.

Figure 20:
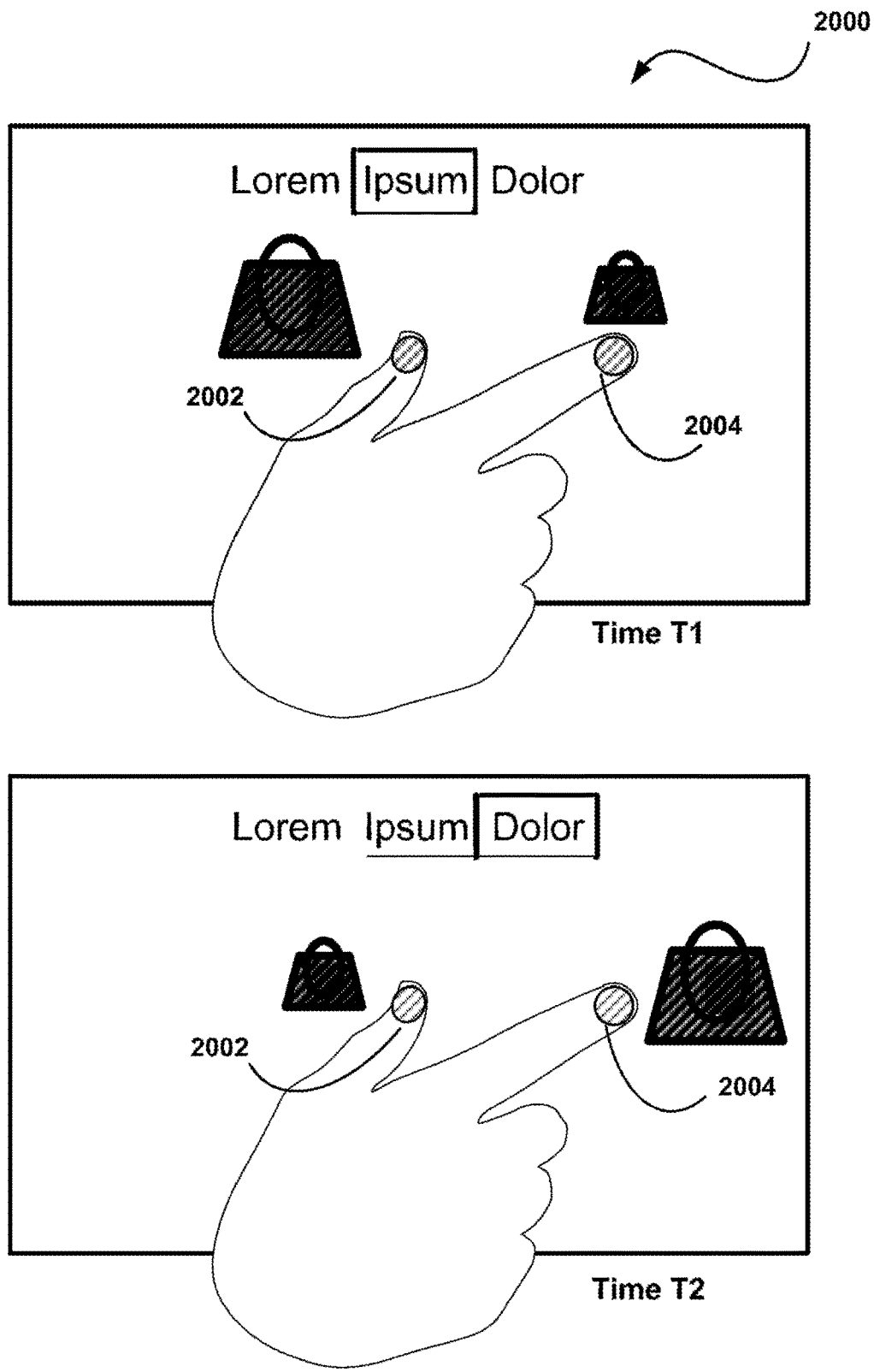
FIG. 20 shows an example of a multitouch pressure gesture for indicating a direction, in accordance with one embodiment.

FIG. 20 shows an exemplary multitouch pressure gesture 2000 for indicating a direction, in accordance with one embodiment. As an option, the gesture 2000 may be implemented in the context of the architecture and environment of the previous Figures or any subsequent Figure(s). Of course, however, the gesture 2000 may be carried out in any desired environment. It should also be noted that the aforementioned definitions may apply during the present description.

As previously discussed, touch gestures may sometimes be modified to be pressure-dependent. In various embodiments, multitouch gestures may also be modified to depend upon pressure. As an option, the modified multitouch gestures may depend upon contact pressure differences between different contact points. In the context of the present description, a multitouch pressure gesture refers to a multitouch gesture whose definition relies in part on differences in contact pressure between different contacts. The definition of multitouch pressure gestures may rely on a variation in pressure differences over time, but it is not required of all multitouch pressure gestures.

See, for example, multitouch pressure gesture 2000 shown in FIG. 20. This static gesture is based upon two points of contact, 2002 and 2004. In various embodiments, this gesture may be used to indicate a direction. As depicted in FIG. 20, this multitouch pressure gesture is indicating a left-to-right direction, in accordance with one embodiment. In other embodiments, this gesture may be associated with any other operation, function, or action.

In various embodiments, multitouch pressure gesture 2000 may be performed by first exerting a contact pressure upon contact point 2002 which exceeds a contact pressure being exerted upon contact point 2004. As an option, various embodiments may require that both of these initial contact pressures exceed a predefined threshold contact pressure level. The gesture is completed by altering the contact pressures on the two contact points such that the pressure exerted on 2004 now exceeds that being exerted on 2002. As an option, a user may be required to maintain this pressure inequality for a predefined amount of time. When this gesture is performed using two digits on the same hand, the user's hand may appear to be rocking from left to right. A right to left direction may be indicated by changing the order of the pressures. This type of multitouch pressure gesture is hereinafter referred to as a rocker pressure gesture.

In various embodiments, a rocker pressure gesture may be preferable over simply indicating a side of the device through touch or pressure because it is less likely to be accidentally performed.

In various embodiments, a rocker pressure gesture may be used to modify a selection. For example, in one embodiment, a text selection may be expanded in a particular direction by performing a rocker pressure gesture in the desired direction, and maintaining the contact pressure difference between the two contact points until the text selection is the desired size. As an option, the speed at which the selection expands may be increased/decreased by increasing/decreasing the contact pressure differential. In another embodiment, this gesture may be used to modify the shape of a selection. For example, it may be used to modify the aspect ratio of the selection boundary geometry associated with the selection.

In various embodiments, a rocker pressure gesture may be used in conjunction with a user interface adapted for the visually impaired. For example, in one embodiment, the rocker pressure gesture may be used to move a selection from one UI element (e.g., button, slider, drop down menu, etc.) to the next. When a UI element is selected, the assistive interface may speak the object name and/or magnify it such that the visually impaired user understands. In this way, a visually impaired user may operate a user interface displayed on a screen which often provides zero tactile feedback.

In various embodiments, a rocker pressure gesture may be used to facilitate interaction with the operating system. For example, in one embodiment, this gesture may be used to traverse a list of applications running in a multi-tasking environment. In another embodiment, this gesture may be used to switch between windows in a windowed user environment. In yet another embodiment, a rocker pressure gesture may be used to increase/decrease system settings such as volume and display brightness.

In various embodiments, a rocker pressure gesture may be advantageous in an application environment. For example, in one embodiment, a rocker pressure gesture may be used to turn the pages of an electronic book, or other multipage document displayed as a book. Using a rocker pressure gesture would allow a user to hold the device with both hands while reading, thumbs in contact with the screen, without danger of accidentally triggering a page turn, nor requiring movement of hands or fingers to turn the page.

Figure 21:
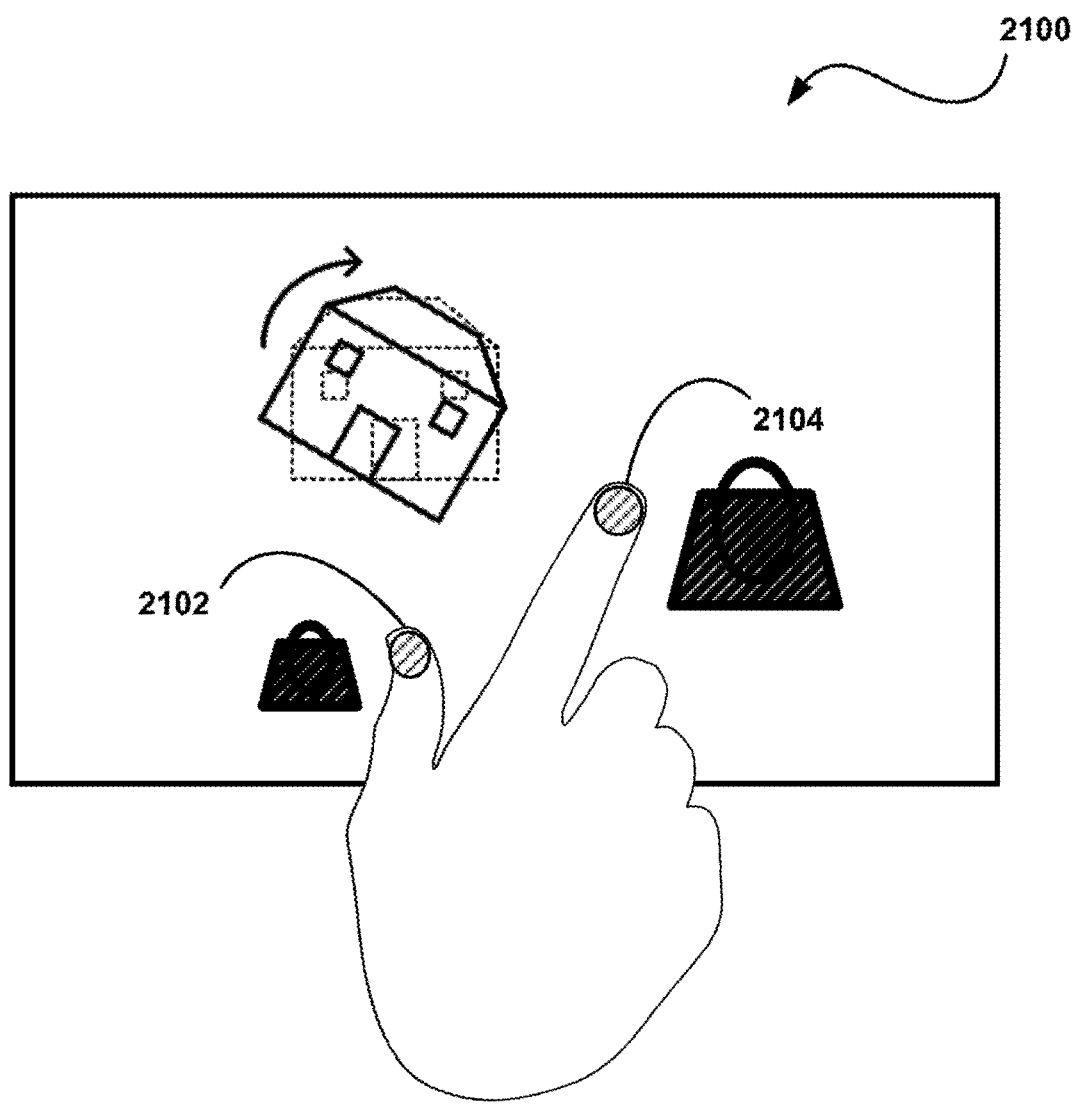
FIG. 21 shows an example of a multitouch pressure gesture for indicating a rotation, in accordance with one embodiment.

FIG. 21 shows an exemplary multitouch pressure gesture 2100 for indicating a rotation, in accordance with one embodiment. As an option, the gesture 2100 may be implemented in the context of the architecture and environment of the previous Figures or any subsequent Figure(s). Of course, however, the gesture 2100 may be carried out in any desired environment. It should also be noted that the aforementioned definitions may apply during the present description.

In various embodiments, multitouch gestures may enhance the user experience with the addition of pressure sensitivity. For example, in one embodiment, the measured difference in contact pressure levels among different contact points associated with a gesture may determine one or more parameters associated with the gesture. As an option, the one or more parameters may vary as a function of the pressure differential. Possible parameters may include, but are not limited to, speed of transformation, direction of transformation, stringency of a color matching selection, and/or any other parameter which may be associated with any type of action, command, or operation.

In another embodiment, the presence of a pressure differential among contact points associated with a gesture may change the identity of the gesture itself. For example, see FIG. 21.

As shown, multitouch pressure gesture 2100 is a static gesture based upon two points of contact, 2102 and 2104. In various embodiments, this gesture may be used to indicate a rotation. As depicted in FIG. 21, this multitouch pressure gesture is indicating a clockwise rotation, in accordance with one embodiment. In other embodiments, this gesture may be associated with any operation, function, or action.

In various embodiments, multitouch pressure gesture 2100 may be performed by exerting contact pressure upon contact points 2102 and 2104 such that there is a pressure differential. For example, as seen in FIG. 21, the contact pressure associated with contact point 2104 is greater than that associated with contact point 2102. As an option, various embodiments may require that both of these contact pressures exceed a predefined threshold contact pressure level. The gesture is completed by ending one or both contacts, or by performing a different gesture. As an option, a user may be required to maintain this pressure inequality for a predefined amount of time. This type of multitouch pressure gesture is hereinafter referred to as a tipping pressure gesture.

In various embodiments, a tipping pressure gesture may be used to rotate an object or element on a display. For example, in one embodiment, an image or selected portion of an image may be rotated by performing a tipping pressure gesture. As an option, the speed of rotation may depend upon the pressure differential between the two contact points. In another embodiment, the speed of rotation may vary as a function of the distance between the two contact points.

In one embodiment, the rotation may be performed in small angular increments, continuing until the tipping pressure gesture has ended. In another embodiment, the rotation is performed in 90° increments (e.g., changing the orientation of photographs, etc.), independent of gesture length or pressure differential. In some embodiments, the rotation may be performed using one of the contact points as the axis of rotation.

In some embodiments, a tipping pressure gesture may only cause a rotation in one direction (e.g., clockwise, etc.). In other embodiments, the direction of rotation caused by a tipping pressure gesture may depend on the positions of the two contact points with respect to each other. For example, in one embodiment, if the high pressure contact point is to the right of the low pressure contact point, the rotation may be in a clockwise direction, and in a counterclockwise direction otherwise. See, for example, multitouch pressure gesture 2100. In one embodiment, the axis used to make the left/right determination may be the horizontal axis as defined by the current device orientation. In another embodiment, the horizontal axis used to make the left/right determination is defined by device geometry, and is orientation independent. In still other embodiments, the axis used to determine left/right may be independent of device geometry or orientation (e.g., display diagonal, vertical, etc.).

In various embodiments, a tipping pressure gesture may be used to interact with user interface elements. For example, in one embodiment, a tipping pressure gesture may be used to increase/decrease the value of a selected slider or scale. In another embodiment, a tipping pressure gesture may be used to cycle through options on a circular pop-up menu. In still another embodiment, a tipping pressure gesture may be used to quickly scroll through a list of items. Possible items may include, but are not limited to, email messages, songs or videos, files, photos, and/or any other object or data.

In some embodiments, there may exist two or more gestures which are the same or similar in execution. For example, see multitouch pressure gestures 2000 and 2100. While performing a tipping pressure gesture, if a user allows the contact pressure differential to switch sign (i.e. low pressure contact point becomes the high pressure contact point, and visa versa), a rocker pressure gesture may be recognized by the device. In various embodiments, constraints may be placed upon gestures to assist the operating system in differentiating between similar gestures.

In various embodiments, similar or identical gestures may be distinguished from each other through the context of their use. For example, in one embodiment, the recognition of a tipping pressure gesture may be limited to instances where there is a rotatable object selected; the rocker pressure gesture would be available in all other instances. By ensuring similar gestures are not recognizable in the same context, user confusion and erroneous gestures may be reduced. These contexts may include, but are not limited to, selection status, device state, active application, system flags, selection subject matter, and/or any other property or attribute by which contexts may be defined.

In various embodiments, similar or identical gestures may be distinguished from each other by the positions of points of interaction, relative to a common axis system. In the context of the present description, a point of interaction refers to any point on an interaction surface where user interaction may be localized. Points of interaction include, but are not limited to, contact points, localized proximity and/or any other localized user interaction.

In the context of the present description, a common axis system refers to an axis system upon which all gesture data may be evaluated. For example, in one embodiment, the common axis system may be tied to the device geometry (i.e. the "horizontal" axis is always parallel to the long edge of the main display, etc.). In another embodiment, the common axis system may be tied to device orientation, such that the axis system changes depending on accelerometer data (though it is still common to all gestures).

Using a common axis system, an examination of the relative positions of points of interaction associated with a gesture may facilitate differentiation. For example, in one embodiment, rocker pressure gestures may only be recognized if a line between the two contact points is within a predefined deviation from the common horizontal axis (and the tipping pressure gesture available in all other cases). In another embodiment, the similar gestures may all be available at all times, but the location of points of interaction with respect to the common axis system may be used to give priority to certain gestures over others in certain situations.

In various embodiments, similar or identical gestures may be distinguished from each other through the timing associated with their execution. For example, in one embodiment, the performance of a rocker pressure gesture may have to be done within a certain amount of time, otherwise it may be interpreted as multiple tipping pressure gestures. In another embodiment, a tipping pressure gesture may have to be held for a certain amount of time before being recognized, such that the beginning of a rocker pressure gesture may not be identified as a tipping pressure gesture.

In various embodiments, one or more pressure-based gestures may be combined with other multi-touch and/or pressure-based gestures, such that a user may give multiple gesture-based instructions without breaking contact with one or more interaction surfaces. For example, suppose a user finger is at 3 o'clock and a user thumb at 9 o'clock and finger and thumb are one inch apart, both on a front touchscreen. The user may slide finger and thumb further apart. In one embodiment, this may result in an increase in selection area, for example. The user may then increase finger pressure. This may result in the increased selection area being rotated.

In other embodiments, other combinations and permutations of various inputs and gestures on various surfaces and using various sensors may be used to simplify the user interface and make pressure-based gestures more intuitive. As an option, such gestures may be pre-programmed, or programmed by the user, or a combination of both.

Pattern-based gestures may be simple to perform and easy for a user to remember. For this reason, they are well suited to a number of applications. One of the most basic pattern-based gestures is the finger press. In various embodiments, a pattern-based gesture made up of one or more fluctuations of contact pressure between a low level and a higher level at a single contact point may be associated with often used operations. For example, in one embodiment, a double press (i.e. increase then decrease contact pressure twice) may activate an interface to switch between active applications in a multitasking environment. In another embodiment, a triple press may activate a pop-up menu populated with iconic representations of the user's preferred actions, contacts, applications, and scripts. In one embodiment, these gestures may be surface agnostic. For example, the application switching interface may be activated no matter which interaction surface received the double press. In another embodiment, these gestures may be surface specific, allowing other system processes and applications to assign operations to these simple gestures without colliding with a system-wide gesture. For example, a triple press on a side surface may activate a pop-up favorites menu, while a triple press on a back surface may activate an application-specific contextual menu.

Another simple pattern-based gesture is the pinch gesture. In various embodiments, this gesture is performed by making simultaneous contact with two different interaction surfaces such a line connecting the two contact points is roughly parallel to the force vectors being applied at said points. An example is pinching a device between a finger and a thumb, the finger and thumb contacting different interaction surfaces. In another embodiment, this gesture may be pressure based. Variations on this gesture may incorporate multiple pinches (i.e. fluctuations of contact pressure between a low level and a higher level, similar to the finger presses previously described).

These simple gestures may be associated with often used operations, including but not limited to, activating device interfaces (i.e. backtouch interface, proximity sensitivity, pressure sensitivity, etc.), displaying a common system interface (i.e. application launcher, system settings, etc.), displaying a menu of user defined "favorites" (i.e. applications, contacts, songs, movies, web bookmarks, recently used documents, etc.), mute volume, and/or any other often used interface or operation. Of course, in other embodiments, these gestures may be associated with any operation, function, or interface.

Building off the previous gesture, a pinch slide gesture is an example of a pattern-based generalized gesture which combines a pinch with a sliding motion. In some embodiments, it may be described as a 1-6 gesture, though it is not limited to just front/back interaction. In various embodiments, this gesture may be performed by pinching the device, then sliding the pinch across the interaction surfaces while maintaining contact. In one embodiment, a contact pressure above a predefined threshold may also be required. This gesture mimics the tactile experience of pushing or pulling an object such as a lever or cord.

In one embodiment, a pinch slide gesture may be used to quickly move through an alphabetical list, similar to using tabs to quickly find a contact quickly in a paper address book. In another embodiment, this operation may be adopted to moving quickly through other sorted lists of items, including but not limited to song lists, application lists, eBooks, and/or any other collection of organized data. As an option, the display may invite the use of this gesture by displaying virtual tabs (i.e. the alphabet, numbers, etc.) along a side of the display where the gesture would be performed.

In another embodiment, a pinch slide gesture may be used to quickly select text. For example, in one embodiment, a selection may be initiated by pinching at the desired location. The selection may be expanded by sliding the pinch to the desired selection end. In another embodiment, this method of selection may be adapted to selecting a portion of an image or graphic (i.e. pinch at one corner of desired selection bounding box and sliding to opposite corner, etc.).

In another embodiment, a pinch slide may be used to move quickly through a large document (i.e. word processing document, web page, image, etc.). For example, in one embodiment, the user may slide a pinch up and down the device, changing the displayed portion of the document relative to the position of the pinch (i.e. the top of the device represents the start of the document, the bottom of the device represents the end, and the relative location of the pinch becomes the portion of the document displayed. In another embodiment, the pinch slide may have to be initiated at a particular location to activate this document navigation functionality. For example, a web browser may have an icon near the top of the display that activates pinch slide navigation when the gesture is initiated on the icon. This functionality may be adapted to two dimensional navigation in a large image, displaying the portion of the image represented by the relative location of the pinch.

In yet another embodiment, a pinch slide gesture may be used to display menus of common operations or applications. For example, in one embodiment, a pinch slide gesture which begins near an edge of a display and then moves inward may cause a menu or window to slide in from that edge of the display. As an option, the menu or window may remain visible until a selection is made. In another embodiment, there may be different menus or windows associated with each edge of a display. In still another embodiment, a window may be closed (i.e. slid back out of view) by using a pinch slide to pull it out a bit farther, then releasing it, similar to rolling up a window shade.

In one embodiment, a user interface may be utilized to present a context based menu for the user. In one embodiment, a user may interact with a display element by exerting contact pressure on a front interaction surface over contact area. At the same time, the user may be in contact with a back interaction surface, over contact area. In various embodiments, contextual menu may be displayed near the backtouch contact, after the user performs a predefined static gesture within contact area. The user may then select a menu item using small movements and contact pressure applied on the back interaction surface.

In one embodiment, the user interface may be utilized to provide easy, quick access to a plurality of favorite operations, applications, contacts, documents, and/or other types of objects. In various embodiments, favorites panel may be displayed in response to a gesture, the selection of a hardware or software button, voice command, accelerometer input (i.e. shaking the device, flicking the users wrist, etc.), and/or any other form of user input. In one embodiment, once favorites panel is displayed, a user may select an item using a slide pad located on the side of the device.

In one embodiment, a user may configure which items are displayed in the favorites panel. In another embodiment, the favorites panel may be automatically populated by the device, based upon factors which may include, but are not limited to, historical usage, date of last use, frequency of use, popularity information obtained from a remote system, and/or any other factors.

In the various embodiments described above, different combinations of user input have been associated with different actions. It should be understood that the described user inputs may be associated with any action, function, operation or interface, just as the described actions may be triggered by any combination of user inputs, according to different embodiments.

In the context of the present description, a cue refers to feedback, visual or otherwise, which is provided to the user. Examples of cues include, but are not limited to, the display logic within selection functions, visual representation of contact point movement, proximity feedback, contact pressure level feedback, and/or any other form of user feedback. For example, in one embodiment, the anchor object may be highlighted (e.g., change of color, text highlight, 3D representation, flashing or other dynamic selection area behavior, etc.)

In various embodiments, cues may include 3D or pseudo-3D effects. For example, in one embodiment, the anchor object may be made to appear to be floating above a background image, using 3D cues.

In various embodiments, a cue may modify a 2D representation into a pseudo-3D representation responsive to user inputs such as device orientation. For example, in one embodiment, the shadow of an object may be adjusted according to device orientation, to provide the illusion that an object is floating above a background. In another embodiment, the pseudo-3D representation may be responsive to user focus (including, in some embodiments, user gaze).

Figure 22:
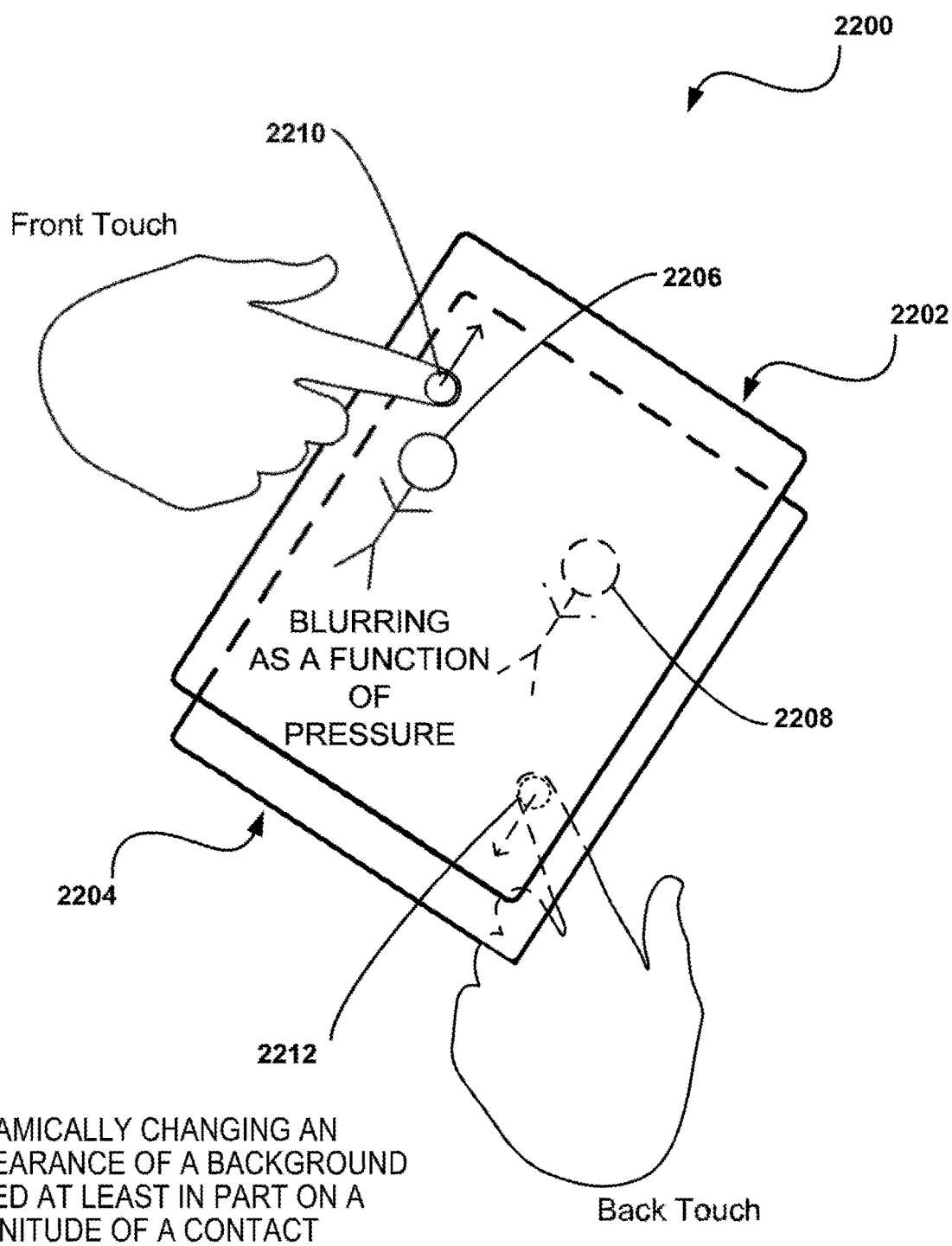
FIG. 22 shows a 3D layered user interface, in accordance with one embodiment.

FIG. 22 shows a 3D layered user interface 2200, in accordance with one embodiment. As an option, the user interface 2200 may be implemented in the context of the architecture and environment of the previous Figures or any subsequent Figure(s). Of course, however, the user interface 2200 may be implemented in any desired environment. The aforementioned definitions may apply during the present description.

In the context of the present description, a 3D layered user interface refers to a user interface in which displayed objects may exist in one of a plurality of layers. For example, see FIG. 22.

As shown, user interface 2200 is comprised of two layers, a front layer 2202 and a back layer 2204. These layers are depicted in a staggered arrangement, to illustrate the depth; it should be noted that in various embodiments, the layers would be aligned. Object 2206 exists in the front layer, while object 2208 exists in the back layer. In various embodiments, a user may interact with the layers separately.

In various embodiments, a 3D layered user interface may be implemented in a layered display device. In the context of the present description, a layered display device refers to a device with at least one display that is made up of a plurality of overlapping display layers, each layer able to display content independent of other layers, with all layers facing the same direction. For example, in one embodiment of a layered display device, the device may have a display made up of a transparent display located on top of a second display, both facing forward. In another embodiment, the display layers may be separated by a non-opaque material, to enhance the layered appearance.

In another embodiment of a layered display device, the display layers may include one or more e-ink layers. In yet another embodiment, the display layers may include one or more LCD layers. In still another embodiment, the display layers may include both e-ink and LCD layers. Other embodiments may include any combination of layers embodying any display technology.

In various embodiments, a 3D layered user interface may be implemented in a device having single layer displays through the use of virtual display layers. In the context of the present description, a virtual display layer refers to a collection of display elements which have all been assigned the same apparent depth within the 3D layered user interface. In various embodiments, a 3D layered user interface may make use of multiple virtual display layers. For example, in one embodiment, a 3D layered user interface may have a virtual foreground display layer and a virtual background display layer.

Additionally, in the context of the present description, a display element refers to the region of the display allotted to an identifiable visual object. Identifiable visual objects may include, but are not limited to, digital objects (i.e. images, text boxes, UI control widgets, selections, etc.), subject matter objects (i.e. people within a photograph, letters and/or words within text, etc.), and/or any other type of identifiable visual object. When located in a virtual display layer, display elements may be referred to as 3D display elements.

In various embodiments, virtual display layers may be given the appearance of depth through the use of 3D depth cues. In the context of the present description, a 3D depth cue refers to an effect, manipulation, transformation, animation, or operation which gives a visual indication of simulated depth. For example, in one embodiment, a 3D depth cue may be a blur operation, such that layers located at successively greater depths may appear blurrier than those closer to the user. In various embodiments, one or more 3D depth cues may be used to give the appearance of depth to one or more virtual display layers. In one embodiment, different 3D depth cues may be used for different virtual display layers. In another embodiment, 3D depth cues may be used in conjunction with a 3D layered user interface implemented in a layered display device, to enhance the layered appearance.

In one embodiment, a 3D depth cue may include the addition of a shadow element to display elements located within a virtual display layer, making them to appear to float above the next virtual display layer. As an option, the location of the light source(s) casting the shadows may be based in part on data obtained from one or more cameras located on the host device.

In one embodiment, a 3D depth cue may include the addition of a depth-based fog, giving the appearance that the layers exist in an environment with a thin, uniform fog. In this way, distant objects may be "foggier" than objects close to the user.

In one embodiment, a 3D depth cue may include a depth-based apparent rate of movement. For example, in a situation where a user is swiping through multiple screens of layered content, the layers closer to the user may appear to move faster than those more distant, giving the appearance of depth.

In one embodiment, a 3D depth cue may include a time-dependent visual transformation. For example, in one embodiment, a background layer may be transformed such that it appears to be below rippling water, while the foreground layer appears to be floating on the surface. In another embodiment, the visual transformation may be static.

In one embodiment, a 3D depth cue may include animated visual elements which appear to exist in between layers. Elements may include, but are not limited to, birds or insects flying, shooting stars, tiny people walking, grass blowing in the wind, and/or any other visual element.

In one embodiment, a 3D depth cue may include moving and/or transforming display elements within a virtual display layer based upon detected user gaze and/or head position. For example, in one embodiment, display elements may be compressed and virtual display layers spread apart if the device determines the user is viewing the display from an angle, the degree of transformation varying with estimated viewing angle. In another embodiment, display elements located on different virtual display layers may be slide around within their respective layers as the user changes their angle of viewing, allowing them to "look around a corner" to see display elements that would be obscured when viewed head on.

In one embodiment, a 3D depth cue may include moving and/or transforming display elements within a virtual display layer based upon changes in device orientation detected through one or more hardware interfaces (i.e. accelerometer, tilt sensor, compass, etc.).

In one embodiment of a 3D layered user interface, the 3D cues may be implemented such that the user interface has an apparent depth equal to the thickness of the device. In another embodiment, the 3D cues may be implemented such that the user interface has an apparent depth equal to the distance between a front display and a backtouch interface.

In various embodiments, a user may interact with the layers separately. For example, in one embodiment, a front interaction surface may be used to interact with display elements in a foreground display layer, and a back interaction surface may be used to interact with display elements in a background display layer. See, for example, FIG. 22.

User interface 2200 is being implemented in a device having front and back touch-sensitive interaction surfaces.

As shown, a user may manipulate display element 2206, located in front layer 2202, through a gesture 2210 performed on the front interaction surface. At the same time, a user may manipulated display element 2208, located in back layer 2204, through a gesture 2212 performed on the back interaction surface. In one embodiment, the manipulation of one of these display elements may be done completely independent of the other display element.

In one embodiment of a 3D layered user interface, a front input interface may be used to move display elements on a virtual foreground display layer. In another embodiment of a 3D layered user interface, a rear input interface may be used to move display elements on a virtual background display layer.

In various embodiments, there may be display layers with which a user may not interact. For example, in one embodiment, there may be an emphasis display layer situated in front of all other display layers. In the context of the present description, an emphasis display layer refers to a display layer (virtual or physical) which is used to provide visual emphasis to one or more display elements without providing independent means of user interaction. In other words, when a user interacts with a display element located in an emphasis display layer, they might also interact with one or more other layers. For example, in one embodiment, an emphasis display layer may be used to indicate results of a text search within a document (i.e. target words appear to float above the document, etc.). Although located on a different display layer, any text selection made by the user may incorporate text from both the emphasis display layer and the display layer housing the document. In another embodiment, an emphasis display layer may cause hyperlinks within a webpage to appear to float above the rest of the page, though still able to be selected along with non-hyperlink text.

In another embodiment, an emphasis display layer may be used to display user avatars floating above the text of a chat session; the user may not interact with the avatars. Other examples of the use of an emphasis display layer may include, but are not limited to, a status bar floating at the top of a display, pop-up volume indicators which appear when the volume is changed, icons within the status bar, and/or any other circumstance where visual emphasis is desired.

Another example of a display layer with which a user may not interact is an ambiance display layer. In the context of the present description, an ambiance display layer refers to a display layer (virtual or physical) which is used to display decorative display elements with which a user may not directly interact with. For example, in one embodiment, one or more ambiance display layers may be used to create the appearance of three-dimensional structure within the 3D layered user interface (i.e. walls, shelves, backdrop, etc.). In another embodiment, an ambiance display layer may be used to display a wallpaper or some other backdrop which is present behind the elements and controls of the user interface. In yet another embodiment, a user may customize one or more ambiance display layers through a separate user interface, but not through direct interaction.

In one embodiment of a 3D layered user interface, a rear touch input may be used to control display elements located on a virtual display layer. In another embodiment, a rear touch input may be used together with a front touch input to control one or more display elements on one or more virtual display layers.

In other embodiments of a 3D layered user interface, a user may interact with one of a plurality of layers through a back interaction surface, the layer being selected using a pressure-sensitive front interface. For example, in one embodiment, a user may select one of a plurality of display layers by applying a predefined level of contact pressure on the front interaction surface, and interact with the selected layer using a back interaction surface. As an option, 3D depth cues may be used to indicate "moving" through the display layers as the contact pressure is changed (i.e. magnifying and fading display layers as they are passed by, sharpening previously blurry display layers as they grow closer, etc.).

In one embodiment, one or more display layers associated with a 3D layered user interface may only be interacted with through coordinated user input on multiple interaction surfaces. For example, in one embodiment, a touch input on the front of the device together with a touch input on the back of the device may control the overlap between two or more virtual display layers.

In one embodiment, display elements may be assigned to virtual display layers, just as they may be assigned to physical display layers in a layered display device. In another embodiment, the process of assigning display elements to virtual display layers may be the same as the process of assigning display elements to physical display layers in a layered display device. In yet another embodiment, a 3D layered user interface may be designed such that it may take advantage of physical display layers, if present, or use virtual display layers if only single layer displays are available. It should be understood that all functionality and embodiments described with respect to virtual display layers may also be implemented in a layered display device.

In various embodiments, a 3D layered user interface for augmented reality may use 3D depth cues to visually differentiate augmenting display elements associated with physical locations near the user from those associate with distant physical locations. In one embodiment, 3D depth cues may be used to give augmenting display elements an apparent distance from the user roughly equal to the physical location with which they are associated. In another embodiment, 3D depth cues may be used to augment the video signal such that it has a three dimensional appearance.

Figure 23:
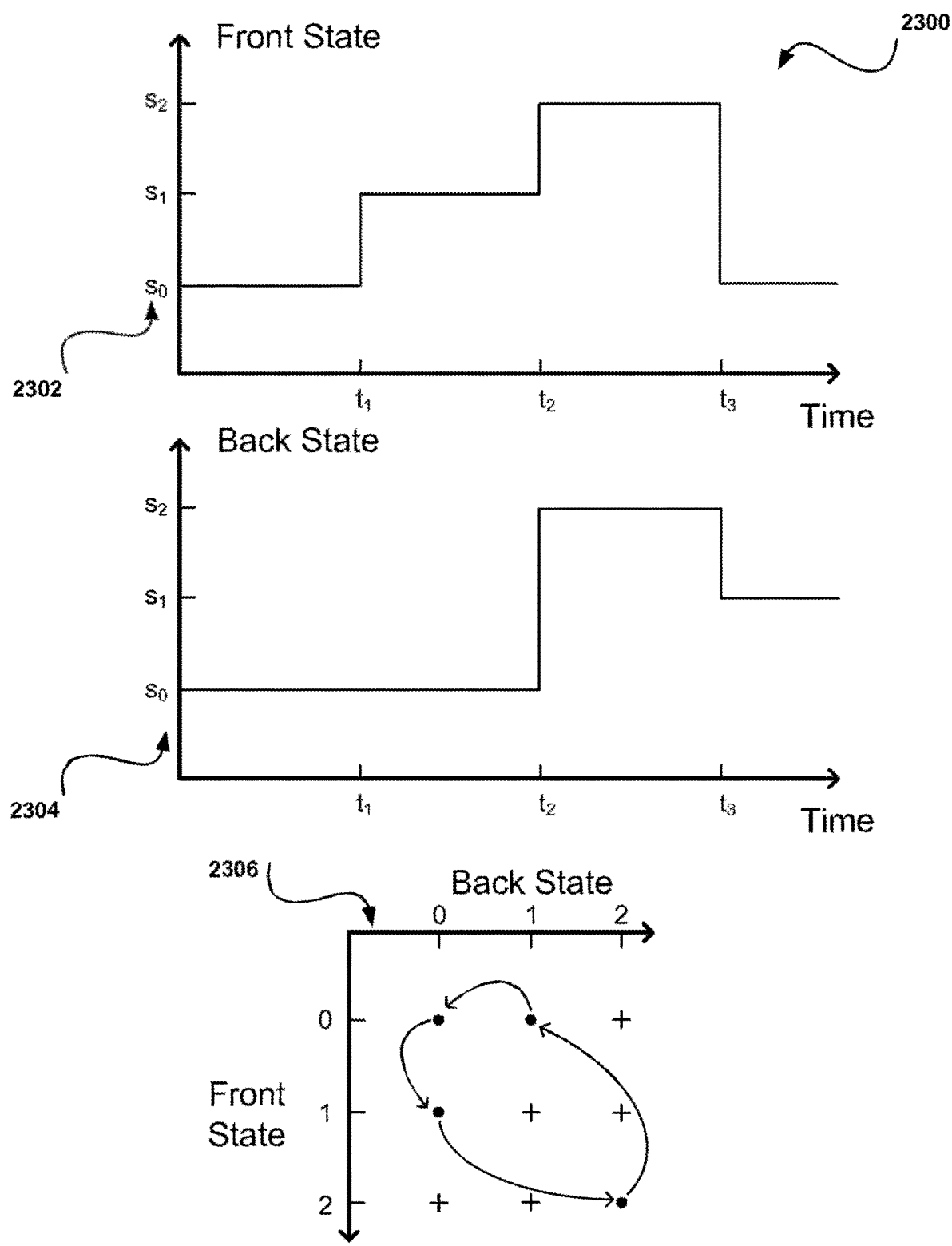
FIG. 23 shows exemplary pattern-based gestures, in accordance with one embodiment.

FIG. 23 shows exemplary pattern-based gestures 2300, in accordance with one embodiment. As an option, the gesture 2300 may be implemented in the context of the architecture and environment of the previous Figures or any subsequent Figure(s). Of course, however, the gesture 2300 may be carried out in any desired environment. It should also be noted that the aforementioned definitions may apply during the present description.

In the context of the present description, a pattern-based gesture refers to a gesture defined, at least in part, by a path through a phase space of one or more dimensions. See, for example, the pattern-based gestures 2300.

In some embodiments, pattern-based gestures may be based upon paths through a phase space whose dimensions do not include any measure of location on an interaction surface. In other words, in these embodiments, pattern-based gestures may not depend upon the location or movement of user interaction across an interaction surface. In one embodiment, these gestures may act as gesture components, which may be combined with other gesture components to form generalized gestures which may or may not be based upon location on or movement across an interaction surface.

See, for example, the pattern-based gesture 2302, described by a phase space path which represents the time evolution of the touch state associated with a contact point located on a front interaction surface. The location of the contact point upon the interaction surface is of no importance.

Pattern-based gesture 2302 is based upon three touch state transitions. At time t1, the contact point changes from touch state s0 to s1. Similar changes of state occur at t2 and t3. In various embodiments, these touch state transitions may be represented by ordered 2-tuples. For example, the first transition may be represented as (s1, t1). The pattern-based gesture itself may be represented as an ordered sequence of state transitions. For example, pattern-based gesture 2302 may be represented as {(s1,t1),(s2,t2),(s0,t3)}.

In other embodiments, pattern-based gestures may be based upon paths through a phase space that may include one or more measures of physical location upon an interaction surface. In other words, there may exist paths through the phase space that describe motion across an interaction surface.

In various embodiments, a pattern-based gesture may be based upon paths through a phase space which does not include time as a dimension. For example, in one embodiment, a pattern-based gesture may be defined by a series of transitions between touch states, where it does not matter how long the individual touch states are maintained.

In other embodiments, a pattern-based gesture may depend upon time to the extent that the entire path through phase space may be completed within a predefined amount of time (though still independent of how much time is spent at each state along the path). In still other embodiments, the gesture may be defined, in part, by the time spent on each leg of the path through phase space.

In one embodiment, a time-independent pattern-based gesture may be combined with a dynamic touch gesture (i.e. a one finger swipe, etc.) to form a generalized gesture.

In various embodiments, a touch state may be associated with a specific contact point upon a pressure-sensitive interaction surface. In other embodiments, the device may not be able to resolve the specific source of pressure exerted upon an interaction surface; in such cases, the pressure may be represented by surface touch states. In the context of the present description, a surface touch state is a partitioning of the range of measurable pressures exerted upon a surface (similar to touch states associated with contact points, but not contact point specific).

In various embodiments, there may exist a subset of generalized gestures referred to as pattern-based generalized gestures. In the context of the present description, a pattern-based generalized gesture refers to a pattern-based gesture which includes input from multiple sources. For example, see pattern-based gesture 2306, which is represented by a path through a two-dimensional phase space.

As shown, gesture 2306 is a pattern-based generalized gesture based upon the evolution of a touch state on a front interaction surface and a back interaction surface of a device, in accordance with one embodiment. The pattern-based gesture components are 2302 and 2304.

As depicted, gesture 2306 is represented by a state transition matrix of touch states, with transitions between touch states marked by directional arrows, in accordance with one embodiment. In the context of the present description, a state transition matrix refers to an iconic depiction of a path through a phase space.

As shown, 2306 represents the phase space made up of all nine possible combinations of the three possible front and back touch states. In one embodiment, these nine combinations may be referred to as touch state points. In another embodiment, the representation may also be shown as three-dimensional, with time as the third dimension.

It should be noted that the use of descriptors such as "front" and "back" in this example are for the sake of simplicity. In various embodiments, gesture 2306 may be performed using any two surfaces on a device, even if the device does not have distinct front and back surfaces. Additionally, in other embodiments, pattern-based generalized gestures such as 2306 may include any number of additional dimensions, each describing a form of user input and/or time.

In various embodiments, a pattern-based generalized gesture may be represented as an ordered sequence of n-tuples. For example, in one embodiment, the gesture 2306 may be represented as a sequence of 2-tuples, (front touch state, back touch state). Specifically, gesture 2306 may be represented as {(s1,s0), (s2,s2),(s0,s1)}. In another embodiment, gesture 2306 may be represented as a sequence of 3-tuples, of the form (front touch state, back touch state, time).

While exemplary gesture 2306 is based on a path through a touch state phase space, pattern-based gestures may also be based upon types and sources of user input which are not broken into discrete states (i.e. contact pressure level, etc.). Additionally, in some embodiments, pattern-based gestures may be defined in terms of the relative states of input, rather than exact. For example, in one embodiment, a pattern-based gesture may be defined in terms of relative pressure. In other words, rather than require that a fixed pressure be achieved, a user may simply cause a particular change in pressure to occur. In one embodiment, such a pattern-based gesture may be defined in terms of gesture attributes, including derived input such as pressure velocity.

In various embodiments, the use of pattern-based gestures based upon relative states may be used to trigger some form of user assistance. These patterns are well suited to trigger some form of user assistance, as they may be performed and recognized in the middle of performing a different gesture. For example, in one embodiment, a pattern-based gesture defined as a rapid 20% decrease and increase of contact pressure of any contact, done three times, may present to the user an interface providing help specific to what the user was doing at the time. Possible contexts include, but are not limited to, providing a list of possible gestures when help is requested during performance of a gesture, application help or manual depending on what application is active, a detailed explanation of a user interface control which was being selected when help was requested, and/or any other scenario where a user is operating the device.

In some embodiments, pattern-based gestures may be recognized in the form of an ordered sequence of tuples using a decision tree. The use of a decision tree, or similar form of logic, has the advantage of being computationally inexpensive. This method may be more appropriate for pattern-based gestures which are represented by paths through an easily enumerated phase space. For example, this method of gesture recognition may be more appropriate for a gesture like 2306 than a similar gesture based upon contact pressure levels, rather than touch states.

In other embodiments, the pattern-based gestures may be recognized using pattern recognition or pattern matching. For example, in one embodiment, pattern-based gestures may be recognized using the methods, or similar methods, as those used to determine a gesture shape in a gesture component. In various embodiments, the pattern-matching algorithms and methods may search for a match within a predefined margin of error.

In one embodiment, pattern recognition or pattern matching to identify pattern-based gestures may be performed by the device. As an option, this functionality may be part of the operating system. In another embodiment, the pattern recognition or pattern matching may be performed using compute resources other than those of the device. Alternative compute resources include, but are not limited to, a similar device, computing resources on a local network, cloud computing resources, and/or any other computing resource. In yet another embodiment, the pattern recognition or pattern matching may be performed using device and/or alternative computing resources combined with help from the user.

In one embodiment, pattern recognition algorithms and methods may search for a match between input and predefined patterns, within a certain probability. In another embodiment, the pattern recognition algorithms may be probabilistic and use statistical inference to find the best pattern match for a given set of input.

In one embodiment, probabilistic pattern recognition algorithms may output a probability that the input being described by a given pattern. In one embodiment, this probability may be reported to the user, either specifically (i.e. displayed as a number or percentage, etc.) or in summary (i.e. a label, a color coded border, an icon, etc.). In another embodiment, this probability may be used to alter or modify a selection. In yet another embodiment, this probability may be used to alter or modify one or more display properties.

In various embodiments, probabilistic pattern recognition algorithms may also determine the n best matches for the given input. In one embodiment, a user may specify the value of n. In another embodiment, these best matches may be reported to the user as a list of gesture names and/or iconic representations of the gestures. As an option, the associated probabilities may be reported as well.

In another embodiment, this list of probable gestures may be displayed to the user in response to a user input, such as a gesture associated with user assistance. In yet another embodiment, this list of probable gestures may be displayed to the user if the recognition algorithms were not able to recognize a gesture with a probability above a predefined threshold. The user may be able to select the intended gesture from the list; upon selection, the associated operation may be performed. As an option, one or more aspects of the list items may depend upon the associated probability of recognition. Possible aspects may include, but are not limited to, text size, button size, color, and/or any other aspect or property that may be associated with the list.

As a specific example, in one embodiment, the user may be typing on a soft keyboard and performs a gesture. The device then determines with probability 80% the gesture corresponds to pressing the letter W, with probability 15% the gesture corresponds to pressing Q, and with probability 5% that the user intended to press E. In this situation, the device may enlarge the W key by a large amount, enlarge the W key by a smaller amount, and enlarge the Q key by a still smaller amount.

In addition to gesture recognition, various embodiments may also perform user intent prediction. In the context of the present description, gesture prediction refers to a process of estimating user intent by assigning probabilities to candidate gestures based upon historical and real time use data. For example, in one embodiment, In various embodiments, the process of gesture recognition may include the computation of the probability of user intent. In the context of the present description, computation of the probability of user intent refers to the process of assigning probabilities to potential user actions, inputs, and intentions, based upon historical and current use data. Examples of historical data include, but are not limited to, often misspelled words, actions consistently followed by a correction, utilization of particular gestures in different use scenarios, and/or any other data which may establish a use pattern.

The estimation of user intent may enhance the user experience by making the device more responsive to user input. In various embodiments, computation of the probability of user intent may facilitate the entry of text though an interaction surface. For example, in one embodiment, frequently made spelling mistakes may be automatically corrected. In another embodiment, the user may be prompted with the word determined to be most likely to be what the user is intending to type.

As an option, the user may be able to accept or decline proposed word completions or proposed spelling corrections through a pressure-based gesture. For example, in one embodiment, a user may accept or decline a proposed completion or correction with a series of taps on a backtouch interface (i.e. one tap for accept, two taps for decline), in addition to keyboard based methods. In another embodiment, a user may be presented with a plurality of possible words to be used for auto completion. As an option, these words may be ordered depending upon a probability based upon historical usage. The words may be presented to the user in a line, with one word highlighted as a selection. In another embodiment, a user may cycle through proposed words with a backtouch gesture, such as a single finger swipe in the direction the words should be cycled in. Of course, these actions may be associated with any other type of gesture, including pattern-based gestures.

In various embodiments, gesture recognition may be enhanced by computation of the probability of user intent. For example, in one embodiment, probabilities may be assigned to potential gestures based upon historical gesture usage with similar context (i.e. application, selection mode, etc.). In another embodiment, estimated user intent may give weight to certain gestures during the recognition process. In this way, the gesture recognition process may be performed more efficiently, by considering the most likely gestures early in the process.

In various embodiments, the computation of the probability of user intent may affect the user interface. In various embodiments, the user interface may adapt in response to the user's intended form of interaction. For example, in one embodiment, upon determining that the probability that the user is performing a virtual control knob gesture has exceeded a predefined probability, and certain context requirements have been satisfied, a virtual control knob may appear for the user to interact with. In this way, the user is given visual feedback that their input is being received in the manner they intended. Examples of context requirements may include, but are not limited to, the user performing the gesture in the vicinity of a user interface object which may be controlled via a virtual control knob (i.e. slider, date, time, etc.), the virtual control knob gesture has not been reassigned to a different function by the active application, and/or any other requirement to ensure that a virtual control knob only appears when the user so intends.

Pattern-based gestures may be simple to perform and easy for a user to remember. For this reason, they are well suited to a number of applications. One of the most basic pattern-based gestures is the finger press. In various embodiments, a pattern-based gesture made up of one or more fluctuations of contact pressure between a low level and a higher level at a single contact point may be associated with often used operations. For example, in one embodiment, a double press (i.e. increase then decrease contact pressure twice) may activate an interface to switch between active applications in a multitasking environment. In another embodiment, a triple press may activate a pop-up menu populated with iconic representations of the user's preferred actions, contacts, applications, and scripts. In one embodiment, these gestures may be surface agnostic. For example, the application switching interface may be activated no matter which interaction surface received the double press. In another embodiment, these gestures may be surface specific, allowing other system processes and applications to assign operations to these simple gestures without colliding with a system-wide gesture. For example, a triple press on a side surface may activate a pop-up favorites menu, while a triple press on a back surface may activate an application-specific contextual menu.

Another simple pattern-based gesture is the pinch gesture. In various embodiments, this gesture is performed by making simultaneous contact with two different interaction surfaces such a line connecting the two contact points is roughly parallel to the force vectors being applied at said points. An example is pinching a device between a finger and a thumb, the finger and thumb contacting different interaction surfaces. In another embodiment, this gesture may be pressure based. Variations on this gesture may incorporate multiple pinches (i.e. fluctuations of contact pressure between a low level and a higher level, similar to the finger presses previously described).

These simple gestures may be associated with often used operations, including but not limited to, activating device interfaces (i.e. backtouch interface, proximity sensitivity, pressure sensitivity, etc.), displaying a common system interface (i.e. application launcher, system settings, etc.), displaying a menu of user defined "favorites" (i.e. applications, contacts, songs, movies, web bookmarks, recently used documents, etc.), mute volume, and/or any other often used interface or operation. Of course, in other embodiments, these gestures may be associated with any operation, function, or interface.

Building off the previous gesture, a pinch slide gesture is an example of a pattern-based generalized gesture which combines a pinch with a sliding motion. In some embodiments, it may be described as a 1-6 gesture, though it is not limited to just front/back interaction. In various embodiments, this gesture may be performed by pinching the device, then sliding the pinch across the interaction surfaces while maintaining contact. In one embodiment, a contact pressure above a predefined threshold may also be required. This gesture mimics the tactile experience of pushing or pulling an object such as a lever or cord.

In one embodiment, a pinch slide gesture may be used to quickly move through an alphabetical list, similar to using tabs to quickly find a contact quickly in a paper address book. In another embodiment, this operation may be adopted to moving quickly through other sorted lists of items, including but not limited to song lists, application lists, eBooks, and/or any other collection of organized data. As an option, the display may invite the use of this gesture by displaying virtual tabs (i.e. the alphabet, numbers, etc.) along a side of the display where the gesture would be performed.

In another embodiment, a pinch slide gesture may be used to quickly select text. For example, in one embodiment, a selection may be initiated by pinching at the desired location. The selection may be expanded by sliding the pinch to the desired selection end. In another embodiment, this method of selection may be adapted to selecting a portion of an image or graphic (i.e. pinch at one corner of desired selection bounding box and sliding to opposite corner, etc.).

In another embodiment, a pinch slide may be used to move quickly through a large document (i.e. word processing document, web page, image, etc.). For example, in one embodiment, the user may slide a pinch up and down the device, changing the displayed portion of the document relative to the position of the pinch (i.e. the top of the device represents the start of the document, the bottom of the device represents the end, and the relative location of the pinch becomes the portion of the document displayed. In another embodiment, the pinch slide may have to be initiated at a particular location to activate this document navigation functionality. For example, a web browser may have an icon near the top of the display that activates pinch slide navigation when the gesture is initiated on the icon. This functionality may be adapted to two dimensional navigation in a large image, displaying the portion of the image represented by the relative location of the pinch.

In yet another embodiment, a pinch slide gesture may be used to display menus of common operations or applications. For example, in one embodiment, a pinch slide gesture which begins near an edge of a display and then moves inward may cause a menu or window to slide in from that edge of the display. As an option, the menu or window may remain visible until a selection is made. In another embodiment, there may be different menus or windows associated with each edge of a display. In still another embodiment, a window may be closed (i.e. slid back out of view) by using a pinch slide to pull it out a bit farther, then releasing it, similar to rolling up a window shade.

The pinch slide gesture is well adapted for providing input where one of a plurality of values may be chosen; it is also easily combined with a pinch gesture. For example, in one embodiment, a user may activate a system and/or ringer volume slider with a double press pinch gesture, and then select a volume by sliding the pinch up and down the device. In another embodiment, a similar operation may be performed for backlight brightness. In yet another embodiment, a user may cycle between system volume, ringer volume, and system brightness sliders with a pinch gesture, and be able to interact with said sliders using a pinch slide. In still another embodiment, the selection of system/ringer volume or brightness may be determined by where on the device the pinch slide is being performed (i.e. left, middle, right, etc.).

A subset of pinch gestures are the side pinch gestures. In various embodiments, the side pinch gesture is performed by applying contact pressure beyond a threshold value to opposite sides of the device, the sides being those other than the front and back. As an option, the user may choose the predefined threshold value. In one embodiment, the pressure may be applied at contact points located on the sides such that a line connecting the contact points is roughly normal to the sides. In another embodiment, the side pinch gesture may also incorporate "presses" similar to the pinch and finger press gestures.

The side pinch gesture is a simple gesture well adapted for use with often used operations. For example, in one embodiment, a side pinch gesture may toggle the device mute, or activate an application launcher.

A variation on the side pinch gesture is the squeeze gesture. In various embodiments, a squeeze gesture is performed by applying contact pressure beyond a predefined threshold to one or more contact points located on opposite sides of the device. For example, in one embodiment, the gesture may be performed by holding the device in one hand, in a natural grip, and applying pressure to two opposite sides by squeezing. As an option, the squeeze gesture may incorporate "presses", similar to the finger press and pinch gestures.

The squeeze gesture is one of the easiest gestures to perform, and may be reserved for operations which are to be available system wide, independent of what application is running. In various embodiments, the squeeze gesture may be associated with commonly used operations. For example, in one embodiment, a double press squeeze gesture may be used to answer a phone call. In another embodiment, a double press squeeze gesture may be used to indicate an affirmative response to any on screen query (i.e. accept proposed auto correction, accept proposed auto completion, activate "ok" button in dialog boxes, etc.). As an option, a complementary negative response gesture may be defined as well, a gesture such as the combination of a single or double tap on the top side while squeezing the left and right sides.

In another embodiment, applying a squeeze gesture for a predefined amount of time may be associated with a delete operation, to be performed upon any selected or active object. As an option, the delete operation may be accompanied by a "crumpling paper" animation routine, as well as a prompt for user confirmation. In one embodiment, a user may not use a squeeze gesture to confirm an operation triggered by a squeeze operation (i.e. to prevent accidental implementation, etc.).

Another class of pattern-based gestures are the "no contact" pressure-based gestures. In some embodiments, the touch sensitive interaction surfaces require an implement of interaction which has a certain degree of conductivity in order to register contact. This class of gestures may be implemented in such devices, which are also pressure-sensitive. In various embodiments, the "no contact" pressure-based gestures may be used to interact with the device in situations where direct contact is not possible (i.e. device is in case, device is in pocket, device is in purse, etc.).

In various embodiments, the "no contact" pressure-based gestures may include variations of the finger press, pinch, and squeeze gestures, in addition to others. In some embodiments, "no contact" pressure-based gestures may require that the pressures being exerted do not create a contact point (i.e. pressure is exerted, but touch contact is not registered). These gestures are well adapted to situations where contact is not feasible. For example, in one embodiment, a user may silence a ringing phone by performing a rapid, one-finger double press on an interaction surface while the device is in the user's pocket, purse, or any other flexible or semi-flexible vessel. In another embodiment, a user may perform a predefined pattern-based gesture to cause the most recently received communication (i.e. voice mail, email, SMS message, etc.) to be reported to the user through a Bluetooth audio device.

In various embodiments, gestures may be used to trigger a variety of activities.

Figure 24:
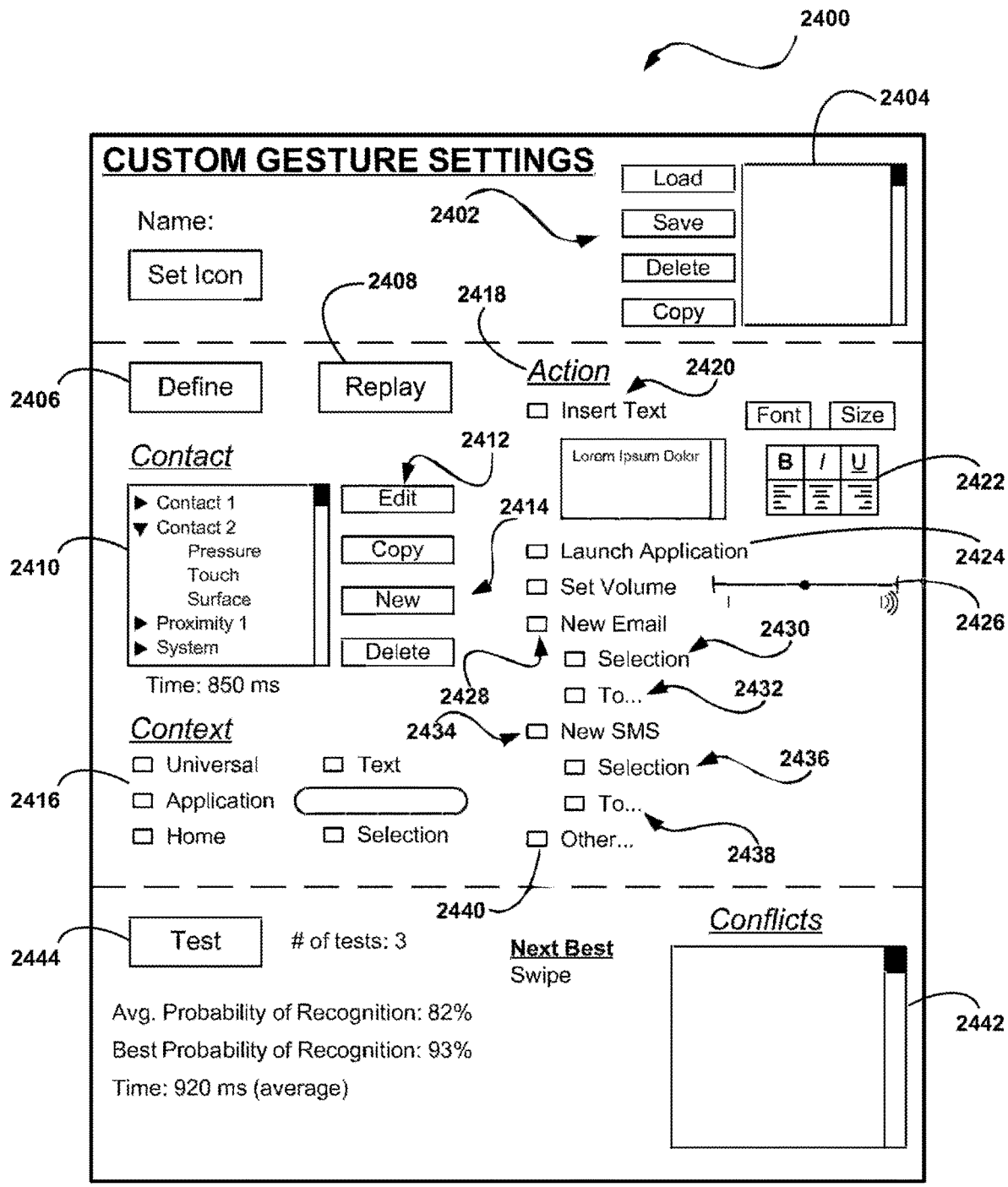
FIG. 24 shows a user interface for defining custom gestures, in accordance with one embodiment.

FIG. 24 shows a user interface 2400 for defining custom gestures, in accordance with one embodiment. As an option, the user interface 2400 may be implemented in the context of the architecture and environment of the previous Figures or any subsequent Figure(s). Of course, however, the user interface 2400 may be implemented in any desired environment. The aforementioned definitions may apply during the present description.

In various embodiments, gestures may be programmed by the user. In other embodiments, gestures may be learned by the device.

As shown, the user interface 2400 may be utilized to define a custom gesture. For example, in one embodiment, the user interface may include a gesture name and/or an iconic representation of the gesture. In another embodiment, the iconic representation may be automatically chosen by the system, depending upon defined gesture parameters. In yet another embodiment, the user interface may contain a plurality of buttons 2402 which allow a user to save, load, copy, and/or delete custom gestures. The user interface may also contain a list 2404 of all defined custom gestures. As an option, the custom gestures may be grouped by context within the list.

In various embodiments, the user interface 2400 may contain a button 2406 to allow the user to define a custom gesture. In one embodiment, selecting button 2406 may initiate a gesture recording session. In the context of the present description, a gesture recording session refers to a period of time wherein the device monitors and records all observable user and system input. In another embodiment, selecting button 2406 may present to the user an interface with instructions before initiating a gesture recording session. Instructions may include, but are not limited to, how to record the gesture, a list of all forms of input upon which a gesture may depend, how to end the recording, and/or any other information which may assist the user. In yet another embodiment, the user may be presented with a short countdown before the gesture recording session is initiated, to give the user time to prepare for the recording. As an option, the device may give some form of visual or auditory feedback to the user to indicate that the recording session has begun.

In various embodiments, a gesture recording session may be terminated by user input. For example, in one embodiment, a gesture recording session may be terminated by the user through a vocal command, recognized by the system. In another embodiment, a gesture recording session may be terminated by the user through an sound which exceeds a predefined volume. In yet another embodiment, a gesture recording session may be terminated by the user by performing a gesture. As an option, the termination gesture may be a reserved gesture.

In the context of the present description, a reserved gesture refers to a gesture which may not be reassigned by a user, application, or process. For example, in one embodiment, there may be a set of gestures, chosen for their simplicity, which are reserved for operations fundamental to the user experience (i.e. a gesture to cycle through active applications running in a multitasking environment, etc.).

In still another embodiment, a gesture recording session may be terminated automatically after a predefined amount of time has elapsed. As an option, in one embodiment the user may specify the amount of time before the recording session begins.

In one embodiment, after the termination of a gesture recording session, the user may be prompted to repeat the gesture one or more times. As an option, the user may not have to indicate when the gesture is complete after the first recording session. In another embodiment, the repeated performance of the gesture may be used to better define the gesture parameters. For example, in one embodiment, gesture aspects which do not appear in every performance of the gesture may be indicated to the user as potentially irrelevant. In another embodiment, the system may use each iteration to improve the recorded description of the gesture. For example, the system may calculate the probability of correct recognition, using methods previously discussed, after each performance. As an option, the user may be prompted to repeat the gesture until the calculated probability of correct recognition has exceeded a predefined threshold.

In various embodiments, the user interface 2400 may include a button 2408 to allow a user to view a depiction of the performance of the custom gesture as currently defined. For example, in one embodiment, selecting button 2408 may display an animated recreation of the gesture in the context of a wireframe model of the device. In another embodiment, different forms of user input may be represented by different colors (i.e. pressure is red, touch is blue, proximity is green, etc.). As an option, changes in contact pressure level may be represented by changes in the color representing pressure. In another embodiment, the device surfaces may be displayed flattened into a two dimensional plane. In still another embodiment, the gesture replay may also include one or more plots which depict the time evolution of various gesture inputs, such as contact pressure or proximity associated with individual contacts or implements of interaction.

In various embodiments, the user interface 2400 may include a list 2410 displaying all components of the currently defined gesture. For example, in one embodiment, list 2410 may be a nested hierarchical list, grouped by "expected implement of interaction" and input type (i.e. contact 1, contact 2, proximity 1, etc.). In another embodiment, list 2410 may visually indicate (i.e. italicized, colored, underlined, etc.) recorded gesture aspects which were determined to be potentially irrelevant to the gesture. In yet another embodiment, list 2410 may break down the input from each "expected implement of interaction" into basic input categories. Categories may include, but are not limited to, pressure, touch, surface identity, proximity, proximity location, and/or any other aspect or type of user input.

The user interface 2400 may be utilized to specifically define or modify aspects of a custom gesture. For example, in one embodiment, the user interface 2400 may include a button 2412 to edit a gesture aspect selected in list 2410. In another embodiment, selecting button 2412 may present an interface to the user which may allow them to review and alter associated gesture aspects. This method of defining the gesture may not be as intuitive as teaching the system the gesture through repeated performance, but it does allow much greater control over the gesture aspects.

In one embodiment, the user interface 2400 may include a plurality of buttons 2414 which allow a user to copy, create, and delete gesture aspects associated with the current gesture. In another embodiment, the creation of a new gesture aspect may prompt the user to specify the input type to create, and with which "expected implement of interaction" it should be associated. As an option, a user may create a new "expected implement of interaction".

In one embodiment, the user interface 2400 may include a collection of check boxes 2416 which allow a user to specify the context in which the custom gesture may be performed. The contexts may include, but are not limited to, universal (i.e. available at all times), text (i.e. active text field, on-screen keyboard visible, etc.), application-specific, home (i.e. application chooser, etc.), selection (i.e. an active selection of an object exists), and/or any other type of context.

When defining a custom gesture, the associated action may be established. As shown, user interface 2400 may be utilized to specify and configure the action to be associated with the present gesture. For example, in one embodiment, the user interface may include a collection of checkboxes 2418 representing different actions which may be associated with the custom gesture.

In one embodiment, the collection of actions 2418 may include a checkbox 2420 to indicate that the gesture may trigger the insertion of a text snippet, as defined in a nearby text field. In another embodiment, the user interface may include a collection of buttons 2422 which may be used to format the text snippet. As an option, the text snippet may be defined as plain text, without formatting.

In another embodiment, the collection of actions 2418 may include a checkbox 2424 to indicate that the gesture may cause an application to launch. The user interface 2400 may also include a button which allows the user to specify which application should be launched when the gesture is performed.

In another embodiment, the collection of actions 2418 may include a checkbox 2426 to indicate that the gesture may set the system volume to a specified level. As an option, the user may be able to specify whether the gesture sets the system volume or a ringer volume. The user interface 2400 may also include a slider which allows the user to specify the volume to be associated with the present gesture.

In another embodiment, the collection of actions 2418 may include a checkbox 2428 to indicate that the gesture may trigger the creation of a new email message. In yet another embodiment, the user interface 2400 may include a checkbox 2430 to indicate, if the gesture is performed while an object is selected, whether the selected object should be inserted into the new email message. Possible objects may include, but are not limited to, images, text, video, files, and/or any other selectable media, file, or other kind of object. In still another embodiment, the user interface 2400 may also include a checkbox 2432 to indicate that the new email message should be addressed to a particular contact. As an option, the user may be able to choose the email address from a list of the user's contacts.

In another embodiment, the collection of actions 2418 may include a checkbox 2434 to indicate that the gesture may trigger the creation of a new SMS message. In yet another embodiment, the user interface 2400 may include checkboxes 2436 and 2438 to indicate the inclusion of a selected object and/or specific destination for the message, similar to the "new email message" action previously described. As an option, if a specific recipient is not specified, the new SMS message may be directed to the most recent SMS message sender.

In another embodiment, the collection of actions 2418 may include a checkbox 2440 to indicate that the gesture may take advantage of functionality provided by third party applications. In various embodiments, developers of third party applications may be able to provide functionality hooks that may be implemented by other applications or the operating system. For example, in one embodiment, a social networking application may allow the user to associate the custom gesture with the creation of a new posting within the social network.

In other embodiments, possible actions which may be associated with a user defined gesture may include, but are not limited to, a favorite contact (i.e. gesture displays a pop-up interface with buttons representing different methods of communicating with the contact, including but not limited to telephone, email, SMS, social networks, etc.), a predefine energy saving profile, a predefined set of application preferences, and/or any often repeated activity.

The user interface 2400 may be utilized to determine whether the custom gesture may conflict with already established gestures. For example, in various embodiments, the user interface may include a list 2442 of conflicting gestures. In one embodiment, the list of conflicts may be made up of other custom gestures, as well as system defined gestures. In another embodiment, the list may also include application specific gestures.

In yet another embodiment, items in the conflict list may be formatted to indicate their severity. For example, conflicting reserved gestures may be highlighted in red, while conflicting gestures which only exist in a single application may be slightly greyed out. In various embodiments, the conflict list may be created using pattern recognition methods previously discussed, or other methods and algorithms capable of matching patterns and/or data.

The user interface 2400 may be utilized to test a custom gesture, in accordance with one embodiment. For example, in various embodiments, the user interface may include a button 2444 which presents the user with an interface which allows them to test the custom gesture as it is currently defined. In one embodiment, the gesture testing interface may provide the user with a plurality of forms of feedback. Feedback may include, but is not limited to, current contact pressure level associated with each contact point, current touch state associated with each contact point, probability of correct gesture recognition, current gesture time, a visual representation of previous contact points, and/or any other form of user feedback.

In one embodiment, user interface 2400 may include statistics collected as a result of the gesture testing process. These statistics may include, but are not limited to, number of tests run with the current gesture configuration, average probability of correct gesture recognition, best probability of correct gesture recognition, identity of next most likely identified gesture (i.e. next closest gesture), minimum gesture performance time, maximum gesture performance time, average gesture performance time, and/or any other statistic related to the testing process.

In some embodiments, user defined gestures may be recognized in any context they were intended for. In other embodiments, a user may have to perform a predefined activation gesture before using a custom gesture.

As a specific example of how custom gestures may be utilized, in one embodiment, a user may define a gesture which is comprised of a triple finger press on a top side, followed by a singer finger swipe across a back interaction surface. The user may associate this gesture with a favorite contact. Upon performing this gesture, the user may be presented with a window showing a picture of the contact in addition to buttons linked to their telephone number and email address. In this way, communication may be established with this contact, at any time, with nothing more than a gesture and a button press.

The various embodiments set forth herein may be implemented in a variety of devices including, but not limited to, consumer devices, phones, cell phones, internet phones, music players, video players, cameras, social interaction devices, radios, TVs, watches, personal communication devices, electronic wallets, smart jewelry, personal computers, tablets, laptop computers, embedded systems, electronic glasses, and/or any other device that includes one or more sensors or inputs. Possible inputs may include, but are not limited to, keyboard, mouse, touchscreen(s), touchpad(s), interaction surfaces, a joystick, touchwheel, touchknob, touchbutton, touchball, trackball, scroll wheel, thumbmouse, switch, button, wheel, knob, ball, pedal, voice recognition, audio command, audio prompt, gaze control, eye tracking, head position sensing, facial and/or gestural and/or postural expression recognition, and/or other inputs and combinations of these. Possible sensors may include, but are not limited to, range sensors, scanners, magnetometers, GPS receivers, accelerometers, cameras, depth sensors, light-field cameras, ambient light sensors, pressure sensors, infra-red (IR) sensors, UV sensors, touch and/or proximity sensor(s), grasp sensors, material sensors, chemical sensors, physical sensors, electrical sensors, biological sensors, weight sensors, force sensors, mass sensors, gas sensors, vapor sensors, particle sensors, wireless sensors, RF and other electromagnetic sensors, and/or other sensors and combinations of these.

In various embodiments, the device may include one or more different forms of displays and/or other outputs including, but not limited to, physical or other actuators, motors, tactile feedback or other tactile output, weight or mass feedback, force feedback or other force outputs, mechanical outputs, audio outputs, alarms, horns, bells, indicators, dials, meters, barcodes and/or other display patterns, vibrations, ultrasonic outputs, wireless and RF outputs, optical and light outputs, avatars, visual outputs, multiscreen displays, multilayer displays, 3D displays, holographic projections and outputs, laser displays and other laser outputs, projection systems, heads-up displays, and/or other outputs or combinations of these.

In various embodiments, the device may support one or more types of applications including, but not limited to, search applications, contacts and/or friends applications, messaging applications, telephone applications, video conferencing applications, e-mail applications, communications applications, voice recognition applications, instant messaging (IM) applications, blog and/or blogging applications, photographic applications, shopping applications, payment applications, digital camera applications, digital video camera applications, web browsing and browser applications, digital music player applications, digital video player applications, cloud applications, office productivity applications, and/or other types of applications or combinations or multiple instances of these.

In other embodiments, different applications on the device may use one or more interface devices that may be physical interface devices or virtual interface devices including, but not limited to, touchscreens, touchpads, soft inputs, hard inputs, keyboards, buttons, knobs, sliders, switches, and/or any other kind of interface device.

In various embodiments, the device may have a common physical architecture (i.e. display, touchscreen, etc.) such that the device may be used with different applications with one or more common user interfaces with one or more common properties (i.e. easy to use, simple, intuitive, transparent, etc.).

In various embodiments, user interfaces may include one or more physical interface devices (i.e. keyboard, joysticks, buttons, sliders, switches, knobs, other hard inputs, etc.) and/or one or more virtual or soft interface devices (i.e. soft keyboard, programmable buttons, UI sliders, UI knobs, check boxes, text fields, other soft inputs, etc.).

In various embodiments, the device may implement one or more types of keyboard (i.e. soft keyboard, physical keyboard, virtual keyboard, keypad, etc.). In one embodiment, the keyboard(s) may include standard keyboard arrangements (i.e. QWERTY configurations, etc.), and/or non-standard arrangements and/or symbols on the keys (i.e. soft keys, buttons, pixels, displayed icons etc.). In another embodiment, the keyboard(s) may include a reduced number of symbols (i.e. letters, icons, soft keys, etc.) compared to the number of keys on a conventional physical keyboard. In yet another embodiment, one or more alternative keyboards may make it easier for users to select one or more symbols in the keyboard, and thus, one or more corresponding representations (i.e. letter, number, special symbol, graphics, emoticon, abbreviation, slang, acronym, etc.). In still another embodiment, one or more keyboards and their associated contents and/or layouts may be modified. For example, in one embodiment, one or more displayed symbols on the keyboard may be modified in accordance with application, application state, device state, settings (i.e. language, etc.), and/or user actions.

In various embodiments, one or more keyboards may be customized to one or more applications and/or users. For example, in one embodiment, one or more keyboard embodiments may be customized to one or more users based on factors including, but not limited to, application states, stored application history, web cookies, a word usage history (i.e. lexicography, slang, individual usage, etc.), language, country, and/or any other factor. In another embodiment, one or more keyboards may be modified to reduce the probability of user error when selecting one or more keys when using the soft keyboards.

In various embodiments, the device may have multiple functions or roles including, but not limited to, telephone, video conferencing, e-mail, instant messaging, blogging, digital photography, digital video, web browsing, digital music playing, social interaction, shopping, searching, and/or any other function or role. As an option, instructions for performing the device functions may be included in a computer readable storage medium, or as a computer program product configured for execution by one or more processors.

In various optional embodiments, the features, capabilities, and/or technology, etc. of the tablets, mobile devices, computing devices, networks, hardware, and/or software, etc. disclosed in the following patents/applications may or may not be incorporated into any of the embodiments disclosed herein: U.S. Pat. Nos. 7,479,949; 7,748,634; US20060017692; US20100188268; US20110145692; U.S. Pat. No. 7,954,101; US20070103454; US20100210329; US20070091825; US20060013219; U.S. Pat. No. 7,916,166; US20090213205; US20070296805; US20100205148; US20100188473; U.S. Pat. Nos. 7,441,196; 7,894,641; 7,966,578; 7,479,949; U.S. Provisional Application No. 61/470,336, filed Mar. 31, 2011, titled "SYSTEM, METHOD, AND COMPUTER PROGRAM PRODUCT FOR UTILIZING IMAGE RECOGNITION TO PERFORM AN ACTION"; U.S. Provisional Application No. 61/470,391, filed Mar. 31, 2011, titled "SYSTEM, METHOD, AND COMPUTER PROGRAM PRODUCT FOR ENABLING A PERIPHERAL DEVICE TO UTILIZE FUNCTIONALITY ASSOCIATED WITH A MOBILE DEVICE"; and U.S. Provisional Application No. 61/569,213, filed Dec. 9, 2011, titled "SYSTEM, METHOD, AND COMPUTER PROGRAM PRODUCT FOR MODIFYING CONTENT." Each of the foregoing patents/applications are hereby incorporated by reference in their entirety for all purposes.

(1) U.S. patent application Ser. No. 10/188,182 (US 2003-0076306 A1), "Touch Pad For Handheld Device," filed Jul. 1, 2002; (2) U.S. patent application Ser. No. 10/722,948 (US 2005-0110768 A1), "Touch Pad For Handheld Device," filed Nov. 25, 2003; (3) U.S. patent application Ser. No. 10/643,256 (US 2005-0052425 A1), "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862 (US 2006-0097991 A1), "Multipoint Touchscreen," filed May 6, 2004; (6) U.S. patent application Ser. No. 10/903,964 (US 2006-0026521 A1), "Gestures For Touch Sensitive Input Devices," filed Jul. 30, 2004; (7) U.S. patent application Ser. No. 11/038,590 (US 2006-0026535 A1), "Mode-Based Graphical User Interfaces For Touch Sensitive Input Devices" filed Jan. 18, 2005; (8) U.S. patent application Ser. No. 11/057,050 (US 2006-0181517 A1), "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749 (US 2006-0197753 A1), "Multi-Functional Hand-Held Device," filed Mar. 3, 2006; and (11) U.S. patent application Ser. No. 29/281,695, "Icons, Graphical User Interfaces, and Animated Graphical User Interfaces For a Display Screen or Portion Thereof," filed Jun. 28, 2007. All of these applications are incorporated by reference herein in their entirety.

The soft keyboard embodiments may include standard (QWERTY) and/or non-standard configurations of symbols on the displayed icons of the keyboard, such as those described in U.S. patent application Ser. No. 11/459,606 (US 2007-0152978 A1), "Keyboards For Portable Electronic Devices," filed Jul. 24, 2006, and Ser. No. 11/459,615 (US 2007-0152980 A1), "Touch Screen Keyboards For Portable Electronic Devices," filed Jul. 24, 2006, the contents of which are hereby incorporated by reference in their entirety.

A quick press of the push button may disengage a lock of the touch screen or begin a process that uses gestures on the touch screen to unlock the device, as described in U.S. patent application Ser. No. 11/322,549 (US 2007-0150842 A1), "Unlocking a Device by Performing Gestures on an Unlock Image," filed Dec. 23, 2005, which is hereby incorporated by reference in its entirety.

A touch-sensitive display in some embodiments of the touch screen may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety.

A touch-sensitive display in some embodiments of the touch screen may be as described in the following applications: (1) U.S. patent application Ser. No. 11/381,313 (US 2007-0257890 A1), "Multipoint Touch Surface Controller," filed May 2, 2006; (2) U.S. patent application Ser. No. 10/840,862 (US 2006-0097991 A1), "Multipoint Touchscreen," filed May 6, 2004; (3) U.S. patent application Ser. No. 10/903,964 (US 2006-0026521 A1), "Gestures For Touch Sensitive Input Devices," filed Jul. 30, 2004; (4) U.S. patent application Ser. No. 11/048,264 (US 2006-0026536 A1), "Gestures For Touch Sensitive Input Devices," filed Jan. 31, 2005; (5) U.S. patent application Ser. No. 11/038,590 (US 2006-0026535 A1), "Mode-Based Graphical User Interfaces For Touch Sensitive Input Devices," filed Jan. 18, 2005; (6) U.S. patent application Ser. No. 11/228,758 (US 2006-0033724 A1), "Virtual Input Device Placement On A Touch Screen User Interface," filed Sep. 16, 2005; (7) U.S. patent application Ser. No. 11/228,700 (US 2006-0053387 A1), "Operation Of A Computer With A Touch Screen Interface," filed Sep. 16, 2005; (8) U.S. patent application Ser. No. 11/228,737 (US 2006-0085757 A1), "Activating Virtual Keys Of A Touch-Screen Virtual Keyboard," filed Sep. 16, 2005; and (9) U.S. patent application Ser. No. 11/367,749 (US 2006-0197753 A1), "Multi-Functional Hand-Held Device," filed Mar. 3, 2006. All of these applications are incorporated by reference herein in their entirety.

The proximity sensor may perform as described in U.S. patent application Ser. No. 11/241,839 (US 2006-0161871 A1), "Proximity Detector In Handheld Device"; Ser. No. 11/240,788 (US 2006-0161870 A1), "Proximity Detector In Handheld Device"; Ser. No. 11/620,702 (US 2008-0167834 A1), "Using Ambient Light Sensor To Augment Proximity Sensor Output"; Ser. No. 11/586,862 (US 2007-0075965 A1), "Automated Response To And Sensing Of User Activity In Portable Devices"; and Ser. No. 11/638,251 (US 2008-0140868 A1), "Methods And Systems For Automatic Configuration Of Peripherals," which are hereby incorporated by reference in their entirety.

The accelerometer may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety.

Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067 (US 2008-0320391 A1), "Portable Multifunction Device, Method, and Graphical User Interface for Playing Online Videos," filed Dec. 31, 2007, the content of which is hereby incorporated by reference in its entirety.

Processes that use gestures on the touch screen to unlock the device are described in U.S. patent application Ser. No. 11/322,549 (US 2007-0150842 A1), "Unlocking A Device By Performing Gestures On An Unlock Image," filed Dec. 23, 2005, and Ser. No. 11/322,550 (US 2007-0150826 A1), "Indication Of Progress Towards Satisfaction Of A User Input Condition," filed Dec. 23, 2005, which are hereby incorporated by reference in their entirety.

In some embodiments, a user may rearrange the icons in UI, e.g., using processes described in U.S. patent application Ser. No. 11/459,602 (US 2007-0157089 A1), "Portable Electronic Device With Interface Reconfiguration Mode," filed Jul. 24, 2006, which is hereby incorporated by reference in its entirety.

In some embodiments, UI includes a gauge (not shown) that displays an updated account usage metric for an account associated with usage of the device (e.g., a cellular phone account), as described in U.S. patent application Ser. No. 11/322,552 (US 2007-0149252 A1), "Account Information Display For Portable Communication Device," filed Dec. 23, 2005, which is hereby incorporated by reference in its entirety.

Additional description of insertion marker positioning can be found in U.S. patent application Ser. No. 11/553,436 (US 2008-0259040 A1), "Method, System, And Graphical User Interface For Positioning An Insertion Marker In A Touch Screen Display," filed Oct. 26, 2006, and U.S. Provisional Patent Application No. 60/947,382, "Portable Multifunction Device, Method, and Graphical User Interface for Adjusting an Insertion Point Marker," filed Jun. 29, 2007, and U.S. patent application Ser. No. 11/923,453 (US 2008-0165142 A1), "Portable Multifunction Device, Method, and Graphical User Interface for Adjusting an Insertion Point Marker," filed Oct. 24, 2007, the contents of which are hereby incorporated by reference herein in their entirety.

Additional description of instant messaging on portable electronic devices can be found in U.S. Provisional Patent Application Nos. 60/883,819, "Portable Electronic Device For Instant Messaging," filed Jan. 7, 2007, and 60/946,969, "Portable Electronic Device For Instant Messaging," filed Jun. 28, 2007, and U.S. patent application Ser. No. 11/848,208 (US 2008-0055269 A1), "Portable Electronic Device for Instant Messaging," filed Aug. 30, 2007, the contents of which are hereby incorporated by reference in their entirety.

Additional description of deletion gestures on portable electronic devices can be found in U.S. Provisional Patent Application Nos. 60/883,814, "Deletion Gestures On A Portable Multifunction Device," filed Jan. 7, 2007 and 60/936,755, "Deletion Gestures On A Portable Multifunction Device," filed Jun. 22, 2007, and U.S. patent application Ser. No. 11/850,642 (US 2008-0094371 A1), "Deletion Gestures on a Portable Multifunction Device," filed Sep. 5, 2007, the contents of which are hereby incorporated by reference in their entirety.

As described in U.S. patent application Ser. No. 11/322, 547 (US 2007-0150830 A1), "Scrolling List With Floating Adjacent Index Symbols," filed Dec. 23, 2005; Ser. No. 11/322,551 (US 2007-0146337 A1), "Continuous Scrolling List With Acceleration," filed Dec. 23, 2005; and Ser. No. 11/322,553 (US 2007-0132789 A1), "List Scrolling In Response To Moving Contact Over List Of Index Symbols," filed Dec. 23, 2005, which are hereby incorporated by reference in their entirety, the user may scroll through the contact list using vertically upward and/or vertically downward gestures 814 on the touch screen.

Additional descriptions of word suggestion can be found in U.S. patent application Ser. No. 11/620,641 (US 2008-0167858 A1), "Method, System, And Graphical User Interface For Providing Word Recommendations for Text Input," filed Jan. 5, 2007) and U.S. patent application Ser. No. 11/620,642 (US 2008-0168366 A1), "Method, System, And Graphical User Interface For Providing Word Recommendations," filed Jan. 5, 2007, the contents of which are hereby incorporated by reference in their entirety.

Additional description of image management can be found in U.S. Provisional Patent Application Nos. 60/883, 785, "Portable Electronic Device For Photo Management," filed Jan. 6, 2007, and 60/947,118, "Portable Electronic Device For Photo Management," filed Jun. 29, 2007, and U.S. patent application Ser. No. 11/848,210 (US 2008-0052945 A1), "Portable Electronic Device For Photo Management," filed Aug. 30, 2007, the contents of which are hereby incorporated by reference in their entirety.

Additional description of a video player and manager can be found in U.S. Provisional Patent Application Nos. 60/883,784, "Video Manager For Portable Multifunction Device," filed Jan. 6, 2007, and 60/946,973, "Video Manager For Portable Multifunction Device," filed Jun. 28, 2007, and U.S. patent application Ser. No. 11/850,008 (US 2008-0055272 A1), "Video Manager For Portable Multifunction Device," filed Sep. 4, 2007, the contents of which are hereby incorporated by reference in their entirety.

Additional description of configuring and displaying widgets can be found in U.S. Provisional Patent Application No. 60/946,975, "Portable Multifunction Device, Method, and Graphical User Interface for Configuring and Displaying Widgets," filed Jun. 28, 2007, and U.S. patent application Ser. No. 11/850,010 (US 2008-0082930 A1), "Portable Multifunction Device, Method, and Graphical User Interface for Configuring and Displaying Widgets," filed Sep. 4, 2007, the content of which is hereby incorporated by reference in its entirety.

As described in U.S. patent application Ser. No. 11/322, 547 (US 2007-0150830 A1), "Scrolling List With Floating Adjacent Index Symbols," filed Dec. 23, 2005, which is hereby incorporated by reference in its entirety, the user may scroll through the contact list using vertically upward and/or vertically downward gestures 2602 on the touch screen.

Additional description of the reordering of user-configurable lists can be found in U.S. Provisional Patent Application No. 60/883,808, "System And Method For Managing Lists," filed Jan. 7, 2007, and U.S. patent application Ser. No. 11/770,725 (US 2008-0165136 A1), "System and Method for Managing Lists," filed Jun. 28, 2007, the contents of which are hereby incorporated by reference in their entirety.

Additional description of missed call management can be found in U.S. Provisional Patent Application No. 60/883, 782, "Telephone Call Management For A Portable Multifunction Device," filed Jan. 6, 2007, and U.S. patent application Ser. No. 11/769,694 (US 2008-0057926 A1), "Missed Telephone Call Management for a Portable Multifunction Device," filed Jun. 27, 2007, the contents of which are hereby incorporated by reference in their entirety.

Additional description of location-based dialing can be found in U.S. Provisional Patent Application No. 60/883, 800, "Method, Device, And Graphical User Interface For Location-Based Dialing," filed Jan. 7, 2007, and U.S. patent application Ser. No. 11/769,692 (US 2008-0167083 A1), "Method, Device, and Graphical User Interface for Location-Based Dialing," filed Jun. 27, 2007, the contents of which are hereby incorporated by reference in their entirety.

Additional description of conference calling can be found in U.S. Provisional Patent Application No. 60/947,133, "Portable Multifunction Device, Method, and Graphical User Interface for Conference Calling," filed Jun. 29, 2007, and U.S. patent application Ser. No. 11/960,673 (US 2008-0168361 A1), "Portable Multifunction Device, Method, and Graphical User Interface for Conference Calling," filed Dec. 19, 2007, the content of which is hereby incorporated by reference in its entirety.

Additional description of application switching can be found in U.S. Provisional Patent Application No. 60/883, 809, "Portable Electronic Device Supporting Application Switching," filed Jan. 7, 2007, and U.S. patent application Ser. No. 11/969,908 (US 2008-0168379 A1), "Portable Electronic Device Supporting Application Switching," filed Jan. 6, 2008, the content of which is hereby incorporated by reference in its entirety.

Additional description of user interfaces for handling incoming calls can be found in U.S. Provisional Patent Application No. 60/883,783, "Incoming Telephone Call Management For A Portable Multifunction Device," filed Jan. 6, 2007, and U.S. patent application Ser. No. 11/769,695 (US 2008-0055263 A1), "Incoming Telephone Call Management For A Portable Multifunction Device," filed Jun. 27, 2007, the contents of which are hereby incorporated by reference in their entirety.

Additional description of the voicemail system can be found in U.S. Provisional Patent Application No. 60/883, 799, "Voicemail Manager For Portable Multifunction Device," filed Jan. 7, 2007; U.S. patent application Ser. No. 11/770,720 (US 2008-0055264 A1), "Voicemail Manager for Portable Multifunction Device," filed Jun. 28, 2007; and 60/947,348, "Voicemail Set-Up on a Portable Multifunction Device," filed Jun. 29, 2007; and U.S. patent application Ser. No. 11/961,716 (US 2008-0168353 A1), "Voicemail Set-Up on a Portable Multifunction Device," filed Dec. 20, 2007, the contents of which are hereby incorporated by reference in their entirety.

Edit icon that when activated (e.g., by a finger tap on the icon) initiates display of a user interface for deleting emails (e.g., as described in U.S. Provisional Patent Application Nos. 60/883,814, "Deletion Gestures On A Portable Multifunction Device," filed Jan. 7, 2007, and 60/936,755, "Deletion Gestures On A Portable Multifunction Device," filed Jun. 22, 2007, and U.S. patent application Ser. No. 11/850, 642 (US 2008-0094371 A1), "Deletion Gestures On A Portable Multifunction Device," filed Sep. 5, 2007, the contents of which are hereby incorporated by reference in their entirety).

In some embodiments, in response to detecting a horizontal swipe gesture on a particular email message in a the list of emails messages, a process for deleting the particular email message is initiated (e.g., as described in U.S. Provisional Patent Application Nos. 60/883,814, "Deletion Gestures On A Portable Multifunction Device," filed Jan. 7, 2007, and 60/936,755, "Deletion Gestures On A Portable Multifunction Device," filed Jun. 22, 2007, and U.S. patent application Ser. No. 11/850,642 (US 2008-0094371 A1), "Deletion Gestures On A Portable Multifunction Device," filed Sep. 5, 2007, the contents of which are hereby incorporated by reference in their entirety).

Additional description of an email client can be found in U.S. Provisional Patent Application No. 60/883,807, "Email Client For A Portable Multifunction Device," filed Jan. 7, 2007, and U.S. patent application Ser. No. 11/850,630 (US 2008-0094369 A1), "Email Client For A Portable Multifunction Device," filed Sep. 5, 2007, the content of which is hereby incorporated by reference in its entirety.

Methods for efficiently fetching email messages can be found in U.S. Provisional Patent Application No. 60/947,395, "Email Fetching System and Method in a Portable Electronic Device," filed Jun. 29, 2007, and U.S. patent application Ser. No. 11/968,070 (US 2009-0006570 A1), "Email Fetching System and Method in a Portable Electronic Device," filed Dec. 31, 2007, the content of which is hereby incorporated by reference in its entirety.

Methods for automatically selecting email ports and email security can be found in U.S. Provisional Patent Application No. 60/947,396, "Port Discovery and Message Delivery in a Portable Electronic Device," filed Jun. 29, 2007, and U.S. patent application Ser. No. 11/968,076 (US 2009-0006644 A1), "Port Discovery and Message Delivery in a Portable Electronic Device," filed Dec. 31, 2007, the content of which is hereby incorporated by reference in its entirety.

Additional description of displaying structured electronic documents (e.g., web pages) can be found in U.S. Provisional Patent Application No. 60/946,715, "Portable Electronic Device, Method, and Graphical User Interface for Displaying Structured Electronic Documents," filed Jun. 27, 2007, and U.S. patent application Ser. No. 11/850,013 (US 2008-0094368 A1), "Portable Electronic Device, Method, and Graphical User Interface for Displaying Structured Electronic Documents," filed Sep. 4, 2007, the content of which is hereby incorporated by reference in its entirety.

Additional description of adding windows to an application can be found in U.S. patent application Ser. No. 11/620,647 (US 2008-0168401 A1), "Method, System, And Graphical User Interface For Viewing Multiple Application Windows," filed Jan. 5, 2007, the content of which is hereby incorporated by reference in its entirety.

Additional description of displaying inline multimedia content can be found in U.S. Provisional Patent Application No. 60/947,155, "Portable Electronic Device, Method, and Graphical User Interface for Displaying Inline Multimedia Content," filed Jun. 29, 2007, and U.S. patent application Ser. No. 11/961,773 (US 2008-0165148 A1), "Portable Electronic Device, Method, and Graphical User Interface for Displaying Inline Multimedia Content," filed Dec. 20, 2007, the content of which is hereby incorporated by reference in its entirety.

Additional description of interacting with user input elements can be found in U.S. Provisional Patent Application No. 60/947,127, "Portable Multifunction Device, Method, and Graphical User Interface for Interacting with User Input Elements in Displayed Content," filed Jun. 29, 2007, and U.S. patent application Ser. No. 11/960,394 (US 2008-0165143 A1), "Portable Multifunction Device, Method, and Graphical User Interface for Interacting with User Input Elements in Displayed Content," filed Dec. 19, 2007, the content of which is hereby incorporated by reference in its entirety.

Additional description of displaying and activating hyperlinks using interfaces can be found in U.S. patent application Ser. No. 11/620,644 (US 2008-0165133 A1), "Method, System, And Graphical User Interface For Displaying Hyperlink Information," filed Jan. 5, 2007, and in U.S. patent application Ser. No. 11/620,646 (US 2008-0259041 A1), "Method, System, And Graphical User Interface For Activating Hyperlinks," filed Jan. 5, 2007, the contents of which are hereby incorporated by reference in their entirety.

Additional description of translating displayed content can be found in U.S. Provisional Patent Application No. 60/946,976, "Portable Multifunction Device, Method, and Graphical User Interface for Translating Displayed Content," filed Jun. 28, 2007, and U.S. patent application Ser. No. 11/960,675 (US 2008-0168405 A1), "Portable Multifunction Device, Method, and Graphical User Interface for Translating Displayed Content," filed Dec. 19, 2007, the content of which is hereby incorporated by reference in its entirety.

Additional description of "rubber band-like" scrolling and translation behavior can be found in U.S. Provisional Patent Application Nos. 60/883,801, "List Scrolling And Document Translation On A Touch-Screen Display," filed Jan. 7, 2007; 60/945,858, "List Scrolling and Document Translation on a Touch-Screen Display," filed Jun. 22, 2007, and 60/946,971, "List Scrolling and Document Translation on a Touch-Screen Display," filed Jun. 28, 2007, and U.S. patent application Ser. No. 11/956,969 (US 2008-0168404 A1), "List Scrolling and Document Translation, Scaling, and Rotation on a Touch-Screen Display," filed Dec. 14, 2007, the contents of which are hereby incorporated by reference in their entirety.

Additional description of scrolling is described in U.S. patent application Ser. No. 11/322,547 (US 2007-0150830 A1), "Scrolling List With Floating Adjacent Index Symbols," filed Dec. 23, 2005; Ser. No. 11/322,551 (US 2007-0146337 A1), "Continuous Scrolling List With Acceleration," filed Dec. 23, 2005; and Ser. No. 11/322,553 (US 2007-0132789 A1), "List Scrolling In Response To Moving Contact Over List Of Index Symbols," filed Dec. 23, 2005, which are hereby incorporated by reference in their entirety.

Additional description of user interface object reconfiguration can be found in U.S. Provisional Patent Application No. 60/937,990, "Portable Multifunction Device, Method, and Graphical User Interface Supporting User Navigations of Graphical Objects on a Touch Screen Display," filed Jun. 29, 2007, and U.S. patent application Ser. No. 11/969,809 (US 2008-0165153 A1), "Portable Multifunction Device, Method, and Graphical User Interface Supporting User Navigations of Graphical Objects on a Touch Screen Display," filed Jan. 4, 2008, the content of which is hereby incorporated by reference in its entirety.

U.S. Provisional Patent Application No. 60/936,562, "Portable Multifunction Device, Method, and Graphical User Interface for Playing Online Videos," filed Jun. 20, 2007, and U.S. patent application Ser. No. 11/968,067 (US 2008-0320391 A1), "Portable Multifunction Device, Method, and Graphical User Interface for Playing Online Videos," filed Dec. 31, 2007, the content of which is hereby incorporated by reference in its entirety, describes a way that major online video content categories can be rearranged by a user to correspond to the user's preferred (favorite) categories. The teachings in that application are also applicable here to rearranging major music and/or video categories.

Cover flow mode and other image modes are described in U.S. Provisional Patent Application No. 60/843,832, "Techniques And Systems For Browsing Media Content," filed Sep. 11, 2006; U.S. patent application Ser. No. 11/519,460 (US 2008-0066016 A1), "Media Manager With Integrated Browsers," filed Sep. 11, 2006; and U.S. Provisional Patent Application No. 60/878,746 "Electronic Device With Image Based Browsing," filed Jan. 5, 2007, which are hereby incorporated by reference in their entirety.

Additional description of mode changes based on device orientation can be found in U.S. Provisional Patent Application No. 60/947,300, "Modal Change Based on Orientation of a Portable Multifunction Device," filed Jun. 29, 2007, and U.S. patent application Ser. No. 11/969,800 (US 2008-0165152 A1), "Modal Change Based on Orientation of a Portable Multifunction Device," filed Jan. 4, 2008, the content of which is hereby incorporated by reference in its entirety.

Additional description of portrait-landscape rotation heuristics can be found in U.S. Provisional Patent Application No. 60/947,132, "Portrait-Landscape Rotation Heuristics for a Portable Multifunction Device," filed Jun. 29, 2007, and U.S. patent application Ser. No. 11/960,671 (US 2008-0165144 A1), "Portrait-Landscape Rotation Heuristics for a Portable Multifunction Device," filed Dec. 19, 2007, the content of which is hereby incorporated by reference in its entirety.

Additional description of adaptive user interface displays can be found in U.S. Provisional Patent Application No. 60/937,992, "Portable Multifunction Device, Method, and Graphical User Interface for Displaying User Interface Objects Adaptively," filed Jun. 29, 2007, and U.S. patent application Ser. No. 11/961,760 (US 2008-0165147 A1), "Portable Multifunction Device, Method, and Graphical User Interface for Displaying User Interface Objects Adaptively," filed Dec. 20, 2007, the content of which is hereby incorporated by reference in its entirety.

Additional description of artwork can be found in U.S. Provisional Patent Application No. 60/883,818, "Creating Digital Artwork Based On Content File Metadata," filed Jan. 7, 2007, and U.S. patent application Ser. No. 11/960,674 (US 2008-0168365 A1), "Creating Digital Artwork Based On Content File Metadata," filed Dec. 19, 2007, the content of which is hereby incorporated by reference in its entirety.

Additional description of positioning a slider icon can be found in U.S. Provisional Patent Application No. 60/947,304, "Positioning a Slider Icon on a Portable Multifunction Device," filed Jun. 29, 2007, and U.S. patent application Ser. No. 11/968,064 (US 2008-0168395 A1), "Positioning a Slider Icon on a Portable Multifunction Device," filed Dec. 31, 2007, the content of which is hereby incorporated by reference in its entirety.

Additional description of word suggestion can be found in U.S. patent application Ser. No. 11/620,641 (US 2008-0167858 A1), "Method And System For Providing Word Recommendations For Text Input," filed Jan. 5, 2007, and U.S. patent application Ser. No. 11/620,642 (US 2008-0168366 A1), "Method, System, And Graphical User Interface For Providing Word Recommendations," filed Jan. 5, 2007, the contents of which are hereby incorporated by reference in their entirety.

Additional description of calendars can be found in U.S. Provisional Patent Application No. 60/883,820, "System And Method For Viewing And Managing Calendar Entries," filed Jan. 7, 2007, and U.S. patent application Ser. No. 11/969,786 (US 2008-0165151 A1), "System and Method for Viewing And Managing Calendar Entries," filed Jan. 4, 2008, the content of which is hereby incorporated by reference in its entirety.

Additional description of inputting date and time information can be found in U.S. Provisional Patent Application No. 60/947,146, "System, Method, and Graphical User Interface for Inputting Date and Time Information on a Portable Multifunction Device," filed Jun. 29, 2007, and U.S. patent application Ser. No. 11/968,051 (US 2008-0165149 A1), "System, Method, and Graphical User Interface for Inputting Date and Time Information on a Portable Multifunction Device," filed Dec. 31, 2007, the content of which is hereby incorporated by reference in its entirety.

Additional description of user created widgets can be found in U.S. Provisional Patent Application Nos. 60/883,805, "Web Clip Widgets On A Portable Multifunction Device," filed Jan. 7, 2007, and 60/946,712, "Web Clip Widgets on a Portable Multifunction Device," filed Jun. 27, 2007, and U.S. patent application Ser. No. 11/850,011 (US 2008-0055273 A1), "Web Clip Widgets On a Portable Multifunction Device," filed Sep. 4, 2007, the contents of which are hereby incorporated by reference in their entirety.

Additional description of providing maps and directions can be found in U.S. Provisional Patent Application No. 60/936,725, "Portable Multifunction Device, Method, and Graphical User Interface for Providing Maps and Directions," filed Jun. 22, 2007, and U.S. patent application Ser. No. 11/969,211 (US 2008-0168396 A1), "Portable Multifunction Device, Method, and Graphical User Interface for Providing Maps and Directions," filed Jan. 3, 2008, the content of which is hereby incorporated by reference in its entirety.

Additional description of displaying notification information for missed communications can be found in U.S. Provisional Patent Application No. 60/883,804, "System And Method For Displaying Communication Notifications," filed Jan. 7, 2007 and U.S. patent application Ser. No. 11/770,718 (US 2008-0220752 A1), "Portable Multifunction Device, Method, and Graphical User Interface for Managing Communications Received While in a Locked State," filed Jun. 28, 2007, the contents of which are hereby incorporated by reference in their entirety.

Additional description of methods for silencing a portable device can be found in U.S. Provisional Patent Application No. 60/883,802, "Portable Electronic Device With Alert Silencing," filed Jan. 7, 2007 and U.S. patent application Ser. No. 11/770,727 (US 2008-0165022 A1), "Portable Electronic Device with Alert Silencing," filed Jun. 28, 2007, the contents of which are hereby incorporated by reference in their entirety.

Additional description of methods for turning off a portable device can be found in U.S. Provisional Patent Application No. 60/883,786, "Power-Off Methods For Portable Electronic Devices," filed Jan. 6, 2007, and U.S. patent application Ser. No. 11/770,722 (US 2008-0168290 A1), "Power-Off Methods For Portable Electronic Devices," filed Jun. 28, 2007, the contents of which are hereby incorporated by reference in their entirety.

Additional description of determining a cursor position from a finger contact can be found in U.S. Provisional Patent Application No. 60/946,716, "Methods for Determining a Cursor Position from a Finger Contact with a Touch Screen Display," filed Jun. 27, 2007, and U.S. patent application Ser. No. 11/850,015 (US 2008-0094356 A1), "Methods for Determining a Cursor Position from a Finger Contact with a Touch Screen Display," filed Sep. 4, 2007, the content of which is hereby incorporated by reference in its entirety.

Additional description of the horizontal and vertical bars can be found in U.S. Provisional Patent Application No. 60/947,386, "Portable Electronic Device, Method, and Graphical User Interface for Displaying Electronic Documents and Lists," filed Jun. 29, 2007, and U.S. patent application Ser. No. 11/968,059 (US 2008-0168349 A1), "Portable Electronic Device, Method, and Graphical User Interface for Displaying Electronic Documents and Lists," filed Dec. 31, 2007, the content of which is hereby incorporated by reference in its entirety.

Additional description of gestures can be found in U.S. Provisional Patent Application Nos. 60/883,817, "Portable Electronic Device Performing Similar Operations For Different Gestures," filed Jan. 7, 2007, and 60/946,970, "Screen Rotation Gestures on a Portable Multifunction Device," filed Jun. 28, 2007, and U.S. patent application Ser. No. 11/850,638 (US 2008-0094370 A1), "Portable Electronic Device Performing Similar Operations For Different Gestures," filed Sep. 5, 2007, and Ser. No. 11/960,667 (US 2008-0211778 A1), "Screen Rotation Gestures on a Portable Multifunction Device," filed Dec. 19, 2007, the contents of which are hereby incorporated by reference in their entirety.

Additional description of interpreting a finger gesture can be found in U.S. Provisional Patent Application No. 60/946,977, "Portable Multifunction Device, Method, and Graphical User Interface for Interpreting a Finger Gesture on a Touch Screen Display," filed Jun. 28, 2007, and U.S. patent application Ser. No. 11/969,796 (US 2008-0165160 A1), "Portable Multifunction Device, Method, and Graphical User Interface for Interpreting a Finger Gesture on a Touch Screen Display," filed Jan. 4, 2008, the content of which is hereby incorporated by reference in its entirety.

Additional description of interpreting a finger swipe gesture can be found in U.S. Provisional Patent Application No. 60/947,140, "Portable Multifunction Device, Method, and Graphical User Interface for Interpreting a Finger Swipe Gesture," filed Jun. 29, 2007, and U.S. patent application Ser. No. 11/961,700 (US 2008-0165145 A1), "Portable Multifunction Device, Method, and Graphical User Interface for Interpreting a Finger Swipe Gesture," filed Dec. 20, 2007, the content of which is hereby incorporated by reference in its entirety.

Additional description of heuristics can be found in U.S. Provisional Patent Application No. 60/937,991, "Touch Screen Device, Method, and Graphical User Interface for Determining Commands by Applying Heuristics," filed Jun. 29, 2007, and U.S. patent application Ser. No. 11/850,635 (US 2008-0122796 A1), "Touch Screen Device, Method, and Graphical User Interface for Determining Commands by Applying Heuristics," filed Sep. 5, 2007, the content of which is hereby incorporated by reference in its entirety.

Additional description of soft keyboards can be found in U.S. Provisional Patent Application No. 60/946,714, "Portable Multifunction Device with Soft Keyboards," filed Jun. 27, 2007, and U.S. patent application Ser. No. 11/961,663 (US 2008-0098331 A1), "Portable Multifunction Device with Soft Keyboards," filed Dec. 20, 2007, the content of which is hereby incorporated by reference in its entirety.

Additional description of keyboards can be found in U.S. Provisional Patent Application No. 60/883,806, "Soft Keyboard Display For A Portable Multifunction Device," filed Jan. 7, 2007, and U.S. patent application Ser. No. 11/850,641 (US 2008-0082934 A1), "Soft Keyboard Display For A Portable Multifunction Device," filed Sep. 5, 2007, the content of which is hereby incorporated by reference in its entirety.

Additional description of airplane mode indicators can be found in U.S. Provisional Patent Application No. 60/947,315, "Airplane Mode Indicator on a Portable Multifunction Device," filed Jun. 29, 2007, and U.S. patent application Ser. No. 11/961,743 (US 2008-0165146 A1), "Airplane Mode Indicator on a Portable Multifunction Device," filed Dec. 20, 2007, the content of which is hereby incorporated by reference in its entirety.

Additional description of dimming techniques can be found in U.S. Provisional Patent Application No. 60/883,821, "Portable Electronic Device With Auto-Dim Timers," filed Jan. 7, 2007, and U.S. patent application Ser. No. 11/960,677 (US 2008-0218535 A1), "Portable Electronic Device With Auto-Dim Timers," filed Dec. 19, 2007, the content of which is hereby incorporated by reference in its entirety.

Additional description of settings-related techniques can be found in U.S. Provisional Patent Application No. 60/883,812, "Portable Electronic Device With A Global Setting User Interface," filed Jan. 7, 2007, and U.S. patent application Ser. No. 11/960,669 (US 2008-0222545 A1), "Portable Electronic Device With A Global Setting User Interface," filed Dec. 19, 2007, the content of which is hereby incorporated by reference in its entirety.

In accordance with various embodiments, a toolbox window is contemplated to have the functionality similar to that set forth in U.S. Pat. No. 7,600,193 to Gunderson entitled "A METHOD OF TRACKING DUAL MODE DATA OBJECTS USING RELATED THUMBNAILS AND TOOL ICONS IN A PALETTE WINDOW," the disclosure of which is wholly incorporated by reference herein.

U.S. Patent Application titled "Video Conferencing System Transcoder", Ser. No. 11/252,238 (US 2006-0087553 A1), which was filed Oct. 17, 2005, whose inventors are Michael L. Kenoyer and Michael V. Jenkins, is hereby incorporated by reference in its entirety as though fully and completely set forth herein.

Similarly, the conference may be a videoconference, and the videoconference may be established according to any of a variety of methods, e.g., the one described in patent application Ser. No. 11/252,238 (US 2006-0087553 A1), which was incorporated by reference above.

A proximity sensor may perform as described in U.S. patent application Ser. No. 11/241,839 (US 2006-0161871 A1), "Proximity Detector In Handheld Device," filed Sep. 30, 2005; Ser. No. 11/240,788 (US 2006-0161870 A1), "Proximity Detector In Handheld Device," filed Sep. 30, 2005; Ser. No. 11/620,702 (US 2008-0167834 A1), "Using Ambient Light Sensor To Augment Proximity Sensor Output"; Ser. No. 11/586,862 (US 2007-0075965 A1), "Automated Response To And Sensing Of User Activity In Portable Devices," filed Oct. 24, 2006; and Ser. No. 11/638,251 (US 2008-0140868 A1), "Methods And Systems For Automatic Configuration Of Peripherals," which are hereby incorporated by reference in their entirety.

In some embodiments, a user may rearrange the icons in UI, e.g., using processes described in U.S. patent application Ser. No. 11/459,602 (US 2007-0157089 A1), "Portable Electronic Device With Interface Reconfiguration Mode," filed Jul. 24, 2006, which is hereby incorporated by reference in its entirety. For example, a user may move application icons in and out of tray 408 using finger gestures.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An electronic device, comprising:
    a display;
    a touch-sensitive surface;
    one or more processors;
    memory; and
    one or more programs, wherein the one or more programs are stored in the memory and configured to be executed by the one or more processors, the one or more programs including instructions for:
        displaying a first user interface on the display, wherein the first user interface includes:
            a background with an appearance, and
            one or more foreground objects;
        while displaying the first user interface on the display, detecting a first input by a first contact on the touch-sensitive surface at a location in the first user interface that corresponds to the background of the first user interface; and
        in response to detecting the first input by the first contact, in accordance with a determination that the first contact has a magnitude that is above a threshold, dynamically changing the appearance of the background of the first user interface without changing an appearance of the one or more foreground objects in the first user interface, wherein the dynamic change in the appearance of the background of the first user interface is based at least in part on the magnitude of the first contact and wherein the dynamic change in the appearance of the background of the first user interface includes displaying in sequence at least some of a plurality of images based at least in part on the magnitude of the first contact.

2. The electronic device of claim 1, wherein the electronic device is configured such that the threshold is associated with an operating system of the electronic device, and respective operations of respective applications on the electronic device are activated in response to detecting respective inputs that satisfy the threshold.

3. The electronic device of claim 1, wherein the electronic device is configured such that a respective foreground object of the one or more foreground objects responds to an input by a contact having a magnitude below the threshold.

4. The electronic device of claim 1, wherein the electronic device is configured such that the dynamic change in the appearance of the background of the first user interface is based in part on a positive rate of change in the magnitude of the first contact.

5. The electronic device of claim 1, wherein the electronic device is configured such that a magnitude of the dynamic change in the appearance of the background of the first user interface decays following detection of a cessation of the first contact.

6. The electronic device of claim 1, wherein the electronic device is configured such that the dynamic change in the appearance of the background of the first user interface is independent of a position of a focus selector on the background.

7. The electronic device of claim 1, wherein the one or more programs include instructions for:
    in response to detecting the first input by the first contact on the touch-sensitive surface, in accordance with a determination that the first input does not have a magnitude above the threshold, maintaining the appearance of the background of the first user interface.

8. The electronic device of claim 1, wherein the one or more programs includes instructions for:
    in response to detecting a cessation of the first input, ceasing the dynamically changing of the appearance of the background.

9. The electronic device of claim 1, wherein the one or more programs includes instructions for:
    in response to detecting a cessation of the first input, ceasing the dynamically changing of the appearance of the background and reverting to the display of the first user interface, including the background, on the display.

10. The electronic device of claim 1, wherein the electronic device is configured such that the plurality of images is associated with the background.

11. The electronic device of claim 1, wherein the electronic device is configured such that the plurality of images includes photographs taken using a camera of the electronic device.

12. The electronic device of claim 1, wherein the electronic device is configured such that the at least some of the plurality of images is displayed, in sequence, by automatically scrolling through the at least some of the plurality of images.

13. The electronic device of claim 1, wherein the electronic device is configured such that the background includes a representative image in the plurality of images that is dynamically changed in response to detecting the first input by the first contact, in accordance with the determination that the first contact has the magnitude that is above the threshold.

14. The electronic device of claim 1, wherein the electronic device is configured such that:
    the object is displayed without the appearance of the object being dynamically changed in a first use scenario, in response to detecting the first input by the first contact, in accordance with the determination that the first contact has the magnitude that is below the threshold; and
    the appearance of the object is dynamically changed in a second use scenario, in response to detecting the first input by the first contact, in accordance with the determination that the first contact has the magnitude that is above the threshold.

15. The electronic device of claim 1, wherein the electronic device is configured such that the plurality of images is associated with the background, and the plurality of images includes photographs.

16. The electronic device of claim 1, wherein the electronic device is configured such that the background is one of a plurality of pre-installed backgrounds stored in the memory and the background is capable of being selected by a user.

17. The electronic device of claim 1, wherein the electronic device is configured such that the at least some of the plurality of images is displayed, in sequence, by automatically moving, one-by-one, through the at least some of the plurality of images.

18. The electronic device of claim 1, wherein the electronic device is configured such that the first user interface includes a lock screen.

19. The electronic device of claim 1, wherein the electronic device is configured such that the first user interface includes a lock screen that is unlocked.

20. The electronic device of claim 1, wherein the electronic device is configured such that the magnitude includes a duration magnitude.

21. The electronic device of claim 1, wherein the electronic device is configured to, in response to detecting a cessation of the first input, revert to one of the plurality of images that is different from that which is displayed as the background prior to detecting the first input.

22. The electronic device of claim 21, wherein the electronic device is configured such that at least one of:
the background includes a background image;
the background is a background image;
a representative image includes a background image;
a representative image includes one of the sequence of images;
the one or more foreground objects includes one or more application icons;
the one or more foreground objects of a second user interface includes one or more application icons;
the one or more foreground objects include at least one of a date, a time, a network type, a battery level, or status information;
the one or more foreground objects of the first user interface include at least one of a date, a time, a network type, a battery level, or status information;
the background of the first user interface is the same as the background of a second user interface;
the background of the first user interface is different from the background of a second user interface;
the first input by the first contact results from a press;
the first input by the first contact results from a press gesture;
the location in the first user interface that corresponds to the background of the first user interface includes a location that overlaps the background, at least in part;
the location in the first user interface that corresponds to the background of the first user interface, includes a bounding box;
the magnitude includes a pressure or force magnitude of the first contact;
the threshold includes a threshold level of pressure or force of the first contact;
the threshold includes a predetermined level of pressure or force of the first contact;
the instructions include at least one of: computer code, computer software, software instructions, hardware code, or hardware instructions;
the dynamic change in the appearance of the background of the first user interface is based at least in part on the magnitude of the first contact, by the appearance of the background of the first user interface conditionally changing based on the determination that the first contact has the magnitude above the threshold;
the dynamic change in the appearance of the background of the first user interface is based at least in part on the magnitude of the first contact, by the appearance of the background of the first user interface changing only if it is determined that the first contact has the magnitude above the threshold;
the dynamic change in the appearance of the background of the first user interface is based at least in part on the magnitude of the first contact, by the dynamic changing of the appearance of the background of the first user interface altering dynamically based at least in part on the magnitude of the first contact;
the dynamic change in the appearance of the background of the first user interface is based at least in part on the magnitude of the first contact, by dynamically changing the appearance of the background in a first manner in response to a first magnitude, and dynamically changing the appearance of the background in a second manner in response to a second magnitude;
the dynamically changing the appearance of the background of the first user interface includes displaying in sequence at least some of the sequence of images based at least in part on the magnitude of the first contact;
the displaying in sequence the at least some of the sequence of images is based at least in part on the magnitude of the first contact, by starting to scroll through the at least some of the sequence of images as a function of the magnitude of the first contact;
the displaying in sequence the at least some of the sequence of images is based at least in part on the magnitude of the first contact, by scrolling through the at least some of the sequence of images as a function of the magnitude of the first contact;
the displaying in sequence the at least some of the sequence of images is based at least in part on the magnitude of the first contact, by speeding a scrolling through the at least some of the sequence of images as a function of the magnitude of the first contact;
the threshold includes a predetermined level of duration of the first contact;
the magnitude includes a duration magnitude of the first contact;
the displaying in sequence the at least some of the sequence of images includes displaying the sequence of images as a video;
the displaying in sequence the at least some of the sequence of images includes displaying the sequence of images to appear as a video;
the displaying in sequence the at least some of the sequence of images is based at least in part on the magnitude of the first contact, by adjusting a speed through which the at least some of the sequence of images are displayed in sequence as a function of the magnitude of the first contact; or
the displaying in sequence the at least some of the sequence of images is based at least in part on the magnitude of the first contact, by increasing a speed through which the at least some of the sequence of images are displayed in sequence as a function of the magnitude of the first contact.

23. A method, comprising:
at an electronic device including a display, a touch-sensitive surface, one or more processors, and memory:
displaying a first user interface on the display, wherein the first user interface includes:
a background with an appearance, and
one or more foreground objects;
with the first user interface displayed on the display, detecting a first input by a first contact on the touch-sensitive surface at a location in the first user interface that corresponds to the background of the first user interface; and
in response to detecting the first input by the first contact, in accordance with a determination that the first contact has a magnitude that is above a threshold, dynamically changing the appearance of the background of the first user interface without changing an appearance of the one or more foreground objects in the first user interface, wherein the dynamic change in the appearance of the background of the first user interface is based at least in part on the magnitude of the first contact and wherein the dynamic change in the appearance of the background of the first user interface includes displaying in sequence at least some of a plurality of images based at least in part on the magnitude of the first contact.

24. The method of claim 23, wherein the threshold is associated with an operating system of the electronic device, and respective operations of respective applications on the electronic device are activated in response to detecting respective inputs that satisfy the threshold.

25. The method of claim 23, wherein a respective foreground object of the one or more foreground objects responds to an input by a contact having a magnitude below the threshold.

26. The method of claim 23, wherein the dynamic change in the appearance of the background of the first user interface is based in part on a positive rate of change in the magnitude of the first contact.

27. The method of claim 23, wherein a magnitude of the dynamic change in the appearance of the background of the first user interface decays following detection of a cessation of the first contact.

28. The method of claim 23, wherein the dynamic change in the appearance of the background of the first user interface is independent of the location that corresponds to the background.

29. The method of claim 23, and further comprising:
in response to detecting the first input by the first contact on the touch-sensitive surface, in accordance with a determination that the first input does not have the magnitude that is above the threshold, maintaining the appearance of the background of the first user interface.

30. The method of claim 23, and further comprising:
in response to detecting a cessation of the first input, ceasing the dynamically changing of the appearance of the background.

31. The method of claim 23, and further comprising:
in response to detecting a cessation of the first input, ceasing the dynamically changing of the appearance of the background and reverting to the display of the first user interface, including the background, on the display.

32. The method of claim 23, wherein the plurality of images is associated with the background.

33. The method of claim 23, wherein the plurality of images includes photographs taken using a camera of the electronic device.

34. The method of claim 23, wherein the at least some of the plurality of images is displayed, in sequence, by automatically scrolling through the at least some of the plurality of images.

35. The method of claim 23, wherein the background includes a representative image in the plurality of images that is dynamically changed in response to detecting the first input by the first contact, in accordance with the determination that the first contact has the magnitude that is above the threshold.

36. The method of claim 23, wherein:
the object is displayed without the appearance of the object being dynamically changed in a first use scenario, in response to detecting the first input by the first contact, in accordance with the determination that the first contact has the magnitude that is below the threshold; and
the appearance of the object is dynamically changed in a second use scenario, in response to detecting the first input by the first contact, in accordance with the determination that the first contact has the magnitude that is above the threshold.

37. The method of claim 23, wherein the at least some of the plurality of images is displayed, in sequence, by automatically displaying, one-by-one, the at least some of the plurality of images.

38. The method of claim 23, wherein the at least some of the plurality of images is displayed, in sequence, by automatically moving, one-by-one, through the at least some of the plurality of images.

39. The method of claim 23, wherein the first user interface includes a lock screen.

40. The method of claim 23, wherein the first user interface includes a lock screen that is unlocked.

41. The method of claim 23, wherein the magnitude includes a duration magnitude.

42. The method of claim 23, wherein the plurality of images is associated with the background, and the plurality of images includes photographs.

43. The method of claim 23, and further comprising: in response to detecting a cessation of the first input, displaying an image that is different from that which is displayed as the background prior to detecting the first input.

* * * * *